(12) United States Patent
Adami et al.

(10) Patent No.: US 11,155,944 B2
(45) Date of Patent: Oct. 26, 2021

(54) TEXTILES AND ARTICLES, AND PROCESSES FOR MAKING THE SAME

(71) Applicant: NIKE, Inc., Beaverton, OR (US)

(72) Inventors: Giovanni Adami, Montebelluna TV (IT); Sam Amis, Portland, OR (US); Sergio Cavaliere, Venice (IT); Jessica Green, Hillsboro, OR (US); Stephen Hipp, Hillsboro, OR (US); John Hurd, Lake Oswego, OR (US); James Molyneux, Portland, OR (US); Thomas J. Rushbrook, Portland, OR (US); Timothy J. Smith, Portland, OR (US); Christianna Wincek, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 304 days.

(21) Appl. No.: 15/941,619

(22) Filed: Mar. 30, 2018

(65) Prior Publication Data

US 2018/0220741 A1     Aug. 9, 2018

Related U.S. Application Data

(63) Continuation of application No. 15/808,851, filed on Nov. 9, 2017.

(Continued)

(51) Int. Cl.
*B29C 51/02*     (2006.01)
*D04B 1/24*     (2006.01)
(Continued)

(52) U.S. Cl.
CPC ............... *D04B 1/24* (2013.01); *A41D 31/00* (2013.01); *A43B 1/0018* (2013.01); *A43B 13/04* (2013.01);
(Continued)

(58) Field of Classification Search
None
See application file for complete search history.

(56) References Cited

U.S. PATENT DOCUMENTS 3,011,383 A     12/1961     Sylvester et al.
3,821,012 A     6/1974     Lattarulo et al.
(Continued)

FOREIGN PATENT DOCUMENTS

CN     101016385 A     8/2007
CN     104066350 A     9/2014
(Continued)

OTHER PUBLICATIONS

International Search Report, issued by the US Patent Office for application PCT/US2017/060934, dated Jan. 23, 2018.
(Continued)

*Primary Examiner* — Monica A Huson
(74) *Attorney, Agent, or Firm* — Thomas|Horstemeyer, LLP

(57) ABSTRACT

Articles of wear having one or more textiles that include a low processing temperature polymeric composition and a high processing temperature polymeric composition, and methods of manufacturing the same are disclosed. The low processing temperature polymeric composition and the high processing temperature polymeric composition can be selectively incorporated into a textile to provide one or more structural properties and/or other advantageous properties to the article. The textile can be thermoformed to impart such structural and/or other advantageous properties to the article of wear. This abstract is intended as a scanning tool for purposes of searching in the particular art and is not intended to be limiting of the present disclosure.

12 Claims, 20 Drawing Sheets

Related U.S. Application Data

(60) Provisional application No. 62/419,824, filed on Nov. 9, 2016, provisional application No. 62/419,832, filed on Nov. 9, 2016, provisional application No. 62/419,841, filed on Nov. 9, 2016, provisional application No. 62/419,851, filed on Nov. 9, 2016.

(51) Int. Cl.

| | | |
|---|---|---|
| *D04B 1/16* | (2006.01) | |
| *B29D 35/06* | (2010.01) | |
| *A43B 1/00* | (2006.01) | |
| *B29C 51/00* | (2006.01) | |
| *B29D 35/14* | (2010.01) | |
| *A43B 13/04* | (2006.01) | |
| *A43B 23/02* | (2006.01) | |
| *B29C 51/26* | (2006.01) | |
| *B41M 1/12* | (2006.01) | |
| *B41M 3/00* | (2006.01) | |
| *A41D 31/00* | (2019.01) | |
| *B29C 70/44* | (2006.01) | |
| *B29D 35/12* | (2010.01) | |
| *D01F 6/62* | (2006.01) | |
| *D01F 6/82* | (2006.01) | |
| *A43B 1/04* | (2006.01) | |
| *A43B 13/12* | (2006.01) | |
| *A43D 95/10* | (2006.01) | |
| *A43D 95/12* | (2006.01) | |
| *A43B 9/02* | (2006.01) | |
| *A43D 95/14* | (2006.01) | |
| *A43D 111/00* | (2006.01) | |
| *A43D 11/00* | (2006.01) | |
| *B29L 31/50* | (2006.01) | |
| *B29D 35/00* | (2010.01) | |
| *B29K 667/00* | (2006.01) | |

(52) U.S. Cl.
CPC ........ *A43B 23/026* (2013.01); *A43B 23/0215* (2013.01); *B29C 51/004* (2013.01); *B29C 51/02* (2013.01); *B29C 51/26* (2013.01); *B29C 70/44* (2013.01); *B29D 35/068* (2013.01); *B29D 35/126* (2013.01); *B29D 35/142* (2013.01); *B41M 1/12* (2013.01); *B41M 3/001* (2013.01); *D01F 6/62* (2013.01); *D01F 6/82* (2013.01); *D04B 1/16* (2013.01); *A41D 2500/10* (2013.01); *A43B 1/04* (2013.01); *A43B 9/02* (2013.01); *A43B 13/12* (2013.01); *A43B 23/024* (2013.01); *A43B 23/0235* (2013.01); *A43B 23/0255* (2013.01); *A43B 23/0265* (2013.01); *A43D 11/003* (2013.01); *A43D 95/10* (2013.01); *A43D 95/12* (2013.01); *A43D 95/14* (2013.01); *A43D 111/00* (2013.01); *B29D 35/0054* (2013.01); *B29D 35/06* (2013.01); *B29D 35/146* (2013.01); *B29K 2667/00* (2013.01); *B29K 2821/003* (2013.01); *B29K 2823/00* (2013.01); *B29K 2871/00* (2013.01); *B29K 2875/00* (2013.01); *B29K 2877/00* (2013.01); *B29K 2913/00* (2013.01); *B29L 2031/50* (2013.01); *D10B 2401/041* (2013.01); *D10B 2501/043* (2013.01)

(56) References Cited

U.S. PATENT DOCUMENTS

| | | | |
|---|---|---|---|
| 4,523,005 A | 6/1985 | Szycher | |
| 4,594,283 A | 6/1986 | Ohigashi | |
| 4,785,558 A | 11/1988 | Shiomura | |
| 4,964,229 A * | 10/1990 | Laberge | A43B 5/1666 36/93 |
| 5,158,636 A | 10/1992 | Groitzsch et al. | |
| 5,866,058 A | 2/1999 | Batchelder et al. | |
| 5,969,076 A | 10/1999 | Lai et al. | |
| 6,164,095 A | 12/2000 | Rock et al. | |
| 6,397,638 B1 | 6/2002 | Roell | |
| 6,601,042 B1 * | 7/2003 | Lyden | A43B 1/0081 36/27 |
| 7,870,681 B2 | 1/2011 | Meschter | |
| 7,975,404 B2 | 7/2011 | Goldberg | |
| 8,448,474 B1 | 5/2013 | Tatler et al. | |
| 8,973,288 B2 | 3/2015 | Dojan et al. | |
| 8,997,530 B1 | 4/2015 | Podhajny | |
| 9,888,743 B2 | 2/2018 | Bell et al. | |
| 10,458,052 B2 | 10/2019 | Adami et al. | |
| 2002/0078599 A1 | 6/2002 | Delgorgue et al. | |
| 2002/0106956 A1 | 8/2002 | Howland | |
| 2004/0118018 A1 | 6/2004 | Dua | |
| 2005/0081402 A1 | 4/2005 | Orei et al. | |
| 2005/0193592 A1 | 9/2005 | Dua et al. | |
| 2006/0048413 A1 | 3/2006 | Sokolowski et al. | |
| 2006/0165939 A1 | 7/2006 | Hottner | |
| 2006/0169387 A1 | 8/2006 | Nayar et al. | |
| 2009/0126225 A1 | 5/2009 | Jarvis | |
| 2010/0018075 A1 | 1/2010 | Meschter et al. | |
| 2010/0037483 A1 | 2/2010 | Meschter et al. | |
| 2010/0154256 A1 | 6/2010 | Dua | |
| 2010/0199406 A1 | 8/2010 | Dua et al. | |
| 2010/0199520 A1 | 8/2010 | Dua et al. | |
| 2010/0229429 A1 | 9/2010 | Longuet | |
| 2011/0088285 A1 | 4/2011 | Dojan et al. | |
| 2011/0308115 A1 | 12/2011 | Le et al. | |
| 2012/0117823 A1 | 5/2012 | Meschter et al. | |
| 2012/0227282 A1 | 9/2012 | Hawkinson et al. | |
| 2012/0233882 A1 | 9/2012 | Huffa et al. | |
| 2012/0246973 A1 | 10/2012 | Dua | |
| 2012/0291314 A1 | 11/2012 | Sokolowski et al. | |
| 2013/0145652 A1 | 6/2013 | Podhajny et al. | |
| 2013/0260629 A1 | 10/2013 | Dua et al. | |
| 2014/0020192 A1 | 1/2014 | Jones | |
| 2014/0107311 A1 | 4/2014 | Farkas | |
| 2014/0130270 A1 | 5/2014 | Baudouin et al. | |
| 2014/0150292 A1 | 6/2014 | Podhajny et al. | |
| 2014/0209233 A1 | 7/2014 | Dua et al. | |
| 2014/0223768 A1 | 8/2014 | Berend et al. | |
| 2014/0223771 A1 | 8/2014 | Berend et al. | |
| 2014/0237738 A1 * | 8/2014 | Johnson | A43D 25/07 12/107 R |
| 2014/0245634 A1 | 9/2014 | Podhajny | |
| 2014/0250611 A1 | 9/2014 | Schoborg | |
| 2014/0310986 A1 | 10/2014 | Tamm et al. | |
| 2014/0373389 A1 | 12/2014 | Bruce | |
| 2015/0040428 A1 | 2/2015 | Davis et al. | |
| 2015/0059211 A1 | 3/2015 | Droege et al. | |
| 2015/0237948 A1 | 8/2015 | Mallen et al. | |
| 2015/0282565 A1 | 10/2015 | Kilgore | |
| 2015/0313316 A1 | 11/2015 | Boucher et al. | |
| 2015/0320136 A1 | 11/2015 | Dua et al. | |
| 2016/0021979 A1 | 1/2016 | Iuchi et al. | |
| 2016/0058098 A1 | 3/2016 | Cross et al. | |
| 2016/0122907 A1 | 5/2016 | Liu et al. | |
| 2016/0165990 A1 | 6/2016 | Peterson | |
| 2016/0206040 A1 | 7/2016 | Cross et al. | |
| 2016/0286898 A1 | 10/2016 | Manz et al. | |
| 2017/0071291 A1 | 3/2017 | Follet et al. | |
| 2017/0129200 A1 | 5/2017 | Adami et al. | |
| 2017/0245582 A1 | 8/2017 | Green et al. | |
| 2017/0325545 A1 | 11/2017 | Becker et al. | |
| 2017/0325546 A1 | 11/2017 | Becker et al. | |
| 2018/0125158 A1 | 5/2018 | Adami et al. | |
| 2018/0125159 A1 | 5/2018 | Adami et al. | |
| 2018/0125165 A1 | 5/2018 | Adami et al. | |

(56) References Cited

U.S. PATENT DOCUMENTS

| | | | |
|---|---|---|---|
| 2018/0127904 A1 | 5/2018 | Adami et al. | |
| 2018/0146745 A1 | 5/2018 | Follet et al. | |

FOREIGN PATENT DOCUMENTS

| | | | |
|---|---|---|---|
| CN | 104334042 | A | 2/2015 |
| CN | 105050442 | A | 11/2015 |
| CN | 105167320 | A | 12/2015 |
| DE | 237190 | A1 | 7/1986 |
| DE | 3613145 | A1 | 11/1986 |
| DE | 294057 | A5 | 9/1991 |
| EP | 1272886 | B1 | 7/2006 |
| EP | 2462908 | A1 | 6/2012 |
| EP | 2649898 | A1 | 10/2013 |
| EP | 2792265 | A2 | 10/2014 |
| EP | 2805638 | A1 | 11/2014 |
| EP | 3075277 | A2 | 10/2016 |
| EP | 3245889 | A1 | 11/2017 |
| GB | 1273524 | | 5/1972 |
| GB | 1588309 | | 4/1981 |
| IL | 32732 | A | 2/1973 |
| WO | 0112896 | A1 | 2/2001 |
| WO | 2004060093 | A1 | 7/2004 |
| WO | 20040060093 | A1 | 7/2004 |
| WO | 2005052235 | A1 | 6/2005 |
| WO | 2007014145 | A1 | 2/2007 |
| WO | 2008079872 | A2 | 7/2008 |
| WO | 2010151408 | A2 | 12/2010 |
| WO | 2012125490 | A2 | 3/2012 |
| WO | 2014182651 | A1 | 11/2014 |
| WO | 2016145002 | A1 | 9/2016 |
| WO | 2016146537 | A1 | 9/2016 |
| WO | 2017151496 | A1 | 9/2017 |
| WO | 2019133651 | A1 | 7/2019 |

OTHER PUBLICATIONS

Spencer, Knitting Technology—a comprehensive handbook and practical guide, Third Edition, excerpts (copyright information, table of contents, pp. 3-4, and 48-59).

International Search Report and Written Opinion for PCT/US2017/060934 dated Jan. 23, 018.

International Preliminary Report on Patentability for PCT/US2017/060868 dated Feb. 19, 2019.

International Search Report and Written Opinion for PCT/US2017/060955 dated Jan. 25, 2018.

Written Opinion of the International Preliminary Examining Authority for PCT/US2017/060934 dated Sep. 26, 2018.

International Search Report and Written Opinion for PCT/US2017/060868 dated Feb. 27, 2018.

International Preliminary Report on Patentability for PCT/US2017/060934 dated on Feb. 12, 2019.

Written Opinion of the International Preliminary Examining Authority for PCT/US2017/060868 dated Oct. 1, 2018.

Abu Sayed, Stock, Top, and Yarn Dyeing, Jun. 2015, Textile Apex (Year: 2015).

International Preliminary Report on Patentability for PCTUS2017060955 dated Dec. 2, 2019.

* cited by examiner

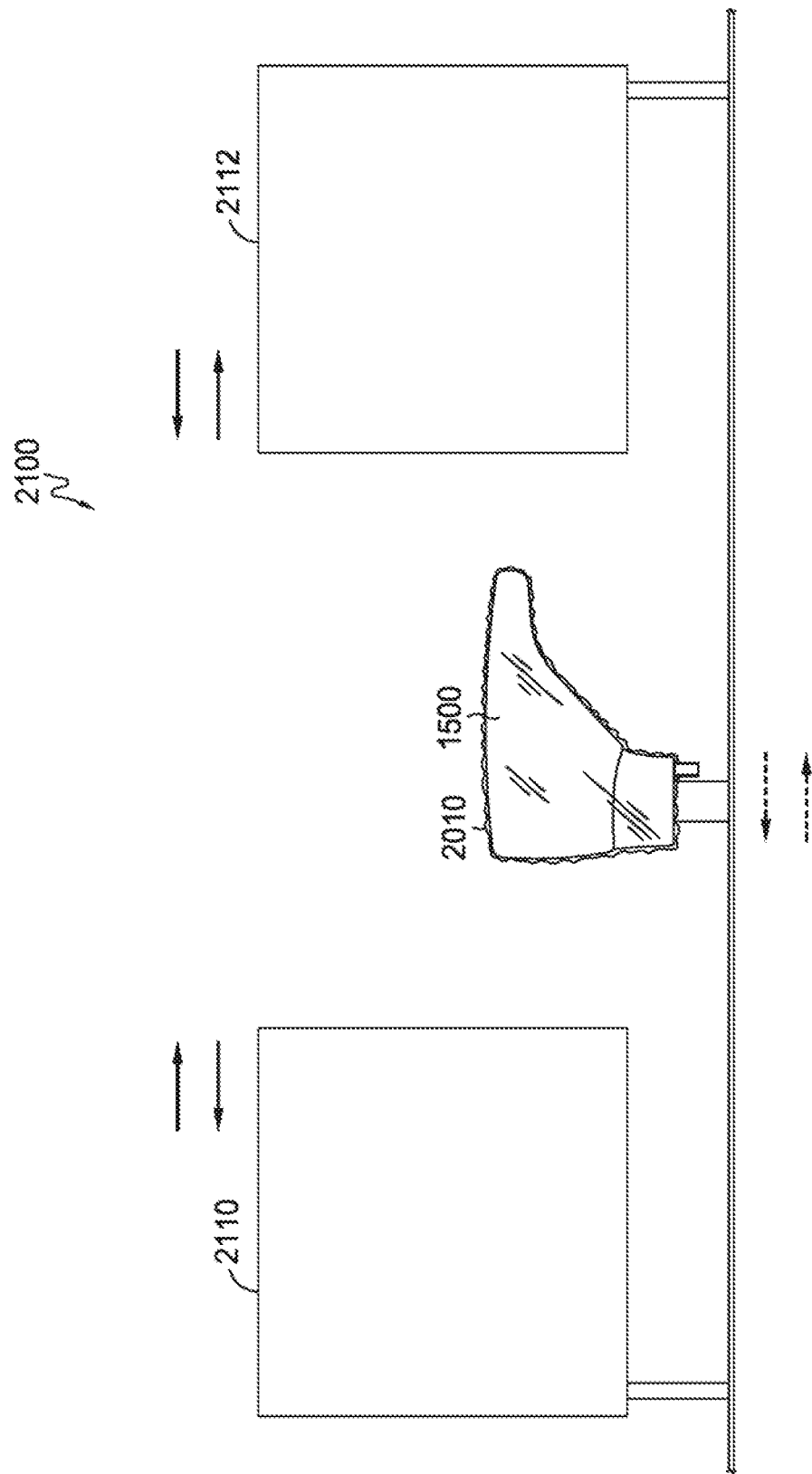

TEXTILES AND ARTICLES, AND PROCESSES FOR MAKING THE SAME

CROSS-REFERENCE TO RELATED APPLICATIONS

This Application claims the benefit of U.S. Provisional Application Nos. 62/419,824; 62/419,832; 62/419,841; and 62/419,851, each filed on Nov. 9, 2016, and U.S. patent application Ser. No. 15/808,851, filed on Nov. 9, 2017, each of which is incorporated herein by reference in their entirety.

TECHNICAL FIELD

The present disclosure is directed to articles, such as articles of apparel, articles of footwear, and articles of sporting equipment. More specifically, the present disclosure is directed to articles comprising one or more materials that include a low processing temperature polymeric composition and a high processing temperature polymeric composition. The present disclosure is also directed to methods of making articles using materials that include a low processing temperature polymeric composition and a high processing temperature polymeric composition.

BACKGROUND

Traditionally, certain articles of wear, e.g., articles of footwear, were made by cutting individual pieces of material and combining them together. The individual pieces could be combined by sewing and/or using adhesives. However, the cutting and combining of multiple pieces of material are wasteful, labor-intensive, and error prone processes, where such errors result in increased waste, as well as increased manufacturing time and energy.

BRIEF DESCRIPTION OF THE DRAWINGS

Further aspects of the present disclosure will be readily appreciated upon review of the detailed description, described below, when taken in conjunction with the accompanying drawings.

FIG. 21 is a schematic representation of a thermoforming system having a heating zone and a cooling zone, in accordance with aspects of the present invention.

DETAILED DESCRIPTION

Figure 1A:
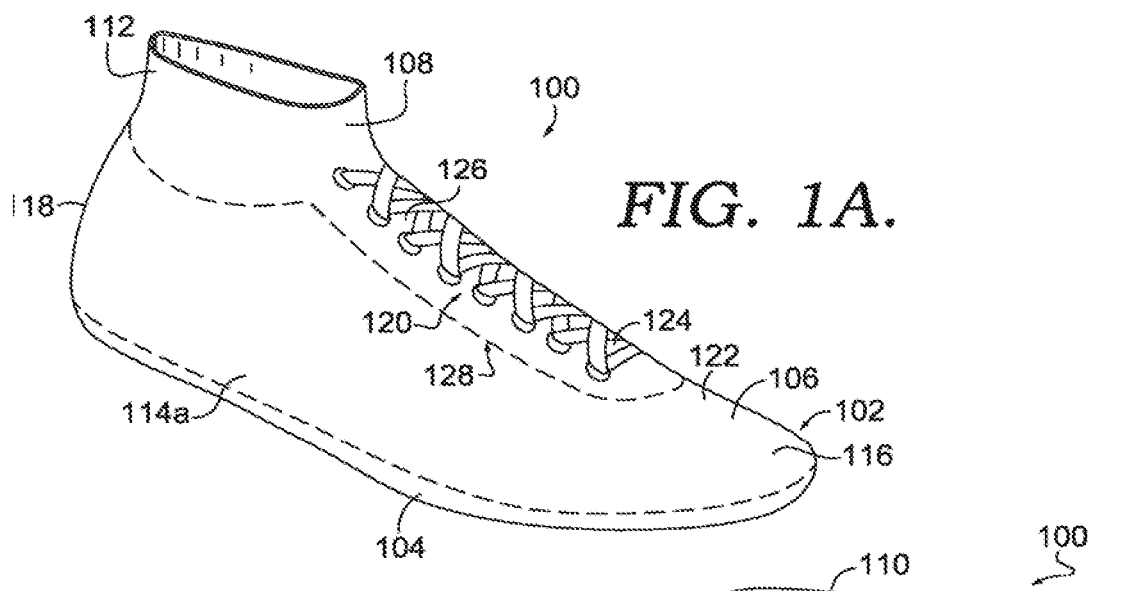
FIG. 1A is a top and side perspective view of an article of footwear, primarily illustrating the position of three different textile zones, in accordance with aspects of the present invention.

The present disclosure is directed to textiles or combinations of textiles and other materials (e.g., shaped components, films, second textiles, yarns or fibers), where one or more of the textiles or other materials include a low processing temperature composition, and one or more of the textiles or other materials include a high processing temperature composition. In some aspects, a single textile includes both the low and high processing temperature compositions. The present disclosure is also directed to methods of thermoforming on a molding surface the textile alone or in combination with one or more other materials to re-shape the textile, to affix the one or more other materials to the textile using re-flown polymeric materials, or both. The thermoforming process involves placing at least a portion of a textile on a molding surface, and, while the textile remains in contact with the molding surface, increasing the temperature of the entire textile to a first temperature, and then decreasing the temperature of the entire textile to a second temperature. The first temperature is a temperature above the melting point of the low processing temperature composition, but is below the below at least one of: 1) the creep relaxation temperature $T_{cr}$; 2) the heat deflection temperature $T_{hd}$; or 3) the Vicat softening temperature $T_{vs}$ of the high processing temperature polymeric composition. Thus, using the disclosed process, the portions of the textile and/or one or more materials which comprise the low processing temperature composition will melt, re-flow and then re-solidify into a new shape or conformation, while the portions formed high processing temperature composition will retain their original shape or conformation. Forming first fibers and/or yarns from the low processing temperature composition and using these fibers and/or yarns to construct textiles, such as woven textiles, knit textile, non-woven textiles, braided textiles, etc.) is a particularly efficient and effective way to incorporate these thermoforming processes low processing temperature composition. For example, use of the disclosed textiles and processes make it possible to use only a single textile to produce a thermoformed article which includes integrally formed areas with attributes ranging from a conventional textile to a solid molded polymeric material using only a single thermoforming process. Creating yarns and or fibers which work well in the disclosed process while also producing finished articles with desirable attributes was found to require the use of low processing temperature compositions having a balance of properties, which are disclosed here. Examples of polymers which can provide this balance of properties in the low processing temperature composition are also disclosed. In particular examples, low processing temperature compositions for use in making yarns suitable for use on commercial weaving or knitting equipment are also disclosed.

In various aspects, the present disclosure pertains to a textile comprising: a first yarn or a first fiber comprising a low processing temperature polymeric composition, the low processing temperature polymeric composition comprising one or more first thermoplastic polymers; and a second yarn or a second fiber comprising a high processing temperature polymeric composition, the high processing temperature polymeric composition comprising one or more second thermoplastic polymers, wherein the high processing temperature polymeric composition exhibits a creep relaxation temperature $T_{cr}$ that is greater than a melting temperature $T_m$ of the low processing temperature polymeric composition.

In an aspect, the present disclosure pertains to a textile comprising: a first yarn or a first fiber comprising a low processing temperature polymeric composition, the low processing temperature polymeric composition comprising one or more first thermoplastic polymers; and a second yarn or a second fiber comprising a high processing temperature polymeric composition, the high processing temperature polymeric composition comprising one or more second thermoplastic polymers, wherein the high processing temperature polymeric composition exhibits a heat deflection temperature $T_{hd}$ that is greater than a melting temperature $T_m$ of the low processing temperature polymeric composition.

In an aspect, the present disclosure pertains to a textile comprising: a first yarn or a first fiber comprising a low processing temperature polymeric composition, the low processing temperature polymeric composition comprising one or more first thermoplastic polymers; and a second yarn or a second fiber comprising a high processing temperature polymeric composition, the high processing temperature polymeric composition comprising one or more second thermoplastic polymers, wherein the high processing temperature polymeric composition exhibits a Vicat softening temperature $T_{vs}$ that is greater than a melting temperature $T_m$ of the low processing temperature polymeric composition.

In an aspect, the present disclosure pertains to a textile comprising: a first yarn or a first fiber comprising a low processing temperature polymeric composition, the low processing temperature polymeric composition comprising one or more first thermoplastic polymers, wherein the low processing temperature polymeric composition exhibits a melting temperature $T_m$ that is 135° C. or less; and a second yarn or a second fiber comprising a high processing temperature polymeric composition, the high processing temperature polymeric composition comprising one or more second thermoplastic polymers, wherein the high processing temperature polymeric composition exhibits at least one of: 1) a creep relaxation temperature $T_{cr}$; 2) a heat deflection temperature $T_{hd}$; or 3) a Vicat softening temperature $T_{vs}$ that is greater than the melting temperature $T_m$ of the low processing temperature polymeric composition.

In an aspect, the present disclosure pertains to a process for manufacturing an article comprising: providing a disclosed textile; and combining the textile with one or more additional components to form an article of footwear, an article of apparel, or an article of sporting equipment.

In an aspect, the present disclosure pertains to an article comprising: a first reflowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature composition comprising one or more second thermoplastic polymers; and wherein the high processing temperature polymeric composition exhibits a creep relaxation temperature $T_{cr}$ that is greater than a melting temperature $T_m$ of the low processing temperature polymeric composition.

In an aspect, the present disclosure pertains to an article comprising: a first reflowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature polymeric composition comprising one or more second thermoplastic polymers; and wherein the high processing temperature polymeric composition exhibits a heat deflection temperature $T_{hd}$ that is greater than a melting temperature $T_m$ of the low processing temperature polymeric composition.

In an aspect, the present disclosure pertains to an article comprising: a first reflowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature polymeric composition comprising one or more second thermoplastic polymers; and wherein the high processing temperature polymeric composition exhibits a Vicat softening temperature $T_{vs}$ that is greater than a melting temperature $T_m$ of the low processing temperature polymeric composition.

In an aspect, the present disclosure pertains to an article comprising: a first reflowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature polymeric composition comprising one or more second thermoplastic polymers; and wherein the high processing temperature polymeric composition exhibits at least one of: 1) a creep relaxation temperature $T_{cr}$; 2) a heat deflection temperature $T_{hd}$; or 3) a Vicat softening temperature $T_{vs}$ that is greater than the melting temperature $T_m$ of the low processing temperature polymeric composition.

In various aspects, the melted and re-solidified product is a melted and re-solidified element selected from a first shaped component, a first film, a first yarn, a first fiber, a first textile, or any combination thereof, which is a component of the second element.

In an aspect, the present disclosure pertains to a process for manufacturing an article comprising: providing a disclosed article; and combining the article with one or more additional materials to form an article of footwear, apparel or sporting equipment.

In an aspect, the present disclosure pertains to a process for manufacturing an article, the process comprising: receiving a first element selected from a first shaped component, a first film, a first textile, a first yarn, and a first fiber; receiving a second element selected from a second shaped component, a second film, a second textile, a second yarn, or a second fiber; wherein the first element comprises a low processing temperature polymeric composition, the low processing temperature polymeric composition comprising one or more first thermoplastic polymers, wherein the second element comprises a high processing temperature polymeric composition, the high processing temperature polymeric composition comprising one or more second thermoplastic polymers, and wherein the high processing temperature polymeric composition exhibits at least one of:

1) a creep relaxation temperature $T_{cr}$; 2) a heat deflection temperature $T_{hd}$; or 3) a Vicat softening temperature $T_{vs}$ that is greater than the melting temperature $T_m$ of the low processing temperature polymeric composition; placing at least a portion of the first element and at least a portion of the second element on a molding surface; while the at least a portion of the first element and the at least a portion of the second element is on the molding surface, increasing a temperature of the entire article to a temperature that is above the melting temperature $T_m$ of the low processing temperature polymeric composition and below at least one of: 1) the creep relaxation temperature $T_{cr}$; 2) the heat deflection temperature $T_{hd}$; or 3) the Vicat softening temperature $T_{vs}$ of the high processing temperature polymeric composition; and subsequent to the increasing the temperature of the entire article, while the at least a portion of the article remains on the molding surface, decreasing the temperature of the entire article to a temperature below the melting temperature $T_m$ of the low processing temperature polymeric composition, thereby forming a article.

In an aspect, the present disclosure pertains to a combination upper and outsole for an article of footwear, comprising: a first re-flowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature composition comprising one or more second thermoplastic polymers; wherein the high processing temperature polymeric composition exhibits at least one of: 1) a creep relaxation temperature $T_{cr}$; 2) a heat deflection temperature $T_{hd}$; or 3) a Vicat softening temperature $T_{vs}$ that is greater than the melting temperature $T_m$ of the low processing temperature polymeric composition; and wherein the combination upper and outsole includes a medial midfoot area, a lateral midfoot area, a ground-facing outsole area, and at least a portion of the first re-flowed material is present on the ground-facing outsole area.

In an aspect, the present disclosure pertains to a process for manufacturing a combination upper and outsole for an article of footwear, the process comprising: receiving a first element selected from a first shaped component, a first film, a first textile, a first yarn, and a first fiber; receiving a second element selected from a second shaped component, a second film, a second textile, a second yarn, or a second fiber; wherein the first element comprises a low processing temperature polymeric composition, the low processing temperature polymeric composition comprising one or more first thermoplastic polymers, wherein the second element comprises a high processing temperature polymeric composition, the high processing temperature polymeric composition comprising one or more second thermoplastic polymers, and wherein the high processing temperature polymeric composition exhibits at least one of: 1) a creep relaxation temperature $T_{cr}$; 2) a heat deflection temperature $T_{hd}$; or 3) a Vicat softening temperature $T_{vs}$ that is greater than the melting temperature $T_m$ of the low processing temperature polymeric composition; placing at least a portion of the first element and at least a portion of the second element on a molding surface; while the at least a portion of the first element and the at least a portion of the second element are on the molding surface, increasing a temperature of the entire first element and the entire second element to a temperature that is above the melting temperature $T_m$ of the low processing temperature polymeric composition and below at least one of: 1) the creep relaxation temperature $T_{cr}$; 2) the heat deflection temperature $T_{hd}$; or 3) the Vicat softening temperature $T_{vs}$ of the high processing temperature polymeric composition; and subsequent to the increasing the temperature of the entire first and second articles, while the at least a portions of the first and second articles remain on the molding surface, decreasing the temperature of the entire first and second elements to a temperature below the melting temperature $T_m$ of the low processing temperature polymeric composition, thereby forming a article.

The present disclosure is directed to materials and processes for making textiles, articles of sporting equipment, and articles of wear, including articles of footwear and articles of apparel. It should be understood that a variety of articles of sporting equipment are contemplated by the present disclosure, including backpacks, equipment bags, hats, protective gear, and the like. It should be understood that a variety articles of wear are contemplated by the present disclosure, including knit articles. A non-limiting list of articles of wear contemplated by the present disclosure includes footwear, shirts, pants, socks, jackets or other outerwear, protective equipment, hats, and undergarments, e.g., brassieres. In certain aspects, the article of wear is an article of footwear. "Article of footwear" is used to refer to an article intended for wear on a human foot, e.g., in some aspects, an article of footwear can be a shoe. In some aspects, the disclosed materials and processes can be used in the manufacture of a component used in an article of wear, such as an article of footwear. An exemplary component of an article of wear include, but are not limited to, an upper for an article of footwear.

An exemplary article of footwear is athletic or sports footwear, including, but not limited to, running shoes, basketball shoes, soccer shoes, baseball shoes, football shoes, tennis shoes, rugby shoes, cross-training shoes, walking shoes, hiking boots, golf shoes, sneakers, and the like. Alternatively, the article of footwear can be non-athletic footwear, including, but not limited to, dress shoes, loafers, casual wear shoes, sandals, and boots, including work boots. A shoe can or cannot enclose the entire foot of a wearer. For example, a shoe could be a sandal or other article that exposes large portions of a wearing foot. The person of ordinary skill in the art can appreciate, therefore, that the materials and processes disclosed herein apply to a wide variety of footwear types or styles, in addition to the specific type or style discussed in the following material and depicted in the accompanying figures.

The disclosed textiles and articles can include yarns, fibers, or a combination of yarns and fibers that comprise a low processing temperature polymeric composition (described below) and yarns, fibers, or a combination of yarns and fibers that comprises a high processing temperature polymeric composition (also described below). The disclosed textiles and articles comprise at least two yarns that balance a number of material properties as described herein. Moreover, the yarns and fibers used in the disclosed materials and processes will be selected based on a variety of factors, including the type of the footwear to be manufactured, e.g., whether it is an article of athletic or non-athletic footwear, and the typical use of the article of footwear. For example, in considering the types of yarns and fibers to use in an article of athletic footwear, the type of sport an article of athletic footwear is used for and/or the conditions (e.g., indoor or outdoor) the article of athletic footwear is to be worn on can be considered.

The disclosed articles can include shaped components, films, fibers, yarns, or a combination thereof that comprise a low processing temperature polymeric composition (described below) and shaped components, films, fibers, yarns, or a combination thereof that comprises a high processing temperature polymeric composition (also described below). The disclosed articles comprise at least two polymeric compositions that balance a number of material properties as described herein. Moreover, the compositions and processes used to form these articles will be selected based on a variety of factors, including the type of the article to be manufactured, and the typical use of the article.

In various aspects, the disclosed shaped component, films, textiles and articles comprise two distinct polymeric compositions, where one of the polymeric compositions can melt or deform in a thermoforming process performed over a first temperature range (referred to herein as the low processing temperature polymeric composition), while the other polymeric composition maintains its shape over the first temperature range (referred to herein as the high processing temperature polymeric composition). It is to be understood that reference to a "polymeric composition" is intended to refer to a composition comprising at least one polymer. Optionally, additional ingredients such as pigments, dyes, fillers, processing aids, and the like, can be present in the polymeric composition. The low processing temperature composition comprises one or more first thermoplastic polymers. The high processing temperature composition comprises one or more second polymers. In some examples, the high processing temperature polymeric composition is a thermoplastic composition, and comprises one or more second thermoplastic polymers. The polymeric compositions of the present disclosure can be used to form shaped components, films, and/or fibers. The shaped components and/or films can in turn be incorporated into articles as described herein. The fibers can in turn be used to form yarns and textiles as described herein, and these yarns and textiles can also be incorporated into articles as described herein. In a further aspect, the disclosed textiles and articles comprise a first film, fiber or yarn comprising comprising a low processing temperature polymeric composition and a second film, fiber or yarn comprising a high processing temperature polymeric composition.

As mentioned above, the articles described herein can include materials, such as a shaped component, a film, a fiber, a yarn and/or a textile, wherein the article is at least partly formed of a low processing temperature polymeric composition and a high processing temperature polymeric composition. In some examples, the material is at least partly formed of a low processing temperature polymeric composition and a high processing temperature polymeric composition. As used herein, a "low processing temperature polymeric composition" and a "high processing temperature polymeric composition" are relative terms with regard to the relative creep relaxation temperature ($T_{cr}$), Vicat softening temperature ($T_{vs}$), heat deflection temperature ($T_{hd}$), and/or melting temperature ($T_m$) of each of these compositions. The creep relaxation temperature ($T_{cr}$), Vicat softening temperature ($T_{vs}$), heat deflection temperature ($T_{hd}$), and melting temperature ($T_m$) of the low processing temperature polymeric composition are also understood to be lower than the decomposition temperature of the high processing temperature polymeric composition. These parameters are further described in detail below. It should be understood that other properties and parameters can differ between the low processing temperature polymeric composition and the high processing temperature polymeric composition, as discussed in detail below. In various aspects, the low processing temperature polymeric composition and/or the high processing temperature polymeric composition or both can be present in a shaped component, film, textile, yarn or fiber.

In various aspects, when both the low processing temperature polymeric composition and the high processing temperature polymeric composition are thermoplastic compositions, the melting temperature ($T_m$) of a low processing temperature polymeric composition is below at least one of the following properties of the high processing temperature polymeric composition: (1) creep relaxation temperature ($T_{cr}$); (2) Vicat softening temperature ($T_{vs}$); (3) heat deflection temperature ($T_{hd}$); or (4) melting temperature ($T_m$). That is, for example, the low processing temperature polymeric composition exhibits a melting temperature ($T_m$) that is below the temperature of one or more of a creep relaxation temperature ($T_{cr}$), a Vicat softening temperature ($T_{vs}$), a heat deflection temperature ($T_{hd}$), or a melting temperature ($T_m$) that is below the melting temperature ($T_m$) of the high processing temperature polymeric composition.

In a further aspect, the melting temperature ($T_m$) of a low processing temperature polymeric composition is below the creep relaxation temperature ($T_{cr}$) of the high processing temperature polymeric composition. In a still further aspect, the melting temperature ($T_m$) of a low processing temperature polymeric composition is below the Vicat softening temperature ($T_{vs}$) of the high processing temperature polymeric composition. In a yet further aspect, the melting temperature ($T_m$) of a low processing temperature polymeric composition is below the heat deflection temperature ($T_{hd}$) of the high processing temperature polymeric composition. In an even further aspect, the melting temperature ($T_m$) of a low processing temperature polymeric composition is below the melting temperature ($T_m$) of the high processing temperature polymeric composition.

In various aspects, the melting temperature ($T_m$) of a high processing temperature polymeric composition is greater than at least one of the following properties of the low processing temperature polymeric composition: (1) creep relaxation temperature ($T_{cr}$); (2) Vicat softening temperature ($T_{vs}$); (3) heat deflection temperature ($T_{hd}$); or (4) melting temperature ($T_m$). That is, for example, the high processing temperature polymeric composition exhibits a melting temperature ($T_m$) that is greater than the temperature of one or more of a creep relaxation temperature ($T_{cr}$), a Vicat softening temperature ($T_{vs}$), a heat deflection temperature ($T_{hd}$), or a melting temperature ($T_m$) that is below the melting temperature ($T_m$) of the low processing temperature polymeric composition.

In a further aspect, the melting temperature ($T_m$) of a high processing temperature polymeric composition is greater than the creep relaxation temperature ($T_{cr}$) of the low processing temperature polymeric composition. In a still further aspect, the melting temperature ($T_m$) of a high processing temperature polymeric composition is greater than the Vicat softening temperature ($T_{vs}$) of the low processing temperature polymeric composition. In a yet further aspect, the melting temperature ($T_m$) of a high processing temperature polymeric composition is greater than the heat deflection temperature ($T_{hd}$) of the low processing temperature polymeric composition. In an even further aspect, the melting temperature ($T_m$) of a high processing temperature polymeric composition is greater than the melting temperature ($T_m$) of the low processing temperature polymeric composition.

In aspects, the low processing temperature polymeric composition and the high processing temperature polymeric composition can be selectively incorporated into a textile or an article to provide one or more structural properties and/or other advantageous properties to the textile or article. In aspects, such a textile can be thermoformed to impart such structural and/or other advantageous properties. The thermoforming can be conducted over a temperature range below at least one of the following properties of the high processing temperature polymeric composition: (1) creep relaxation temperature ($T_{cr}$); (2) Vicat softening temperature ($T_{vs}$); (3) heat deflection temperature ($T_{hd}$); or (4) melting temperature ($T_m$). The thermoforming can be conducted over a temperature range below a creep relaxation temperature ($T_{cr}$) of the high processing temperature polymeric composition. The thermoforming can be conducted over a temperature range below a Vicat softening temperature ($T_{vs}$) of the high processing temperature polymeric composition. The thermoforming can be conducted over a temperature range below a heat deflection temperature ($T_{hd}$) of the high processing temperature polymeric composition. The thermoforming can be conducted over a temperature range below a melting temperature ($T_m$) of the high processing temperature polymeric composition.

In aspects, a low processing temperature polymeric composition can be used to form a fiber. As used herein, "fiber" is understood to include filaments. Similarly, in aspects, a high processing temperature polymeric composition can be used to form a fiber. In various aspects, a fiber can be a bi-component fiber comprising a first portion formed of a low processing temperature polymeric composition and a second portion formed of a high processing temperature polymeric composition. For example, the low and high processing temperature polymeric compositions can be co-extruded to form the bi-component fiber. The fiber can be extruded from the low processing temperature polymeric composition, and subsequently coated with the high processing temperature polymeric composition. Alternatively, the fiber can be extruded from the high processing temperature polymeric composition, and subsequently coated with the low processing temperature polymeric composition. In a further aspect, a fiber can be a multi-component fiber comprising three or more polymeric compositions including one or more low processing temperature polymeric compositions and one or more high processing temperature polymeric compositions.

In aspects, the disclosed fibers can be used to prepare yarns. The yarns can be formed using staple fibers, or using continuous fibers. The yarns of the present disclosure comprise at least one of the low processing temperature polymeric composition and the high processing temperature polymeric composition. Examples of the present disclosure include both the low processing temperature polymeric composition and the high processing temperature polymeric composition. For example, a yarn can comprise one or more disclosed fiber comprising low processing temperature polymeric composition, a mixture of two or more low processing temperature polymeric compositions, a high processing temperature polymeric composition, a mixture of high or more low processing temperature polymeric compositions, or a mixture of one or more low processing temperature polymeric compositions and one or more high processing temperature polymeric compositions. Essentially all, or a majority of the fibers of the yarn can be formed of the low processing temperature polymeric composition. Alternatively, essentially all or a majority of the fibers of the yarn can be formed of the high processing temperature polymeric composition. The yarn can comprise fibers formed of the low processing temperature polymeric composition, or fibers formed of the high processing temperature polymeric composition, or both type of fibers. The yarn can comprise fibers formed of the low processing temperature polymeric composition, wherein the yarn is coated with the high processing temperature polymeric composition. Alternatively, the yarn can comprise fibers formed of the high processing temperature polymeric composition, where the yarn is coated with the low processing temperature polymeric composition.

In aspects, the foregoing fibers or yarns can be used to prepare a textile. The textile can comprise one or more of the disclosed fibers or yarns. In various aspects, the textile can be a woven textile comprising one or more disclosed yarn. In a further aspect, the textile can be a knit textile comprising one or more disclosed yarn. In a still further aspect, the textile can be a non-woven textile comprising one or more disclosed fibers.

In aspects, a low processing temperature polymeric composition or a high processing temperature polymeric composition or both can be used to prepare a shaped component. A shaped component can a molded part manufactured by injection molding, compression molding, blow molding, rotational molding, or other molding techniques as known to one skilled in the art.

In some aspects, the shaped component can comprise a mixture of two or more low processing temperature polymer compositions. In alternative aspects, the shaped component can comprise a mixture of two or more high processing temperature polymer compositions. In a further aspect, the shaped component can comprise one or more low processing temperature polymer compositions and one or more high processing temperature polymer compositions. For example, the shaped component can include two or more portions, where a first portion is formed of the low processing temperature polymeric composition and a second portion is formed of the high processing temperature polymeric composition. The two or more portions can be formed using a double-shot molding process.

In aspects, a low processing temperature polymeric composition or a high processing temperature polymeric composition can be used to manufacture a film. In some aspects, a film can comprise one or more low processing temperature polymeric compositions. Alternatively, in some aspects, a film can comprise one or more high processing temperature polymeric compositions. In a further aspect, a film can comprise one or more low processing temperature polymer compositions and one or more high processing temperature polymer compositions. In various aspects, a film can be a multi-layered film comprising one or more disclosed film, e.g., a bilayer film comprising a first layer comprising a low processing temperature polymeric composition and a second layer comprising a high processing temperature polymeric composition. The multi-layered film can be formed by co-extrusion or lamination.

In traditional forming of an article including articles of wear, transitions from a first region of functionality to a second region of functionality can be accomplished through a change in material imparting the functionality. This transition from a first material having a first functional description to a second material having a different functional description can introduce limitations to the final article. For example, in the context of a shoe, a transition from a sole to an upper occurs near a biteline of the shoe. This transition can be referred to as a hard-to-soft transition as the sole generally has a relatively rigid response to foot movement and the upper has a relatively generally non-rigid response to the foot movement. Other such hard-to-soft transitions can be present in other locations on a shoe, depending upon the design and methods of construction used. At this transition, the wearer of the shoe can experience discomfort as portions of the foot on one side of the transition are allowed to move in a different (e.g., more free) manner than portions of the foot on the other side of the transition. This abrupt change (e.g., hard-to-soft transition) in the allowed freedom of movement of the wearer's foot can affect perceived performance and feel of the shoe. To limit the impact of the hard-to-soft transition, manufacturers can insert multiple layers of materials or otherwise mechanically manipulate the transition region to mask the change. Each of these alterations can insert complexity, additional processing steps, and/or materials that can further influence efficiencies, costs, and weight of the shoe.

As such, aspects contemplated herein allow for an integrally formed article portion having a transition from a first functional region to a second functional region that is engineered into and during the formation of the regions. For example, a manipulation of materials and techniques, such as knitting stitches, can be implemented to allow for a gradient from the first functional region to the second functional region. Relating this back to the hard-to-soft transition of a shoe, it is contemplated that a first functional region (e.g., a sole region) of the shoe can be formed (e.g., knit) with a first type of material (e.g., low processing temperature polymeric composition described below) and the second functional region (e.g., an upper portion) of the shoe is formed (e.g., knit) with a different material (e.g., high processing temperature polymeric composition described below). Additionally or alternatively, the sole region of the shoe is knit with a first type of stitch and the upper portion of the shoe is knit with a second type of stitch. Further, in this example, the transition from the first functional region (e.g., the sole region) to the second functional region (e.g., the upper region) can include one or more transitions zones where knitting techniques (e.g., stitch selection, layer manipulation) and/or materials are blended in defined manners to integrally form a more natural transition from the first functional region to the second functional region during the manufacturing of the region. This integral transition between functional zones can positively influence the perceived performance and/or feel of the shoe to a wearer in an exemplary aspect.

In an aspect, a textile is provided comprising a first plurality of fibers comprising a low processing temperature polymeric composition. The textile further includes a second plurality of fibers comprising a high processing temperature polymeric composition. The first plurality of fibers and the second plurality of fibers can be deposited so as to form separate zones of the textile. For example, the first plurality of fibers can form a first surface of the textile, and the second plurality of fibers can form a second surface of the textile opposing the first surface. Alternatively or additionally, the first plurality of fibers can form a medial portion of a first surface of the textile, and the second plurality of fibers can form a lateral portion of a first surface of the textile. The first plurality of fibers and the second plurality of fibers can be laid down in a first zone, a second zone, and a third zone, the second zone positioned between the first and third zones, wherein the first zone comprises an increased concentration of the second plurality of fibers compared to the second zone, and wherein the third zone comprises an increased concentration of the first plurality of fibers compared to the second zone. In a particular example, the textile is a non-woven textile. In some examples, the textile is a component of an article of the present disclosure, such as an article of apparel or an article of footwear or an article of sporting equipment. In particular examples, the textile is a component of an upper of an article of footwear. The textile component can comprise at least 75 wt % of an upper for an article of footwear.

In an aspect, a textile is provided comprising a first yarn comprising a low processing temperature polymeric composition. The textile further includes a second yarn comprising a high processing temperature polymeric composition. The first and second yarns can be used to form separate zones of the textile. The first yarn and the second yarn can be included in a first zone, a second zone, and a third zone, the second zone positioned between the first and third zones, wherein the first zone comprises an increased concentration of the second yarn compared to the second zone, and wherein the third zone comprises an increased concentration of the first yarn compared to the second zone. In some examples, the textile is a component of an article of the present disclosure, such as an article of apparel or an article of footwear or an article of sporting equipment. In particular examples, the textile is a component of an upper of an article of footwear. The textile component can comprise at least 75 wt % of an upper for an article of footwear.

In an aspect, a woven textile is provided comprising a first yarn comprising a low processing temperature polymeric composition. The woven textile article further includes a second yarn comprising a high processing temperature polymeric composition. The first yarn and the second yarn can be used to form separate zones of the woven textile article. For example, the first yarn can form substantially all or a portion of a warp of the weave of the woven textile article, and the second yarn can form substantially all or a portion of a weft of the weave of the woven textile article, or vice versa. The first yarn and the second yarn can form a first zone, a second zone, and a third zone, the second zone positioned between the first and third zones, wherein the first zone comprises an increased concentration of the second yarn compared to the second zone, and wherein the third zone comprises an increased concentration of the first yarn compared to the second zone. In some examples, the woven textile is a component of an article of the present disclosure, such as an article of apparel or an article of footwear or an article of sporting equipment. In particular examples, the woven textile is a component of an upper of an article of footwear. The woven textile component can comprise at least 75 wt % of an upper for an article of footwear.

In an aspect, a knit textile is provided comprising a first yarn comprising a low processing temperature polymeric composition, the low processing temperature polymeric composition comprising one or more first thermoplastic polymers. The knit textile further includes a second yarn that comprising a high processing temperature polymeric composition, the high processing temperature polymeric composition comprising one or more second thermoplastic polymers. The first and second yarns at least partly form a plurality of interconnected courses in at least one knit layer of the knit textile, the at least one knit layer having at least a first zone, a second zone, and a third zone, the second zone positioned between the first and third zones, wherein the first zone comprises an increased concentration of the second yarn compared to the second zone, and wherein the third zone comprises an increased concentration of the first yarn compared to the second zone. In some examples, the knit textile is a component of an article of the present disclosure, such as an article of apparel or an article of footwear or an article of sporting equipment. In particular examples, the knit textile is a component of an upper of an article of footwear. The knit textile component can comprise at least 75 wt % of an upper for an article of footwear.

The knit textile can be formed through a knitting process, such as flat knitting or circular knitting. In certain aspects, the knit textile can be a knit article having a substantially seamless configuration. In a further aspect, the knit textile can be a knit article formed of unitary knit construction. As utilized herein, a knit article is defined as being formed of "unitary knit construction" when formed as a one-piece element through a knitting process. That is, the knitting process substantially forms the various features and structures of the knit article without the need for significant additional manufacturing steps or processes. Although portions of knit article can be joined to each other (e.g., edges of the knit article being joined together, as at seam) following the knitting process, the knit article remains formed of unitary knit construction because it is formed as a one-piece knit element. In various aspects, the knit article can further comprise other elements (e.g., a tongue, a strobel, a lace, a heel counter, logos, trademarks, placards) that can be added following the knitting process.

The knit textile can incorporate various types and combinations of stitches and yarns. With regard to stitches, the knit textile can have one type of stitch in one area of the knit textile and another type of stitch in another area of the knit textile. Depending upon the types and combinations of stitches utilized, areas of the knit textile can have, for example, a plain knit structure, a mesh knit structure, or a rib knit structure. The different types of stitches may affect the physical properties of the knit textile, including aesthetics, stretch, thickness, air permeability, and abrasion-resistance. That is, the different types of stitches may impart different properties to different areas of knit textile. With regard to yarns, the knit textile may have one type of yarn in one area of the knit textile and another type of yarn in another area of the knit textile, e.g., a yarn comprising a low processing temperature polymeric composition in one area of the knit textile and a yarn comprising a high processing temperature polymeric composition in another area of the knit textile. Depending upon various design criteria, the knit textile can incorporate yarns with different deniers, materials (e.g., cotton, elastane, polyester, rayon, wool, and nylon), and degrees of twist, for example. The different types of yarns may affect the physical properties of the knit textile, including aesthetics, stretch, thickness, air permeability, and abrasion-resistance. That is, the different types of yarns may impart different properties to different areas of the knit textile. By combining various types and combinations of stitches and yarns, each area knit article can have specific properties that enhance the comfort, durability, and performance of the knit textile as required by its use in an article of footwear, article of apparel, or article of sporting equipment.

The knit textile can be prepared by a variety suitable processes. For example, a flat knitting process can be utilized to manufacture the knit textile. Although flat knitting can provide a suitable process for forming the knit textile, other knitting processes can also be utilized such as wide tube circular knitting, narrow tube circular knit jacquard, single knit circular knit jacquard, double knit circular knit jacquard, warp knit tricot, warp knit raschel, and double needle bar raschel. In aspects, the knit textile can be subject to post-processing steps, e.g., to remove a portion of the knit textile, to add components to the knit textile, to create a fleece texture, etc. In other aspects, the knit textile can comprise various knitted structures and/or comprise different knitted sublayers.

In certain aspects, the entire knit article can be seamless. The seamless knit article may, for example, be provided by circular knitting. A circular knit article can allow a three-dimensionally preshaped article to be provided without having to be sewn up at a designated place(s). Thus, unwanted seams in the knit article can be avoided and the three-dimensionally preshaped knit article can have a particularly good fit and the additional aforementioned benefits of a seamless structure.

It should be noted, however, that the textiles and textile articles of the present disclosure, including knit articles, can be utilized in manufacture of composite elements. In some aspects, a composite element can comprise a first textile prepared as disclosed herein, along with a second textile or a film or a shaped component. That is, the composite element comprises a first textile region and a second region selected from a region comprising a second textile, a region comprising a film, a region comprising a shaped component, or combinations thereof.

In one aspect, a textile comprises a first plurality of fibers is provided, the first plurality of fibers comprising a low processing temperature polymeric composition, the low processing temperature polymeric composition comprising one or more thermoplastic polymers. The textile can be a non-woven textile. The textile can be a textile article. The textile article can be a component of an article of sporting equipment. The textile article can be a component of an article of apparel. The textile article can be a component of an article of footwear. The textile article can be an upper portion for an article of footwear.

In aspects, the textile comprises a second plurality of fibers comprising a high processing temperature polymeric composition that exhibits at least one of: (1) a creep relaxation temperature ($T_{cr}$); (2) a heat deflection temperature ($T_{hd}$); (3) a Vicat softening temperature ($T_{vs}$); or (4) a melting temperature ($T_m$) that is greater than a melting temperature ($T_m$) of the low processing temperature polymeric composition in the first plurality of fibers.

In a further aspect, the textile comprises a second plurality of fibers comprising a high processing temperature polymeric composition that exhibits a creep relaxation temperature ($T_{cr}$) that is greater than a melting temperature ($T_m$) of the low processing temperature polymeric composition in the first plurality of fibers.

In a further aspect, the textile comprises a second plurality of fibers comprising a high processing temperature polymeric composition that exhibits a heat deflection temperature ($T_{hd}$) that is greater than a melting temperature ($T_m$) of the low processing temperature polymeric composition in the plurality of fibers.

In a further aspect, the textile comprises a second plurality of fibers comprising a high processing temperature polymeric composition that exhibits a Vicat softening temperature ($T_{vs}$) that is greater than a melting temperature ($T_m$) of the low processing temperature polymeric composition in the first plurality of fibers.

In a further aspect, the textile comprises a second plurality of fibers comprising a high processing temperature polymeric composition that exhibits a melting temperature ($T_m$) that is greater than a melting temperature ($T_m$) of the low processing temperature polymeric composition in the first plurality of fibers.

In another aspect, a textile comprises a first yarn, the first yarn comprising a low processing temperature polymeric composition, the low processing temperature polymeric composition comprising one or more thermoplastic polymers. The textile can be a knit textile. The textile can be a woven textile. The textile can be a textile article. The textile article can be an upper portion for an article of footwear.

In aspects, the textile comprises a second yarn comprising a high processing temperature polymeric composition that exhibits at least one of: (1) a creep relaxation temperature ($T_{cr}$); (2) a heat deflection temperature ($T_{hd}$); (3) a Vicat softening temperature ($T_{vs}$); or (4) a melting temperature ($T_m$) that is greater than a melting temperature ($T_m$) of the low processing temperature polymeric composition in the first yarn.

In a further aspect, the textile comprises a second yarn comprising a high processing temperature polymeric composition that exhibits a creep relaxation temperature ($T_{cr}$) that is greater than a melting temperature ($T_m$) of the low processing temperature polymeric composition in the first yarn.

In a further aspect, the textile comprises a second yarn comprising a high processing temperature polymeric composition that exhibits a heat deflection temperature ($T_{hd}$) that is greater than a melting temperature ($T_m$) of the low processing temperature polymeric composition in the yarn.

In a further aspect, the textile comprises a second yarn comprising a high processing temperature polymeric composition that exhibits a Vicat softening temperature ($T_{vs}$) that is greater than a melting temperature ($T_m$) of the low processing temperature polymeric composition in the first yarn.

In a further aspect, the textile comprises a second yarn comprising a high processing temperature polymeric composition that exhibits a melting temperature ($T_m$) that is greater than a melting temperature ($T_m$) of the low processing temperature polymeric composition in the first yarn.

In certain aspects, a textile article is provided comprising a melted fiber component that is thermoformed from a first state as a first plurality of fibers into a second state as the melted fiber component (i.e, a component formed of a plurality of fibers, wherein at least a portion of the plurality of fibers have been at least partially melted and re-solidified into a new conformation which is different than their fiber conformation). The first plurality of fibers comprises a low processing temperature polymeric composition. It is to be understood that a melted fiber component can comprise a structure such as a partially melted first plurality of fibers, essentially completely melted first plurality of fibers, and mixtures thereof. The textile article can also include a second plurality of fibers including a high processing temperature polymeric composition. Optionally, the melted fiber component and the second plurality of fibers at least partly form a structure having at least a first zone, a second zone, and a third zone, with the second zone positioned between the first and third zones. The first zone includes a higher concentration of the second plurality of fibers compared to the second zone, and the third zone includes a higher concentration of the melted plurality of fibers component compared to the second zone. In some examples this structure can form an outer surface of an article, where the first, second and third zones each form a portion of the outer surface.

In one aspect, a textile article comprises a first plurality of fibers, the first plurality of fibers comprising a low processing temperature polymeric composition, the low processing temperature polymeric composition comprising one or more thermoplastic polymers. The textile article can be a component of an article of apparel. The textile article can be a non-woven textile article. The textile can be a component of an article of sporting equipment. The textile article can be a component of an article of footwear. The textile article can be an upper portion for an article of footwear.

In aspects, the textile article comprises a second plurality of fibers comprising a high processing temperature polymeric composition that exhibits at least one of: (1) a creep relaxation temperature ($T_{cr}$); (2) a heat deflection temperature ($T_{hd}$); (3) a Vicat softening temperature ($T_{vs}$); or (4) a melting temperature ($T_m$) that is greater than a melting temperature ($T_m$) of the low processing temperature polymeric composition of the first plurality of fibers that is transformed from a first state as the first plurality of fibers into a second state as the melted fiber component.

In a further aspect, the textile article comprises a second plurality of fibers comprising a high processing temperature polymeric composition that exhibits a creep relaxation temperature ($T_{cr}$) that is greater than a melting temperature ($T_m$) of the low processing temperature polymeric composition of the first plurality of fibers that is transformed from a first state as the first plurality of fibers into a second state as the melted fiber component.

In a further aspect, the textile article comprises a second plurality of fibers comprising a high processing temperature polymeric composition that exhibits a heat deflection temperature ($T_{hd}$) that is greater than a melting temperature ($T_m$) of the low processing temperature polymeric composition of the first plurality of fibers that is transformed from a first state as the first plurality of fibers into a second state as the melted fiber component.

In a further aspect, the textile article comprises a second plurality of fibers comprising a high processing temperature polymeric composition that exhibits a Vicat softening temperature ($T_{vs}$) that is greater than a melting temperature ($T_m$) of the low processing temperature polymeric composition of the first plurality of fibers that is transformed from a first state as a first plurality of fibers into a second state as the melted fiber component.

In a further aspect, the textile article comprises a second yarn comprising a high processing temperature polymeric composition that exhibits a melting temperature ($T_m$) that is greater than a melting temperature ($T_m$) of the low processing temperature polymeric composition of the first plurality of fibers that is transformed from a first state as a first plurality of fibers into a second state as the melted fiber component.

In certain aspects, a textile article is provided comprising a melted yarn component that is thermoformed from a first state as a first yarn into a second state as the melted yarn component (i.e, a component formed of yarn which has been at least partially melted and re-solidified into a new conformation which is different than its yarn conformation). The first yarn comprises a low processing temperature polymeric composition. It is to be understood that a melted yarn component can comprise a structure such as a partially melted first yarn, essentially completely melted first yarn, and mixtures thereof. The knit article can also include a second yarn including a high processing temperature polymeric composition. Optionally, the melted yarn component and the second yarn at least partly form a structure having at least a first zone, a second zone, and a third zone, with the second zone positioned between the first and third zones. The first zone includes a higher concentration of the second yarn compared to the second zone, and the third zone includes a higher concentration of the melted yarn component compared to the second zone. In some examples this structure can form an outer surface of an article, where the first, second and third zones each form a portion of the outer surface.

In one aspect, a textile article comprises a first yarn, the first yarn comprising a low processing temperature polymeric composition, the low processing temperature polymeric composition comprising one or more thermoplastic polymers. The textile article can be a knit article. The textile article can be a woven article. The textile article can be a component of an article of apparel. The textile article can be a component of an article of footwear. The textile article can be an upper portion for an article of footwear. The textile article can be a knit upper portion for an article of footwear.

In aspects, the textile article comprises a second yarn comprising a high processing temperature polymeric composition that exhibits at least one of: (1) a creep relaxation temperature ($T_{cr}$); (2) a heat deflection temperature ($T_{hd}$); (3) a Vicat softening temperature ($T_{vs}$); or (4) a melting temperature ($T_m$) that is greater than a melting temperature ($T_m$) of a low processing temperature polymeric composition in the first yarn that is transformed from a first state as a first yarn into a second state as the melted yarn component.

In a further aspect, the textile article comprises a second yarn comprising a high processing temperature polymeric composition that exhibits a creep relaxation temperature ($T_{cr}$) that is greater than a melting temperature ($T_m$) of the low processing temperature polymeric composition in the first yarn that is transformed from a first state as a first yarn into a second state as the melted yarn component.

In a further aspect, the textile article comprises a second yarn comprising a high processing temperature polymeric composition that exhibits a heat deflection temperature ($T_{hd}$) that is greater than a melting temperature ($T_m$) of the low processing temperature polymeric composition in the first yarn that is transformed from a first state as a first yarn into a second state as the melted yarn component.

In a further aspect, the textile article comprises a second yarn comprising a high processing temperature polymeric composition that exhibits a Vicat softening temperature ($T_{vs}$) that is greater than a melting temperature ($T_m$) of the low processing temperature polymeric composition in the first yarn that is transformed from a first state as a first yarn into a second state as the melted yarn component.

In a further aspect, the textile article comprises a second yarn comprising a high processing temperature polymeric composition that exhibits a melting temperature ($T_m$) that is greater than a melting temperature ($T_m$) of the low processing temperature polymeric composition in the first yarn that is transformed from a first state as a first yarn into a second state as the melted yarn component.

In certain aspects, the textile article is a knit article comprising a plurality of interconnected courses. Each course of the plurality of interconnected courses includes a first yarn and a second yarn. The first yarn comprises a low processing temperature polymeric composition. The second yarn comprises a high processing temperature polymeric composition. The knit article also includes at least one knit layer including at least a first zone, a second zone, and a third zone, with the second zone positioned between the first and third zones. Each course of the plurality of interconnected courses extends through the first zone, the second zone, and the third zone, where the third zone has an increased concentration of the first yarn compared to the second zone. In some examples this structure can form an outer surface of an article, where the first, second and third zones each form a portion of the outer surface. In addition, the knit article includes an anchor yarn that extends through at least a portion of the third zone. The anchor yarn comprises a high processing temperature polymeric composition such as, for example, fibers formed of a high processing temperature polymeric composition. The anchor yarn exhibits an elongation that is less than an elongation of the first yarn.

In addition to textiles and articles comprising textiles, the present disclosure is also directed to articles comprising a melted film component that is thermoformed from a first state as a film into a second state as the melted film (i.e., a film comprising a low processing temperature polymeric material, wherein at least a portion of the low processing temperature polymeric material of the film has been melted and re-solidified into a new conformation on a substrate which is different than its film conformation). The article can also include the high processing temperature composition. Optionally, the melted film component and the high processing temperature composition at least partly form a structure having at least a first zone, a second zone, and a third zone, with the second zone positioned between the first and third zones. The first zone includes a higher concentration of the high processing temperature composition compared to the second zone, and the third zone includes a higher concentration of the melted film component compared to the second zone. In some examples this structure can form an outer surface of an article, where the first, second and third zones each form a portion of the outer surface.

In one aspect, an article comprises a melted film component, the melted film component comprising a low processing temperature polymeric composition, the low processing temperature polymeric composition comprising one or more thermoplastic polymers. The article can be a component of an article of apparel. The article can be a component of an article of sporting equipment. The article can be a component of an article of footwear. The article can be an upper portion for an article of footwear.

In aspects, the article comprises a second element (e.g., a shaped component, a film, a textile, a fiber, a yarn) comprising a high processing temperature polymeric composition that exhibits at least one of: (1) a creep relaxation temperature ($T_{cr}$); (2) a heat deflection temperature ($T_{hd}$); (3) a Vicat softening temperature ($T_{vs}$); or (4) a melting temperature ($T_m$) that is greater than a melting temperature ($T_m$) of the low processing temperature polymeric composition of the melted film component that is transformed from a first state as a film into a second state as the melted film component.

In a further aspect, the article comprises a second element comprising high processing temperature polymeric composition that exhibits a creep relaxation temperature ($T_{cr}$) that is greater than a melting temperature ($T_m$) of the low processing temperature polymeric composition of the melted film component that is transformed from a first state as a film into a second state as the melted film component.

In a further aspect, the article comprises a second element comprising a high processing temperature polymeric composition that exhibits a heat deflection temperature ($T_{hd}$) that is greater than a melting temperature ($T_m$) of the low processing temperature polymeric composition of the melted film component that is transformed from a first state as a film into a second state as the melted film component.

In a further aspect, the article comprises a second element comprising a high processing temperature polymeric composition that exhibits a Vicat softening temperature ($T_{vs}$) that is greater than a melting temperature ($T_m$) of the low processing temperature polymeric composition of the melted film component that is transformed from a first state as a film into a second state as the melted film component.

In a further aspect, the article comprises a second element comprising a high processing temperature polymeric composition that exhibits a melting temperature ($T_m$) that is greater than a melting temperature ($T_m$) of the low processing temperature polymeric composition of the first plurality of fibers that is transformed from a first state as a first plurality of fibers into a second state as the melted fiber component.

The present disclosure is also directed to articles comprising a first polymeric component comprising a melted region that is thermoformed from a first state as a shaped component into a second state as the melted shaped component (i.e, a shaped component comprising a low processing temperature polymeric material, wherein at least a portion of the low processing temperature polymeric material has been melted and re-solidified into a new conformation which is different than its original shaped component conformation). The first component can also include a region formed of high processing temperature. Alternatively or additionally, the article can also include a second component comprising a high processing temperature polymeric composition.

In one aspect, an article comprises a first shaped component, the first shaped component comprising a low processing temperature polymeric composition, the low processing temperature polymeric composition comprising one or more thermoplastic polymers. The article can be a component of an article of apparel. The article can be a component of an article of sporting equipment. The article can be a component of an article of footwear. The article can be an upper portion for an article of footwear. The article can be a sole element for an article of footwear.

In aspects, the article comprises a second element (e.g., a shaped component, a film, a textile, a fiber, a yarn) comprising a high processing temperature polymeric composition that exhibits at least one of: (1) a creep relaxation temperature ($T_{cr}$); (2) a heat deflection temperature ($T_{hd}$); (3) a Vicat softening temperature ($T_{vs}$); or (4) a melting temperature ($T_m$) that is greater than a melting temperature ($T_m$) of the low processing temperature polymeric composition of the first shaped component that is transformed from a first state as the shaped component into a second state as a melted shaped component.

In a further aspect, the article comprises a second element comprising a high processing temperature polymeric composition that exhibits a creep relaxation temperature ($T_{cr}$) that is greater than a melting temperature ($T_m$) of the low processing temperature polymeric composition of the first shaped component that is transformed from a first state as the first shaped component into a second state as the melted shaped component.

In a further aspect, the article comprises a second element comprising a high processing temperature polymeric composition that exhibits a heat deflection temperature ($T_{hd}$) that is greater than a melting temperature ($T_m$) of the low processing temperature polymeric composition of the first shaped element that is transformed from a first state as the shaped element into a second state as the melted shaped component.

In a further aspect, the article comprises a second element comprising a high processing temperature polymeric composition that exhibits a Vicat softening temperature ($T_{vs}$) that is greater than a melting temperature ($T_m$) of the low processing temperature polymeric composition of the first shaped element that is transformed from a first state as the first shaped element into a second state as the melted shaped component.

In a further aspect, the article comprises a second element comprising a high processing temperature polymeric composition that exhibits a melting temperature ($T_m$) that is greater than a melting temperature ($T_m$) of the low processing temperature polymeric composition of the first plurality of fibers that is transformed from a first state as the first shaped component into a second state as the melted shaped component.

In an aspect, a knit upper for an article of footwear is provided comprising a first yarn comprising a low processing temperature polymeric composition. The knit upper for an article of footwear further includes a second yarn comprising a high processing temperature polymeric composition. The first and second yarns at least partly form a plurality of interconnected courses in at least one knit layer of the knit upper for an article of footwear, the at least one knit layer having at least a first zone, a second zone, and a third zone, the second zone positioned between the first and third zones, wherein the first zone comprises an increased concentration of the second yarn compared to the second zone, and wherein the third zone comprises an increased concentration of the first yarn compared to the second zone. In some examples this structure can form an outer surface of an article, where the first, second and third zones each form a portion of the outer surface.

In certain aspects, a knit upper for an article of footwear is provided comprising a melted yarn component comprising a low processing temperature polymeric composition. The melted yarn component is thermoformed from a first state as a first yarn into a second state as the melted yarn component. The knit upper for an article of footwear also includes a second yarn including a high processing temperature polymeric composition. The melted yarn component and the second yarn at least partly form a surface having at least a first zone, a second zone, and a third zone, with the second zone positioned between the first and third zones. The first zone includes a higher concentration of the second yarn compared to the second zone, and the third zone includes a higher concentration of the melted yarn component compared to the second zone. In some examples this structure can form an outer surface of an article, where the first, second and third zones each form a portion of the outer surface.

In some aspects, the article of wear is an article of footwear, which include, but are not limited to, such articles as shoes. Articles of footwear generally include an upper and a sole structure. The upper provides a covering for the foot that comfortably receives and securely positions the foot with respect to the sole structure. Moreover, the upper generally provides protection for the foot. The sole structure can provide various kinds of support, cushioning and shock absorption. The sole structure is secured to a lower portion of the upper and is generally positioned between the foot and the ground. In addition to attenuating ground reaction forces (that is, providing cushioning) during walking, running, and other ambulatory activities, the sole structure can influence foot motions (for example, by resisting pronation), impart stability, and provide traction, for example. Accordingly, the upper and the sole structure operate cooperatively to provide a comfortable structure that is suited for a wide variety of athletic activities.

An upper forms a structure that that provides a covering for some or all of a wearer's foot and positions that foot relative to a sole structure of that shoe. The upper forms a void on the interior of the footwear for receiving the foot. The void has the general shape of the foot, and access to the void is provided at an ankle opening. In certain aspects, the upper extends over instep and toe areas of the foot, along medial and lateral sides of the foot, and around the heel area of the foot. The upper can have any design, shape, size and/or color. For example, in certain aspects, e.g., if an article is a basketball shoe, then the upper can be a high top upper that is shaped to provide high support on an ankle. Alternatively, in certain aspects, e.g., if an article is a running shoe, then the upper can be a low top upper.

The upper can also incorporate a lacing system to adjust fit of the footwear, as well as permit entry and removal of the foot from the void within the upper. A lacing system often is incorporated into the upper to selectively change the size of the ankle opening and to permit the wearer to modify certain dimensions of the upper, particularly girth, to accommodate feet with varying proportions. In addition, the upper can include a tongue that extends under the lacing system to enhance the comfort of the footwear (e.g., to modulate pressure applied to the foot by the laces), and the upper also can include a heel counter to limit or control movement of the heel. In addition, the upper can include a tongue that extends under the lacing system to enhance adjustability and comfort of the footwear, and the upper can incorporate a heel counter.

In some aspects, a sole structure can one or more components or layers, which can individually or collectively provide an article of footwear with a number of attributes, such as support, rigidity, flexibility, stability, cushioning, comfort, reduced weight, or other attributes. In some aspects, a sole structure can comprise layers referred to as an insole, a midsole, and an outsole. In some aspects, however, one or more of these components can be omitted. In certain aspects, a sole can optionally comprise a sole plate. In some aspects, the sole structure comprises at an outsole component that includes an exterior major surface, which can be exposed and ground-contacting, and an interior major surface. In a further aspect, the sole structure can further comprise a midsole component that can be attached to the upper along the entire length of the upper. When present, the midsole forms the middle layer of the sole structure and serves a variety of purposes that include controlling foot motions and attenuating impact forces.

The midsole, which may be attached to the upper along the entire length of the upper, forms the middle layer of the sole structure and serves a variety of purposes that include controlling foot motions and attenuating impact forces. Many midsole configurations are primarily formed from a resilient polymer foam material, such as polyurethane (PU) or ethylene-vinyl acetate (EVA), that extends throughout the length and width of the footwear. The midsole can also incorporate plates, moderators, fluid-filled chambers, and/or other elements that further attenuate forces, influence the motions of the foot, and/or impart stability, for example.

The outsole forms the ground-contacting element of footwear and is usually fashioned from a durable, wear-resistant material that includes texturing or other features to improve traction. The outsole can be fashioned from a durable and wear-resistant material (for example, rubber) that includes texturing to improve traction. The outsole can optionally further comprise cleats.

In some aspects, an article of footwear can further comprise a sock liner, that is a thin member located within the upper and adjacent the plantar (lower) surface of the foot to enhance footwear comfort, e.g., to wick away moisture and provide a soft, comfortable feel. In some aspects, the sockliner can be formed of a foam material such as a polyurethane foam, foamed rubber or ethylene vinyl acetate. In certain aspects, the sockliner is not glued or otherwise attached to the sole structure. Alternatively, the sockliner can be attached to the sole structure.

In certain aspects, a knit upper for an article of footwear is provided comprising a plurality of interconnected courses. Each course of the plurality of interconnected courses includes a first yarn and a second yarn. The first yarn comprises a low processing temperature polymeric composition comprising one or more first thermoplastic polymers. The second yarn comprises a high processing temperature polymeric composition comprising one or more second thermoplastic polymers. The knit upper for an article of footwear also includes at least one knit layer including at least a first zone, a second zone, and a third zone, with the second zone positioned between the first and third zones. Each course of the plurality of interconnected courses extends through the first zone, the second zone, and the third zone, where the third zone has an increased concentration of the first yarn compared to the second zone. In addition, the knit upper for an article of footwear includes an anchor yarn that extends through at least a portion of the third zone. The anchor yarn includes an anchor yarn composition that includes one or more polymers. The anchor yarn exhibits an elongation that is less than an elongation of the first yarn.

Exemplary Aspects of Article of Sporting Equipment, Articles of Wear and Textiles As discussed above, certain aspects are directed to one or more textiles that include fibers and/or yarns comprising the low processing temperature polymeric composition and the high processing temperature polymeric composition. In certain aspects, such textiles can form at least a portion of an article of sporting equipment or article of wear. In certain aspects, the disclosed textiles can form at least a portion of a component of an article of footwear. In certain aspects, the disclosed textiles can form at least a portion of a component of an article of sporting equipment. For example, the disclosed textiles can form at least a portion of an upper for a shoe, such as an athletic shoe.

Figure 1B:
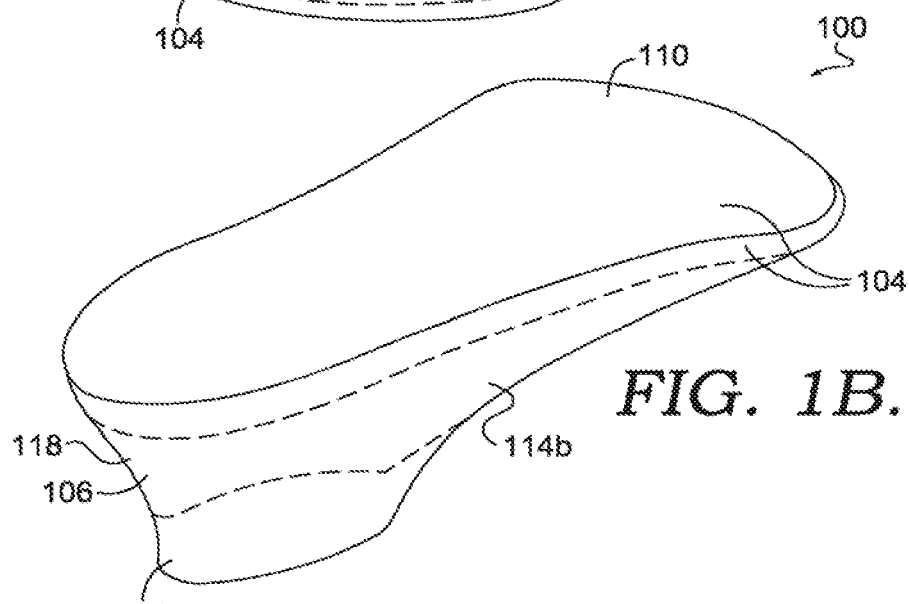
FIG. 1B is a bottom and side perspective view of the article of footwear of FIG. 1A, in accordance with aspects of the present invention.

Turning now to the figures, in particular, FIGS. 1A and 1B, an article of footwear 100 is depicted as one exemplary article of wear. While FIGS. 1A and 1B depict an article of footwear 100. While FIGS. 1A and 1B depict an article of footwear 100, it should be understood that other articles of wear are also contemplated by the present disclosure. The article of footwear 100 of FIGS. 1A and 1B generally can include a ground-facing outsole area 110, an ankle collar area 112, a lateral midfoot area 114a, and a medial midfoot area 114b, a toe box area 116, and a heel area 118. Further, the article of footwear 100 can include a plurality of eyestays 120, a vamp area 122, a tongue area 124, and a throat area 126. As shown in FIGS. 1A and 1B, article of footwear 100, is intended to be used with a right foot; however, it should be understood that the following discussion can equally apply to a mirror image of article of footwear 100 that is intended for use with a left foot.

The article of footwear 100 depicted in FIGS. 1A and 1B can include at least one textile 102 that at least partly forms a portion of the article of footwear 100. The textile 102 of the article of footwear 100 can include at least three separate textile zones, e.g., zones 104, 106, and 108, identifying specific functional areas of the article of footwear 100. In certain aspects, these specific functional areas are at least partly associated with the targeted incorporation of specific textile media in varying amounts, techniques, and combinations into these textile zones (illustrated as zones 104, 106, and 108 in FIGS. 1A and 1B). It should be understood that, while the textile 102 includes three specific functional areas, more than three functional areas are also contemplated.

In certain aspects, the textile zone 104 can exhibit a rigid or semi-rigid functionality suitable for use as a ground-facing outsole 110 for the article of footwear 100. Accordingly, in certain aspects, the textile zone 104 can be positioned to include at least a portion of a ground-facing outsole 110 of the article of footwear 100. In certain aspects, the targeted incorporation of the low processing temperature polymeric composition into the textile zone 104 of the textile 102, upon thermoforming, can at least partly provide the rigid or semi-rigid functionality for use as a ground-facing outsole 110. As used herein "thermoforming" refers to a process that can include the melting and/or deforming of the low processing temperature polymeric composition and/or one or more thermoplastic polymers and the subsequent cooling of the melted and/or deformed material to form a plaque or film, which can be rigid or semi-rigid. The thermoforming process is discussed in detail below.

Further, in aspects, another textile zone, such as, for example, textile zone 108, can exhibit flexibility and/or pliability to accommodate movements from a wearer. In certain aspects, the textile zone 108 can include the ankle collar area 112, the tongue area 124, and/or the throat area 126 of the article of footwear 100. In various aspects, the textile zone 108 can include a high processing temperature polymeric composition.

In certain aspects, another textile, such as, for example, zone 106, can be positioned between the textile zones 104 and 108. In certain aspects, the textile zone 106 can include at least a portion of the lateral midfoot region 114a and/or the medial midfoot region 114b on the article of footwear 100. In certain aspects, the textile zone 106 can include a combination of the low processing temperature polymeric composition from the textile zone 104 and the high processing temperature polymeric composition from the textile zone 108. In such aspects, this combination of textile media present in the textile zone 106 allows the textile zone 106 to function as a transition between the rigid or semi-rigid functionality of the textile zone 104 and the flexible pliable functionality of the textile zone 108, allowing for a more gradual transition from rigidness to flexibility of the textile 102.

Further, in such aspects, the textile zone 106 can exhibit rigidity or semi-rigidity to a lesser extent than the textile zone 104, but to a greater extent than the textile zone 108. Also, in the same or alternative aspects, the textile zone 106 can exhibit flexibility to a lesser extent than the textile zone 108, but to a greater extent than the textile zone 104.

Alternatively or additionally, the three textile zones 104, 106 and 108 can be at least partly located within a midfoot region, such as lateral midfoot region 114a and/or medial midfoot region 114b.

In certain aspects in the textile zone 106, the combination of the low processing temperature polymeric composition present in the textile zone 104 and the high processing temperature polymeric composition present in the textile zone 108, when exposed to the thermoforming process, can impart one or more structural properties to the article of footwear 100, such as semi-rigid support in the lateral and/or medial midfoot regions 114a and 114b, and/or three-dimensional shape or structure to one or more portions of the article of footwear 100.

In certain aspects, as can be seen in FIG. 1A, the textile zone 106 extends away from the textile zone 104 towards the eyestays 120. In such aspects, the combination of textile media comprising the low processing temperature polymeric composition and textile media comprising the high processing temperature polymeric composition can allow for the transferring of a force transmitted from the eyestays 120 or other lacing mechanisms into this combination of textile media present in the lateral and/or medial midfoot regions 114a and 114b. In certain aspects, for the successful transfer of the forces transmitted from the eyestays 120, the textile zone 104, and/or the low processing temperature polymeric composition present in the textile zone 104, can terminate to an area 128 that is a distance of at least about 0.5 cm, about 1.0 cm, or about 2.0 cm from the eyestays 120, and/or at least about 3, at least about 4, or at least about 5 needles below the eyestays 120, when the textile 102 is a knit textile formed on a commercial knitting machine. In such aspects, the flexible and pliable characteristics of the high processing temperature polymeric composition that is present in the zone 108 that is adjacent the eyestays 120 can facilitate in transferring forces transmitted from the eyestays 120 to the textile zone 106 and/or the low processing temperature polymeric composition present in the lateral and/or medial midfoot regions 114a and 114b.

In the aspect depicted in FIGS. 1A and 1B, the textile zone 106 is positioned in the toe box area 116 and the heel area 118. In such aspects, the combination of the low processing temperature polymeric composition and the high processing temperature polymeric composition can provide structure and/or support due to the rigidity provided by the thermoformed material. Further, the thermoformed material can provide abrasion resistance in the toe box area 116 and/or the heel area 118. In alternative aspects, the textile zone 104 can form at least a portion of the toe box area 116 and/or the heel area 118 for increased rigidity or increased abrasion resistance, since the textile zone 104 includes a greater amount, or alternative positioning (e.g., outer knit surface), of the low processing temperature polymeric composition than the textile zone 106.

Figure 1C:
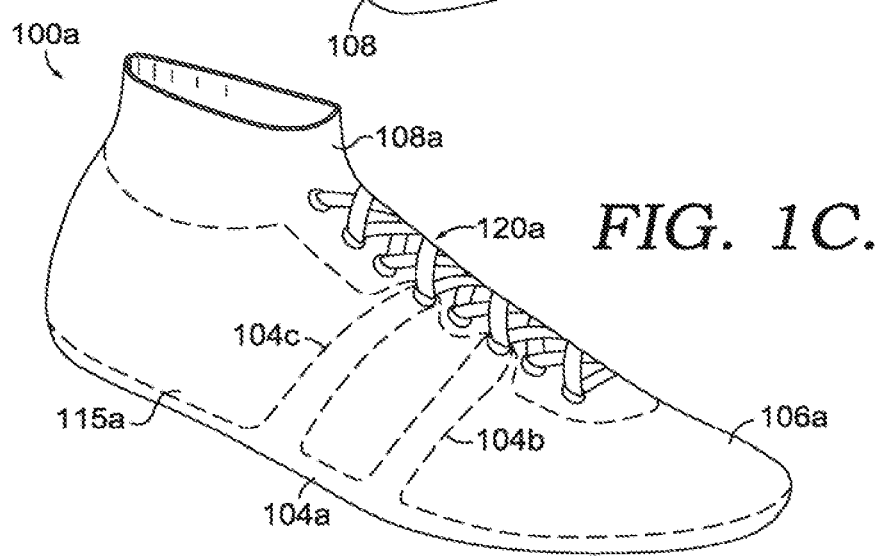
FIG. 1C is a top and side perspective view of an alternative aspect of the article of footwear of FIG. 1A, primarily illustrating the position of three different textile zones, in accordance with aspects of the present invention.

FIG. 1C depicts an alternative aspect of an article of footwear 100a. In such aspects, the article of footwear 100a can generally include at least three types of textile zones: the textile zone 104a, the textile zone 106a, and the textile zone 108a. In certain aspects, the textile zones 104a, 106a, and 108a can have the same properties and parameters as the textile zones 104, 106, and 108, respectively, of the article of footwear 100 discussed above with reference to FIG. 1A.

In the aspect depicted in FIG. 1C, portions, e.g., portions 104b and 104c, of the textile zone 104a can extend from an outsole area up through a midfoot area 115A and toward a plurality of eyestays 120a. In such aspects, a rigid or semi-rigid functionality provided by the portions 104b and 104c extending from an outsole area through the midfoot area 115A to a plurality of eyestays 120a can provide increased wearer stability in the midfoot area 115A. Further, in aspects, a force applied through one or more of the plurality of eyestays 120a can at least partly be transferred onto the rigid or semi-rigid portions 104b and 104c extending through the midfoot area 115A, and into the rigid or semi-rigid textile zone 104a present in an outsole area, providing increased support and comfort for a wearer.

In certain aspects, in addition to the thermoformed material providing structure, rigidity, strength, and/or support to one or more areas of the article of wear, the thermoformed material can provide a water-proof or water-resistant surface.

Figure 2A:
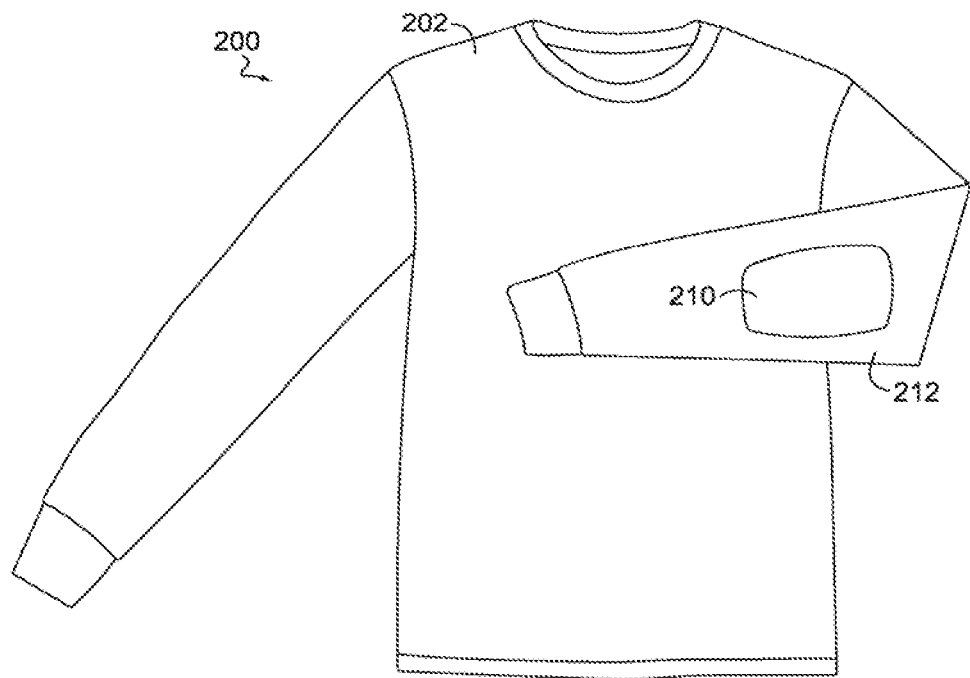
FIG. 2A is a side view of an article of apparel, primarily illustrating an elbow patch, in accordance with aspects of the present invention.
Figure 2B:
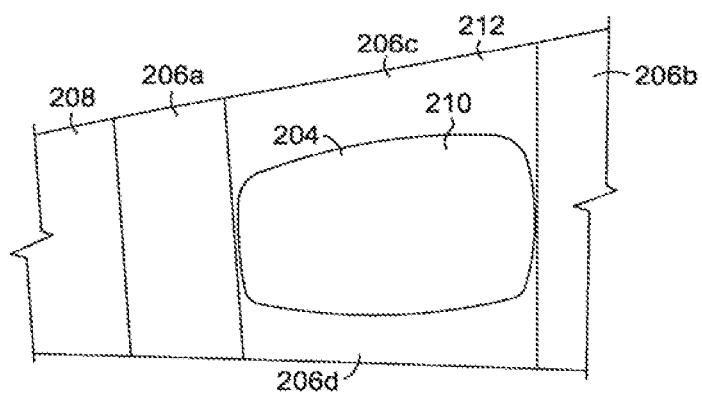
FIG. 2B is a close-up view of the elbow patch of the article of apparel of FIG. 2A, primarily illustrating three different textile zones, in accordance with aspects of the present invention.

FIGS. 2A and 2B depict a shirt 200 as an exemplary article of apparel. The shirt 200 depicted in FIGS. 2A and 2B includes at least one textile 202 that at least partly forms a portion of the shirt 200. As best seen in FIG. 2B, the textile 202 can include three separate textile zones 204, 206a-d, and 208, which can identify specific functional areas of the 200. In certain aspects, these specific functional areas are at least partly associated with the targeted incorporation of specific textile media in varying amounts and combinations into these textile zones 204, 206a-d, and 208.

In certain aspects, the textile zone 204 can include a reinforced area such as an exterior-facing film or patch 210, which can, for example, provide abrasion resistance to an elbow region 212 of the shirt 200. In such aspects, the targeted integral incorporation of the low processing temperature polymeric composition into the textile zone 204 can at least partly form the patch 210, when the textile 202 is thermoformed, by melting or deforming the low processing temperature polymeric composition and subsequent cooling and solidifying of the melted material to form a patch 210.

In various aspects, the textile zone 208 can exhibit flexibility and/or pliability similar to a conventional shirt material. In such aspects, the textile zone 208 can include or solely include the high processing temperature polymeric composition. Further, in certain aspects, the textile zone 206 can at least partly provide a transition within the textile 202 from the rigid or semi-rigid patch 210 present in textile zone 204 to the flexible pliable portion present in the textile zone 208. In such aspects, the textile zones 206a-d can include a combination of the low processing temperature polymeric composition present in the textile zone 204 and the high processing temperature polymeric composition present in the textile zone 208. While not shown in FIGS. 2A and 2B, the textile zones 206b-d also provide a transition to a flexible pliable material, such as that present in the textile zone 208.

In certain aspects, like with the textile zone 106 of the textile 102 discussed above with reference to FIGS. 1A and 1B, this combination of the low processing temperature polymeric composition from textile zone 204 and the high processing temperature polymeric composition present from textile zone 208 can provide a seamless or integrated transition from the patch 210 to the flexible pliable portion found in textile zone 208 of the shirt 200.

While this exemplary description in FIGS. 2A and 2B of the textile zones 204, 206a-d, and 208 relates to an elbow region of the article of apparel 200, it should be understood that the textile zones 204, 206a-d, and 208 and associated properties can be applied to other areas of a shirt or other articles of apparel, such as a knee, thigh, hip, chest, and/or lower back region of an article of apparel, or to areas requiring reinforcement such as areas adjacent to a fastener, for example, a zipper, a button, a snap, a pull cord, and the like.

Figure 3:
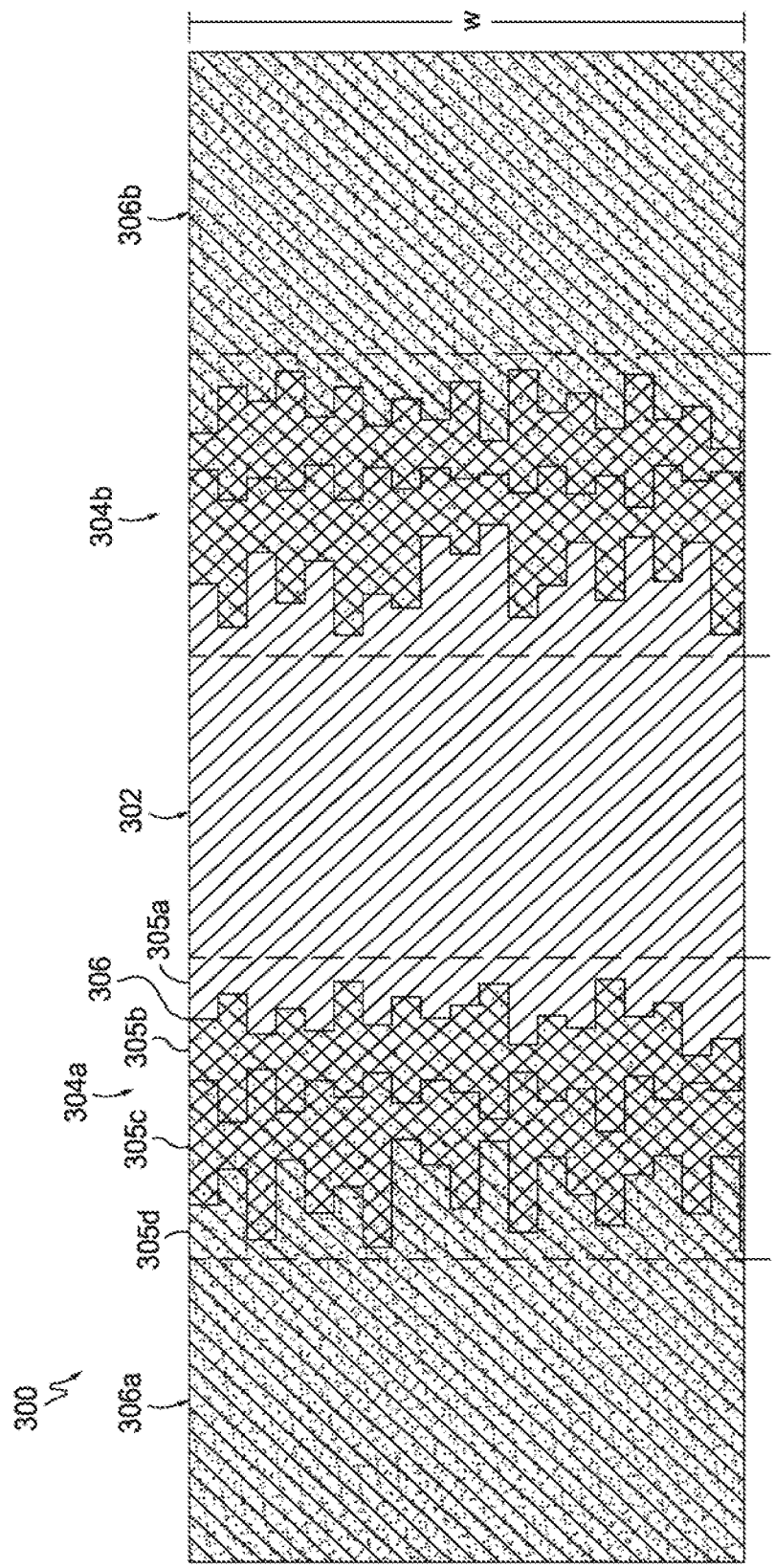
FIG. 3 is a plan view of a schematic depiction of a textile having three types of textile zones, in accordance with aspects of the present invention.

Turning now to FIG. 3, a plan view of a schematic textile 300 is provided. It should be understood that the textile 300 can be any type of textile known to one skilled in the art. A non-limiting list of textiles that are suitable for use in the articles of wear and methods disclosed herein includes knit textiles, woven textiles, non-woven textiles, and braided textiles.

Similar to the textile 102 of FIGS. 1A and 1B, and the textile 202 of FIGS. 2A and 2B, the textile 300 of FIG. 3 includes three types of textile zones. For example, the textile 300 includes a textile zone 302 that can include fibers and/or yarns comprising a low processing temperature polymeric composition, textile zones 306a and 306b that can include a high processing temperature polymeric composition, and textile zones 304a and 304b that can include a combination of fibers and/or yarns comprising the low processing temperature polymeric composition and fibers and/or yarns comprising the high processing temperature polymeric composition. In textile 300 of FIG. 3, the textile zones 304a and 304b can be positioned on either side of textile zone 302, while textile zones 306a and 306b can be positioned on the opposite sides of the textile zones 304 and 304b, respectively.

In certain aspects, the fibers and/or yarns comprising the low processing temperature polymeric composition present in textile zone 302, when exposed to a thermoforming process, can impart a structural or functional property to the textile 300 that can be used in forming an article of wear. For example, the textile zone 302 can represent the textile zone 104 of the textile 102 of FIGS. 1A and 1B, which forms at least a portion of a ground-facing outsole 112. In aspects, the fibers and/or yarns comprising the high processing temperature polymeric composition present in 306a and 306b can impart flexibility or pliability to the textile 300, such as the textile zone 108 of the article of footwear 100 depicted in FIGS. 1A and 1B. Further, in various aspects, the textile zones 304a and 304b can include a combination of fibers and/or yarns comprising the low processing temperature polymeric composition present in the textile zone 302 and fibers and/or yarns comprising the high processing temperature polymeric composition present in the textile zones 306a and 306b to provide structural support and three-dimensional structure for a particular article of wear. Further, as discussed above, in certain aspects, this combination of fibers and/or yarns comprising the low processing temperature polymeric composition and fibers and/or yarns comprising the high processing temperature polymeric composition in the textiles zones 304a and 304b can provide an integrated transition between the rigid thermoformed material in textile zone 302 and the flexible pliable high processing temperature polymeric composition in textile zones 306a and 306b.

In one or more aspects, the textile zones 304a and 304b can include a plurality of subzones, such as subzones 305a, 305b, 305c, and 305d of the textile zone 304a, which can include varying combinations and/or varied positioning of the fibers and/or yarns comprising the low processing temperature polymeric composition and fibers and/or yarns comprising the high processing temperature polymeric composition. In certain aspects, the subzone 305a can include fibers and/or yarns comprising the low processing temperature polymeric composition but not fibers and/or yarns comprising the high processing temperature polymeric composition present in the textile zones 306a and/or 306b. In the same or alternative aspects, the subzone 305d can include fibers and/or yarns comprising the high processing temperature polymeric composition but not fibers and/or yarns comprising the low processing temperature polymeric composition present in the textile zone 302.

It should be understood that, while only the subzones of the textile zone 304a can be further described herein, such descriptions apply to subzones present in the textile zone 304b. Further, it should be understood that, if in certain descriptions only a textile zone 304a and/or 306a is further discussed, such descriptions also apply to the textile zones 304b and 306b, respectively.

In certain aspects, based on the relative positioning of the fibers and/or yarns comprising the low processing temperature polymeric composition and the fibers and/or yarns comprising the high processing temperature polymeric composition in the textiles zones 302, 304a, and 306a the textile 300 can have varying concentrations of the low processing temperature polymeric composition and/or high processing temperature polymeric composition in these textile zones 302, 304a, 306a.

As used herein, the term "concentration" refers to a clustering or congregation in a specific volume. Thus, the term concentration includes measuring the amount (e.g., the weight in grams) of a material in a specified volume (e.g., $cm^3$). For example, in a knit textile, a first portion of a single knit layer of a textile can have an increased concentration of a first yarn compared to a second portion of the textile by having more stitches (e.g., knit stitches, tuck stitches, and/or float stitches) of that first yarn than the second portion of equal size. In another example, in a non-woven textile, a first portion of the textile can have an increased concentration of a first fiber if that textile was formed with more of the first fiber (e.g., a weight in grams) than a second portion of equal size.

In aspects, the textile zone 302 can include an increased concentration of fibers and/or yarns comprising the low processing temperature polymeric composition compared to the textile zones 304a and/or 306a. For example, in such aspects, the textile zone 302 can have at least 5 wt % more fibers and/or yarn comprising the low processing temperature polymeric composition compared to the textile zones 304a and/or 306a. In another aspect, the textile zone 302 can have at least 10 wt % more fibers and/or yarn comprising the low processing temperature polymeric composition compared to the textile zones 304a and/or 306a. In one aspect, the textile zone 302 can have at least 25 wt % more fibers and/or yarn comprising the low processing temperature polymeric composition compared to the textile zones 304a and/or 306a.

In the same or alternative aspects, the textile zone 304a can include an increased concentration of fibers and/or yarn comprising the low processing temperature polymeric composition compared to the textile zones 306a. For example, in such aspects, the textile zone 304a can have at least 5 wt % more fibers and/or yarn comprising the low processing temperature polymeric composition compared to the textile zone 306a. In another aspect, the textile zone 304a can have at least 10 wt % more fibers and/or yarn comprising the low processing temperature polymeric composition compared to the textile zone 306a. In one aspect, the textile zone 304a can have at least 25 wt % more fibers and/or yarn comprising the low processing temperature polymeric composition compared to the textile zone 306a.

In various aspects, the textile zone 306a can include an increased concentration of fibers and/or yarn comprising the high processing temperature polymeric composition compared to the textile zones 302 and 304a. For example, in such aspects, the textile zone 306a can have at least 5 wt % more fibers and/or yarn comprising the high processing temperature polymeric composition compared to the textile zones 302 and/or 304a. In another aspect, the textile zone 306a can have at least 10 wt % more fibers and/or yarns comprising the high processing temperature polymeric composition compared to the textile zones 302 and/or 304a. In one aspect, the textile zone 306a can have at least 25 wt % more fibers and/or yarn comprising the high processing temperature polymeric composition compared to the textile zones 302 and/or 304a.

In certain aspects, the textile zone 304a can include an increased concentration of fibers and/or yarn comprising the high processing temperature polymeric composition compared to the textile zone 302. For example, in such aspects, the textile zone 304a can have at least 5 wt % more fibers and/or yarn comprising the high processing temperature polymeric composition compared to the textile zone 302. In another aspect, the textile zone 304a can have at least 10 wt % more fibers and/or yarn comprising the high processing temperature polymeric composition compared to the textile zone 302. In one aspect, the textile zone 304a can have at least 25 wt % more fibers and/or yarn comprising the high processing temperature polymeric composition compared to the textile zones 302.

Figure 4A:
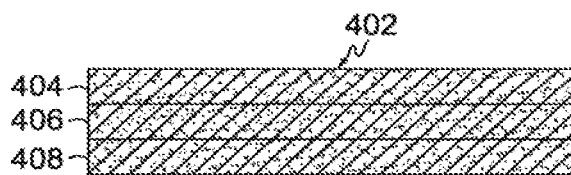
FIGS. 4A-4E depict exemplary cross-sections of the various types of textile zones of the textile of FIG. 3, in accordance with aspects of the present invention.
Figure 4B:
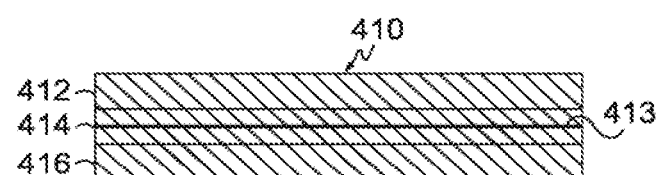
Figure 4C:
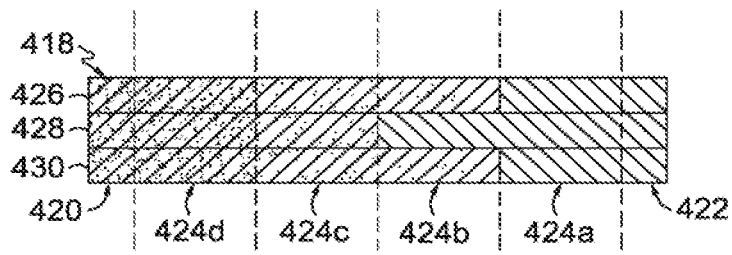
Figure 4D:
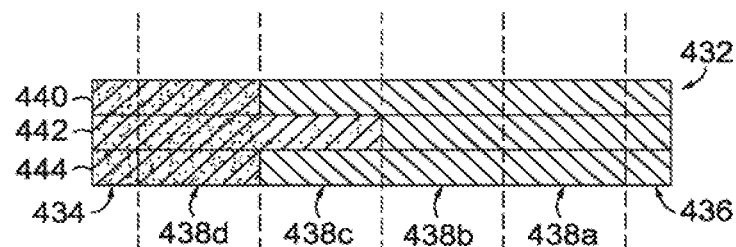

FIGS. 4A-4D schematically depict exemplary cross-sections of the textile zones 302, 304a, and 306a of the textile 300. Generally, FIG. 4A depicts an exemplary cross-section from the textile zone 306a and further illustrates how, in certain aspects, this portion of the textile zone 306a includes fibers and/or yarns comprising the high processing temperature polymeric composition but does not include fibers and/or yarn comprising the low processing temperature polymeric composition that is present in the textile zone 302. FIG. 4B depicts an exemplary cross-section of the textile zone 302 and also illustrates how, in various aspects, this portion of the textile zone 302 includes fibers and/or yarns comprising the low processing temperature polymeric composition but does not include fibers and/or yarns comprising the high processing temperature polymeric composition that is present in the textile zone 306a. FIGS. 4C and 4D depict two exemplary cross-sections from the textile zone 304a, and further illustrate how in these exemplary portions of the textile zone 304a both fibers and/or yarns comprising the low processing temperature polymeric composition and fibers and/or yarns comprising the high processing temperature polymeric composition is present.

The cross-sections depicted in FIGS. 4A-4D will now be described from the perspective of the textile 300 being a knit textile. Various processes for forming a knit textile and the types of yarns that can be used are discussed in detail below. It is contemplated that a variety of knitting techniques can be implemented to achieve a described result. For example, in some aspects, a "knit stitch" can be substituted with a purl stitch to achieve a comparable result having a different aesthetic and/or texture. For purposes of simplicity herein, a "knit stitch" will be discussed while it is contemplated that a functional equivalent could be substituted. Similarly, a "tuck stitch" can be discussed in specific aspects, but it is also contemplated that alternative stitch techniques can be implemented to achieve a comparable result. Although a relatively simple knit structure is depicted and discussed, numerous warp knit and weft knit structures can be formed through flat knitting, wide tube circular knitting, narrow tube circular knit jacquard, single knit circular knit jacquard, double knit circular knit jacquard, double needle bar raschel, warp knit jacquard, and tricot for example.

It should be understood that the cross-sections depicted in FIGS. 4A-4D are schematic and each cross-section is organized into various segments to highlight potential knit structures that can be present. The potential knitting structures that can be present in the various segments of these cross-sections are described first.

Figure 5A:
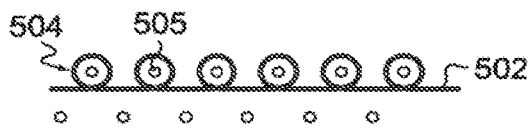
FIGS. 5A-5J depict exemplary knit structures that can be present in various segments of the exemplary cross-sections depicted in FIGS. 4A-4E, in accordance with aspects of the present invention.

FIGS. 5A-5J depict exemplary potential knitting structures that can be present in the various segments of the cross-sections depicted in FIGS. 4A-4D. FIG. 5A depicts a knit stitch (or sometimes referred to as a Jersey stitch) structure 502 formed from a back needle bed 504. It should be understood that the row of small circles associated with the back needle bed 504, represents needles (e.g., a needle 505) of the back needle bed 504, in accordance with traditional stitch schematics. Further, the same is true for a front needle bed, e.g., the front needle bed 508 depicted in FIG. 5B; that is, that the row of small circles associated with the front needle bed 508 represent needles (e.g., a needle 507) in the front needle bed 508.

Figure 5B:
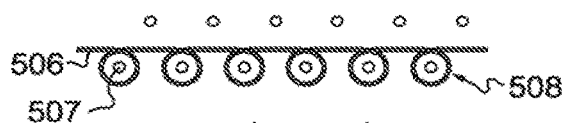
Figure 5C:
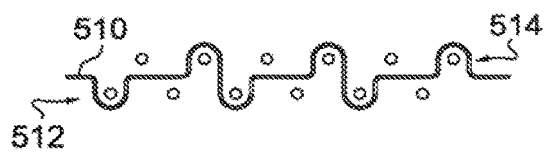
Figure 5D:
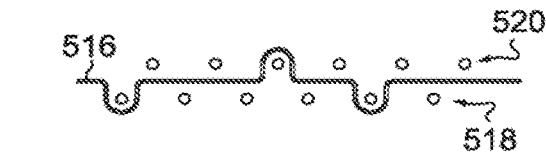
Figure 5E:
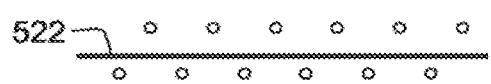
Figure 5F:
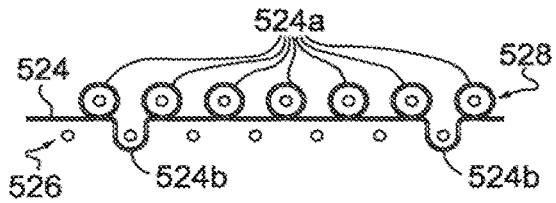
Figure 5G:
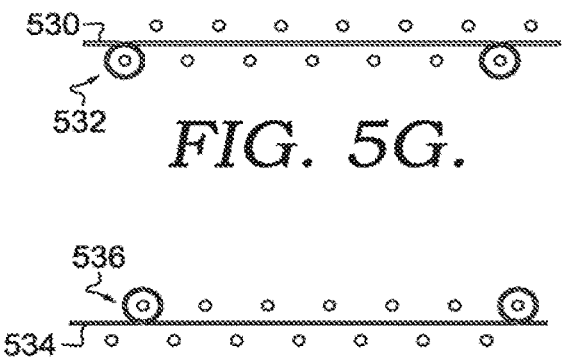
Figure 5H:
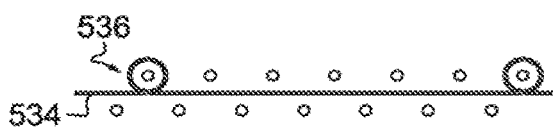
Figure 5I:
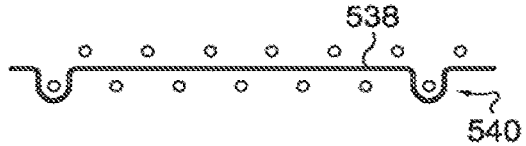
Figure 5J:
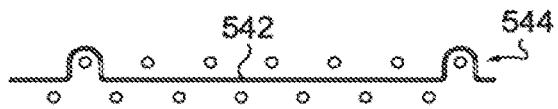

FIG. 5B depicts a knit stitch structure 506 formed from a front needle bed 508. FIG. 5C depicts a float and tuck stitch structure 510, with tuck stitches that are formed by a front needle bed 512 and a back needle bed 514. FIG. 5D depicts another float and tuck stitch structure 516, with tuck stitches formed by a front needle bed 518 and a back needle bed 520. FIG. 5E depicts a float stitch structure 522. FIG. 5F depicts a knit and tuck stitch structure 524 having knit stitches 524a formed by a back needle bed 528 and tuck stitches 524b formed by a front needle bed 526. FIG. 5G depicts a knit and float stitch structure 530, with the knit stitches formed on a front needle bed 532. FIG. 5H depicts a knit and float stitch structure 534, with the knit stitches formed a back needle bed 536. FIG. 5I depicts a tuck and float knit structure 538, with the tuck stitches formed by a front needle bed 540. FIG. 5J depicts a tuck and float knit structure 542, with the tuck stitches formed by a back needle bed 544.

Returning now to the cross-sections 4A-4D of the textile 300. Generally, the cross-sections depicted 4A-4D are structured similarly, which is due to the primary structure of the knit textile. For example, in aspects, there is tubular knit structure that includes a knit structure formed primarily from a back needle bed (such as the knit structure 502 depicted in FIG. 5A) and a knit structure primarily formed on a front needle bed (such as the knit structure 506 depicted in FIG. 5B). Further, in such aspects, this tubular knit structure is connected via one or more tuck and float stitch structures, with tuck stitches formed from a back needle bed and a front needle bed (such as the tuck and float stitch structures 510 and 516 depicted in FIGS. 5C and 5D, respectively).

This connected tubular knit structure is schematically depicted in the three horizontal rows highlighted in the cross-sections depicted 4A-4D. For example, FIG. 4A depicts a cross-section 402 of the textile zone 306a of FIG. 3 that includes the high processing temperature polymeric composition.

The cross-section 402 of FIG. 4A schematically depicts a top segment 404, a middle segment 406, and a bottom segment 408. The top segment 404 and the bottom segment 408 denote the knit structures for forming the tubular knit structure, while the middle segment 406 denotes the tuck and float stitch structures to connect the tubular knit structure together. Thus, in certain aspects, the top segment 404 can include one or more of the knitting structures 502 and 524 depicted in FIGS. 5A and 5F, respectively. The bottom segment 408 can include the knitting structure 506 depicted in FIG. 5B. The middle segment 406 can include one or more of the knit structures 510 and 516 depicted in FIGS. 5C and 5D, respectively.

FIG. 4B depicts a cross-section 410 of the textile zone 302 that includes yarn comprising the low processing temperature polymeric composition. The cross-section 410 includes a top segment 412, a middle segment 414, and a bottom segment 416, which can include the same knit structures identified above with respect to the top segment 404, the middle segment 406, and the bottom segment 408 of the cross-section 402 of FIG. 4A.

In certain aspects, it can be desirable to bulk up the low processing temperature polymeric composition in the textile zone 302 in order to provide a desired thickness and rigidity to the thermoformed textile zone 302, e.g., to form a ground-facing outsole of an article of footwear. In such aspects, the textile zone 302 can include repeat stitches to increase the concentration of the yarn comprising the low processing temperature polymeric composition relative to other textile zones, e.g., the textile zones 304a and/or 306a. In certain aspects, repeat stitches can be provided, for example, by including multiple stitch structures in any or all of the top segment 412, middle segment 414, and bottom segment 416 of the cross-section 410. In one example, multiple overlapping tuck and float stitch structures (such as the structures depicted in FIGS. 5C, 5D, 5I, and 5J) can be provided in the middle segment 414 of the cross-section 410.

In certain aspects, in regions of the textile 300 that include a substantial amount of yarn comprising the low processing temperature polymeric composition, e.g., the textile zone 302, an anchor yarn 413 can be provided in the textile 300 to help restrict the flow of the melted low processing temperature polymeric composition and/or to provide some flexibility to the thermoformed material. In the cross-section 410 depicted in FIG. 4B, the anchor yarn 413 is depicted as being present in the middle segment 414 between the top and bottom segments 412 and 416, respectively. In such aspects, this positioning of the anchor yarn 413 can result in the embedding or the encapsulation of the anchor yarn 413 by the low processing temperature polymeric composition upon thermoforming of the textile 300.

While the anchor yarn 413 in FIG. 4B is depicted as a straight line it should be understood that this is a schematic representation of the anchor yarn 413 and is not meant to specify any particular type of knit structure. For example, the anchor yarn 413 can be present in the textile 300 as many different types of knit structure, such as one or more of structures depicted in FIGS. 5E and 5G-J. In certain aspects, the stitch selection for the anchor yarn 413 can depend upon the desired resistance to elongation of the material through which the anchor yarn 413 extends. For example, an anchor yarn stitch which floats five needles between tuck or knit stitches would provide a greater resistance to stretch to the material through which the anchor yarn 413 extends compared to an anchor yarn stitch which only floats 2 or 3 needles between tuck or knit stitches. In such an example, the differing resistance to elongation between the length of the float is a result of non-linear portions (e.g., stitch loops) that are more prone to elongation than linear segments, which results in different amounts of resistance to elongation.

In certain aspects, when the anchor yarn 413 is present as one or more of the knit structures depicted in FIGS. 5G-J, the anchor yarn 413 extends as a float stitch along at least two, at least three, at least four, or at least five adjacent loops of the yarn comprising the low processing temperature polymeric composition, since the yarn comprising the low processing temperature polymeric composition is also present as one or more of the knit structures of FIGS. 5A and 5B. Further in certain aspects, the anchor yarn 413 can extend as a float stitch along at least two, at least three, at least four, or at least five adjacent loops of the yarn comprising the low processing temperature polymeric composition and also can form at least a portion of a tuck stitch and/or a knit stitch with the yarn comprising the low processing temperature polymeric composition. In such aspects, a length between tuck stitches or knit stitches is at least partly formed with the yarn comprising the low processing temperature polymeric composition and the anchor yarn, the anchor yarn 413 can extend at least two, at least three, at least four, or at least five adjacent loops of the yarn comprising the low processing temperature polymeric composition. In the same or alternative aspects, the anchor yarn 413 can be stitched, e.g., tuck stitch or knit stitch, at loops spaced apart an amount represented by needle count of a common needle bed of within 50% or within 25% of the gauge of a knit machine used to form at least a portion of the textile 300.

Figure 4E:
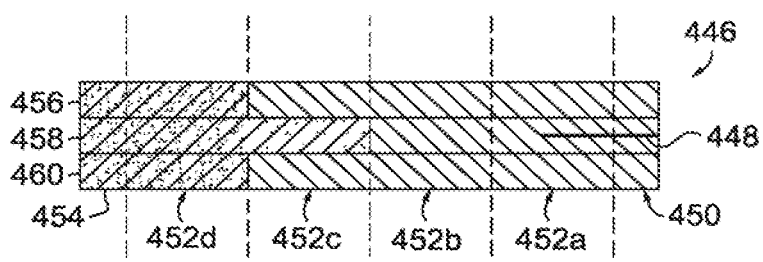

FIGS. 4C and 4D depict cross-sections of the textile zone 304a and portions of the textile zones 302 and 306a. For example, the cross-section 418 of FIG. 4C includes a portion 422 that corresponds to the textile zone 302, and a portion 420 that corresponds to the textile zone 306a. The portions 424a, 424b, 424c, and 424d correspond to the subzones 305a, 305b, 305c, and 305d, respectively, of the textile zone 304a of the textile 300. The cross sections of FIGS. 4C-4E are simplified schematically; however, it is contemplated that one or more zones and/or portions of the cross sections can include a variety of fibers and/or yarns in different configurations and concentrations. For example, textile zone 424c in a middle segment 428 can be comprised of both fibers and/or yarns comprising the low processing temperature polymeric composition and fibers and/or yarns comprising the high processing temperature polymeric composition, but in a different configuration/concentration as that which is found in textile zone 424b and/or 424d of the middle segment 428. Stated differently, various constructions techniques allow for combinations of fibers and/or yarns in given segments and textile zone by variations in the method of combining, attaching, depositing or applying the fibers and/or yarn (e.g., stitch selection) that allow for variations in fiber and/or yarn concentration at segment levels and/or textile zone levels.

The cross-section 418 of FIG. 4C includes the same type of general tubular knit structure discussed above with respect to the cross-sections 402 and 410 of FIGS. 4A and 4B, respectively. Accordingly, the cross-section 418 includes a top segment 426, a middle segment 428, and a bottom segment 430. The top segment 426, the middle segment 428, and the bottom segment 430 can include the same knit structures discussed above with reference to the top segment 404, the middle segment 406, and the bottom segment 408 of the cross-section 402 of FIG. 4A, respectively.

In the cross-section 418 of FIG. 4C, the portions 422 and 424a include knit structures made with yarn that comprises the low processing temperature polymeric composition, while the portions 420, 424d, and 424c include knit structures made with yarn that comprises the high processing temperature polymeric composition. However, as provided above, it is contemplated that combinations of fibers and/or yarn based on differing stitch techniques can be implemented in the various portions to achieve a transition from one primary material to another primary material.

The portion 424b includes the tubular knit structure made from yarn that comprises the high processing temperature polymeric composition; however, knit structures formed from the front and back needle beds (with yarn(s) comprising the high processing temperature polymeric composition) are connected via the float and tuck stitches (or an effective stitch comparable) from a yarn comprising the low processing temperature polymeric composition. This portion 424b illustrates how, when melted and solidified, the low processing temperature polymeric composition can physically connect two outer knit layers together via a plaque or film of thermoformed material, once the textile 300 undergoes thermoforming. In such aspects, an article of wear having this type of tubular knit structure that has been thermoformed and connected via an integral thermoformed material would primarily include typical knit yarn layers on opposing outer surfaces of the textile that are connected together via a thermoformed film. Such a structure could be utilized to provide water-proofing/resistance or other weather proofing to an article of wear while still maintaining a typical knit article aesthetic and hand feel.

Like the cross-section 418 of FIG. 4C, the cross-section 432 of FIG. 4D includes a portion 436 that corresponds to the textile zone 302, and a portion 434 that corresponds to the textile zone 306a. The portions 438a, 438b, 438c, and 438d correspond to the subzones 305a, 305b, 305c, and 305d, respectively, of the textile zone 304a of the textile 300.

The top region 440, the middle region 442, and the bottom region 444 of the cross-section 432 of FIG. 4D can include the same knit structures discussed above with reference to the top segment 404, the middle segment 406, and the bottom segment 408 of the cross-section 402 of FIG. 4A, respectively, in order to provide the same type of general tubular structure.

The portions 434 and 438d of the cross-section 432 of FIG. 4D include knit structures that include yarn that comprises the high processing temperature polymeric composition while the portions 436, 438a, and 438b include knit structures made with yarn that comprises the low processing temperature polymeric composition, in an exemplary aspect. However, as also provided above, it is contemplated that a primary, but not exclusive, material selection can be used. For example, in portion 438b, the yarn comprising the high processing temperature polymeric composition can be present in the middle region 442 to aid in the transition of materials. The concentration of the yarn comprising the high processing temperature polymeric composition in portion 438b can be less than that present in portion 438c of the same middle region 442. For example, the portion 438b can have at least 5 wt % less, 10 wt % less, or 25 wt % less yarn comprising the high processing temperature polymeric composition than is present in portion 438c of the same middle region 442.

The portion 438c includes the tubular structure with yarn that comprises the low processing temperature polymeric composition, which are connected via the float and tuck stitches from a yarn comprising the high processing temperature polymeric composition. In such aspects, upon thermoforming this portion 438c can encapsulate the yarn comprising the high processing temperature polymeric composition in a plaque of the melted and cooled thermoformed material. In certain aspects, such a structure can provide some flexibility to an otherwise rigid thermoformed material.

For example, FIG. 4E depicts a cross-section 446 that is identical to the cross-section 432 of FIG. 4D with the exception that an anchor yarn 448 has been added to at least a portion of the regions that include the yarn comprising the low processing temperature polymeric composition. In certain aspects, the anchor yarn 448 can have any or all of the properties discussed above with respect to the anchor yarn 413 of FIG. 4B. For example, the anchor yarn can be incorporated into the textile using one or more of the knit structures depicted in FIGS. 5E and 5G-J.

As can be seen in FIG. 4E the anchor yarn 448 extends from the portion 450 of the cross-section 446, which corresponds to the textile zone 302, and into the portions 452a and 452b, which correspond to the subzones 305a and 305b of the textile zone 304a. Further, in such aspects, FIG. 4E illustrates that yarn comprising the low processing temperature polymeric composition is also present (e.g., as a yarn having one or more of the knit structures present in FIGS. 5A and 5B) in at least the same portions of the textile as the anchor yarn 448. Thus, in certain aspects, the anchor yarn 448 can extend as a float stitch along at least two, at least three, at least four, or at least five adjacent loops of the yarn comprising the low processing temperature polymeric composition. Further in certain aspects, the anchor yarn 448 can extend as a float stitch along at least two, at least three, at least four, or at least five adjacent loops of the yarn comprising the low processing temperature polymeric composition and also can form at least a portion of a tuck stitch and/or a knit stitch with the yarn comprising the low processing temperature polymeric composition. In such aspects, between tuck stitches or knit stitches at least partly formed with yarn comprising the low processing temperature polymeric composition and the anchor yarn 448, the anchor yarn 448 can extend at least two, at least three, at least four, or at least five adjacent loops of the yarn comprising the low processing temperature polymeric composition. In the same or alternative aspects, the anchor yarn 448 can be stitched, e.g., tuck stitch or knit stitch, at loops spaced apart by needle count an amount of within 50% or within 25% of the gauge of a knit machine used to form at least a portion of the textile 300.

As discussed above, in one or more aspects, the anchor yarn 448 can extend from the textile zone 302 into the textile zone 304*a* and toward the textile zone 306*a*. In such aspects, the anchor yarn 448 can not extend from the textile zone 302 into the textile zone 304*a* and toward the textile zone 306*a* as far as a yarn comprising the low processing temperature polymeric composition extends into the zone 304*a* and toward the textile zone 306*a*, because there is less need to restrict flow during thermoforming and/or provide flexibility to the thermoformed material since the yarn comprising the high processing temperature polymeric composition from the zone 306*a* is also present in textile zone 304*a*.

For example, in the cross-section 446 of FIG. 4E, the anchor yarn extends from the portion 450 (corresponding to a portion of the textile zone 302) and into the portion 452*b* (corresponding to the subzone 305*b* of the textile 300). Further, the cross-section 446 illustrates that the top segment 456 and bottom segment 460 of the cross-section 446 show that yarn comprising the low processing temperature polymeric composition extends from the portion 450 and into the portion 452*c* towards the portion 454 (corresponding to the textile zone 406*a*), which is beyond the extension of the anchor yarn 448 in the same direction. However, in the middle segment 458, in portions 452*c* and 452*d*, the yarn comprising the high processing temperature polymeric composition is present, which can provide flexibility to the thermoformed textile and/or restrict flow during thermoforming.

As discussed above, in certain aspects, when the textile 300 is a knit textile, the cross-sections of the textile depicted in FIGS. 4A-4E are depicted with a top segment, bottom segment, and middle segment, where the top and bottom segments can form a tubular knit structure (and where tuck stitches or other connecting stitches present in the middle segment can also form part of the tubular or general knit structure) with a top and bottom knit layers. In such aspects, each of the top and bottom outer knit layers can include a plurality of interconnected courses.

Further, as can be seen in the textile 300 of FIG. 3, in the zone 304*a*, the subzones 305*a-d* have at least one staggered interface, e.g., staggered interface 306. The staggered interfaces, e.g., the staggered interface 306, provide a staggered or non-linear transition between subzones of the textile 300 along the width w of the textile. In such aspects, these staggered interfaces provide a more refined integrated transition, when the textile 300 is thermoformed, between the rigid area formed by the low processing temperature polymeric composition in the textile zone 302 and the flexible pliable area formed by the yarn comprising the high processing temperature polymeric composition in the textile zone 306*a*. In aspects, this refined integrated transition provided at least in part by the staggered interfaces, can increase the durability or tear resistance of the thermoformed textile 300, as opposed to a similar textile having a linear abrupt transition between an integral rigid material and a flexible material.

In aspects where the textile 300 is a knit textile, the staggered interface 306 can depict how different courses of yarn on either the top or bottom outer knit layers can have different amounts of loops (or general stitch selection) of a yarn comprising the low processing temperature polymeric composition and/or a yarn comprising the high processing temperature polymeric composition. As the textile can have multiple layers (e.g., a top, middle, and bottom), the staggered interface can be addressed in any combination of the layers and is not limited to the surfaces exposed or depicted. Instead, as provided herein and as contemplated, a transition from a first primary material (e.g., fibers and/or yarn comprising the high processing temperature polymeric composition) to a second primary material (e.g., fibers and/or yarn comprising the low processing temperature polymeric composition) forming a textile, the transition can occur at a middle layer exclusively or in combination with one or more outer layers. It should be understood for the purposes of the following discussion of knit layers, it is assumed that, when the textile 300 of FIG. 3 is a knit textile, the view of the textile 300 depicts a top layer. Further, the same description equally applies to the bottom knit layer.

Figure 6:
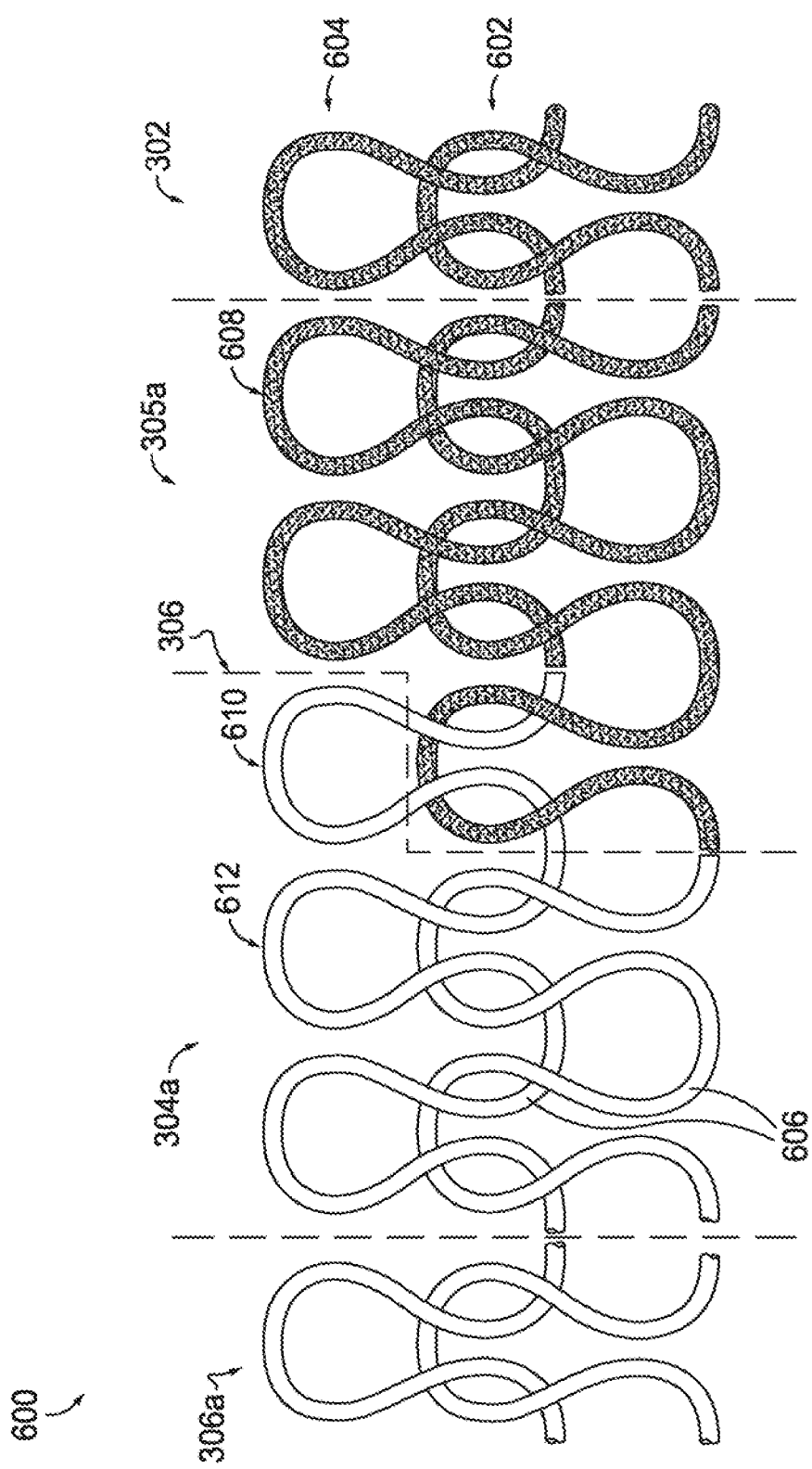
FIG. 6 is a schematic representation of two interconnected courses of loops having different types of yarn and depicting a staggered interface, in accordance with aspects of the present invention.

FIG. 6 schematically depicts one exemplary portion 600 of the top layer of the textile 300 showing a portion of a staggered interface 306. As can be seen in FIG. 6, the portion 600, a first course 602 of loops is interconnected to a second course 604 of loops. It should be understood that while only two interconnected courses are depicted in FIG. 6, more than two courses can be interconnected in the top knit layer of the textile 300. As used herein "interconnected," when referencing interconnected courses, refers to how at least a portion of the loops in a first course of loops are tethered to at least a portion of the loops in a second course of loops. One exemplary aspect of interconnected courses is depicted in FIG. 6, where individual loops from the second course 604 are interlooped with individual loops from the first course 602. As used herein, "interlooped" refers to the how a loop from one course can wrap around a loop of another course such as in a knit stitch, and also refers to how one loop can have another segment of yarn pulled through the loop (or through the loop and around the yarn forming the loop) in order to form a second loop, as in a crochet process.

As can be seen in the portion 600 of the textile 300, both the first course 602 and the second course 604 include two types of yarns: a first yarn 606 that can comprise the high processing temperature polymeric composition, and a second yarn 608 that can comprise the low processing temperature polymeric composition. While only two courses are depicted in the portion 600, it should be understood that the top knit layer of the textile 300 can include any number of courses. In aspects, each of the courses present in the top knit layer of the textile 300 can include two or more types of yarn, as depicted in FIG. 6.

As can be seen in FIG. 6, each course, e.g., the first course 602 and the second course 604, can extend from the textile zone 302 to the textile zone 306*a* (in aspects, each of the course can extend from the textile zone 306*a* to the textile zone 306*b*). In certain aspects, as can be seen in FIG. 6, the second yarn 608 in both the first course 602 and the second course 604 can extend from the textile zone 302 into the textile 304a. In the same or alternative aspects, the first yarn 606 can extend from the textile zone 304a into the textile zone 306a. It should be understood that, while the schematic portion 600 of the textile 300 depicts each loop as only having a single yarn, more than one yarn can be present at one or more loops (e.g., another yarn can form a tuck stitch with the loops of the portion 600 of FIG. 6), as depicted in the cross-sections of FIGS. 4A-4E.

As discussed above, the portion 600 of the outer knit layer of the textile 300 illustrates at least a portion of the staggered interface 306. In certain aspects, the staggered interface 306 (and any other staggered interfaces) can be formed by the same type of yarn in multiple courses extending different distances from the one zone (or subzone) into the next zone or subzone. For example, as can be seen in FIG. 6, in the first course 602, the second yarn 608 extends from the textile zone 302 into the textile zone 304a and towards the textile zone 306a further than the second yarn extends from the textile zone 302 into the textile zone 304a and towards the textile zone 306a. In such aspects, the different distances of extension of the second yarn 608 into the textile zone 304a results in different amounts of loops of the second yarn 608 in each of the first course 602 and the second course 604, which can change a concentration of yarn for a given zone/subzone. Thus, in such aspects, within the textile zone 304a a loop of the second yarn 608 in the first course 602 can be interlooped with a loop of the second yarn 608 in the first course 602 at a first wale 608, while at a second wale 610 the second yarn 608 of the first course 602 can be interlooped to a loop of the first yarn 604 in the first course 602. In the same or alternative aspects, within the textile zone 304a, the first yarn 604 in the first course 602 can be interlooped with the first yarn 604 in the second course 604 at a third wale 612.

In one or more aspects, a staggered interface, e.g., the staggered interface 306, can result in adjacent courses of the plurality of courses in the textile 300 having different numbers of loops of the yarn comprising the low processing temperature polymeric composition and of a yarn comprising the high processing temperature polymeric composition. For example, as can be seen in the portion 600 of the upper knit layer of the textile 300 depicted in FIG. 6, in at least a portion of the textile zone 304a the first course 602 has a different number of loops of the first yarn 606, and/or of the second yarn 608, than the second course 604. Further, in the same or alternative aspects, within at least a portion of the textile zone 304a, adjacent wales can have one or more loops of different yarns. For example, as illustrated in the portion 600 of the upper knit layer of the textile 300 in FIG. 6, the wale 610 includes loops of both the first yarn 606 and the second yarn 608, while the wale 612 includes loops of the first yarn 606.

As discussed above, the textiles described herein, which can include fibers and/or yarns comprising the low processing temperature polymeric composition, can be thermoformed to impart some structure of properties to the article of wear. Further, as discussed above, the thermoforming process can cause at least a portion of the low processing temperature polymeric composition present in the textile to melt or deform and subsequently solidify.

Figure 7A:
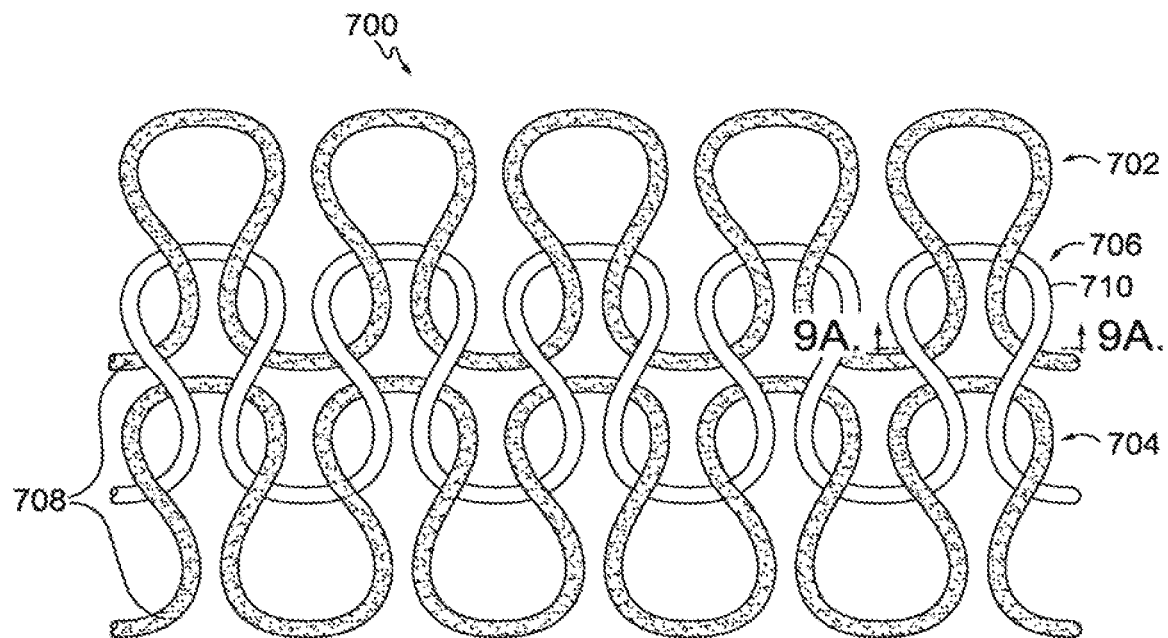
FIG. 7A is a schematic representation of three interconnected courses of loops with the middle course of loops being formed of a different yarn than the outer courses of loops, in accordance with aspects of the present invention.

FIG. 7A schematically depicts a portion 700 of the textile zone 304a of the upper knit layer of the textile 300 of FIG. 3 prior to a thermoforming process. The portion 700 includes a first course 702 and a second course 704 having a first yarn 708 that comprises the high processing temperature polymeric composition. The portion also includes a third course 706 of a second yarn 710 that comprises the low processing temperature polymeric composition. In such an aspect, the third course 706 of loops of the second yarn 710 can be interconnected, e.g., interlooped, to the first course 702 and the second course 707 having the first yarn 708.

Figure 7B:
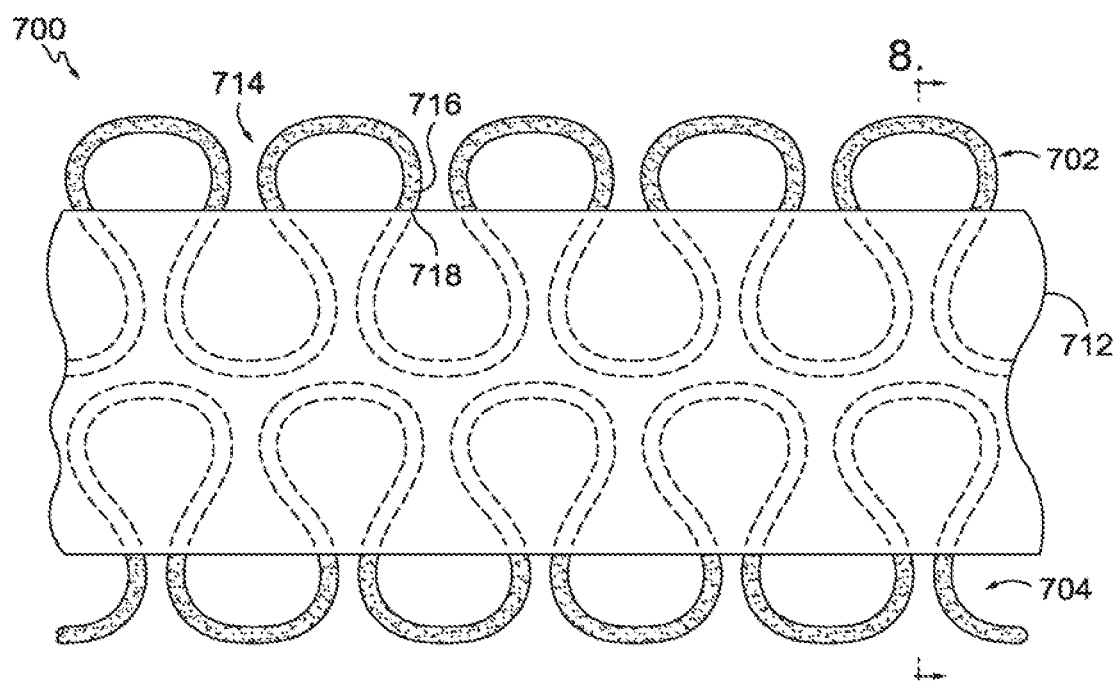
FIG. 7B is a schematic representation of the interconnected courses of loops of FIG. 7A after being exposed to a thermoforming process, and showing the middle course of loops being transformed into a melted yarn component upon thermoforming but not the two outer courses of loops, in accordance with aspects of the present invention.

FIG. 7B depicts the portion 700 after being exposed to a thermoforming process. As can be seen by comparing FIGS. 7A and 7B, the second yarn 710 that comprises the low processing temperature polymeric composition was thermoformed from a yarn material into a melted yarn component 712. In certain aspects, the heating step of the thermoforming process at least partly caused the low processing temperature polymeric composition in the second yarn 710 to melt and flow and then subsequently solidify by the completion of the thermoforming process into the melted yarn component 712.

In aspects, as can be seen in FIGS. 7A and 7B, the thermoforming process has also transformed at least a portion of the knit structure of the portion 700 of the upper knit layer of the textile 300 of FIG. 3. For example, the courses 702, 704, and 706 depicted in FIG. 7A have been transformed such that the portion 700 no longer includes interconnected courses of loops of a yarn comprising the low processing temperature polymeric composition and a yarn comprising the high processing temperature polymeric composition, at least partly due to the transformation of the yarn 710 in the second course 706 to the melted yarn component 712. As can be seen in FIG. 7B, although the thermoforming process can eliminate the interconnected loops in the portion 700 of the upper knit layer of the textile 300 of FIG. 3, the remaining course 702 and 704 can be connected by the melted yarn component 712. In such aspects, this portion 700 of upper knit layer of the textile 300 of FIG. 3 can fix the position of the courses 702 and 704 to one another, as opposed to when the courses 702 and 704 were interconnected via the course 706 prior thermoforming. Further, in such aspects, a top portion 714 of the loops of the first course 702 can still be free to interconnect with other courses of yarn allowing one to modulate the level of rigidity and/or three-dimensional forming provided by the textile zone 304a.

Figure 8:
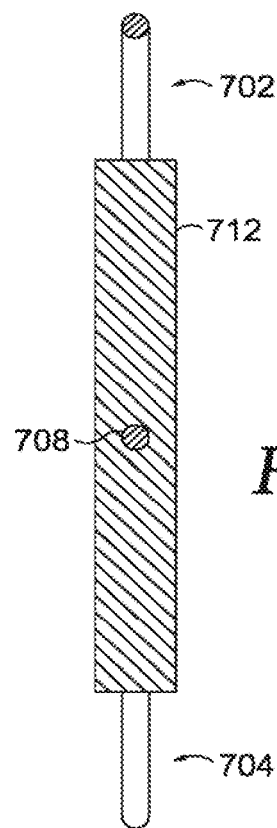
FIG. 8 is a schematic representation of a cross-section of the melted yarn component of FIG. 7B, and showing a portion of a yarn from one of the outer courses of loops being encapsulated within the melted yarn component, in accordance with aspects of the present invention.

FIG. 8 depicts a cross-section of the portion 700 of the upper knit layer of the textile 300 of FIG. 3 along the cut line 8 illustrated in FIG. 7B. As can be seen in FIG. 8, at least portion of the first yarn 708 can be encapsulated within the melted yarn component 712. Depending on the conditions used during the thermoforming process, the melted yarn component 712 can solidify into a film-like structure surrounding at least a portion of the loops of the first course 702 and the second course 704 of the first yarn 708 that comprises the high processing temperature polymeric composition.

As can be seen in the aspect depicted in FIGS. 7B and 8, the first yarn 708 that comprises the high processing temperature polymeric composition did not melt or deform after being exposed to the thermoforming process. Further, in certain aspects, the first yarn 708 can contain a dye 716 (depicted as the speckling within the first yarn 708) that does not leach out after being exposed to the thermoforming process. For example, as can be seen in FIGS. 7B and 8, there is no visible leaching of the dye 716 from the first yarn 708 into adjacent regions of the melted yarn component 712, e.g., the adjacent region 718. In certain aspects, at least about 80 wt %, at least about 90 wt %, at least about 95 wt %, or at least 99 wt % of the dye 716 remains within the first yarn 708 or within the thermoformed portion 700 of the upper knit layer of the textile 300 of FIG. 3. In the same or alternative aspects, upon thermoforming, there is no visible leaching of the dye into any additional materials associated with the final article of wear, which the portion 700 of upper knit layer of the textile 300 of FIG. 3 textile 300 is incorporated into.

Figure 9A:
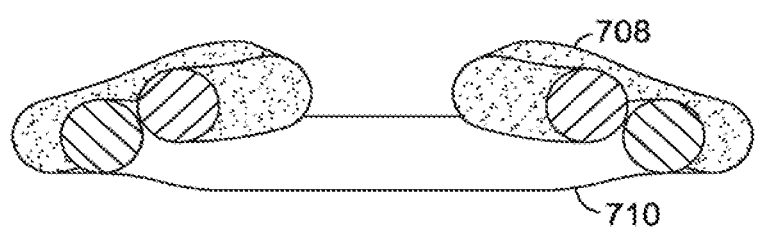
FIG. 9A is a schematic representation of a cross-section of a portion of the interconnected courses of FIG. 7, showing one loop in the middle course of loops and one loop in the upper course of loops, in accordance with aspects of the present invention.
Figure 9B:
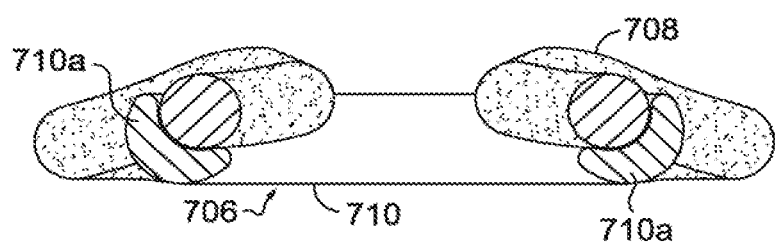
FIG. 9B is a schematic representation of the cross-section of FIG. 9A but after the interconnected courses of FIG. 7 have been exposed to a thermoforming process, showing how the loop of yarn in the middle course deforms but still maintains a general yarn structure, in accordance with aspects of the present invention.

FIGS. 9A and 9B depict an aspect where the portion 700 of the upper knit layer of the textile 300 of FIG. 3 is exposed to the thermoforming process but only results in the deforming of the low processing temperature polymeric composition in the second yarn 710 without eliminating at least a portion of the interconnected courses 702, 704, and 706 of FIG. 7A. As used herein, "deform" and "deforming" in the context of the thermoforming process of a knit textile refers to the alteration of the structure of the yarn such that the yarn does not melt and flow in such a manner as to substantially eliminate the knit structure of the textile (e.g., eliminate one or more interconnected loops or interlooped courses).

FIG. 9A depicts a cross-section of the portion 700 of the upper knit layer of the textile 300 of FIG. 3 along the cutline 9A-B prior to the thermoforming process, and FIG. 9B depicts the same cross-section after the thermoforming process. As can be seen in FIG. 9B, upon being exposed the thermoforming process, the second yarn 710 in the third course 706 has an altered yarn structure 710a while the structure of the first yarn 708 has not been altered. In this aspect, the second yarn 710 in the third course 706 maintains the interlooping with the first course 702 and the second course 704 and the overall knit structure of the portion 700 of the upper knit layer of the textile 300 of FIG. 3.

In certain aspects, this altered yarn structure 710a can result in a mechanical coupling or physical bonding of the second yarn 710 to another yarn, e.g., the first yarn 706, (or to another portion of the second yarn 710). In certain aspects, during the thermoforming process, the yarn 710 can have been exposed to a temperature above the glass transition temperature $T_g$ of the low processing temperature polymeric composition but not above the melting temperature of the low processing temperature polymeric composition. In such aspects, when the second yarn 710 is exposed to such an elevated temperature, the second yarn can soften and become pliable but not melt, allowing the yarn to slightly mold around at least a portion of adjacent yarn, e.g., the first 706, and upon cooling this altered yarn structure can be mechanically locked in place to physically bond to the adjacent yarn.

Figure 10A:
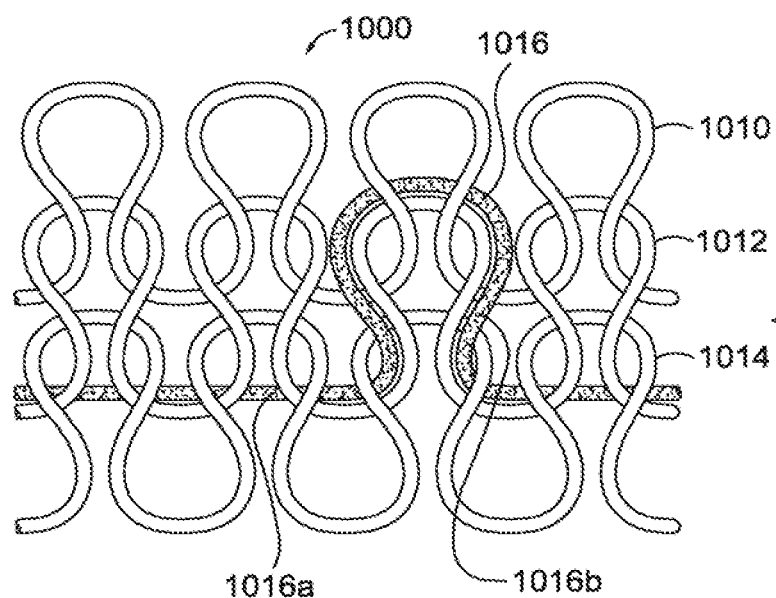
FIG. 10A is a schematic representation of three interconnected courses of one type of yarn with anchor yarn in float stitches and tuck stitches, in accordance with aspects of the present invention.
Figure 10B:
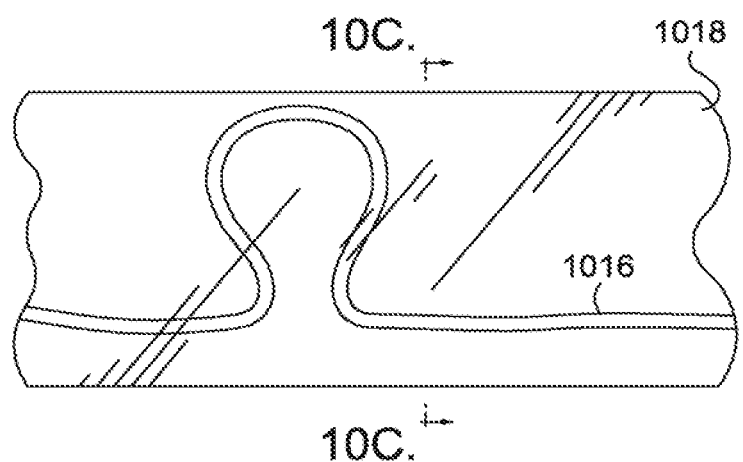
FIG. 10B is a schematic representation of the interconnected courses of FIG. 10A, and shows that upon thermoforming the one type of yarn forming the interconnected courses has been transformed into a melted yarn component, with the anchor yarn still present as a yarn, in accordance with aspects of the present invention.
Figure 10C:
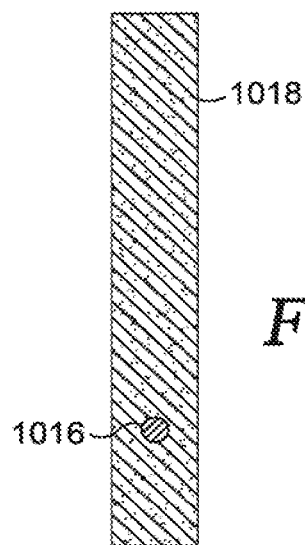
FIG. 10C is a schematic representation of a cross-section of the melted yarn component of FIG. 10B, showing the anchor yarn encapsulated within the melted yarn component, in accordance with aspects of the present invention.

FIGS. 10A-10C depict a portion 1000 of the textile zone 302 upper knit layer of the textile 300 of FIG. 3 before and after thermoforming. FIG. 10A depicts three courses 1010, 1012, 1014 of a yarn that includes the low processing temperature polymeric composition. FIG. 10A further depicts the present of an anchor yarn 1016 extending as a float stitch 1016a and a tuck stitch 1016b.

FIG. 10B depicts the same portion 1000 of the textile zone 302 upper knit layer of the textile 300 of FIG. 3 after being exposed to the thermoforming process. As can be seen in FIG. 10B, the interlooped courses 1010, 1012, and 1014 of the yarn have been transformed into a melted yarn component 1018. Further, as can be seen in FIG. 10B and FIG. 10C, which is a cross-section along the cutline 10C of FIG. 10B, the anchor yarn 1016 has maintained its yarn structure and is now encapsulated within the melted yarn component 1018. It should be understood that while in FIG. 10B, the anchor yarn 1016 is depicted as being encapsulated within the melted yarn component 1018, it is also contemplated that the anchor yarn 1016 can be at least partially embedded within the melted yarn component 1018 such that at least a portion of the anchor yarn 1016 is not fully covered in the melted yarn component 1018.

As discussed above, in certain aspects, the textiles described herein can include a knit textile, e.g., such as the portions of a knit textile depicted in FIGS. 4A-10C. A knit upper for an article of footwear is one exemplary knit textile. In such aspects, at least a portion of the knit upper of the article of footwear, and in some aspects substantially the entirety of the upper, can be formed of the knit textile. The knit textile can additionally or alternatively form another element of the article of footwear such as the midsole or ground-facing outsole for example. The knit textile can have a first side forming an inner surface of the upper (e.g., facing the void of the article of footwear) and a second side forming an outer surface of the upper. An upper including the knit textile can substantially surround the void so as to substantially encompass the foot of a person when the article of footwear is in use. The first side and the second side of the knit textile can exhibit different characteristics (e.g., the first side can provide abrasion resistance and comfort while the second side can be relatively rigid and provide water resistance).

In aspects, the knit textile can be formed as an integral one-piece element during a knitting process, such as a weft knitting process (e.g., with a flat knitting machine or circular knitting machine), a warp knitting process, or any other suitable knitting process. That is, the knitting process can substantially form the knit structure of the knit textile without the need for significant post-knitting processes or steps. Alternatively, two or more portions of the knit textile can be formed separately and then attached. In some embodiments, the knit textile can be shaped after the knitting process to form and retain the desired shape of the upper (for example, by using a foot-shaped last). The shaping process can include attaching the knit textile to another object (e.g., a strobel) and/or attaching one portion of the knitted component to another portion of the knitted component at a seam by sewing, by using an adhesive, or by another suitable attachment process.

Forming an upper with the knit textile can provide the upper with advantageous characteristics including, but not limited to, a particular degree of elasticity (for example, as expressed in terms of Young's modulus), breathability, bendability, strength, moisture absorption, weight, and abrasion resistance. These characteristics can be accomplished by selecting a particular single layer or multi-layer knit structure (e.g., a ribbed knit structure, a single jersey knit structure, or a double jersey knit structure), by varying the size and tension of the knit structure, by using one or more yarns formed of a particular material (e.g., a polyester material, a monofilament material, or an elastic material such as spandex), by selecting yarns of a particular size (e.g., denier), or a combination thereof.

The knit textile can also provide desirable aesthetic characteristics by incorporating yarns having different colors or other visual properties arranged in a particular pattern. The yarns and/or the knit structure of the knit textile can be varied at different locations such that the knitted component has two or more portions with different properties (e.g., a portion forming the throat area of the upper can be relatively elastic while another portion can be relatively inelastic). In some aspects, the knit textile can incorporate one or more materials with properties that change in response to a stimulus (e.g., temperature, moisture, electrical current, magnetic field, or light).

In some aspects, the knit textile can include one or more yarns or strands that are at least partially inlaid or otherwise inserted within the knit structure of the knit textile during or after the knitting process, herein referred to as "tensile strands." The tensile strands can be substantially inelastic so as to have a substantially fixed length. The tensile strands can extend through a plurality of courses of the knit textile or through a passage within the knit textile and can limit the stretch of the knit textile in at least one direction. For example, the tensile strands can extend approximately from a biteline of the upper to a throat area of the upper to limit the stretch of the upper in the lateral direction. The tensile strands can form one or more lace apertures for receiving a lace and/or can extend around at least a portion of a lace aperture formed in the knit structure of the knit textile.

In alternative aspects, the textiles described herein can include non-woven textiles. The non-woven textiles described herein can be produced by any conventional methods, such as any conventional mechanical, chemical, or thermal methods for bonding the fibers together, including needle entangling and water entangling.

Figure 11A:
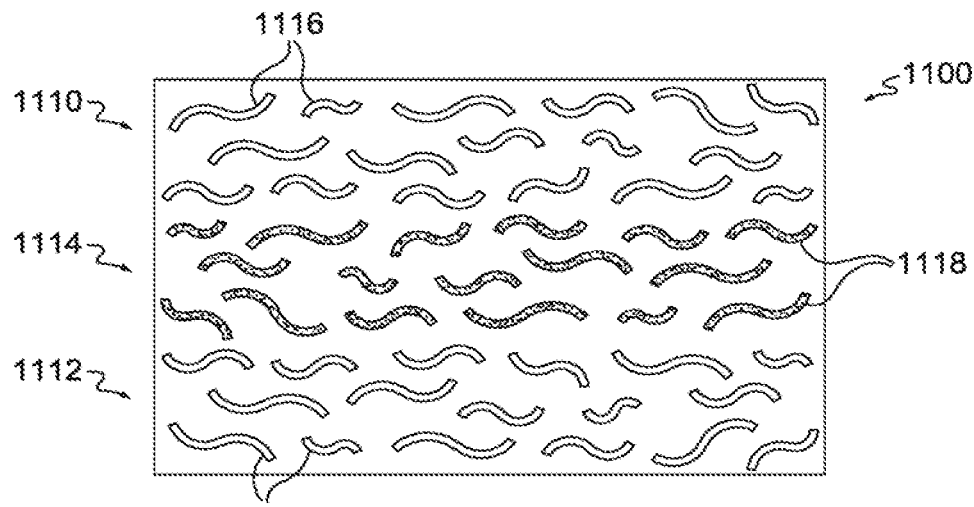
FIG. 11A is a schematic representation of a portion of one of the textile zones of the textile of FIG. 3, and showing areas of different types of fibers, in accordance with aspects of the present invention.
Figure 11B:
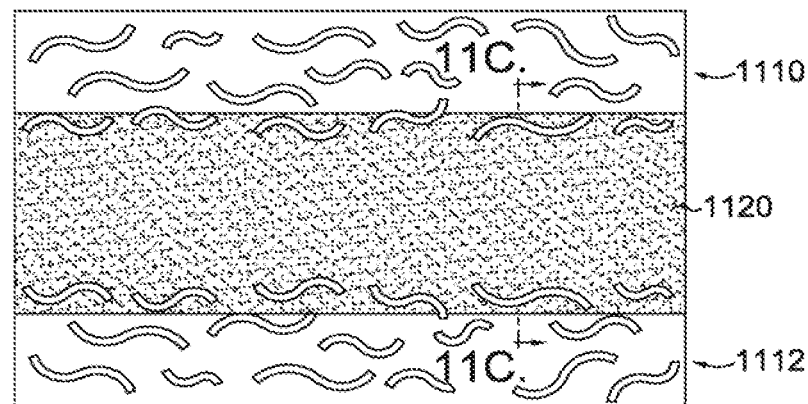
FIG. 11B is a schematic representation of the portion of FIG. 11A after being exposed to a thermoforming process, and showing how one of the types of fibers have been transformed into a non-fiber material with fibers of the other material embedded within the non-fiber material, in accordance with aspects of the present invention.
Figure 11C:
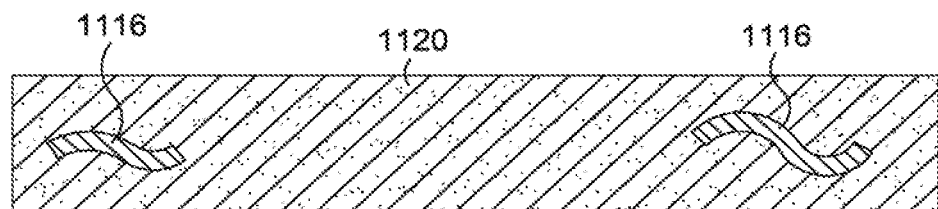
FIG. 11C is a cross-section of the non-fiber material of FIG. 11B showing the two other fibers encapsulated within the non-fiber material, in accordance with aspects of the present invention.

FIGS. 11A-11C depict an aspect where the textile 300 of FIG. 3 is a non-woven textile and undergoes the thermoforming process. FIG. 11A is a schematic depiction of a portion 1100 of the textile zone 304a of the textile 300 of FIG. 3. As can be seen in FIG. 11A, the portion includes a first grouping 1110 of first fibers 1116 that comprise the high processing temperature polymeric composition, a second grouping 1112 of the first fibers 1116, and a third grouping 1114 of second fibers 1118 that comprise the low processing temperature polymeric composition. It should be understood that the portion 1100 of the textile 300 is schematic and the placing and spacing of the first fibers 1116 and the second fibers 1118 can be different in a textile.

While not depicted in FIGS. 11A-11C, in aspects where the textile 300 is a non-woven textile, one or more interfaces between the different portions of different fibers can also include one or more staggered interfaces, e.g., the staggered interface 306. In such aspects, the staggered interface 306 can depict how the transition between zones or subzones having different concentrations of fibers comprising the low processing temperature polymeric composition and/or fibers comprising the high processing temperature polymeric composition does not occur in a linear manner along the width w of the textile 300 of FIG. 3.

Returning now to FIGS. 11A-11C, and FIG. 11C in particular, in aspects where the thermoforming process causing the melting and flowing of the low processing temperature polymeric composition in the second fibers 1118, the second fibers 1118 have been transformed into a non-fiber material 1120, while the first fibers 1116 have not been transformed and so remain in fiber form. In such aspects, the non-fiber material 1120 can join together the first grouping 1110 of the first fibers 1116 with the second grouping 1112 of the first fibers 1116. FIG. 11C shows a cross-section along the cutline 11C, which shows how in certain aspects, at least a portion of the first fibers 1116 can be encapsulated within the non-fiber material 1120. In aspects, it is contemplated that at least a portion of the first fibers 1116 can be can be at least partly embedded within the non-fiber material 1120 such that the first fibers 1116 are not fully encapsulated by the non-fiber material 1120.

Although not depicted in the figures, in certain aspects, upon being exposed to the thermoforming process, the second fibers 1118 can not melt and flow but instead can deform and alter shape. This deformation of fibers or yarns is depicted in FIGS. 9A and 9B. Like the deformation of fibers or yarns discussed above with respect to FIGS. 9A and 9B, in certain aspects, the second fibers can deform and mold on another first or second fiber (or the same fiber) and mechanically couple or physically bond to that fiber.

Processes for Manufacturing

Certain conventional thermoforming processes include the selective thermoforming of only a portion of an article, e.g., by masking portions of the article not desired to be exposed to the thermoforming process, or using tooling which contacts or covers only a portion of an article. However, such conventional methods result in time and energy intensive manufacturing processes, as multiple steps are required to mask and unmask portions of the article before and after the thermoforming process, or multiple sets of tooling are required. Other conventional thermoforming processes include the thermoforming of article components prior to assembly into an article. This conventional process is also a time and resource intensive process, as multiple steps and machinery are required to individually form the article components prior to assembling the article. Moreover, an article formed from several individual components results in multiple seams where the individual components interface, thereby providing weaknesses in the article, less natural feel for a wearer, and/or actual discomfort or injury for a wearer.

The manufacturing processes disclosed herein solve one or more of the foregoing problems. The manufacturing processes disclosed herein utilize one or more of the shaped components, films, textiles, yarns and fibers disclosed herein, wherein the one or more shaped components, films, textiles, yarns and fibers comprises at least one low processing temperature polymeric composition as disclosed herein. The manufacturing processes disclosed herein also utilize one or more of the shaped components, films, textiles, yarns and fibers disclosed herein, wherein the one or more shaped components, films, textiles, yarns and fibers comprises at least one high processing temperature polymeric composition as disclosed herein. The disclosed manufacturing processes comprise a thermoforming step, in which the low processing temperature polymeric composition is softened or melted, which the high processing temperature polymeric composition is not melted or softened. The thermoforming is conducted over a temperature range below at least one of the following properties of the high processing temperature polymeric composition: (1) creep relaxation temperature ($T_{cr}$); (2) Vicat softening temperature ($T_{vs}$); (3) heat deflection temperature ($T_{hd}$); or (4) melting temperature ($T_m$). The thermoforming can be conducted over a temperature range below a creep relaxation temperature ($T_{cr}$) of the high processing temperature polymeric composition. The thermoforming can be conducted over a temperature range below a Vicat softening temperature ($T_{vs}$) of the high processing temperature polymeric composition. The thermoforming can be conducted over a temperature range below a heat deflection temperature ($T_{hd}$) of the high processing temperature polymeric composition. The thermoforming can be conducted over a temperature range below a melting temperature ($T_m$) of the high processing temperature polymeric composition.

For example, in certain aspects, as discussed further below, the specific and selective incorporation of a low processing temperature polymeric composition and a high processing temperature polymeric composition into an article provides a way to program structural features into an article that can be formed upon thermoforming. In some aspects, the article can comprise a textile comprising a low processing temperature polymeric composition and a high processing temperature polymeric composition, e.g., a textile comprising at least one plurality of fibers or yarn comprising a low processing temperature polymeric composition in at least a portion of the textile. In another aspect, the article can comprise a first shaped component, film, textile, yarn or plurality of fibers comprising the low processing temperature polymeric composition, and a second shaped component, film, textile, yarn or plurality of fibers comprising the high processing temperature polymeric composition, e.g., a knit upper for an article of footwear comprising the high processing temperature polymeric composition, and a film comprising the low processing temperature polymeric composition. In further aspects, the article can comprise an aggregation of components at least a portion of which comprise a low processing temperature polymeric composition and a high processing temperature polymeric composition, upon which the disclosed thermoforming process has been applied.

Since, in aspects, such structural features are built into the article depending upon the location in the article of the low processing temperature polymeric composition and the high processing temperature polymeric composition, upon thermoforming these structural features become integrated with each other, allowing for a more natural feel for the wearer or user. For example, a knit program for electronic knitting equipment can be used to determine the location of structural features. However, as already noted, the manufacturing processes (and advantages associated with these processes) is not limited to the use of the textiles disclosed herein. For example, a process to form structural features in a disclosed article can utilize a film comprising a low processing temperature polymeric composition with a textile comprising a high processing temperature polymeric composition is also contemplated as a process to program structural features into a disclosed article. Alternatively, a process to effectively program structural features into a disclosed article can utilize a shaped component comprising a low processing temperature polymeric composition with a textile comprising a high processing temperature polymeric composition.

Additionally, this selective incorporation of the low processing temperature polymeric composition and the high processing temperature polymeric composition into an article provides for a streamlined manufacturing process. For example, in certain aspects, an entire article can be formed by arranging components and exposing the arranged components to a thermoforming process, where the components that include the low processing temperature polymeric composition melt, flow, and re-solidify into a more rigid structural feature, while the components that include the high processing temperature polymeric composition do not deform during the thermoforming process. In such aspects, this allows for the entire article to be exposed to the thermoforming process without the need to mask or protect areas that the manufacturer does not wish to melt, flow, and re-solidify, thereby resulting in a more time and energy efficient manufacturing process. Further, in some cases, use of the articles described herein in the manufacturing processes described herein also allows for several different structural or other advantageous features to be provided in the article without the need to combine individual components into the final article, since such features can be built into the article at the textile level using the low processing temperature polymeric composition and the high processing temperature polymeric composition.

In various aspects, the thermoforming process occurs at a temperature below which a yarn or fiber has been dyed (e.g., a temperature below with a yarn or fiber comprising the high processing temperature polymeric composition was dyed) so that such dye does not leach out of the yarn or fiber and into the surround low processing temperature polymeric composition during the thermoforming process. Thus, in order to form various textiles and articles described herein, the melting temperature of the low processing temperature polymeric composition in a first yarn or fiber is below a temperature used to dye a second yarn or fiber, such as a second yarn or fiber comprising the high processing temperature polymeric composition.

Further, the compositions having this range of melting temperature (i.e., a melting temperature below a temperature at which a second yarn or fiber comprising the high processing temperature polymeric composition was dyed) created another problem, in that such many of the low processing temperature polymeric compositions tested evaluated did not produce yarns suitable for use in commercial knitting equipment, as the yarns produced shrank significantly when exposed to the temperature under which commercial knitting equipment typically operates.

In particular examples, the low processing temperature polymeric compositions described herein have melting characteristics and acceptable levels of shrinkage when present in a yarn and used in commercial knitting equipment. For example, in certain aspects, the low processing temperature polymeric compositions can exhibit a melting temperature $T_m$ that is 135° C. or less.

In certain aspects, thermoforming the articles and textiles described herein can be conducted over a range of temperatures which cause the low processing temperature polymeric composition to melt or deform (and subsequently solidify) while the high processing temperature polymeric composition does not melt and/or deform, thus maintaining the structure of the element comprising the high processing temperature polymeric composition, such as a yarn or fiber. In such aspects, this thermoforming process can result in a more rigid structural component (such as an outsole portion of a shoe) integrally connected to a less rigid portion of the article or textile, such as an upper portion of the shoe having a yarn or fiber that comprises the high processing temperature polymeric composition.

Accordingly, in one aspect, a process for manufacturing an article provided. The article can be a component of an article of footwear, a component of an article of apparel, or is a component of an article of sporting equipment. For example, a component of an article of sporting equipment can be a hat, a component of a bag, a component of a ball, and a component of protective equipment. The process includes receiving an article, comprising a first shaped component, a first film, a first textile, a first yarn, or a first fiber; and a second shaped component, a second film, a second textile, a second yarn, or a second fiber. The first shaped component, the first film, the first textile, the first yarn, or the first fiber comprise a low processing temperature polymeric composition, the low processing temperature polymeric composition comprising one or more first thermoplastic polymers, wherein the second shaped component. The second film, the second textile, the second yarn, or the second fiber comprises a high processing temperature polymeric composition, the high processing temperature polymeric composition comprising one or more second thermoplastic polymers, and wherein the high processing temperature polymeric composition exhibits at least one of: 1) a creep relaxation temperature $T_{cr}$; 2) a heat deflection temperature $T_{hd}$; or 3) a Vicat softening temperature $T_{vs}$ that is greater than the melting temperature $T_m$ of the low processing temperature polymeric composition. The process also comprises placing at least a portion of the article on a molding surface. Further, the process includes, while the at least a portion of the article is on the molding surface, increasing a temperature of the entire article to a temperature that is above the melting temperature $T_m$ of the low processing temperature polymeric composition and below at least one of: 1) the creep relaxation temperature $T_{cr}$; 2) the heat deflection temperature $T_{hd}$; or 3) the Vicat softening temperature $T_{vs}$ of the high processing temperature polymeric composition. Subsequent to the increasing the temperature of the entire article, while the at least a portion of the article remains on the molding surface, decreasing the temperature of the entire article to a temperature below the melting temperature $T_m$ of the low processing temperature polymeric composition, to thereby form a thermoformed an article.

In another aspect, a process for making an upper for an article of apparel is provided. The process includes weaving a first course that includes interlacing a first yarn and a second yarn. The first yarn includes a low processing temperature polymeric composition that includes one or more first thermoplastic polymers. The second yarn includes a high processing temperature polymeric composition that includes one or more second thermoplastic polymers. The high processing temperature polymeric composition exhibits at least one of: (1) creep relaxation temperature $(T_{cr})$; (2) Vicat softening temperature $(T_{vs})$; (3) heat deflection temperature $(T_{hd})$; or (4) melting temperature $(T_m)$ that is greater than the melting temperature $(T_m)$ of the low processing temperature polymeric composition. In some aspects, at least a portion of the first yarn is a warp yarn; and wherein at least a portion of the second yarn is a weft yarn. In alternative aspects, at least a portion of the first yarn is a weft yarn; and wherein at least a portion of the second yarn is a warp yarn.

In a still further aspect, a process for manufacturing an upper for a shoe is provided. The process includes receiving an upper that includes a first yarn and a second yarn. The first yarn includes a low processing temperature polymeric composition that includes one or more first thermoplastic polymers. The second yarn includes a high processing temperature polymeric composition that includes one or more second thermoplastic polymers. The high processing temperature polymeric composition exhibits at least one of: (1) creep relaxation temperature $(T_{cr})$; (2) Vicat softening temperature $(T_{vs})$; (3) heat deflection temperature $(T_{hd})$; or (4) melting temperature $(T_m)$ that is greater than the melting temperature $(T_m)$ of the low processing temperature polymeric composition. In a first portion of the upper, at least one of the first yarn and the second yarn form a plurality of interconnected loops. The process also includes placing the upper on a last. Further, the process includes heating the entire upper, while on the last, to a temperature that is above the melting temperature $(T_m)$ of the low processing temperature polymeric composition and below at least one of: (1) creep relaxation temperature $(T_{cr})$; (2) Vicat softening temperature $(T_{vs})$; (3) heat deflection temperature $(T_{hd})$; or (4) melting temperature $(T_m)$ of the high processing temperature polymeric composition. Subsequent to the heating the entire upper, cooling the entire upper, while on the last, to a temperature below the melting temperature $T_m$ of the first yarn composition, to thereby form a thermoformed upper.

In yet another aspect, a process for manufacturing an upper for a shoe is provided. The process includes receiving an upper including one or more first fibers, yarns, films, or shaped components comprising a low processing temperature polymeric composition and one or more second fibers, yarns, films, or shaped components comprising a high processing temperature polymeric composition. Each of the one or more first fibers, yarns, films, or shaped components includes a low processing temperature polymeric composition that includes one or more first thermoplastic polymers. Each of the one or more second fibers, yarns, films, or shaped components includes a high processing temperature polymeric composition that includes one or more second thermoplastic polymers. The high processing temperature polymeric composition of the one or more second fibers exhibits at least one of: (1) creep relaxation temperature $(T_{cr})$; (2) Vicat softening temperature $(T_{vs})$; (3) heat deflection temperature $(T_{hd})$; or (4) melting temperature $(T_m)$ that is greater than the melting temperature $(T_m)$ of the low processing temperature polymeric composition of the one or more first fibers. The upper includes a ground-facing outsole area, and wherein at least a portion of the one or more first fibers is present on the ground-facing outsole area. The process further includes placing the upper on a last such that at least a portion of the ground-facing outsole area covers at least a portion of a bottom of the last. The process also includes heating the entire upper, while on the last, to a temperature that is above the melting temperature $T_m$ of the low processing temperature polymeric composition of the one or more first fibers and below at least one of: (1) creep relaxation temperature $(T_{cr})$; (2) Vicat softening temperature $(T_{vs})$; (3) heat deflection temperature $(T_{hd})$; or (4) melting temperature $(T_m)$ of the high processing temperature polymeric composition of the one or more second fibers. Subsequent to the heating the entire upper, cooling the entire upper, while on the last, to a temperature below the melting temperature $(T_m)$ of the low processing temperature polymeric composition of the one or more first fibers, to thereby form a thermoformed upper.

In a yet further aspect, a process for making a knit upper for an article of footwear is provided. The process includes knitting a first course that includes loops of a first yarn and a second yarn. The first yarn includes a low processing temperature polymeric composition that includes one or more first thermoplastic polymers. The second yarn includes a high processing temperature polymeric composition that includes one or more second thermoplastic polymers. The high processing temperature polymeric composition exhibits at least one of: (1) creep relaxation temperature $(T_{cr})$; (2) Vicat softening temperature $(T_{vs})$; (3) heat deflection temperature $(T_{hd})$; or (4) melting temperature $(T_m)$ that is greater than the melting temperature $(T_m)$ of the low processing temperature polymeric composition. The process further includes knitting a second course that comprises loops of the first yarn and the second yarn. At least a portion of the first course and at least a portion of the second course form a plurality of interconnected loops.

The method steps, processes, and operations described herein are not to be construed as necessarily requiring their performance in the particular order discussed or illustrated, unless specifically identified as an order of performance. Additional or alternative steps can be employed.

Exemplary Pre-Thermoforming and Thermoforming Processes

As discussed above, in certain aspects, the articles and textiles described above, e.g., the textile 300 of FIG. 3, can form at least a portion of an article of wear, such as an article of footwear. In such aspects, the textile can form an upper for the article of footwear, where the upper includes a ground-facing outsole portion.

In certain aspects, the article or textile can be combined with additional materials in forming the upper for the article of footwear. For example, in one or more aspects, the textile can be combined or layered with one or more of an ankle collar lining, ankle collar foam, upper lining, or upper foam layer. In certain aspects, one or more of these additional materials can be secured to the textile, e.g., by knitting, stitching, or adhesion, prior to thermoforming the textile.

Figure 12:
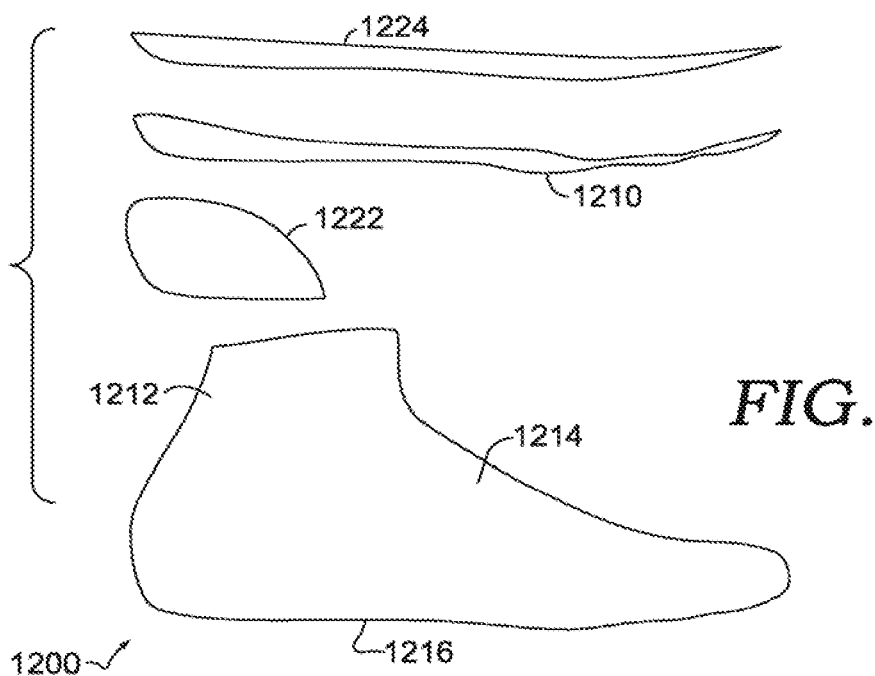
FIG. 12 is a side view of a schematic representation of an article of footwear that includes a textile material, and showing a chassis, a heel counter, and a sock liner for incorporation into the article of footwear, in accordance with aspects of the present invention.
Figure 13:
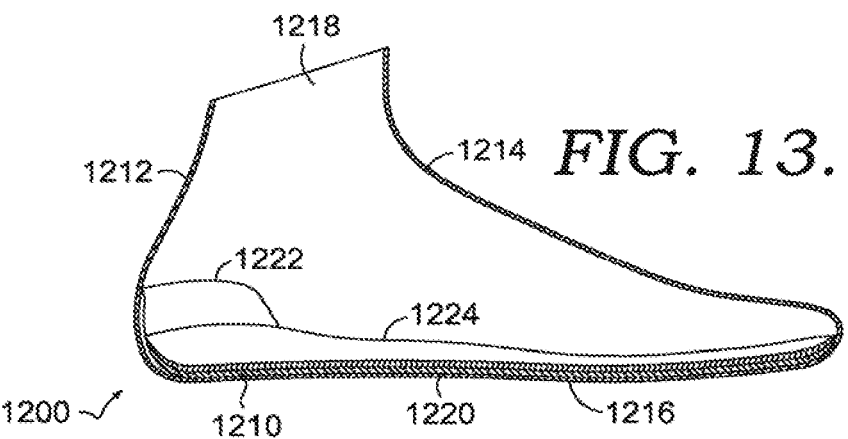
FIG. 13 is a cross-section of the article of footwear of FIG. 12 with the chassis, heel counter, and sock liner positioned in the interior of the article of footwear, in accordance with aspects of the present invention.

In certain aspects, to provide additional comfort and/or support to a wearer for an article of footwear formed at least partly by the textiles described herein, an internal support device or chassis can be provided. FIGS. 12 and 13 depict an article of footwear 1200 that includes a chassis 1210. The article of footwear 1200 includes a textile 1212 forming an upper 1214 having a ground-facing outsole portion 1216. In certain aspects, as can best be seen in FIG. 13, which depicts a cross-section of the article of footwear 1200, the chassis 1210 is positioned in the interior portion 1218 of the article of footwear 1200 and contacting an inner surface 1220 of the textile 1212. In certain aspects, the chassis 1210 can include a polymeric material such as a high processing temperature polymeric material, e.g., a polyether block amide, which has a melting or deforming temperature above the temperature range over which the thermoforming process is conducted, so that the polymeric material is capable of not melting or deforming during the thermoforming process described herein.

In various aspects, for a wearer's heel support, a heel counter 1222 can be positioned on the interior portion 1218 of the upper 1214, or on an exterior portion of the upper 1214, or can form a portion of the upper 1214. In aspects, like the chassis, 1210, the heel counter 1222 can include a polymeric material such as a high processing temperature polymeric material, e.g., a polyether block amide that is capable of not melting or deforming when exposed to the thermoforming process. In aspects, like the chassis, 1210, the heel counter 1222 can include portions formed of a low processing temperature polymeric composition in addition to portions formed of a high processing temperature polymeric composition In certain aspects, a sockliner 1224 can be positioned on top of the chassis 1210 in the interior 1218 of the article of footwear 1200. In such aspects, the sockliner 1224 can include conventional sockliner materials, such as one or more layers of a foam or memory foam and a textile layer. It should be understood that while, a chassis 1210, heel counter 1222, and a sockliner 1224 are depicted as additional materials for forming the upper for the article of footwear, other materials could also be added, such as plates, toe caps, and/or structures along the sides.

In various aspects, the heel counter 1222 and the chassis 1210 can be positioned in the interior 1218 of the article of footwear 1200 prior to thermoforming. In certain aspects, the sockliner can be applied after the thermoforming process is completed.

Figure 14:
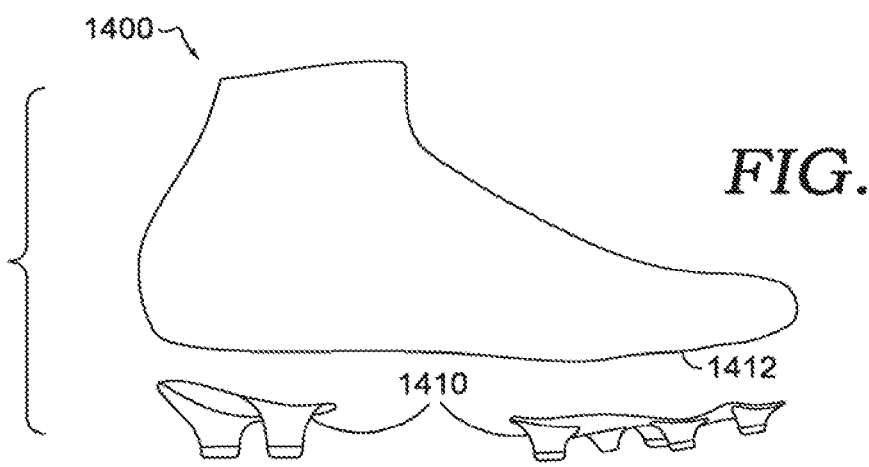
FIG. 14 is a side view of a schematic representation of an article of footwear that includes a textile material, showing the addition of ground-engaging cleats to the ground-facing outsole area of the article of footwear, in accordance with aspects of the present invention.

In certain aspects, such as that depicted in FIG. 14, ground-engaging cleats 1410 can be applied to an article of footwear 1400. In aspects, the article of footwear 1400 can include the same features as the article of footwear 1200 described above with reference to FIGS. 12 and 13. As can be seen in FIG. 14, the ground-engaging cleats 1410 can be applied to the ground-facing outsole area 1412 of the article of footwear 1400 to provide increase stability and traction.

In aspects, the ground-engaging cleats 1410 can be applied to the ground-facing outsole area 1412 after the thermoforming process is completed. In other aspects, the ground-engaging cleats 1410 can be applied to the ground-facing outsole area 1412 as part of the thermoforming process.

Figure 15:
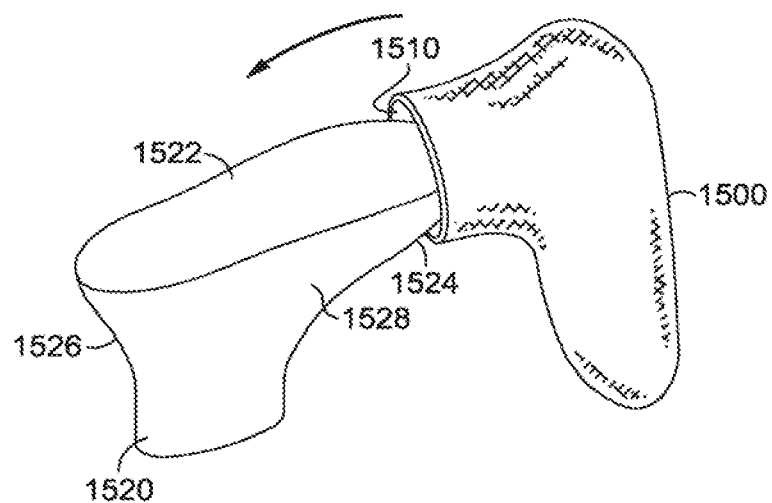
FIG. 15 is a top and side perspective view showing an upper for an article of footwear being placed on a last, in accordance with aspects of the present invention.

In various aspects, prior to thermoforming an article of footwear, the textile and any of the additional materials discussed above can be braided, woven, knitted or preformed into the general booty-type shape of an upper with a ground-facing outsole portion, such as that depicted in the upper 1500 of FIG. 15. In such aspects, the upper 1500 can also include a chassis or heel counter positioned on the inside 1510 of the upper 1500, such as the chassis 1210 and heel counter 1222 discussed above with respect to FIG. 12.

Figure 16:
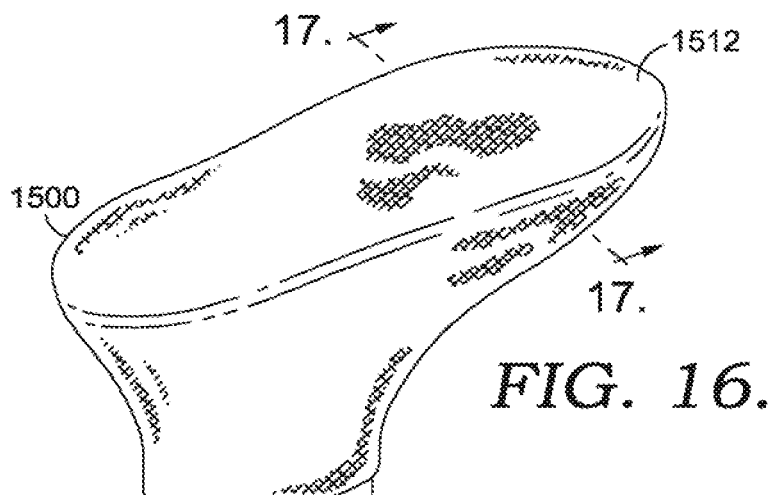
FIG. 16 is a top and side perspective view of the upper from FIG. 15 on the last showing the upper wrap around at least a bottom portion of the last, in accordance with aspects of the present invention.

In order to prepare the upper 1500 for the thermoforming process, the upper 1500 is placed on a last 1520 such that the last 1520 enters the inside 1510 of the upper 1500. In certain aspects, the last 1520 can be formed of a polymeric material such as a high processing temperature polymer composition. In a particular aspect, the last 1520 can be formed of a polymeric material having a melting temperature $T_m$ or a degradation temperature greater than 250° C. or greater than 300° C. such as, for example, a silicone polymer. The last 1520 can be made of other types of material as long as such a material would not be deformed or melt during the thermoforming process or otherwise adversely affect the thermoforming of the upper. FIG. 16 depicts the upper 1500 positioned on the last 1520. As can be seen in FIG. 16, the upper 1500 wraps around the last 1520 to cover a bottom portion 1522 of the last 1520, a forefoot portion 1524 of the last 1520, and a heel portion 1526 of the last 1520. In such aspects, the ground-facing outsole portion 1512 of the upper covers the bottom portion 1524 of the last 1520. Although the upper 1500 is illustrated in FIGS. 15 and 16 as having a sock-like structure which wraps around and covers the bottom portion 1522, the forefoot portion 1524, and the heel portion 1526 of the last 1520, in other aspects, the upper 1500 can only partially wrap around the last 1520. Similarly, in other aspects, the upper 1500 can cover only the bottom portion 1522 of the last 1520, only the forefoot portion 1524 of the last 1520, only the heel portion 1526 of the last 1520, or combinations thereof. In yet other aspects, the upper 1500 can cover only a portion of the bottom portion 1522 of the last 1520, a portion of the forefoot portion 1524 of the last 1520, a portion of the heel portion 1526 of the last 1520, or combinations thereof.

Figure 17:
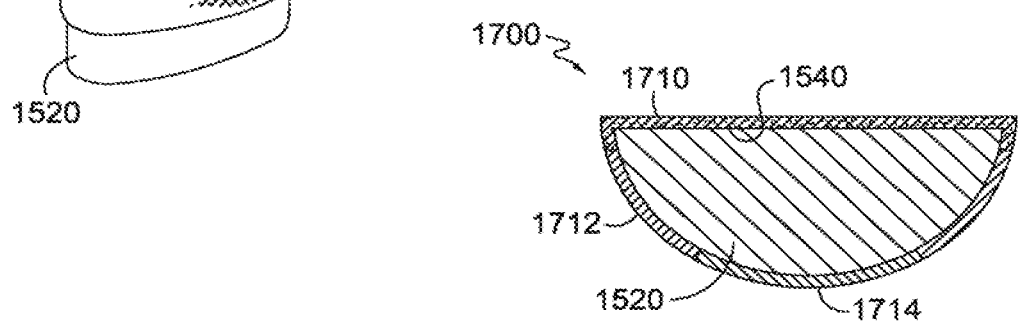
FIG. 17 is a cross-section of the upper on the last from FIG. 16, showing the last in contact with inner surface of the upper, in accordance with aspects of the present invention.

FIG. 17 shows a cross-section of the upper 1500 positioned on the last 1520 along the cutline 17. The cross-section 1700 reveals that the last 1500 contacts the inner surface 1540 of the upper 1500. The cross-section 1700 also reveals the two types of materials present in the upper 1500. For example, the cross-section 1700 reveals the three types of textile zones of the textile forming the upper 1500. As can be seen in FIG. 17, the textile zone 1710, which is associated with the ground-facing outsole portion 1512 of the upper, covers the bottom portion 1524 of the last 1520. In such aspects, when the upper is a knit textile forming a knitted upper, at least a portion of the yarn comprising the low processing temperature polymeric composition is covering at least a portion of the bottom portion 1524 of the last 1520.

Further, the textile zone 1714 covers the forefoot portion 1524 of the last 1520, while the textile zone 1712 covers the midfoot area 1528 of the last. In certain aspects, the textile zones 1710, 1712, and 1714 can have any or all of the properties discussed above with reference to the textile zones 302, 304a, 306a of FIG. 3, respectively.

In certain aspects, a first layer can be placed on a molding surface, such as a last, before the article, such as an article of footwear or component of an article of footwear. For example, a first layer, such as a liner, can be optionally placed over a molding surface, such as a last. For example, referring to FIG. 17 to further exemplify an aspect of a first layer that can be optionally placed on a molding surface, such as a last, before the article, a liner, can be placed over last 1520, such that a forefoot region of the liner covers the forefoot region 1524. Accordingly, an upper, comprising the textile zones 1710, 1712, and 1714, is then placed such it covers at least a portion of the liner. Thus, at least a portion of the yarn comprising the low processing temperature polymeric composition is covering at least a portion of the liner. It is understood that in certain aspects, the textile zones 1710, 1712, and 1714 can have any or all of the properties discussed above with reference to the textile zones 302, 304*a*, 306*a* of FIG. 3, respectively.

In further aspects, an outer layer can be optionally positioned on at least a portion of the article that is positioned on a molding surface and covering at least a portion of the article. The outer layer, such can be a film, can be optionally placed over at least a portion of an article, such as an upper, that is positioned on a molding surface, such as a last. For example, referring to FIG. 17 to further exemplify an aspect of an outer layer can be optionally placed over at least a portion of an upper that has been positioned on an last, such that the textile zone 1710, which is associated with the ground-facing outsole portion 1512 of the upper, covers the bottom portion 1524 of the last 1520. Accordingly, at least a portion the upper, comprising the textile zones 1710, 1712, and 1714, can be covered by at least a portion of the outer layer. Thus, at least a portion of the yarn comprising the low processing temperature polymeric composition is in contact with at least a portion of the outer layer. It is understood that in certain aspects, the textile zones 1710, 1712, and 1714 can have any or all of the properties discussed above with reference to the textile zones 302, 304*a*, 306*a* of FIG. 3, respectively. The outer layer can be utilized in conjunction with a first layer as described in the preceding paragraph.

In certain aspects, a shaped component, such as a heel counter or a toe cap, can be optionally placed on an outer surface 1530 of an upper 1500. Alternatively, a shaped component, such as a heel counter or a toe cap, can be optionally placed on an inner surface 1540 of an upper 1500. It is understood that the placement of a shaped component, whether an outer surface 1530 of an upper 1500 or an inner surface 1540 of an upper 1500, is completed before applying a protective sheath, a vacuum, or a protective sheath and a vacuum bag as described herein below.

Figure 18:
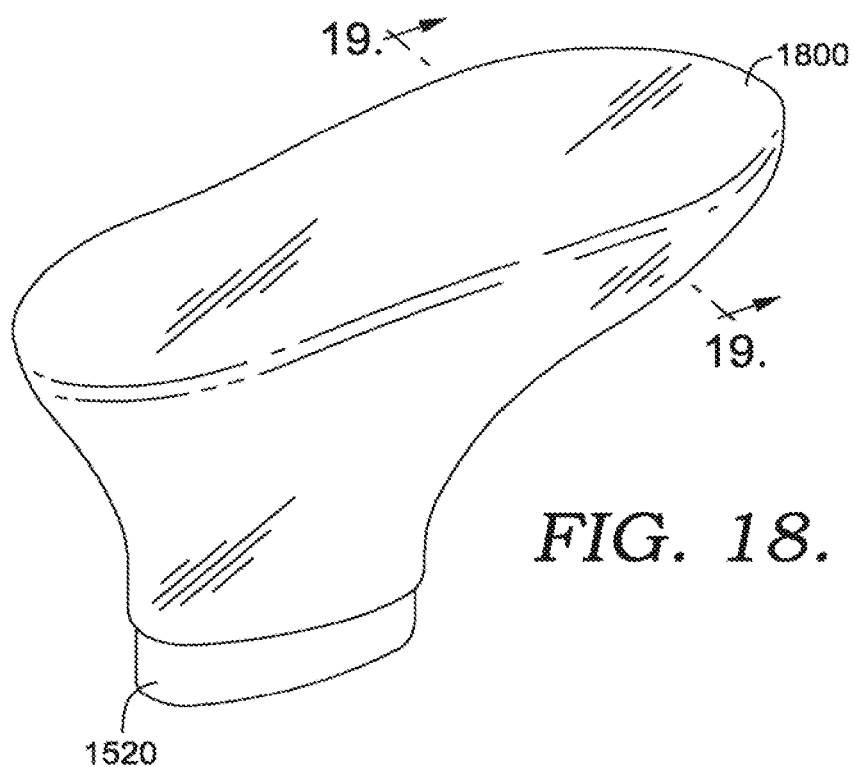
FIG. 18 is a top and side perspective view of the upper on the last from FIG. 16, showing a protective sheath wrapped around the upper, in accordance with aspects of the present invention.
Figure 19:
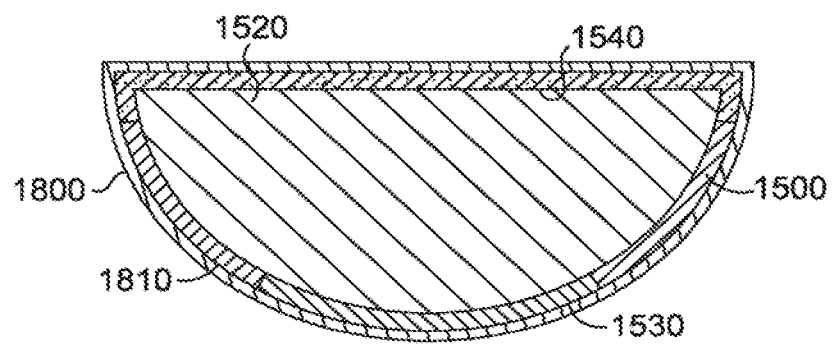
FIG. 19 is a cross-section of the protective sheath-covered upper from FIG. 18, showing the protective sheath contacting the outer surface of the upper, in accordance with aspects of the present invention.

In certain aspects, during the thermoforming process, the low processing temperature polymeric composition can melt and flow. In various aspects, it can be desirable to restrict the flow of the melted low processing temperature polymeric composition. In such aspects, a protective sheath can be applied over the upper positioned on a last. For example, as can be seen in FIGS. 18 and 19, a protective sheath 1800 is positioned over the upper 1500 positioned on the last 1520. In certain aspects, the protective sheath 1800 can be formed of a polymeric material such as a high processing temperature polymer composition. In a particular aspect, the protective sheath 1800 can be formed of an elastomeric polymeric material having a melting temperature $T_m$ or a degradation temperature greater than 250° C. or greater than 300° C. such as, for example, a silicone polymer. The protective sheath 1800 can be made of other types of material as long as such a material would not be deformed or melt during the thermoforming process or otherwise adversely affect the thermoforming of the upper. In aspects, the protective sheath 1800 can apply a compressive force to the outer surface 1530 of the upper 1500, which can aid in restricting the flow of the melted low processing temperature polymeric composition. Further, in such aspects, a vacuum can be drawn on the combination of the last 1520, the upper 1500 positioned on the last, and the protective sheath positioned on the upper 1500. For example, a bag under vacuum can be compressed on the outside of the protective sheath 1800 to apply a compressive force to the protective sheath 1800 to ensure the sheath 1800 is in flush contact with the outer surface 1530 of the upper 1500. The vacuum bag is discussed in more detail below.

In certain aspects, the protective sheath 1800 can be utilized to provide a pattern or marking on the outer surface of the upper 1500. For example, the inner surface 1810 of the protective sheath 1800 can include markings or patterns, which during the thermoforming process can be embossed or imprinted on the outer surface 1530 of the upper 1500, due to the melting and cooling of the low processing temperature polymeric composition in the upper 1500 combined with a compressive force applied by the protective sheath 1800 (and optionally a vacuum bag) onto the upper 1500. In such aspects, since the protective sheath 1800, can cover the entire upper 1500 it is possible for the protective sheath 1800 to emboss or imprint a pattern onto any portion of the outer surface 1530 of the upper 1500 that includes the low processing temperature polymeric composition.

In certain aspects, it may be desirable to optionally use both a protective sheath and a vacuum bag together. In such aspects, a protective sheath can be applied over the upper positioned on a last. For example, as can be seen in FIGS. 18 and 19, a protective sheath 1800 is positioned over the upper 1500 positioned on the last 1520. As disclosed herein above, the protective sheath 1800 can be formed of an elastomeric polymeric material having a melting temperature $T_m$ or a degradation temperature greater than 250° C. or greater than 300° C. such as, for example, a silicone polymer. Accordingly, the protective sheath 1800 is positioned on a last and inside of a vacuum bag 2010. As used herein, the term "vacuum bag" refers to any material that can compress onto the outer surface of an object. It is understood that the various methods of applying a compressive force to a protective sheath or a vacuum bag, as discussed in the present disclosure, can be used to apply a compressive force to both the protective sheath and vacuum bag as used together.

In certain aspects, use of the protective sheath 1800 alone and when used under vacuum can be effective in reducing the number of air bubbles which become trapped in the low processing temperature polymer material during the thermoforming process, as compared to an identical upper thermoformed under similar conditions except without the use of the protective sheath 1800.

In the aspects depicted in FIGS. 15-19, the last 1520 is formed of a rigid material. Further, in these aspects, when the last 1520 is made of a rigid material, the compressive force applied via the protective sheath 1800 (and/or the vacuum bag) creates a force or pressure differential between the inner 1540 and outer 1530 surfaces of the upper 1500 (since the rigid last 1520 at least partly resists this compressive force which results in the upper 1500 experiencing the compressive force). In such aspects, this pressure differential can at least partly provide the environment necessary to restrict the flow of the melted low processing temperature polymeric composition and/or provide embossing or patterning to the outer surface 1530 of the upper 1500.

In certain aspects, the upper 1500 can be positioned on the last 1520 when formed of a rigid material and the outer surface 1530 of the upper 1500 (with or without the protective sheath 1800) can be exposed to a pressure above a $T_m$ospheric pressure to create this pressure differential. In another aspect, the upper 1500 can be positioned on the last 1520 and a negative pressure can be applied between the inner surface 1540 of the upper 1500 and the last 1520 to compress the upper 1500 onto the rigid last 1520.

In aspects, the pressure differential across the inner 1540 and outer 1530 surfaces of the upper 1500 can also aid in forming the three-dimensional structure of the article of footwear during the thermoforming process. That is, in such aspects, as the low processing temperature polymeric composition is melting the melted material and the upper 1500 are forced up against the rigid last 1520, which when cooled, results in the upper 1500 taking on the shape of the last 1520.

In alternative aspects, this force or pressure differential between the inner 1540 and outer 1530 surfaces of the upper 1500 can be achieved in another manner. For example, in certain aspects, the last 1520 can be an expandable last 1520, which can apply an outward force to the inner surface 1540 of the upper 1500. In such aspects, to achieve the pressure differential, the outer surface 1530 of the upper 1500 can be contacting some type of material that will at least partly resist the outward force applied by the expanding of the last 1520.

Figure 20A:
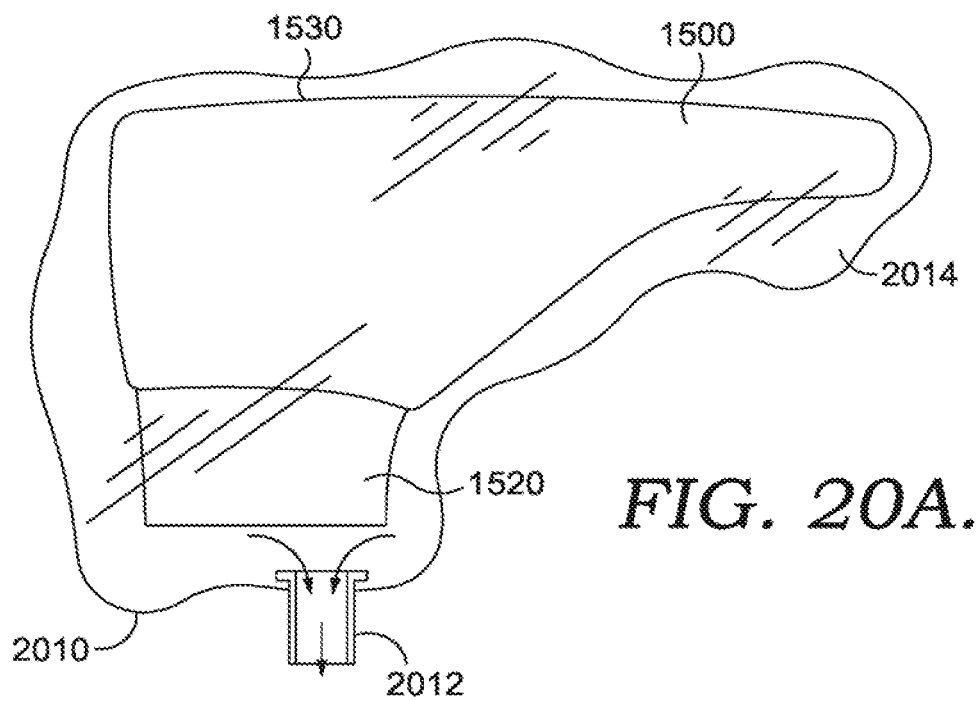
FIG. 20A is a side view of the upper on the last from FIG. 16 showing a vacuum bag with the upper placed inside, in accordance with aspects of the present invention.

As discussed above, a vacuum bag can be applied to the upper 1500 positioned on the last 1520, with or without the protective sheath 1800. FIG. 20A depicts the upper 1500 positioned on the last 1520 inside of a vacuum bag 2010. As used herein the term "vacuum bag" refers to any material that can compress onto the outer surface of an object.

Figure 20B:
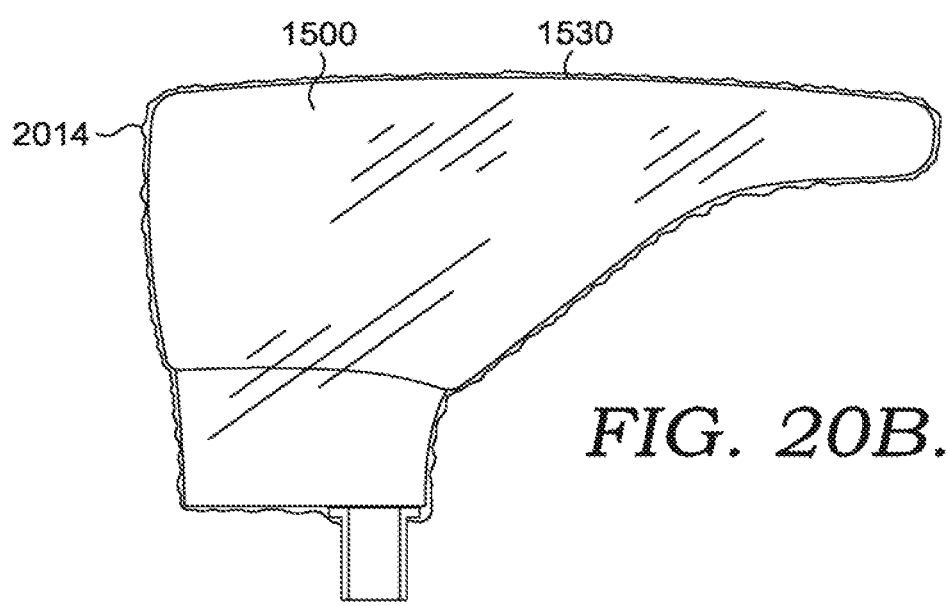
FIG. 20B is a side view of the upper inside the vacuum bag of FIG. 20A, showing the vacuum bag compressed against the outer surface of the upper, in accordance with aspects of the present invention.

In the aspect depicted in FIG. 20A, the vacuum bag 2010 can include a valve 2012 for reducing pressure inside the vacuum bag 2010. For example, the pressure can be reduced between the outer surface 1530 of the upper 1500 (or an outer surface of the protective sheath 1800 on the upper 1500) and the inside 2014 of the vacuum bag 2010, which will compress the vacuum bag onto the outer surface 1530 of the upper 1500 (or an outer surface of the protective sheath 1800 on the upper 1500). FIG. 20B depicts the vacuum bag 2010 compressed onto the outer surface 1530 of the upper 1500 (or an outer surface of the protective sheath 1800 on the upper 1500). As discussed above, the compression of the vacuum bag 2010 onto the upper 1500 can provide, at least partly, the pressure differential discussed above with reference to FIGS. 15-19.

FIG. 21 depicts a thermoforming system 2100. The thermoforming system 2100 of FIG. 21 can include the upper 1500 positioned on the last 1520 with a vacuum bag 2010 compressed onto the upper 1500, as discussed above with respect to FIGS. 20A and 20B.

As discussed above, the thermoforming process includes increasing the temperature of the textile material, e.g., the upper 1500, to a temperature that can cause at least a portion of the low processing temperature polymeric composition present in the upper 1500 to melt and flow, or to deform. Further, the thermoforming process includes the subsequent decreasing of the temperature of the upper 1500 to solidify the melted low processing temperature polymeric composition into the desired shape, such as an article of footwear.

The thermoforming system 2100 includes a heating zone 2110 that can be configured to heat the entire upper 1500. In aspects, the heating zone 2110 heats the entire upper 1500 to a temperature that is above the melting temperature $T_m$ of the low processing temperature polymeric composition present in the upper 1500.

In various aspects, it is to be understood that although the heating used in thermoforming have been discussed specifically with regard to application with an upper 1500, this is only an exemplary aspect of heating and thermoforming for the disclosed articles and processes. That is, it is contemplated by the present disclosure that any of the disclosed heating methods used to provide a heating zone in the thermoforming systems and processes can be utilized to heat for thermoforming any disclosed article comprising a first shaped component, a first film, a first textile, a first yarn, or a first fiber and a second shaped component, a second film, a second textile, a second yarn, or a second fiber positioned on a molding surface, with the ensemble covered, at least in part, with a vacuum bag, a protective sheath, or a combination of a protective sheath and a vacuum, and then heat to a temperature of above the $T_m$ of a low processing temperature composition. The first shaped component, the first film, the first textile, the first yarn, or the first fiber comprises the low processing temperature composition.

In aspects, heating the entire upper 1500 can provide for a more efficient streamlined thermoforming process. For example, because shaped component, films, textiles, fibers and/or yarns comprising the low processing temperature polymeric composition and the shaped components, films, textiles, fibers and/or yarns comprising the high processing temperature polymeric composition are selected and targeted to specific areas of the upper, it is not necessary to thermoform only a portion of the upper (such as, for example, by masking a portion of the upper or applying heat to only a portion of the upper), since the high processing temperature polymeric composition can be resistant to undergoing any deformation or melting under conditions that can thermoform the low processing temperature polymeric composition. However, optionally, additional thermal processing steps may be performed on the thermoformed article of the present disclosure. For example, one or more surfaces of a thermoformed article may be subjected to additional thermoforming processes, for example, to thermally attach cleats to a ground-facing surface of an article of footwear prepared using the thermoforming processes described herein.

As discussed above, it is desirable that the thermoforming process does not deform or alter the shaped components, films, textiles, fibers and/or yarn comprising the high processing temperature polymeric composition. In such aspects, the heating zone 2110 can heat the entire upper 1500 to a temperature that is below at least one of the creep relaxation temperature $T_{cr}$, the heat deflection temperature $T_{hd}$, or a Vicat softening temperature $T_{vs}$ of the high processing temperature polymeric composition or of the fibers and/or yarn comprising the high processing temperature polymeric composition.

In one or more aspects, the heating zone 2110 can increase the temperature of the entire upper 1500 to a temperature of from about 90° C. to about 240° C. In aspects, the heating zone 2110 can increase the temperature of the entire upper 1500 to a temperature of from about 90° C. to about 200° C. In one aspect, the heating zone 2110 can increase the temperature of the entire upper 1500 to a temperature of from about 110° C. to about 180° C.

In certain aspects, the temperature of the entire upper 1500 can be increased for about 10 seconds to about 5 minutes. In aspects, the temperature of the entire upper 1500 can be increased for about 30 seconds to about 5 minutes. In one aspect, the temperature of the entire upper 1500 can be increased for about 30 seconds to about 3 minutes.

In one or more aspects, the heating zone 2110 can expose the entire upper 1500 to a temperature of from about 90° C. to about 240° C. In aspects, the heating zone 2110 can expose the entire upper 1500 to a temperature of from about 90° C. to about 200° C. In one aspect, the heating zone 2110 can expose the entire upper 1500 to a temperature of from about 110° C. to about 180° C.

In certain aspects, the entire upper 1500 can be exposed to one or more of the heating zone 2110 temperatures or ranges discussed above for about 10 seconds to about 5 minutes. In aspects, the entire upper 1500 can be exposed to one or more of the heating zone 2110 temperatures or ranges discussed above from about 30 seconds to about 5 minutes. In one aspect, the entire upper 1500 can be exposed to one or more of the heating zone 2110 temperatures or ranges discussed above from about 30 seconds to about 3 minutes.

In certain aspects, the heating zone 2110 can expose the entire upper 1500 to a pressure of about 50 kPa to about 300 kPa. In aspects, the heating zone 2110 can expose the entire upper 1500 to a pressure of about 50 kPa to about 250 kPa. In one aspect, the heating zone 2110 can expose the entire upper 1500 to a pressure of about from about 100 kPa to about 300 kPa.

In certain aspects, the entire upper 1500 can be exposed the heating zone 2110 under the above conditions multiple times in a row prior to undergoing the cooling step. For example, in some aspects, the entire upper 1500 can be exposed the heating zone 2110 under the above conditions 2-10 times in a row prior to undergoing the cooling step. In an alternative example, in some aspects, the entire upper 1500 can be exposed the heating zone 2110 under the above conditions twice in a row prior to undergoing the cooling step.

In various aspects, subsequent to increasing the temperature of the entire upper 1500, the temperature of the entire upper 1500 is decreased to a temperature below the melting temperature $T_m$ of the low processing temperature polymeric composition for a duration of time sufficient for the low processing temperature polymeric composition to solidify. For example, the heating zone 2110 can be heated using a thermal energy source, including, but not limited to, conventional heaters, such as convection heating, a conventional oven, air-circulating oven or forced hot air oven, steam, targeted microwave heat, ultraviolet radiation, infrared heating, and combinations of any of the foregoing. The thermal energy source can further comprise a plurality of thermal energy sources such as a plurality of similar sources, e.g., a plurality of heating coils or infrared emitters. Alternatively, a plurality of thermal energy sources can comprise a plurality of one or more different thermal energy sources, e.g., a plurality of heating coils and a plurality of infrared emitters that can be used simultaneously or sequentially, or alternatively, used in a mode where only one of the plurality of thermal energy sources is used at any given time.

In some aspects, heating can be carried out such that heat is transferred from another material or object to an entire upper 1500. For example, a molding surface, such as a last, can itself be heated directly, e.g., via configuration as a resistive heating element. In an alternative aspect, a molding surface, such as a last, can be preheated to the desired temperature immediately prior to positioning an upper, a textile or an article thereon. In the foregoing aspects, the molding surface itself can act as a heating zone that transfers heat to an entire upper.

In some aspects, heating of heating zone can be carried out using radio-frequency heating, e.g., microwave radiation, such that the radio-frequency heats the compositions via interaction of a radio-frequency field with a composition, such as a low processing temperature composition, that is part of an upper, textile or article.

Further, in certain aspects, the entire upper 1500 can be exposed to the heating zone 2110 either by moving the entire upper 1500 into the heating zone 2110 or by the heating zone 2110 moving to where the upper 1500 is positioned and then moving away after the heating step.

The movements of the upper 1500 and/or the heating zone 2110 can be automated or semi-automated using conventional conveyance systems.

In certain aspects, subsequent to heating the entire upper 1500, the entire upper 1500 is cooled to a temperature below the melting temperature $T_m$ of the low processing temperature polymeric composition. In such aspects, the entire upper 1500 can be exposed to reduced temperatures in the cooling zone 2112 either by moving to the cooling zone 2112 or by the cooling zone 2112 moving the upper 1500. The cooling zone 2112 can expose the entire upper 1500 to a pressure of about 0 kPa.

In one or more aspects, the entire upper 1500, when in the cooling zone 2112, can be exposed to a temperature of about −25° C. to about 25° C. In aspects, the entire upper 1500, when in the cooling zone 2112, can be exposed to a temperature of about −10° C. to about 25° C. In one aspect, the entire upper 1500, when in the cooling zone 2112, can be exposed to a temperature of about from about −10° C. to about 10° C.

In certain aspects, the entire upper 1500 can be exposed to one or more of the cooling zone 2112 temperatures or ranges discussed above for about 10 seconds to about 5 minutes. In aspects, the entire upper 1500 can be exposed to one or more of the cooling zone 2112 temperatures or ranges discussed above for about 10 seconds to about 3 minutes. In one aspect, the entire upper 1500 can be exposed to one or more of the cooling zone 2112 temperatures or ranges discussed above for about 10 seconds to about 2.5 minutes.

In certain aspects, once the upper 1500 has been cooled as described above the vacuum bag 2010 and protective sheath 1800 can be removed. In such aspects, any additional components can now be applied to the upper 1500, such as the ground-engaging cleats 1410 of FIG. 14.

Figure 22:
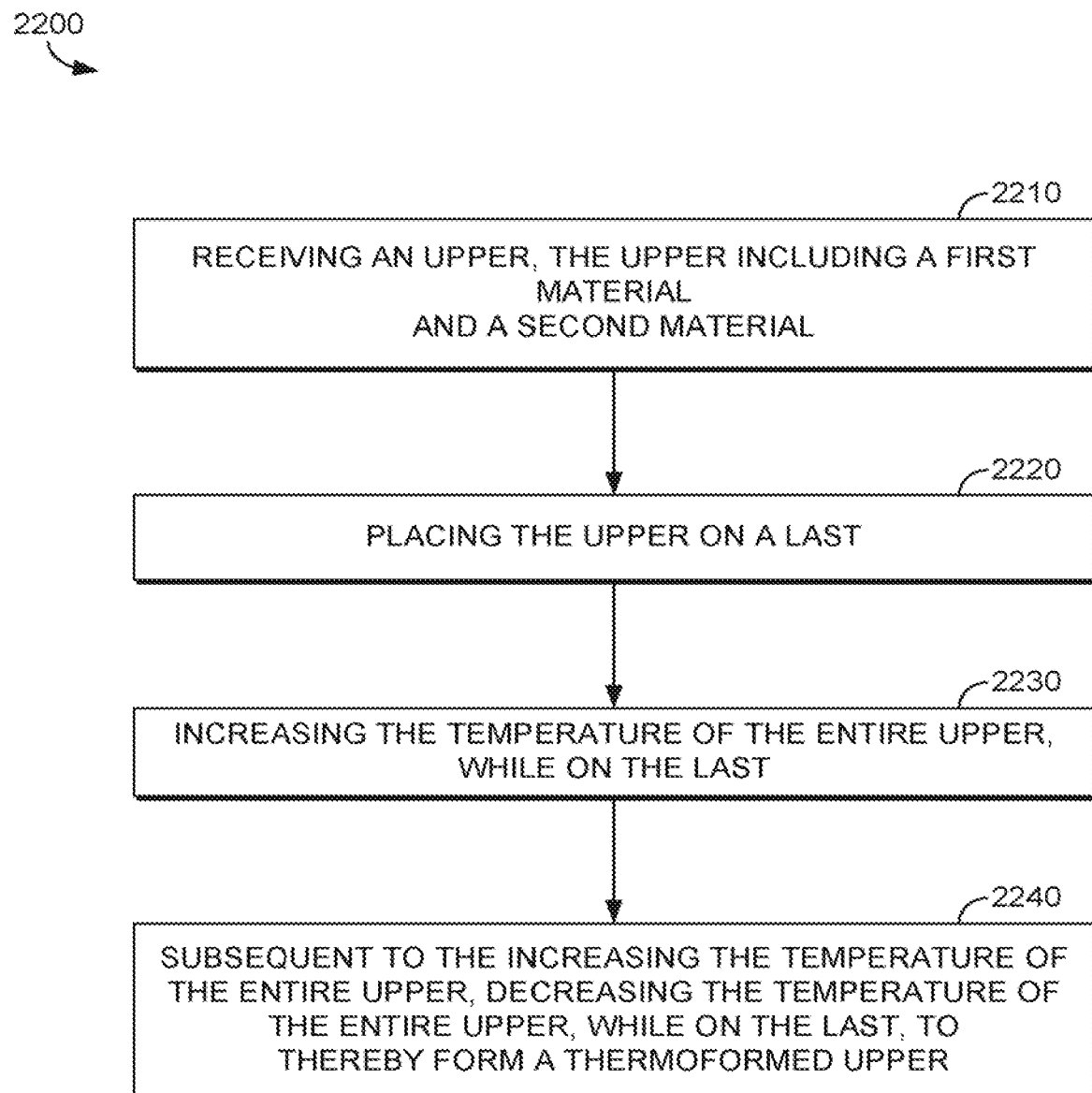
FIG. 22 is a flow diagram of an exemplary process for manufacturing an upper for a shoe, in accordance with aspects of the present invention.

FIG. 22 depicts one exemplary process 2200 of manufacturing an upper for a shoe. The process 2200 can include the step 2210 of receiving an upper that includes a first material or component formed of a low processing temperature polymeric composition, and a second material or component formed of a high processing temperature polymeric composition.

In accordance with the exemplary process 2200 of FIG. 22 and of this disclosure generally, the low processing temperature polymeric composition can be present in the form of fibers (e.g., fibers that consist essentially of the low processing temperature polymeric composition). The low processing temperature polymeric composition can be present in the received upper in the form of a yarn (e.g., a yarn comprising the low processing temperature polymeric composition, a yarn formed entirely of fibers comprising the low processing temperature polymeric composition, a yarn formed partially of fibers comprising the low processing temperature polymeric composition). Additionally or alternatively, the low processing temperature polymeric composition can be present in the form of fibers that are not part of a yarn structure. For example, the fibers can comprise the low processing temperature polymeric composition, or can consist essentially of the low processing temperature polymeric composition. The low processing temperature polymeric composition also can be present in the form of a textile (including knit, braided, woven, and non-woven textiles), a film, a sheet, or a molded article, such as an injection molded article. The low processing temperature polymeric composition can also be present in the form of a foamed material.

Although certain aspects of the disclosure have been exemplified with particularity in relation to an article of footwear or an upper, the exemplified aspects can be generally understood to be used, within the scope of the disclosure, to be applicable to other disclosed aspects. For example, any disclosed low processing temperature composition can be utilized to form, fabricate, or manufacture a shaped component, a film, a textile, or other article, and used in the processes disclosed herein. Similarly, any disclosed high processing temperature composition can be utilized to form, fabricate, or manufacture a shaped component, a film, a textile, or other article, and used in the processes disclosed herein. Accordingly, any such a shaped component, a film, a textile, or other article comprising a low processing temperature composition can be optionally brought into contact with a shaped component, a film, a textile, or other article comprising a high processing temperature composition, and positioned on a molding surface. In some aspects, the molding surface can be a mold, a form, or a last. A protective sheath and/or a vacuum bag can be positioned thereon, a compressive force applied, and a heating zone provided thereto as described in the present disclosure.

In certain aspects, the second material formed from the high processing temperature polymeric composition can exhibit at least one of a creep relaxation temperature $T_{cr}$, a heat deflection temperature $T_{hd}$, or a Vicat softening temperature $T_{vs}$ that is greater than the melting temperature $T_m$ of the low processing temperature polymeric composition. The material formed from the low processing temperature polymeric composition can include any or all of the properties of the low processing temperature polymeric composition described above. The second material formed from the high processing temperature polymeric composition can include any or all of the properties of the high processing temperature polymeric composition described above. The second material formed from the high processing temperature polymeric composition can be present in the form of fibers (e.g., fibers that consist essentially of the high processing temperature polymeric composition). The high processing temperature polymeric composition can be present in the received upper in the form of a yarn (e.g., a yarn comprising the high processing temperature polymeric composition, a yarn formed entirely of fibers comprising the high processing temperature polymeric composition, a yarn formed partially of fibers comprising the high processing temperature polymeric composition). Additionally or alternatively, the high processing temperature polymeric composition can be present in the form of fibers that are not part of a yarn structure. For example, the fibers can comprise the high processing temperature polymeric composition, or can consist essentially of the high processing temperature polymeric composition. The high processing temperature polymeric composition also can be present in the form of a textile (including knit, braided, woven, and non-woven textiles), a film, a sheet, or a molded article, such as an injection molded article. The high processing temperature polymeric composition can also be present in the form of a foamed material. In certain aspects, the upper can include any or all of the properties of the upper 1500 described above with reference to FIGS. 15-21. Further, the upper can be formed using any of the textiles described above, such as the textile 300 of FIG. 3.

While the low processing temperature polymeric composition and the high processing temperature polymeric composition can be present as separate materials or components of the received upper (e.g., in separate fibers, yarns, textiles, films, etc.), they can also be present in the same component (e.g., yarns including fibers formed from the low processing temperature polymeric composition and separate fibers formed from the high processing temperature polymeric composition; textiles including yarns formed from the low processing temperature polymeric composition and separate yarns formed from the high processing temperature polymeric composition). In other words, in the received upper, the low processing temperature polymeric composition and the high processing temperature polymeric composition are present in materials or components which are separate and distinct from each other at least at the fiber level.

In one or more aspects, in a first portion of the upper, when the upper comprises a knit textile having a first yarn comprising a low processing temperature polymeric composition and a second yarn comprising a high processing temperature polymeric composition, at least one of the first yarn and the second yarn form a plurality of interconnected loops, such as the plurality of interconnected loops depicted in FIG. 6, 7A, or 9.

In the step 2220 of the process 2200, the upper is placed on a last, such as that depicted in FIGS. 15-17. In various aspects, the last can formed of a rigid material or can be an expandable last. Further, as described above, the upper can have a chassis, heel counter, or other components inserted into the upper prior to being placed on a last.

In the step 2230 of the process 2200, the temperature of the entire upper is increased, for example, heated, while on the last, to a temperature that is above the melting temperature $T_m$ of the first yarn composition and below at least one of the creep relaxation temperature $T_{cr}$, the heat deflection temperature $T_{hd}$, or the Vicat softening temperature $T_{vs}$ of the second yarn composition.

In various aspects, the entire upper can be heated using the thermoforming system 2100 described above with respect to FIG. 21. The upper can be heated using any or all of the parameters described above with respect to the thermoforming system of FIG. 21.

In step 2240 of the process 2200, subsequent to heating the temperature of the entire upper is decreased to a temperature below a melting temperature $T_m$ of the low processing temperature polymeric composition while the upper remains on the last. For example, the entire upper can be cooled while on the last to form the thermoformed upper. In various aspects, the entire upper can be cooled using the thermoforming system 2100 described above with respect to FIG. 21. The upper can be cooled using any or all of the parameters described above with respect to the thermoforming system of FIG. 21.

After thermoforming the received upper, as the thermoforming is conducted at a temperature at or greater than a melting temperature $T_m$ of the low processing temperature polymeric composition but less than a creep relaxation temperature $T_{cr}$, or a heat deflection temperature $T_{hd}$, or a Vicat softening temperature $T_{vs}$ of the high processing temperature polymeric composition, the second material or component (fiber, yarn, textile, sheet, molded article, etc.) comprising the high processing temperature polymeric composition retains its original physical structure (e.g., as a fiber, a yarn, a textile, etc.), while the first material or component comprising the low processing temperature polymeric composition has been deformed and its original structure has been modified, or has melted and solidified into a new physical structure.

Figure 23:
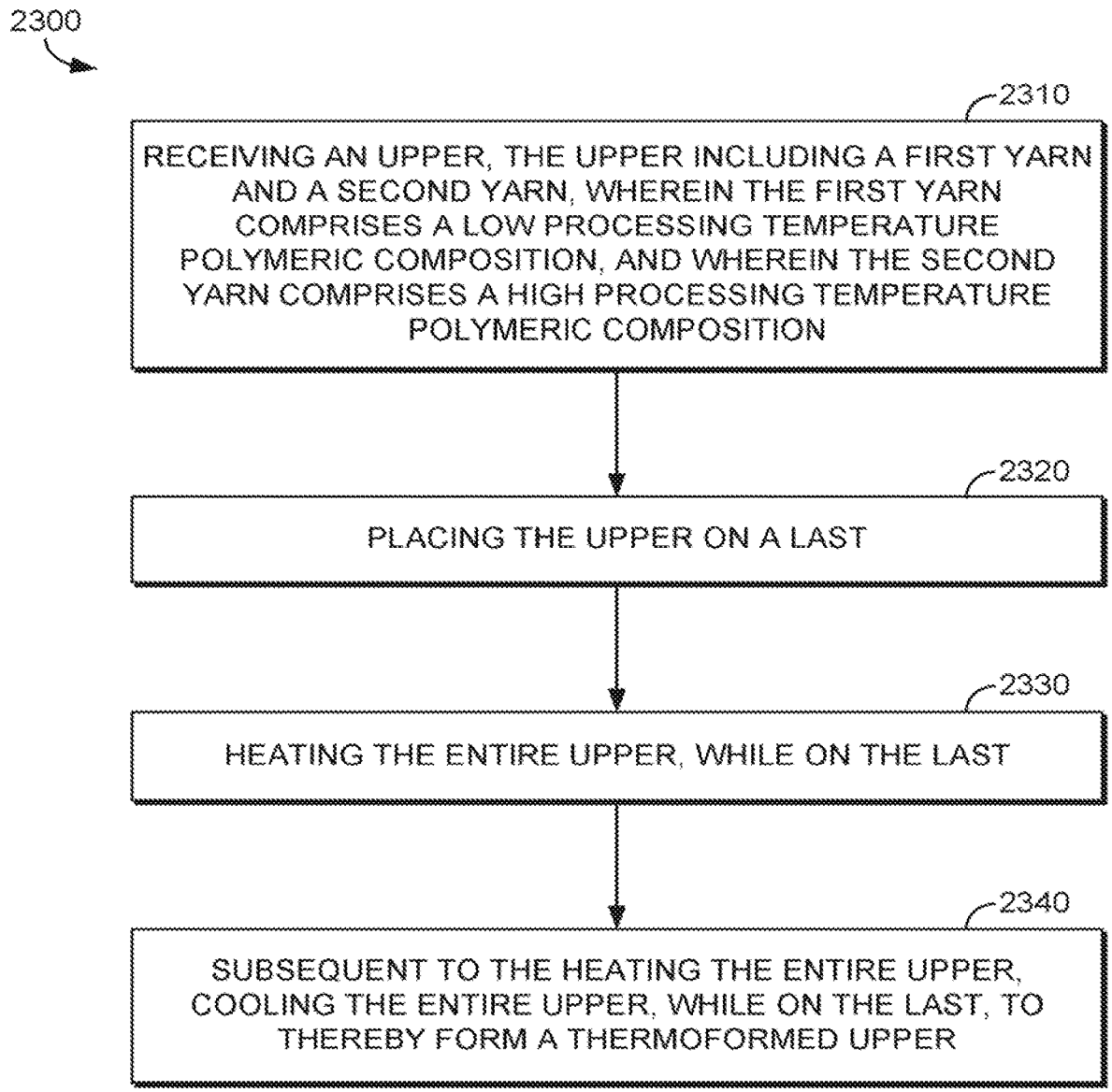
FIG. 23 is a flow diagram of another exemplary process for manufacturing an upper for a shoe, in accordance with aspects of the present invention.

FIG. 23 depicts one exemplary process 2300 of manufacturing an upper for a shoe. The process 2300 can include the step 2310 of receiving an upper that includes a first yarn and a second yarn, where the first yarn includes a low processing temperature polymeric composition and the second yarn includes a high processing temperature polymeric composition. The low processing temperature polymeric composition can include one or more first thermoplastic polymers, and the high processing temperature polymeric composition can include one or more second thermoplastic polymers. In aspects, the first and second thermoplastic polymers can include any or all of the parameters discussed above with respect to thermoplastic polymers. In certain aspects, the upper can include any or all of the properties of the upper 1500 described above with reference to FIGS. 15-21. Further, the upper can be formed using any of the textiles described above, such as the textile 300 of FIG. 3.

In certain aspects, the high processing temperature polymeric composition can exhibit at least one of a creep relaxation temperature $T_{cr}$, a heat deflection temperature $T_{hd}$, or a Vicat softening temperature $T_{vs}$ that is greater than the melting temperature $T_m$ of the low processing temperature polymeric composition. The low processing temperature polymeric composition can include any or all of the properties of the low processing temperature polymeric composition described above. The high processing temperature polymeric composition can include any or all of the properties of the high processing temperature polymeric composition described above. Further, the first and second yarn can exhibit any or all of the properties and parameters discussed above.

In one or more aspects, in a first portion of the upper, at least one of the first yarn and the second yarn form a plurality of interconnected loops, such as the plurality of interconnected loops depicted in FIG. 6, 7A, or 9.

In the step 2320 of the process 2300, the upper is placed on a last, such as that depicted in FIGS. 15-17. In various aspects, the last can formed of a rigid material or can be an expandable last. Further, as described above, the upper can have a chassis, heel counter, or other components inserted into the upper prior to being placed on a last.

In the step 2330 of the process 2300, the entire upper is heated, while on the last, to a temperature that is above the melting temperature $T_m$ of the low processing temperature polymeric composition and below at least one of the creep relaxation temperature $T_{cr}$, the heat deflection temperature $T_{hd}$, or the Vicat softening temperature $T_{vs}$ of the high processing temperature polymeric composition. In various aspects, the entire upper can be heated using the thermoforming system 2100 described above with respect to FIG. 21. The upper can be heated using any or all of the parameters described above with respect to the thermoforming system of FIG. 21.

In step 2340 of the process 2300, subsequent to heating the entire upper, the entire upper is cooled while on the last to form the thermoformed upper. In various aspects, the entire upper can be cooled using the thermoforming system 2100 described above with respect to FIG. 21. The upper can be cooled using any or all of the parameters described above with respect to the thermoforming system of FIG. 21.

Figure 24:
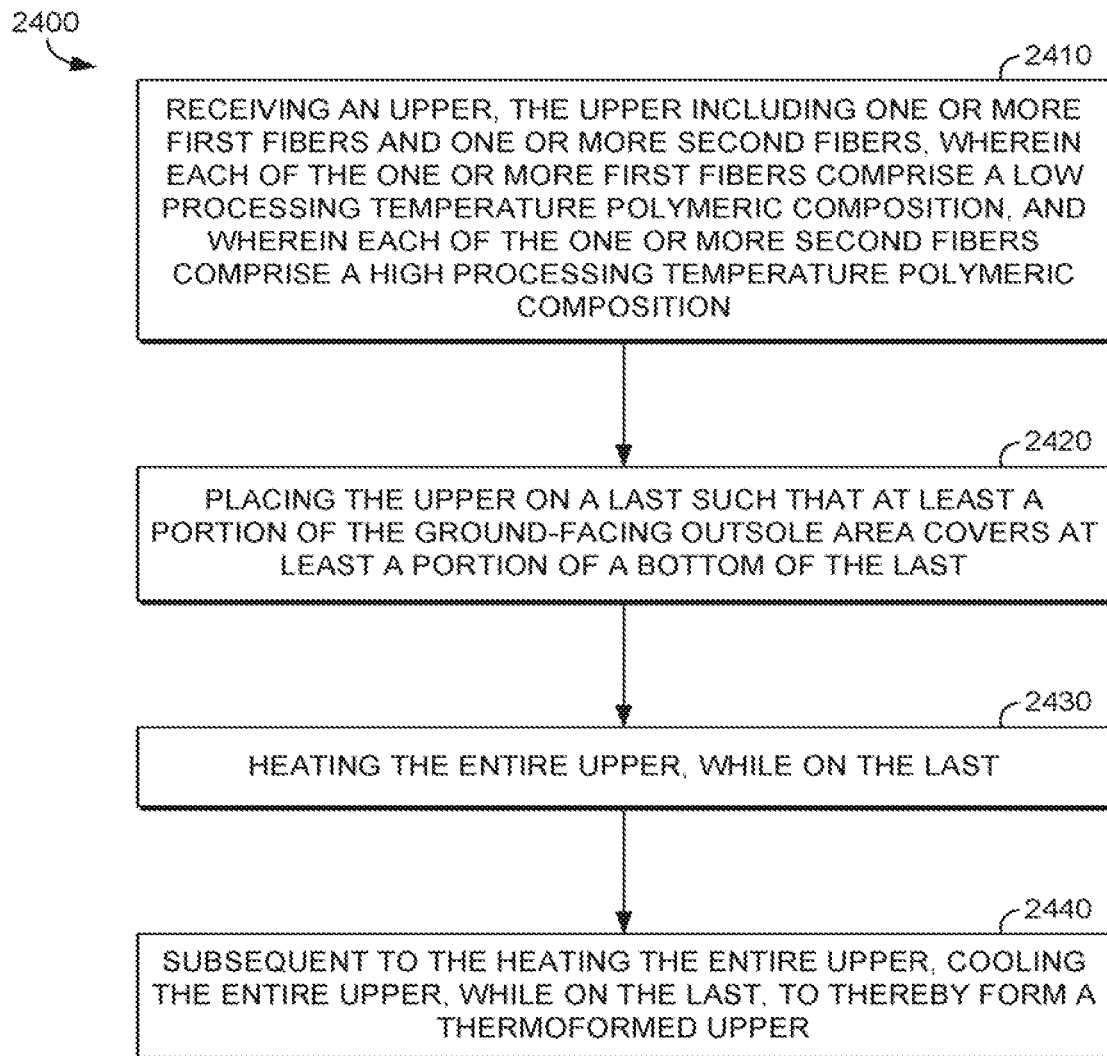
FIG. 24 is a flow diagram of an exemplary process for making a knit upper for an article of footwear, in accordance with aspects of the present invention.

FIG. 24 depicts a process 2400 for manufacturing an upper for a shoe. The process 2400 can include the step 2410 of receiving an upper including one or more first fibers and one or more second fibers. The one or more first fibers can include a low processing temperature polymeric composition that includes one or more first thermoplastic polymers. The low processing temperature polymeric composition can have any or all of the properties discussed above with respect to the low processing temperature polymeric compositions. The one or more second fibers include a high processing temperature polymeric composition that includes one or more second thermoplastic polymers. The high processing temperature polymeric composition can have any or all of the properties discussed above with respect to the high processing temperature polymeric compositions. In aspects, the first and second thermoplastic polymers can include any or all of the parameters discussed above with respect to thermoplastic polymers. Further, in aspects, the first and second fibers can include any or all of the properties discussed above with respect to fibers.

In one aspect, the high processing temperature polymeric composition exhibits at least one of: a creep relaxation temperature $T_{cr}$, a heat deflection temperature $T_{hd}$, or a Vicat softening temperature $T_{vs}$ that is greater than the melting temperature $T_m$ of the low processing temperature polymeric composition of the one or more first fibers.

In certain aspects, the upper can include a ground-facing outsole area, where at least a portion of the first fibers are present in the ground-facing outsole area.

The process 2400 can include the step 2420 of placing the upper on a last such that at least a portion of the ground-facing outsole area covers at least a bottom portion of the last, such as that depicted in FIGS. 15-17. In various aspects, the last can be formed or a rigid material or can be an expandable last. Further, as described above, the upper can have a chassis and/or heel counter inserted into the upper prior to being placed on a last.

The process 2400 can also include the step 2430 of heating the entire upper, while on the last to a temperature that is above the melting temperature $T_m$ of the low processing temperature polymeric composition and below at least one of the creep relaxation temperature $T_{cr}$, the heat deflection temperature $T_{hd}$, or the Vicat softening temperature $T_{vs}$ of the high processing temperature polymeric composition. In various aspects, the entire upper can be heated using the thermoforming system 2100 described above with respect to FIG. 21. The upper can be heated using any or all of the parameters described above with respect to the thermoforming system of FIG. 21.

In step 2440 of the process 2400, subsequent to heating the entire upper, the entire upper is cooled while on the last to form the thermoformed upper. In various aspects, the entire upper can be cooled using the thermoforming system 2100 described above with respect to FIG. 21. The upper can be cooled using any or all of the parameters described above with respect to the thermoforming system of FIG. 21.

Figure 25:
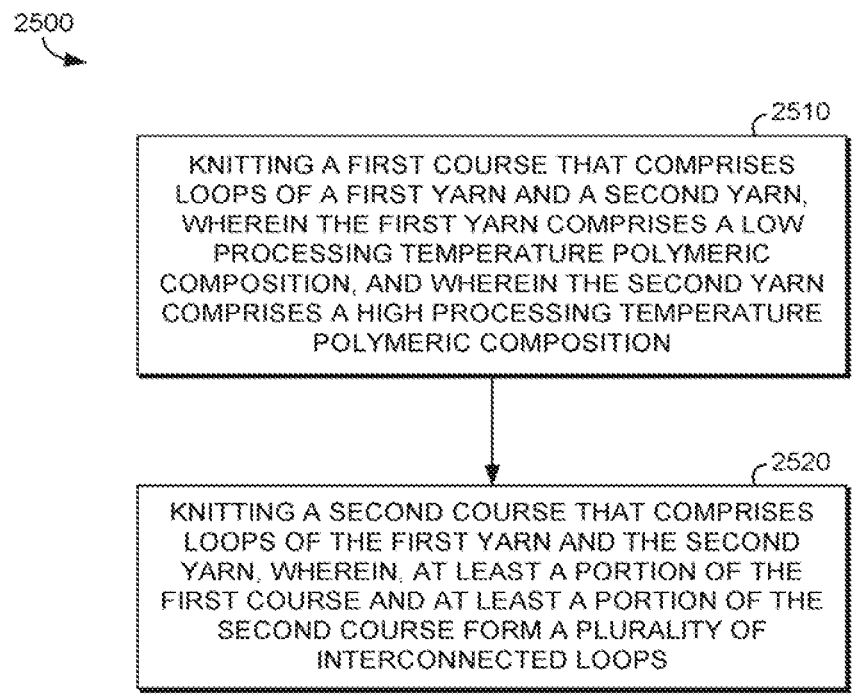
FIG. 25 is a flow diagram of an exemplary process for forming a knit article, in accordance with aspects of the present invention.

FIG. 25 depicts a process 2500 for making a knit upper for an article of footwear. The process 2500 includes the step 2510 for knitting a first course that comprises loops of a first yarn and a second yarn. In aspects, the first yarn includes a low processing temperature polymeric composition and the second yarn includes a high processing temperature polymeric composition.

The low processing temperature polymeric composition can include one or more first thermoplastic polymers, and the high processing temperature polymeric composition can include one or more second thermoplastic polymers. In aspects, the first and second thermoplastic polymers can include any or all of the parameters discussed above with respect to thermoplastic polymers. In certain aspects, the upper can include any or all of the properties of the upper 1500 described above with reference to FIGS. 15-21.

In certain aspects, the high processing temperature polymeric composition can exhibit at least one of a creep relaxation temperature $T_{cr}$, a heat deflection temperature $T_{hd}$, or a Vicat softening temperature $T_{vs}$ that is greater than the melting temperature $T_m$ of the low processing temperature polymeric composition. The low processing temperature polymeric composition can include any or all of the properties of the low processing temperature polymeric composition described above. The high processing temperature polymeric composition can include any or all of the properties of the high processing temperature polymeric composition described above. Further, the first and second yarn can exhibit any or all of the properties and parameters discussed above.

The process 2500 also can include the step 2520 of knitting a second course that comprises loops of the first yarn and the second yarn. In aspects, the first and second courses can be knitted using any commercial knitting techniques as described above. In aspects, at least a portion of the first course and at least a portion of the second course form a plurality of interconnected loops, such as that depicted in FIG. 6.

Figure 26:
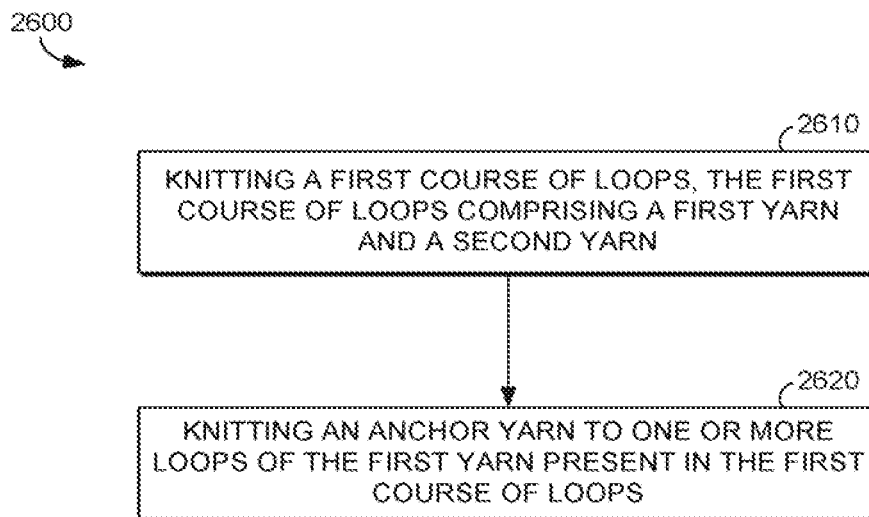
FIG. 26 is a flow diagram of an exemplary process for making an upper for an article of footwear, in accordance with aspects of the present invention.

FIG. 26 depicts a process 2600 for forming a knit article. The process 2600 can include the step 2610 of knitting a first course of loops that comprise a first yarn and a second yarn. In aspects, the first yarn includes a low processing temperature polymeric composition and the second yarn includes a high processing temperature polymeric composition. The low processing temperature polymeric composition can include one or more first thermoplastic polymers, and the high processing temperature polymeric composition can include one or more second thermoplastic polymers. In aspects, the first and second thermoplastic polymers can include any or all of the parameters discussed above with respect to thermoplastic polymers.

In certain aspects, the high processing temperature polymeric composition can exhibit at least one of a creep relaxation temperature $T_{cr}$, a heat deflection temperature $T_{hd}$, or a Vicat softening temperature $T_{vs}$ that is greater than the melting temperature $T_m$ of the low processing temperature polymeric composition. The low processing temperature polymeric composition can include any or all of the properties of the low processing temperature polymeric composition described above. The high processing temperature polymeric composition can include any or all of the properties of the high processing temperature polymeric composition described above. Further, the first and second yarn can exhibit any or all of the properties and parameters discussed above.

Step 2620 of the process 2600, includes knitting an anchor yarn to one or more loops of the first yarn present in the first course of loops. The anchor yarn includes an anchor yarn composition, where the anchor yarn composition includes one or more polymers. The anchor yarn composition exhibits an elongation that is less than an elongation of the low processing temperature polymeric composition. In aspects, the anchor yarn can have any or all of the properties of the anchor yarn discussed above with reference to FIGS. 4B, 4E, 10A, and 10B.

In aspects, the first course of loops can be present on an outer surface of the knit upper. In such aspects, the outer surface of the knit upper can comprise a first zone, a second zone, and a third zone, where the second zone is positioned between the first and third zones. Further, in such aspects, the third zone has an increased concentration of the first yarn compared to the second zone. The first zone, second zone, and third zone can include any or all of the properties of the textile zones 306a, 304a, and 302, respectively, discussed above with reference to the textile 300 of FIG. 3.

Figure 27:
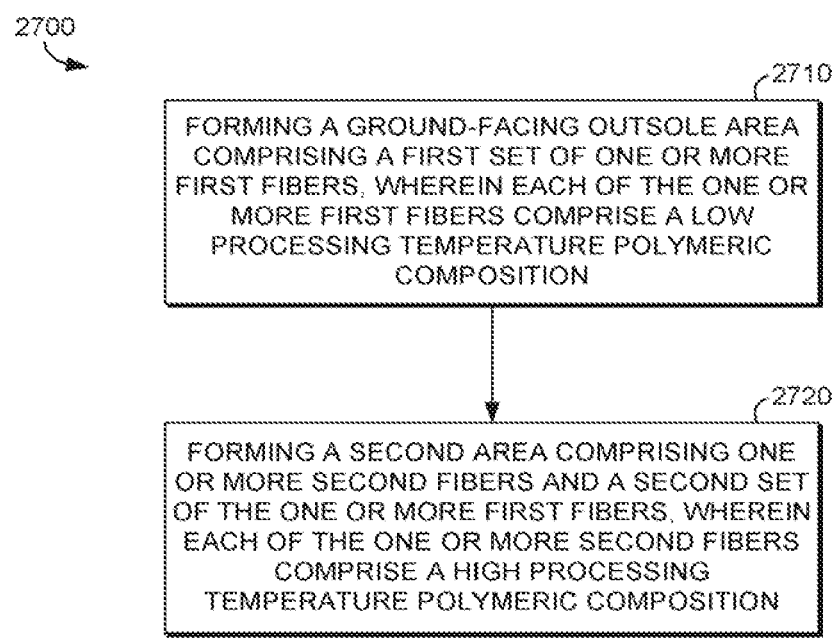
FIG. 27 is a flow diagram of an exemplary process for making an outsole for an article of footwear, in accordance with aspects of the present invention.

FIG. 27 depicts a process 2700 for making an upper for an article of footwear. Step 2710 of the process 2700 includes forming a ground-facing outsole area that comprises a first set of one or more first fibers. In such aspects, the one or more first fibers can comprise a low processing temperature polymeric composition that includes one or more first thermoplastic polymers.

The process 2700 can include the step 2720 of forming a second area comprising one or more second fibers and a second set of one or more first fibers. In such aspects, the one or more second fibers include a high processing temperature polymeric composition that includes one or more second thermoplastic fibers. The high processing temperature polymeric composition exhibits at least one of: a creep relaxation temperature $T_{cr}$; a heat deflection temperature $T_{hd}$; or a Vicat softening temperature $T_{vs}$ that is greater than the melting temperature $T_m$ of the low processing temperature polymeric composition of the one or more first fibers. The first and second fibers, low and high processing temperature polymeric compositions, and first and second thermoplastic polymers, can include any or all of the respective properties discussed above.

Textiles, Yarns and Fibers

As discussed above, the fibers, yarns, textiles, films, and shaped components described herein can include the selective incorporation of a low processing temperature polymeric composition and/or the selective incorporation of a high processing temperature polymeric composition. In aspects, such low processing temperature polymeric compositions can be present in the form of fibers comprising the low processing temperature polymeric composition. In some aspects, the fibers comprising the low processing temperature polymeric composition are essentially free of a high processing temperature polymeric composition. In other aspects, the fibers comprising the low processing temperature polymeric composition consist essentially of the low processing temperature polymeric composition. These fibers can be used to form yarns which in turn can be used to form textiles, including knit, woven or braided textiles, in accordance with the present disclosure. These fibers can also be used to form non-woven textiles in accordance with the present disclosure.

Similarly, the high processing temperature polymeric compositions described above can be present in the form of fibers comprising the high processing temperature polymeric composition. In some aspects, the fibers comprising the high processing temperature polymeric composition are essentially free of a low processing temperature polymeric composition. In other aspects, the fibers comprising the high processing temperature polymeric composition consist essentially of the high processing temperature polymeric composition. These fibers can be used to form yarns which in turn can be used to form textiles, including knit, woven or braided textiles, in accordance with the present disclosure. These fibers can also be used to form non-woven textiles in accordance with the present disclosure.

In some aspects, the fibers and/or yarns comprising the low processing temperature polymeric composition can further comprise a high processing temperature polymeric composition. For example, the fibers can be bi-component fibers having the low processing temperature polymeric composition present on at least a portion of an external surface of the fibers. For example, the low and high processing temperature polymeric compositions can have a side-by-side structure, or can have a core-and-sheath structure, with the low processing temperature polymeric composition present in the sheath. In certain aspects, the low processing temperature polymeric composition, the high processing temperature polymeric composition, or both, can also include one or more conventional additives found in yarns or fibers that comprise polymeric materials. While the foregoing can only describe the properties and parameters of a yarn or yarn composition it should be understood that such properties and parameters also apply to a fiber or fiber composition, unless otherwise mentioned.

In certain aspects, one or more of the yarns can be mono-filament yarns or multi-filament yarns. In certain aspects, the yarns can be spun yarns. In various aspects, one or more of the yarns can be formed using conventional techniques including, but not limited to, melt-spinning, solution spinning, or electrospinning.

In certain aspects, the fibers described herein can be fibers of varying sizes, including fibers that are not suitable for spinning into spinning into commercial yarns. The yarns described herein include yarns that are suitable for use in a commercial knitting machine as well as yarns that are not individually suitable for use in a commercial knitting machine.

In certain aspects, the yarns and/or fibers described herein can be used to provide a specific functionality. For example in certain aspects, a yarn comprising the low processing temperature polymeric composition can be thermoformed to form a film having water-proof or water-resistant properties. In such aspects, a film on the outer surface of an article could be provided by utilizing yarns and or fibers comprising the low processing temperature polymeric material on an outer portion of a textile, including a knit structure forming a textile.

As discussed above, in certain aspects, one or more of the yarns and/or fibers can be dyed, e.g., for aesthetic purposes. In various aspects, the yarns and/or fibers can be dyed using conventional dyeing techniques, such as package dyeing or solution dyeing. Generally, package dyeing is a process that is performed on already formed yarns and/or fibers, while solution dyeing dyes the fibers prior to forming the fibers into yarn. In certain aspects, a yarn or fiber that comprises the high processing temperature polymeric composition can be dyed. In certain aspects, a yarn or fiber that comprises the low processing temperature polymeric composition is not dyed, and can be formed from a polymeric composition that is essentially free of pigments or dyes, which can result in the region comprising the low processing temperature polymeric composition being clear or nearly transparent (e.g., the non-yarn or non-fiber material upon thermoforming).

In certain aspects, a yarn comprising the low processing temperature polymeric composition can exhibit a tenacity of from about 1 gram/denier to about 5 grams/denier. In one or more aspects, a yarn comprising the low processing temperature polymeric composition can exhibit a tenacity of from about 1.5 grams/denier to about 4.5 grams/denier. In one aspect, a yarn comprising the low processing temperature polymeric composition can exhibit a tenacity of from about 2 grams/denier to about 4.5 grams/denier. "Tenacity" as used herein refers to a property of a fiber or yarn, and is determined using the respective testing method and sampling procedure described below in the Property Analysis And Characterization Procedures section.

In various aspects, a yarn comprising the low processing temperature polymeric composition can exhibit an elongation of from about 10% to about 130%. In one or more aspects, a yarn comprising the low processing temperature polymeric composition can exhibit an elongation of from about 20% to about 130%. In one aspect, a yarn comprising the low processing temperature polymeric composition can exhibit an elongation of from about 40% to about 130%. The term "elongation" as used herein refers to a property of a fiber or yarn and the respective testing method described below in the Property Analysis And Characterization Procedures section.

As discussed above, in certain aspects, it can be desired to utilize a yarn that is suitable for use on commercial knitting equipment. A free-standing shrinkage of a yarn at 50° C. is one property that can be predictive of a suitable yarn for use on a commercial knitting machine. In certain aspects, a yarn comprising the low processing temperature polymeric composition can exhibit a free-standing shrinkage when heated from 20° C. to 50° C. of from about 0% to about 60%. In one or more aspects, a yarn comprising the low processing temperature polymeric composition can exhibit a free-standing shrinkage when heated from 20° C. to 50° C. of from about 0% to about 30%. In one aspect, a yarn comprising the low processing temperature polymeric composition can exhibit a free-standing shrinkage when heated from 20° C. to 50° C. of from about 0% to about 20%. The term "free-standing shrinkage" as used herein refers to a property of a yarn and a respective testing method described below in the Property Analysis And Characterization Procedures section.

In one or more aspects, the free-standing shrinkage of a yarn at 70° C. can be a useful indicator of the ability of a yarn to be exposed to certain environmental conditions without any substantial changes to the physical structure of the yarn. In certain aspects, a yarn comprising the low processing temperature polymeric composition can exhibit a free-standing shrinkage when heated from 20° C. to 70° C. of from about 0% to about 60%. In one or more aspects, a yarn comprising the low processing temperature polymeric composition can exhibit a free-standing shrinkage when heated from 20° C. to 70° C. of from about 0% to about 30%. In one aspect, a yarn comprising the low processing temperature polymeric composition can exhibit a free-standing shrinkage when heated from 20° C. to 70° C. of from about 0% to about 20%.

In one or more aspects, a yarn comprising the low processing temperature polymeric composition can exhibit a modulus of from about 1 MPa to about 500 MPa. In certain aspects, a yarn comprising the low processing temperature polymeric composition can exhibit a modulus of from about 5 MPa to about 150 MPa. In one aspect, a yarn comprising the low processing temperature polymeric composition can exhibit a modulus of from about 20 MPa to about 130 MPa. In another aspect, a yarn comprising the low processing temperature polymeric composition can exhibit a modulus of from about 30 MPa to about 120 MPa. In yet another aspect, a yarn comprising the low processing temperature polymeric composition can exhibit a modulus of from about 40 MPa to about 110 MPa. The term "modulus" as used herein refers to a respective testing method described below in the Property Analysis And Characterization Procedures section.

In one or more aspects, when present in plaque form, the low processing temperature polymeric composition can exhibit a modulus of from about 1 MPa to about 500 MPa. In certain aspects, in plaque form, the low processing temperature polymeric composition can exhibit a modulus of from about 5 MPa to about 150 MPa. In one aspect, in plaque form, the low processing temperature polymeric composition can exhibit a modulus of from about 20 MPa to about 130 MPa. In another aspect, in plaque form, the low processing temperature polymeric composition can exhibit a modulus of from about 30 MPa to about 120 MPa. In yet another aspect, in plaque form, the low processing temperature polymeric composition can exhibit a modulus of from about 40 MPa to about 110 MPa.

In one or more aspects, when a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 1 Mpa to about 500 MPa. In aspects, when a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 5 Mpa to about 150 MPa. In one or more aspects, a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 20 Mpa to about 130 MPa. In one or more aspects, a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 30 MPa to about 120 MPa. In one or more aspects, a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 40 MPa to about 110 MPa.

In various aspects, when a yarn comprising the low processing temperature polymeric composition is present in a textile and has been brought to temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (or melted yarn component) exhibits a cold ross flex of from about 5000 cycles to about 500,000 cycles. In one or more aspects, when a yarn comprising the low processing temperature polymeric composition is present in a textile and has been brought to temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (or melted yarn component) exhibits a cold ross flex of from about 10,000 cycles to about 300,000 cycles. In certain aspects, when a yarn comprising the low processing temperature polymeric composition is present in a textile and has been brought to temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (or melted yarn component) exhibits a cold ross flex of at least about 150,000 cycles. The term "cold Ross flex" as used herein refers to a respective testing method described below in the Property Analysis And Characterization Procedures section.

In certain aspects, as discussed in detail below, an anchor yarn can be used to aid in restricting the flow of a melted material, e.g., a low processing temperature polymeric composition, during the thermoforming process and/or to impart some flexibility to the thermoformed material. In such aspects, the anchor yarn can exhibit an elongation that is less than the elongation of the low processing temperature polymeric composition, such as a yarn comprising the low processing temperature polymeric composition or a melted yarn component produced by thermoforming such a yarn. For example, in aspects, the anchor yarn can exhibit an elongation that is at least about 10% less than the elongation of a yarn comprising the low processing temperature polymeric composition or a melted yarn component produced by thermoforming a yarn comprising the low processing temperature polymeric composition. In one aspect, the anchor yarn can exhibit an elongation that at least about 25% less than the elongation of a yarn comprising the low processing temperature polymeric composition or a melted yarn component produced by thermoforming a yarn comprising the low processing temperature polymeric composition. In another aspect, the anchor yarn can exhibit an elongation that at least about 50% less than the elongation of a yarn comprising the low processing temperature polymeric composition or a melted yarn component produced by thermoforming a yarn comprising the low processing temperature polymeric composition. In yet another aspect, the anchor yarn can exhibit an elongation that at least about 75% less than the elongation of a yarn comprising the low processing temperature polymeric composition or a melted yarn component produced by thermoforming a yarn comprising the low processing temperature polymeric composition. Exemplary anchor yarns include polyamide yarns, polyolefin yarns, and polyester yarns, including yarns having tenacities of from about 5 grams per denier to about 10 grams per denier.

The anchor yarn can be formed of a high processing temperature polymeric composition comprising one or more polymers. The one or more polymers of the anchor yarn high processing temperature polymeric composition can be thermoplastic polymers. In certain aspects, the one or more polymers of the high processing temperature polymeric composition of the anchor yarn can be the same one or more polymers of the high processing temperature polymeric composition forming a second yarn used in a textile including the anchor yarn. In other aspects, the one or more polymers of the high processing temperature polymeric composition of the anchor yarn are different from the one or more polymers of the high processing temperature polymeric composition forming a second yarn used in a textile including the anchor yarn.

As discussed above, in certain aspects, the low processing temperature polymeric compositions and the high processing temperature polymeric compositions have differing properties. In various aspects, these differing properties allow for the low processing temperature polymeric composition, during a thermoforming process, to melt and flow, and subsequently cool and solidify into a different structure than that prior to the thermoforming process (e.g., thermoform from a yarn to a melted yarn component), while the high processing temperature polymeric composition cannot deform or melt during such a process and can maintain its structure (e.g., as a yarn), when the thermoforming process is conducted at a temperature below the creep relaxation temperature, the heat deflection temperature, or the Vicat softening temperature of the high processing temperature polymeric composition. In such aspects, the melted yarn component formed from the low processing temperature polymeric composition during the thermoforming process can be integrally connected to the non-altered structure (e.g., a yarn or fiber), which can provide three-dimensional structure and/or other properties targeted to specific spots on an article of wear.

In various aspects, one or more of the disclosed yarns can be a coated yarn. In a further aspect, the coated yarn can be any suitable yarn that has formed thereupon a coating layer comprising a thermoplastic coating composition.

In certain aspects, the thermoplastic coating composition comprises a low processing temperature polymeric composition and optionally one or more additives. In a further aspect, the thermoplastic coating composition comprises a low processing temperature polymeric composition comprising a thermoplastic polyurethane and optionally one or more additives. In a still further aspect, the thermoplastic coating composition comprises a low processing temperature polymeric composition comprising a thermoplastic poly(ether-block-amide) and optionally one or more additives.

In certain aspects, the thermoplastic coating composition comprises a high processing temperature polymeric composition and optionally one or more additives. In a further aspect, the thermoplastic coating composition comprises a high processing temperature polymeric composition comprising a thermoplastic polyurethane and optionally one or more additives. In a still further aspect, the thermoplastic coating composition comprises a high processing temperature polymeric composition comprising a thermoplastic poly(ether-block-amide) and optionally one or more additives.

In certain aspects, the coated yarn coated can be a monofilament or multifilament yarn. The yarns can be based on natural or manmade fibers including polyester, high tenacity polyester, polyamide yarns, metal yarns, stretch yarns, carbon yarns, glass yarns, polyethylene or polyolefin yarns, bi-component yarns, PTFE yarns, utra-high-molecular-weight polyethylene (UHMWPE) yarns, liquid crystal polymer yarns, specialty decorative yarns or reflective yarns or a multi-component yarn comprising one or more of the yarns.

In certain aspects, the thermoplastic coating composition comprises a TPU. In some aspects, the TPU can be any such material as described in the present disclosure, e.g., a TPU prepared by polymerizing aromatic isocyanate or aliphatic isocyanate with polyether polyol or polycarprolactone using short chain glycol (e.g., 1,4-butanediol) as a chain extender, or mixtures of different types of disclosed TPUs. Alternatively, in other aspects, the TPU can be a commercially available TPU.

In various aspects, the thermoplastic coating composition can further comprise an additive, such as, but not limited to, be one or more of a thickener, processing aid, a dye or colorant. In a further aspect, the additive is not optional and comprises at least one thickener. In a still further aspect, the additive is not optional and comprises at least one processing aid. In yet a further aspect, the additive is not optional and comprises at least one thickener and at least one processing aid. In certain aspects, the thickener can comprise an inorganic material such as silica, talc, or calcium carbonate ($CaCO_3$).

In certain aspects, as described herein, a thickener can be used during the preparation of the thermoplastic coating composition in order to improve productivity and matting properties. In a further aspect, the thickener is silica powder, talc, or $CaCO_3$. The thickener acts, at least in part, to increase the viscosity of the thermoplastic coating composition. In a still further aspect, the thickener that is used in the disclosed thermoplastic coating compositions can be an alloy with a resin such as a styrene butadiene styrene (SBS) block copolymer, a styrene ethylene/butylene styrene (SEBS) resin, a polyacetal resin (POM) or a styrene acrylonitrile resin (SAN), which can impart compatibility with thermoplastic polyurethane.

In certain aspects, the thermoplastic coating composition can comprise a processing agent in order to improve productivity. In a further aspect, the processing agent can be montane wax or a fatty acid ester (C5-C9) with pentaerythritol. Other processing agents are known to the skilled artisan and can also be used in the disclosed thermoplastic compositions. An exemplary commercially available processing aid is ESTANE 58277 (Lubrizol).

In certain aspects, the coated yarn having a desired color can be produced by adding a master batch corresponding to the desired color during production of the TPU compound for coating yarn. In a further aspect, a TPU compound for coating yarn, which has a desired hardness, can be prepared by controlling the content of raw material. In a still further aspect, the thickness of coated yarn can be reduced depending on the thickness of yarn made of polyester, nylon, spandex or the like.

In certain aspects, the coated yarn can be prepared by compounding in a conventional extruder a thermoplastic coating composition comprising a thermoplastic polymer, e.g., thermoplastic polyurethane, and optionally also including one or more additive, and then coating the compounded thermoplastic polyurethane coating composition on the surface of a yarn. In a further aspect, the process for preparing the coated yarn comprises the steps of: 1) preparing formed thermoplastic pellets; and 2) producing coated yarn. The formed thermoplastic pellets can be prepared by the method disclosed herein, prepared by similar methods as known to the skilled artisan, or obtained from a commercially available source.

The step of preparing formed thermoplastic pellets can comprise the following steps: 1) mixing a thermoplastic polymer with various additives, e.g., a thickener and/or a processing aid, and feeding the mixture into the hopper of a conventional compounding extruder; 2) melting, kneading and compounding the mixture in the cylinder of the compounding extruder at a suitable temperature and pressure; 3) cutting the compounded thermoplastic coating composition, discharged through the dice of the compounding extruder, in cooling water to form pellets; and 4) drying the formed thermoplastic polyurethane pellets at a suitable temperature for about period of time and aging the dried pellets at a suitable temperature for a suitable period of time.

In a particular example, the step of preparing formed thermoplastic pellets comprises at least the steps of: 1) mixing thermoplastic polyurethane with various additives, e.g., a thickener and/or a processing aid, and feeding the mixture into the hopper of a conventional compounding extruder; 2) melting, kneading and compounding the mixture in the cylinder of the compounding extruder at a temperature of about 150-250° C. and a pressure of about 50-150 kgf; 3) cutting the compounded thermoplastic polyurethane, discharged through the dice of the compounding extruder, in cooling water to form pellets; and 4) drying the formed thermoplastic polyurethane pellets at a temperature of 60-80° C. for about 4-6 hours and aging the dried pellets at a temperature of 30-50° C. for about 7 days or more.

In certain aspects, the step of producing the coated yarn can comprise the following steps: 1) mixing the formed thermoplastic polymer pellets, prepared as described above, with a master batch corresponding to a desired color and feeding the mixture into the hopper of a yarn coating extruder; 2) melting the mixture of the formed thermoplastic polymer pellets and the master batch in the cylinder of the yarn coating extruder at a suitable temperature and a suitable pressure; 3) coating the compounded thermoplastic polymer and master batch on the surface of yarn passing through a nipple and a dice to produce coated yarn; and 4) winding the coated yarn around a bobbin using a winding machine.

In particular, the step of producing the coated yarn can comprise the following steps: 1) mixing the formed thermoplastic polyurethane pellets with a master batch corresponding to a desired color and feeding the mixture into the hopper of a yarn coating extruder; 2) melting the mixture of the formed thermoplastic polyurethane pellets and the master batch in the cylinder of the yarn coating extruder at a temperature of about 150-250° C. and a pressure of about 50-150 kgf; 3) coating the compounded TPU and master batch on the surface of yarn (made of polyester, nylon, spandex or the like) passing through a nipple and a dice to produce coated yarn; and 4) winding the coated yarn around a bobbin using a winding machine.

An exemplary non-limiting example of a suitable commercially available coated yarn is Dream-Sil, which is a TPU coated yarn available from Sambu Fine Chemicals (Korea).

As discussed above, an anchor yarn can be used to aid in restricting the flow of a melted material, e.g., a low processing temperature polymeric composition, during the thermoforming process and/or to impart some flexibility to the thermoformed material. In such aspects, the anchor yarn can not melt or deform during the thermoforming process. As such, in certain aspects, the anchor yarn can comprise an anchor yarn composition comprising one or more third thermoplastic polymers such that the anchor yarn composition exhibits at least one of a creep relaxation temperature $T_{cr}$, a Vicat softening temperature $T_{vs}$, a heat deflection temperature $T_{hd}$, or a melting temperature $T_m$ that is greater than the melting temperature $T_m$ of a low processing temperature polymeric composition. In certain aspects, the anchor yarn composition can have the specific ranges associated with these properties discussed above with respect to the high processing temperature polymeric composition. In certain aspects, the anchor yarn can be formed of a high processing temperature polymeric compositions, and thus can comprise any of the thermoplastic polymers discussed above with reference to the high processing temperature polymeric composition.

In various aspects, a fiber or a yarn comprising a low processing temperature polymeric composition comprises a polyamide or a poly(ether-block-amide) with a melting temperature $(T_m)$ from about 90° C. to about 120° C. when determined in accordance with AS $T_m$ D3418-97 as described herein below. In a further aspect, the polyamide or poly(ether-block-amide) has a melting temperature $(T_m)$ from about 93° C. to about 99° C. when determined in accordance with AS $T_m$ D3418-97 as described herein below. In a still further aspect, the polyamide or poly(ether-block-amide) with a melting temperature $(T_m)$ from about 112° C. to about 118° C. when determined in accordance with AS $T_m$ D3418-97 as described herein below. In some aspects, the polyamide or poly(ether-block-amide) has a melting temperature of about 90° C., about 91° C., about 92° C., about 93° C., about 94° C., about 95° C., about 96° C., about 97° C., about 98° C., about 99° C., about 100° C., about 101° C., about 102° C., about 103° C., about 104° C., about 105° C., about 106° C., about 107° C., about 108° C., about 109° C., about 110° C., about 111° C., about 112° C., about 113° C., about 114° C., about 115° C., about 116° C., about 117° C., about 118° C., about 119° C., about 120° C., any range of melting temperature $(T_m)$ values encompassed by any of the foregoing values, or any combination of the foregoing melting temperature $(T_m)$ values, when determined in accordance with AS $T_m$ D3418-97 as described herein below.

In various aspects, a fiber or a yarn comprising a low processing temperature polymeric composition comprises a polyamide or a poly(ether-block-amide) with a glass transition temperature $(T_g)$ from about −20° C. to about 30° C. when determined in accordance with AS $T_m$ D3418-97 as described herein below. In a further aspect, the polyamide or poly(ether-block-amide) with a glass transition temperature $(T_g)$ from about −13° C. to about −7° C. when determined in accordance with AS $T_m$ D3418-97 as described herein below. In a still further aspect, the polyamide or poly(ether-block-amide) has a glass transition temperature $(T_g)$ from about 17° C. to about 23° C. when determined in accordance with AS $T_m$ D3418-97 as described herein below. In some aspects, the polyamide or poly(ether-block-amide) with a glass transition temperature $(T_g)$ of about −20° C., about −19° C., about −18° C., about −17° C., about −16° C., about −15° C., about −14° C., about −13° C., about −12° C., about −10° C., about −9° C., about −8° C., about −7° C., about −6° C., about −5° C., about −4° C., about −3° C., about −2° C., about −1° C., about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., any range of glass transition temperature values encompassed by any of the foregoing values, or any combination of the foregoing glass transition temperature values, when determined in accordance with AS $T_m$ D3418-97 as described herein below.

In various aspects, a fiber or a yarn comprising a low processing temperature polymeric composition comprises a polyamide or a poly(ether-block-amide) with a melt flow index from about 10 $cm^3/10$ min to about 30 $cm^3/10$ min when tested in accordance with AS $T_m$ D1238-13 as described herein below at 160° C. using a weight of 2.16 kg. In a further aspect, the polyamide or poly(ether-block-amide) has a melt flow index from about 22 $cm^3/10$ min to about 28 $cm^3/10$ min when tested in accordance with AS $T_m$ D1238-13 as described herein below at 160° C. using a weight of 2.16 kg. In some aspects, the polyamide or poly(ether-block-amide) has a melt flow index of about 10 $cm^3/10$ min, about 11 $cm^3/10$ min, about 12 $cm^3/10$ min, about 13 $cm^3/10$ min, about 14 $cm^3/10$ min, about 15 $cm^3/10$ min, about 16 $cm^3/10$ min, about 17 $cm^3/10$ min, of about 18 $cm^3/10$ min, about 19 $cm^3/10$ min, of about 20 $cm^3/10$ min, about 21 $cm^3/10$ min, about 22 $cm^3/10$ min, about 23 cm³/10 min, about 24 cm³/10 min, about 25 cm³/10 min, about 26 cm³/10 min, about 27 cm³/10 min, of about 28 cm³/10 min, about 29 cm³/10 min, of about 30 cm³/10 min, any range of melt flow index values encompassed by any of the foregoing values, or any combination of the foregoing melt flow index values, when determined in accordance with AS $T_m$ D1238-13 as described herein below at 160° C. using a weight of 2.16 kg.

In various aspects, a fiber or a yarn comprising a low processing temperature polymeric composition comprises a polyamide or a poly(ether-block-amide) with a cold Ross flex test result of about 120,000 to about 180,000 when tested on a thermoformed plaque of the polyamide or the poly(ether-block-amide) in accordance with the cold Ross flex test as described herein below. In a further aspect, the polyamide or poly(ether-block-amide) has a cold Ross flex test result of about 140,000 to about 160,000 when tested on a thermoformed plaque of the polyamide or the poly(ether-block-amide) in accordance with the cold Ross flex test as described herein below. In a still further aspect, the polyamide or poly(ether-block-amide) has a cold Ross flex test result of about 130,000 to about 170,000 when tested on a thermoformed plaque of the polyamide or the poly(ether-block-amide) in accordance with the cold Ross flex test as described herein below. In some aspects, the polyamide or a poly(ether-block-amide) has a cold Ross flex test result of about 120,000, about 125,000, about 130,000, about 135,000, about 140,000, about 145,000, about 150,000, about 155,000, about 160,000, about 165,000, about 170,000, about 175,000, about 180,000, any range of cold Ross flex test values encompassed by any of the foregoing values, or any combination of the foregoing cold Ross flex test values, when tested on a thermoformed plaque of the polyamide or the poly(ether-block-amide) in accordance with the cold Ross flex test as described herein below.

In various aspects, a fiber or a yarn comprising a low processing temperature polymeric composition comprises a polyamide or a poly(ether-block-amide) with a modulus from about 5 MPa to about 100 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below. In a further aspect, the polyamide or poly(ether-block-amide) has a modulus from about 20 MPa to about 80 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below. In some aspects, the polyamide or poly(ether-block-amide) has a modulus of about 5 MPa, about 10 MPa, about 15 MPa, about 20 MPa, about 25 MPa, about 30 MPa, about 35 MPa, about 40 MPa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, any range of modulus values encompassed by any of the foregoing values, or any combination of the foregoing modulus values, when tested on a thermoformed plaque of the polyamide or the poly(ether-block-amide) in accordance with AS $T_m$ D412-98 Standard Test Methods for Vulcanized Rubber and Thermoplastic Rubbers and Thermoplastic Elastomers-Tension with modifications described herein below.

In various aspects, a fiber or a yarn comprising a low processing temperature polymeric composition comprises a polyamide or a poly(ether-block-amide) with a melting temperature ($T_m$) of about 115° C. when determined in accordance with AS $T_m$ D3418-97 as described herein below; a glass transition temperature ($T_g$) of about −10° C. when determined in accordance with AS $T_m$ D3418-97 as described herein below; a melt flow index of about 25 cm³/10 min when tested in accordance with AS $T_m$ D1238-13 as described herein below at 160° C. using a weight of 2.16 kg; a cold Ross flex test result of about 150,000 when tested on a thermoformed plaque in accordance with the cold Ross flex test as described herein below; and a modulus from about 25 MPa to about 70 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

In various aspects, a fiber or a yarn comprising a low processing temperature polymeric composition comprises a polyamide or a poly(ether-block-amide) with a melting temperature ($T_m$) of about 96° C. when determined in accordance with AS $T_m$ D3418-97 as described herein below; a glass transition temperature ($T_g$) of about 20° C. when determined in accordance with AS $T_m$D3418-97 as described herein below; a cold Ross flex test result of about 150,000 when tested on a thermoformed plaque in accordance with the cold Ross flex test as described herein below; and a modulus of less than or equal to about 10 MPa a when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

In various aspects, a fiber or a yarn comprising a low processing temperature polymeric composition comprises a polyamide or a poly(ether-block-amide) mixture comprising a first polyamide or a poly(ether-block-amide) with a melting temperature ($T_m$) of about 115° C. when determined in accordance with AS $T_m$ D3418-97 as described herein below; a glass transition temperature ($T_g$) of about −10° C. when determined in accordance with AS $T_m$ D3418-97 as described herein below; a melt flow index of about 25 cm³/10 min when tested in accordance with AS $T_m$ D1238-13 as described herein below at 160° C. using a weight of 2.16 kg; a cold Ross flex test result of about 150,000 when tested on a thermoformed plaque in accordance with the cold Ross flex test as described herein below; and a modulus from about 25 MPa to about 70 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below; and a second polyamide or a poly(ether-block-amide) with a melting temperature ($T_m$) of about 96° C. when determined in accordance with AS $T_m$ D3418-97 as described herein below; a glass transition temperature ($T_g$) of about 20° C. when determined in accordance with AS $T_m$ D3418-97 as described herein below; a cold Ross flex test result of about 150,000 when tested on a thermoformed plaque in accordance with the cold Ross flex test as described herein below; and a modulus of less than or equal to about 10 MPa a when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

In various aspects, a yarn comprising a low processing temperature polymeric composition has a denier of about 750 to about 1100.

In various aspects, a yarn comprising a low processing temperature polymeric composition has a yarn tenacity of greater than or equal to about 1.5 g/den when tested in accordance with EN ISO 2062 with the modifications described herein below. In a further aspect, a yarn comprising a low processing temperature polymeric composition has a yarn tenacity from about 1.5 g/den to about 3.0 g/den when tested in accordance with EN ISO 2062 with the modifications described herein below. In a still further aspect, a yarn comprising a low processing temperature polymeric composition has a yarn tenacity from about 1.7 g/den to about 1.8 g/den when tested in accordance with EN ISO 2062 with the modifications described herein below. In a still further aspect, a yarn comprising a low processing temperature polymeric composition has a tenacity from about 3.3 g/den to about 3.6 g/den when tested in accordance with EN ISO 2062 with the modifications described herein below. In some aspects, a yarn comprising a low processing temperature polymeric composition has a yarn tenacity of about 1.5 g/den, about 1.6 g/den, about 1.7 g/den, about 1.8 g/den, about 1.9 g/den, about 2.0 g/den, about 2.1 g/den, about 2.2 g/den, about 2.3 g/den, about 2.4 g/den, about 2.5 g/den, about 2.6 g/den, about 2.7 g/den, about 2.8 g/den, about 2.9 g/den, about 3.0 g/den, any range of tenacity values encompassed by any of the foregoing values, or any combination of the foregoing tenacity values, when tested in accordance with EN ISO 2062 with the modifications described herein below.

In various aspects, a yarn comprising a low processing temperature polymeric composition has a yarn elongation of less than or equal to about 150% when tested in accordance with EN ISO 2062 with the modifications described herein below. In a further aspect, a yarn comprising a low processing temperature polymeric composition has a yarn elongation from about 30% to about 130% when tested in accordance with EN ISO 2062 with the modifications described herein below. In a still further aspect, a yarn comprising a low processing temperature polymeric composition has a yarn elongation from about 115% to about 120% when tested in accordance with EN ISO 2062 with the modifications described herein below. In an even further aspect, a yarn comprising a low processing temperature polymeric composition has a yarn elongation from about 120% to about 140% when tested in accordance with EN ISO 2062 with the modifications described herein below. In a yet further aspect, a yarn comprising a low processing temperature polymeric composition has a yarn elongation from about 35% to about 45% when tested in accordance with EN ISO 2062 with the modifications described herein below. In some aspects, a yarn comprising a low processing temperature polymeric composition has a yarn elongation of about 30%, about 35%, about 40%, about 45%, about 50%, about 55%, about 60%, about 65%, about 70%, about 75%, about 80%, about 85%, about 90%, about 95%, about 100%, about 105%, about 110%, about 115%, about 120%, about 125%, about 130%, any range of elongation values encompassed by any of the foregoing values, or any combination of the foregoing tenacity values, when tested on a thermoformed plaque of the polyamide or the poly(ether-block-amide) in accordance with EN ISO 2062 with the modifications described herein below.

In various aspects, a yarn comprising a low processing temperature polymeric composition has a yarn shrinkage of less than or equal to about 15% when tested in accordance with methods described herein below at 50° C. In a further aspect, a yarn comprising a low processing temperature polymeric composition has a yarn shrinkage from about 7% to about 13% when tested in accordance with methods described herein below at 50° C. In a still further aspect, a yarn comprising a low processing temperature polymeric composition has a yarn shrinkage from about 9.5% to about 10.5% when tested in accordance with methods described herein below at 50° C. In a still further aspect, a yarn comprising a low processing temperature polymeric composition has a yarn elongation from about 0% to about 5% when tested in accordance with methods described herein below at 50° C. In some aspects, a yarn comprising a low processing temperature polymeric composition has a yarn shrinkage of about 0%, about 0.5%, about 1.0%, about 1.5%, about 2.0%, about 2.5%, about 3.0%, about 3.5%, about 4.0%, about 5.5%, about 6.0%, about 6.5%, about 7.0%, about 7.5%, about 8.0%, about 8.5%, about 9.0%, about 9.5%, about 10%, any range of shrinkage values encompassed by any of the foregoing values, or any combination of the foregoing shrinkage values, when tested in accordance with methods described herein below at 50° C.

In various aspects, a yarn comprising a low processing temperature polymeric composition has an enthalpy of melting (a measure of crystallinity) from about 15 J/g to about 50 J/g when tested in accordance with methods described herein. In a further aspect, a yarn comprising a low processing temperature polymeric composition has an enthalpy of melting from about 17 J/g to about 23 J/g when tested in accordance with methods described herein. In a still further aspect, a yarn comprising a low processing temperature polymeric composition has an enthalpy of melting from about 35 J/g to about 42 J/g when tested in accordance with methods described herein. In some aspects, a yarn comprising a low processing temperature polymeric composition has an enthalpy of melting of about 15 J/g, about 20 J/g, about 25 J/g, about 30 J/g, about 35 J/g, about 40 J/g, about 45 J/g, about 50 J/g, any range of enthalpy of melting values encompassed by any of the foregoing values, or any combination of the foregoing enthalpy of melting values, when tested in accordance with methods described herein.

In various aspects, a yarn comprising a low processing temperature polymeric composition has a yarn tenacity of about 2.0 to about 2.2 g/den when tested in accordance with EN ISO 2062 with the modifications described herein below; a yarn elongation of about 116% to about 122% when tested in accordance with EN ISO 2062 with the modifications described herein below; a yarn shrinkage of about 8 to about 12% when tested in accordance with methods described herein below at 50° C.; and an enthalpy of melting of about 18 J/g to about 22 J/g when tested in accordance with methods described herein. The contemplated yarns include those with any value within the range given, including a value equal to or about the value of the lower or upper limit of the range given.

In various aspects, a yarn comprising a low processing temperature polymeric composition has a yarn tenacity of about 3.2 to about 3.6 g/den when tested in accordance with EN ISO 2062 with the modifications described herein below; a yarn elongation of about 37% to about 43% when tested in accordance with EN ISO 2062 with the modifications described herein below; a yarn shrinkage from about 0% to about 3% when tested in accordance with methods described herein below at 50° C.; and an enthalpy of melting of about 35 J/g to about 42 J/g when tested in accordance with methods described herein. The contemplated yarns include those with any value within the range given, including a value equal to or about the value of the lower or upper limit of the range given.

In various aspects, a yarn comprising a low processing temperature polymeric composition comprises a first yarn having a yarn tenacity of about 2.0 to about 2.2 g/den when tested in accordance with EN ISO 2062 with the modifications described herein below; a yarn elongation of about 116% to about 122% when tested in accordance with EN ISO 2062 with the modifications described herein below; a yarn shrinkage of about 8 to about 12% when tested in accordance with methods described herein below at 50° C.; and an enthalpy of melting of about 18 J/g to about 22 J/g when tested in accordance with methods described herein. The contemplated yarns include those with any value within the range given, including a value equal to or about the value of the lower or upper limit of the range given; and a second yarn having a yarn tenacity of about 3.2 to about 3.6 g/den when tested in accordance with EN ISO 2062 with the modifications described herein below; a yarn elongation of about 37% to about 43% when tested in accordance with EN ISO 2062 with the modifications described herein below; a yarn shrinkage from about 0% to about 3% when tested in accordance with methods described herein below at 50° C.; and an enthalpy of melting of about 35 J/g to about 42 J/g when tested in accordance with methods described herein. The contemplated yarns include those with any value within the range given, including a value equal to or about the value of the lower or upper limit of the range given.

Shaped Articles and Films

As discussed above, disclosed films and shaped components described herein can include the selective incorporation of a low processing temperature polymeric composition and/or the selective incorporation of a high processing temperature polymeric composition. In aspects, such low processing temperature polymeric compositions can be present in the form of a film or a shaped component comprising the low processing temperature polymeric composition. In some aspects, a film or a shaped component comprising the low processing temperature polymeric composition is essentially free of a high processing temperature polymeric composition. In other aspects, a film or a shaped component comprising the low processing temperature polymeric composition consists essentially of the low processing temperature polymeric composition. These shaped components can be manufactured by any suitable means known in the art for manufacturing a shaped component, such as polymer extrusion, polymer blow molding, injection molding, and machining. These films can be manufactured by any suitable means known in the art for manufacturing a film, such as polymer extrusion.

Similarly, the high processing temperature polymeric compositions described above can be present in the form of a film or a shaped component comprising the high processing temperature polymeric composition. In some aspects, the film or shaped component comprising the high processing temperature polymeric composition is essentially free of a low processing temperature polymeric composition. In other aspects, the film or shaped component comprising the high processing temperature polymeric composition consists essentially of the high processing temperature polymeric composition. These shaped components can be manufactured by any suitable means known in the art for manufacturing a shaped component, such as polymer extrusion, polymer blow molding, injection molding, and machining. These films can be manufactured by any suitable means known in the art for manufacturing a film, such as polymer extrusion.

In some aspects, the film or shaped component comprising the low processing temperature polymeric composition can further comprise a high processing temperature polymeric composition. For example, the film or shaped component can be bi-component materials formed by arc co-extruding or co-injecting the low processing temperature polymeric composition and the high processing temperature polymeric composition.

In certain aspects, the film or shaped component described herein can be used to provide a specific functionality. For example in certain aspects, a film comprising the low processing temperature polymeric composition can be thermoformed to form a film having water-proof or water-resistant properties. In such aspects, a film on the outer surface of an article could be provided by utilizing a film comprising the low processing temperature polymeric material.

As discussed above, in certain aspects, a film or shaped component can be colored, e.g., for aesthetic purposes. In various aspects, a film or shaped component can be colored using conventional coloring techniques. In certain aspects, a film or shaped component that comprises the low processing temperature polymeric composition is not colored, and can be formed from a polymeric composition that is essentially free of pigments, colorants, or dyes, which can result in the region comprising the low processing temperature polymeric composition being clear or nearly transparent (e.g., the non-yarn or non-fiber material upon thermoforming).

In one or more aspects, a film or shaped component comprising the low processing temperature polymeric composition can exhibit a modulus of from about 1 MPa to about 500 MPa. In certain aspects, a yarn comprising the low processing temperature polymeric composition can exhibit a modulus of from about 5 Mpa to about 150 MPa. In one aspect, a yarn comprising the low processing temperature polymeric composition can exhibit a modulus of from about 20 Mpa to about 130 MPa. In another aspect, a yarn comprising the low processing temperature polymeric composition can exhibit a modulus of from about 30 MPa to about 120 MPa. In yet another aspect, a yarn comprising the low processing temperature polymeric composition can exhibit a modulus of from about 40 MPa to about 110 MPa. The term "modulus" as used herein refers to a respective testing method described below in the Property Analysis And Characterization Procedures section.

In one or more aspects, when a film or shaped component comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 1 MPa to about 500 MPa. In aspects, when a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 5 MPa to about 150 MPa. In one or more aspects, a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 20 Mpa to about 130 MPa. In one or more aspects, a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 30 Mpa to about 120 MPa. In one or more aspects, a yarn comprising the low processing temperature polymeric composition is brought to a temperature above the melting temperature $T_m$ of the low processing temperature polymeric composition and then brought to a temperature below the melting temperature $T_m$ of the low processing temperature polymeric composition, when tested at approximately 20° C. and 1 A $T_m$ of pressure, the resulting thermoformed material (e.g., melted yarn component) can exhibit a modulus of from about 40 Mpa to about 110 MPa.

As discussed above, in certain aspects, the low processing temperature polymeric compositions and the high processing temperature polymeric compositions have differing properties. In various aspects, these differing properties allow for the low processing temperature polymeric composition, during a thermoforming process, to melt and flow, and subsequently cool and solidify into a different structure than that prior to the thermoforming process (e.g., thermoform from a film or shaped component to a melted or partially melted the film or shaped component), while the high processing temperature polymeric composition cannot deform or melt during such a process and can maintain its structure (e.g., as a film or shaped component), when the thermoforming process is conducted at a temperature below the creep relaxation temperature, the heat deflection temperature, or the Vicat softening temperature of the high processing temperature polymeric composition. In such aspects, the melted yarn component formed from the low processing temperature polymeric composition during the thermoforming process can be integrally connected to the non-altered structure (e.g., a textile or article, or another film or shaped component), which can provide three-dimensional structure and/or other properties targeted to specific spots on an article of wear.

In various aspects, a film or shaped component can be a coated film or shaped component. In a further aspect, the coated film or shaped component can be any suitable film or shaped component that has formed thereupon a coating layer comprising a thermoplastic coating composition or other suitable coating.

In certain aspects, the thermoplastic coating composition comprises a low processing temperature polymeric composition and optionally one or more additives. In a further aspect, the thermoplastic coating composition comprises a low processing temperature polymeric composition comprising a thermoplastic polyurethane and optionally one or more additives. In a still further aspect, the thermoplastic coating composition comprises a low processing temperature polymeric composition comprising a thermoplastic poly(ether-block-amide) and optionally one or more additives.

In certain aspects, the thermoplastic coating composition comprises a high processing temperature polymeric composition and optionally one or more additives. In a further aspect, the thermoplastic coating composition comprises a high processing temperature polymeric composition comprising a thermoplastic polyurethane and optionally one or more additives. In a still further aspect, the thermoplastic coating composition comprises a high processing temperature polymeric composition comprising a thermoplastic poly(ether-block-amide) and optionally one or more additives.

In certain aspects, the thermoplastic coating composition comprises a TPU. In some aspects, the TPU can be any such material as described in the present disclosure, e.g., a TPU prepared by polymerizing aromatic isocyanate or aliphatic isocyanate with polyether polyol or polycarprolactone using short chain glycol (e.g., 1,4-butanediol) as a chain extender, or mixtures of different types of disclosed TPUs. Alternatively, in other aspects, the TPU can be a commercially available TPU.

In various aspects, the thermoplastic coating composition can further comprise an additive, such as, but not limited to, be one or more of a thickener, processing aid, a dye or colorant. In a further aspect, the additive is not optional and comprises at least one thickener. In a still further aspect, the additive is not optional and comprises at least one processing aid. In yet a further aspect, the additive is not optional and comprises at least one thickener and at least one processing aid. In certain aspects, the thickener can comprise an inorganic material such as silica, talc, or calcium carbonate ($CaCO_3$).

In certain aspects, as described herein, a thickener can be used during the preparation of the thermoplastic coating composition in order to improve productivity and matting properties. In a further aspect, the thickener is silica powder, talc, or $CaCO_3$. The thickener acts, at least in part, to increase the viscosity of the thermoplastic coating composition. In a still further aspect, the thickener that is used in the disclosed thermoplastic coating compositions can be an alloy with a resin such as a styrene butadiene styrene (SBS) block copolymer, a styrene ethylene/butylene styrene (SEBS) resin, a polyacetal resin (POM) or a styrene acrylonitrile resin (SAN), which can impart compatibility with thermoplastic polyurethane.

In certain aspects, the thermoplastic coating composition can comprise a processing agent in order to improve productivity. In a further aspect, the processing agent can be montane wax or a fatty acid ester (C5-C9) with pentaerythritol. Other processing agents are known to the skilled artisan and can also be used in the disclosed thermoplastic compositions. An exemplary commercially available processing aid is ESTANE 58277 (Lubrizol).

In certain aspects, the coated film or shaped component having a desired color can be produced by adding a master batch corresponding to the desired color during production of the TPU compound for coating a film or shaped component. In a further aspect, a TPU compound for coating a film or shaped component, which has a desired hardness, can be prepared by controlling the content of raw material.

In certain aspects, the coated film or shaped component can be prepared by compounding in a conventional extruder a thermoplastic coating composition comprising a thermoplastic polymer, e.g., thermoplastic polyurethane, and optionally also including one or more additive, and then coating the compounded thermoplastic polyurethane coating composition on the surface of a film or shaped component. In a further aspect, the process for preparing the coated film or shaped component comprises the steps of: 1) preparing formed thermoplastic pellets; and 2) producing coated film or shaped component. The formed thermoplastic pellets can be prepared by the method disclosed herein, prepared by similar methods as known to the skilled artisan, or obtained from a commercially available source.

The step of preparing formed thermoplastic pellets can comprise the following steps: 1) mixing a thermoplastic polymer with various additives, e.g., a thickener and/or a processing aid, and feeding the mixture into the hopper of a conventional compounding extruder; 2) melting, kneading and compounding the mixture in the cylinder of the compounding extruder at a suitable temperature and pressure; 3) cutting the compounded thermoplastic coating composition, discharged through the dice of the compounding extruder, in cooling water to form pellets; and 4) drying the formed thermoplastic polyurethane pellets at a suitable temperature for about period of time and aging the dried pellets at a suitable temperature for a suitable period of time.

In a particular example, the step of preparing formed thermoplastic pellets comprises at least the steps of: 1) mixing thermoplastic polyurethane with various additives, e.g., a thickener and/or a processing aid, and feeding the mixture into the hopper of a conventional compounding extruder; 2) melting, kneading and compounding the mixture in the cylinder of the compounding extruder at a temperature of about 150-250° C. and a pressure of about 50-150 kgf; 3) cutting the compounded thermoplastic polyurethane, discharged through the dice of the compounding extruder, in cooling water to form pellets; and 4) drying the formed thermoplastic polyurethane pellets at a temperature of 60-80° C. for about 4-6 hours and aging the dried pellets at a temperature of 30-50° C. for about 7 days or more.

In various aspects, a shaped component or film comprises a polyamide or a poly(ether-block-amide) with a melting temperature ($T_m$) from about 90° C. to about 120° C. when determined in accordance with AS $T_m$ D3418-97 as described herein below. In a further aspect, the polyamide or poly(ether-block-amide) has a melting temperature ($T_m$) from about 93° C. to about 99° C. when determined in accordance with AS $T_m$ D3418-97 as described herein below. In a still further aspect, the polyamide or poly(ether-block-amide) with a melting temperature ($T_m$) from about 112° C. to about 118° C. when determined in accordance with AS $T_m$ D3418-97 as described herein below. In some aspects, the polyamide or poly(ether-block-amide) has a melting temperature of about 90° C., about 91° C., about 92° C., about 93° C., about 94° C., about 95° C., about 96° C., about 97° C., about 98° C., about 99° C., about 100° C., about 101° C., about 102° C., about 103° C., about 104° C., about 105° C., about 106° C., about 107° C., about 108° C., about 109° C., about 110° C., about 111° C., about 112° C., about 113° C., about 114° C., about 115° C., about 116° C., about 117° C., about 118° C., about 119° C., about 120° C., any range of melting temperature ($T_m$) values encompassed by any of the foregoing values, or any combination of the foregoing melting temperature ($T_m$) values, when determined in accordance with AS $T_m$ D3418-97 as described herein below.

In various aspects, a shaped component or film comprises a polyamide or a poly(ether-block-amide) with a glass transition temperature ($T_g$) from about -20° C. to about 30° C. when determined in accordance with AS $T_m$ D3418-97 as described herein below. In a further aspect, the polyamide or poly(ether-block-amide) with a glass transition temperature ($T_g$) from about -13° C. to about -7° C. when determined in accordance with AS $T_m$ D3418-97 as described herein below. In a still further aspect, the polyamide or poly(ether-block-amide) has a glass transition temperature ($T_g$) from about 17° C. to about 23° C. when determined in accordance with AS $T_m$ D3418-97 as described herein below. In some aspects, the polyamide or poly(ether-block-amide) with a glass transition temperature ($T_g$) of about -20° C., about -19° C., about -18° C., about -17° C., about -16° C., about -15° C., about -14° C., about -13° C., about -12° C., about -10° C., about -9° C., about -8° C., about -7° C., about -6° C., about -5° C., about -4° C., about -3° C., about -2° C., about -1° C., about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., any range of glass transition temperature values encompassed by any of the foregoing values, or any combination of the foregoing glass transition temperature values, when determined in accordance with AS $T_m$ D3418-97 as described herein below.

In various aspects, a shaped component or film comprises a polyamide or a poly(ether-block-amide) with a melt flow index from about 10 cm³/10 min to about 30 cm³/10 min when tested in accordance with AS $T_m$ D1238-13 as described herein below at 160° C. using a weight of 2.16 kg. In a further aspect, the polyamide or poly(ether-block-amide) has a melt flow index from about 22 cm³/10 min to about 28 cm³/10 min when tested in accordance with AS $T_m$ D1238-13 as described herein below at 160° C. using a weight of 2.16 kg. In some aspects, the polyamide or poly(ether-block-amide) has a melt flow index of about 10 cm³/10 min, about 11 cm³/10 min, about 12 cm³/10 min, about 13 cm³/10 min, about 14 cm³/10 min, about 15 cm³/10 min, about 16 cm³/10 min, about 17 cm³/10 min, of about 18 cm³/10 min, about 19 cm³/10 min, of about 20 cm³/10 min, about 21 cm³/10 min, about 22 cm³/10 min, about 23 cm³/10 min, about 24 cm³/10 min, about 25 cm³/10 min, about 26 cm³/10 min, about 27 cm³/10 min, of about 28 cm³/10 min, about 29 cm³/10 min, of about 30 cm³/10 min, any range of melt flow index values encompassed by any of the foregoing values, or any combination of the foregoing melt flow index values, when determined in accordance with AS $T_m$ D1238-13 as described herein below at 160° C. using a weight of 2.16 kg.

In various aspects, a shaped component or film comprises a polyamide or a poly(ether-block-amide) with a cold Ross flex test result of about 120,000 to about 180,000 when tested on a thermoformed plaque of the polyamide or the poly(ether-block-amide) in accordance with the cold Ross flex test as described herein below. In a further aspect, the polyamide or poly(ether-block-amide) has a cold Ross flex test result of about 140,000 to about 160,000 when tested on a thermoformed plaque of the polyamide or the poly(ether-block-amide) in accordance with the cold Ross flex test as described herein below. In a still further aspect, the polyamide or poly(ether-block-amide) has a cold Ross flex test result of about 130,000 to about 170,000 when tested on a thermoformed plaque of the polyamide or the poly(ether-block-amide) in accordance with the cold Ross flex test as described herein below. In some aspects, the polyamide or a poly(ether-block-amide) has a cold Ross flex test result of about 120,000, about 125,000, about 130,000, about 135,000, about 140,000, about 145,000, about 150,000, about 155,000, about 160,000, about 165,000, about 170,000, about 175,000, about 180,000, any range of cold Ross flex test values encompassed by any of the foregoing values, or any combination of the foregoing cold Ross flex test values, when tested on a thermoformed plaque of the polyamide or the poly(ether-block-amide) in accordance with the cold Ross flex test as described herein below.

In various aspects, a shaped component or film comprises a polyamide or a poly(ether-block-amide) with a modulus from about 5 MPa to about 100 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below. In a further aspect, the polyamide or poly(ether-block-amide) has a modulus from about 20 MPa to about 80 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below. In some aspects, the polyamide or poly(ether-block-amide) has a modulus of about 5 MPa, about 10 MPa, about 15 MPa, about 20 MPa, about 25 MPa, about 30 MPa, about 35 MPa, about 40 MPa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, any range of modulus values encompassed by any of the foregoing values, or any combination of the foregoing modulus values, when tested on a thermoformed plaque of the polyamide or the poly(ether-block-amide) in accordance with AS $T_m$ D412-98 Standard Test Methods for Vulcanized Rubber and Thermoplastic Rubbers and Thermoplastic Elastomers-Tension with modifications described herein below.

In various aspects, a shaped component or film comprises a polyamide or a poly(ether-block-amide) with a melting temperature $(T_m)$ of about 115° C. when determined in accordance with AS $T_m$ D3418-97 as described herein below; a glass transition temperature $(T_g)$ of about –10° C. when determined in accordance with AS $T_m$ D3418-97 as described herein below; a melt flow index of about 25 cm$^3$/10 min when tested in accordance with AS $T_m$ D1238-13 as described herein below at 160° C. using a weight of 2.16 kg; a cold Ross flex test result of about 150,000 when tested on a thermoformed plaque in accordance with the cold Ross flex test as described herein below; and a modulus from about 25 MPa to about 70 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

In various aspects, a shaped component or film comprises a polyamide or a poly(ether-block-amide) with a melting temperature $(T_m)$ of about 96° C. when determined in accordance with AS $T_m$ D3418-97 as described herein below; a glass transition temperature $(T_g)$ of about 20° C. when determined in accordance with AS $T_m$ D3418-97 as described herein below; a cold Ross flex test result of about 150,000 when tested on a thermoformed plaque in accordance with the cold Ross flex test as described herein below; and a modulus of less than or equal to about 10 MPa a when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

In various aspects, a shaped component or film comprises a polyamide or a poly(ether-block-amide) mixture comprising a first polyamide or a poly(ether-block-amide) with a melting temperature $(T_m)$ of about 115° C. when determined in accordance with AS $T_m$ D3418-97 as described herein below; a glass transition temperature $(T_g)$ of about –10° C. when determined in accordance with AS $T_m$ D3418-97 as described herein below; a melt flow index of about 25 cm$^3$/10 min when tested in accordance with AS $T_m$ D1238-13 as described herein below at 160° C. using a weight of 2.16 kg; a cold Ross flex test result of about 150,000 when tested on a thermoformed plaque in accordance with the cold Ross flex test as described herein below; and a modulus from about 25 MPa to about 70 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below; and a second polyamide or a poly(ether-block-amide) with a melting temperature $(T_m)$ of about 96° C. when determined in accordance with AS $T_m$ D3418-97 as described herein below; a glass transition temperature $(T_g)$ of about 20° C. when determined in accordance with AS $T_m$ D3418-97 as described herein below; a cold Ross flex test result of about 150,000 when tested on a thermoformed plaque in accordance with the cold Ross flex test as described herein below; and a modulus of less than or equal to about 10 MPa a when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

Low Processing Temperature Polymeric Compositions

As discussed above, in certain aspects, the low processing temperature polymeric composition comprises one or more first thermoplastic polymers, and can exhibit a melting temperature $T_m$ (or melting point) that is below at least one of the heat deflection temperature $T_{hd}$, the Vicat softening temperature $T_{vs}$, the creep relaxation temperature $T_{cr}$, or the melting temperature $T_m$ of a high processing temperature polymeric composition. In the same or alternative aspects, the low processing temperature polymeric composition can exhibit one or more of a melting temperature $T_m$, a heat deflection temperature $T_{hd}$, a Vicat softening temperature $T_{vs}$, and a creep relaxation temperature $T_{cr}$ that is below one or more of the heat deflection temperature $T_{hd}$, the Vicat softening temperature $T_{vs}$, the creep relaxation temperature $T_{cr}$, or the melting temperature $T_m$ of the high processing temperature polymeric composition. The "creep relaxation temperature $T_{cr}$", the "Vicat softening temperature $T_{vs}$", the "heat deflection temperature $T_{hd}$", and the "melting temperature $T_m$" as used herein refer to the respective testing methods described below in the Property Analysis And Characterization Procedures section.

In certain aspects, the low processing temperature polymeric composition can exhibit a melting temperature $T_m$ (or melting point) that is about 135° C. or less. In one aspect, the low processing temperature polymeric composition can exhibit a melting temperature $T_m$ that is about 125° C. or less. In another aspect, the low processing temperature polymeric composition can exhibit a melting temperature $T_m$ that is about 120° C. or less. In certain aspects, the low processing temperature polymeric composition can exhibit a melting temperature $T_m$ that is from about 80° C. to about 135° C. In various aspects, the low processing temperature polymeric composition can exhibit a melting temperature $T_m$ that is from about 90° C. to about 120° C. In one aspect, the low processing temperature polymeric composition can exhibit a melting temperature $T_m$ that is from about 100° C. to about 120° C.

In one or more aspects, the low processing temperature polymeric composition can exhibit a glass transition temperature $T_g$ of about 50° C. or less. In one aspect, the low processing temperature polymeric composition can exhibit a glass transition temperature $T_g$ of about 25° C. or less. In another aspect, the low processing temperature polymeric composition can exhibit a glass transition temperature $T_g$ of about 0° C. or less. In various aspects, the low processing temperature polymeric composition can exhibit a glass transition temperature $T_g$ of from about –55° C. to about 55° C. In one aspect, the low processing temperature polymeric composition can exhibit a glass transition temperature $T_g$ of from about –50° C. to about 0° C. In certain aspects, the low processing temperature polymeric composition can exhibit a glass transition temperature $T_g$ of from about −30° C. to about −5° C. The term "glass transition temperature $T_g$," as used herein refers to a respective testing method described below in the Property Analysis And Characterization Procedures section.

In various aspects, the low processing temperature polymeric composition can exhibit a melt flow index, using a test weight of 2.16 kilograms, of from about 0.1 grams/10 minutes (min.) to about 60 grams/10 min. In certain aspects, the low processing temperature polymeric composition can exhibit a melt flow index, using a test weight of 2.16 kilograms, of from about 2 grams/10 min. to about 50 grams/10 min. In another aspect, the low processing temperature polymeric composition can exhibit a melt flow index, using a test weight of 2.16 kilograms, of from about 5 grams/10 min to about 40 grams/10 min. In certain aspects, the low processing temperature polymeric composition can exhibit a melt flow index, using a test weight of 2.16 kilograms, of about 25 grams/10 min. The term "melt flow index" as used herein refers to a respective testing method described below in the Property Analysis And Characterization Procedures section.

In one or more aspects, the low processing temperature polymeric composition can exhibit an enthalpy of melting of from about 8 J/g to about 45 J/g. In certain aspects, the low processing temperature polymeric composition can exhibit an enthalpy of melting of from about 10 J/g to about 30 J/g. In one aspect, the low processing temperature polymeric composition can exhibit an enthalpy of melting of from about 15 J/g to about 25 J/g. The term "enthalpy of melting" as used herein refers to a respective testing method described below in the Property Analysis And Characterization Procedures section.

As previously stated, the low processing temperature polymeric composition comprises one or more thermoplastic polymers. In various aspects, the thermoplastic polymers can include one or more polymers selected from the group consisting of polyesters, polyethers, polyamides, polyurethanes and polyolefins. In aspects, the thermoplastic polymers can include one or more polymers selected from the group consisting of polyesters, polyethers, polyamides, polyurethanes, and combinations thereof.

In one or more aspects, the thermoplastic polymers can include one or more polyesters. In such aspects, the polyesters can include polyethylene terephthalate (PET). In certain aspects, the thermoplastic polymers can include one or more polyamides. In such aspects, the polyamides can include poly(hexamethylene adipamide) (nylon 6,6), polycaprolactam (nylon 6), polylaurolactam (nylon 12), and combinations thereof. In aspects, the thermoplastic polymers can include one or more polyurethanes.

In various aspects, the thermoplastic polymers can include one or more co-polymers. In certain aspects, the thermoplastic polymers can include one or more co-polymers selected from the group consisting of co-polyesters, co-polyethers, co-polyamides, co-polyurethanes, and combinations thereof. In one or more aspects, the thermoplastic polymers can include one or more co-polyesters. In certain aspects, the thermoplastic polymers can include one or more co-polyethers. In aspects, the thermoplastic polymers can include one or more co-polyamides. In certain aspects, the thermoplastic polymers can include one or more co-polyurethanes. In one aspect, the thermoplastic polymers can include one or more polyether block amide (PEBA) co-polymers. Exemplary thermoplastic polymers are described in detail below.

High Processing Temperature Polymeric Compositions

In various aspects, the low processing temperature polymeric compositions and the high processing temperature polymeric compositions have differing properties. In particular, when thermoforming a textile that includes the low processing temperature polymeric composition and the high processing temperature polymeric composition, in accordance with the present disclosure, the thermoforming is conducted under conditions such that the high processing temperature polymeric composition does not melt or deform while the low processing temperature polymeric composition does melt. In an aspect, a heat characteristic or thermal transition property of a low processing temperature polymeric composition can be lower than a heat characteristic or thermal transition property of a high processing temperature polymeric composition. In a further aspect, the melting temperature ($T_m$) of a low processing temperature polymeric composition can be lower than at least one of the following properties of the high processing temperature polymeric composition: (1) creep relaxation temperature ($T_{cr}$); (2) a Vicat softening temperature ($T_{vs}$); (3) a heat deflection temperature ($T_{hd}$); or (4) a melting temperature ($T_m$). That is, for example, the low processing temperature polymeric composition can exhibit at least one of a creep relaxation temperature ($T_{cr}$), a Vicat softening temperature ($T_{vs}$), a heat deflection temperature ($T_{hd}$), or a melting temperature ($T_m$) that is below the melting temperature ($T_m$) of a high processing temperature polymeric composition.

In one or more aspects, the high processing temperature polymeric composition exhibits a melting temperature $T_m$ that is at least about 10° C. greater than the melting temperature $T_m$ of a low processing temperature polymeric composition. In another aspect, the high processing temperature polymeric composition exhibits a melting temperature $T_m$ that is at least about 20° C. greater than the melting temperature $T_m$ of a low processing temperature polymeric composition. In certain aspects, the high processing temperature polymeric composition exhibits a melting temperature $T_m$ that is at least about 40° C. greater than the melting temperature $T_m$ of a low processing temperature polymeric composition.

In various aspects, the high processing temperature polymeric composition exhibits a melting temperature $T_m$ from about 140° C. to about 500° C. In one or more aspects, the high processing temperature polymeric composition exhibits a melting temperature $T_m$ from about 140° C. to about 400° C. In certain aspects, the high processing temperature polymeric composition exhibits a melting temperature $T_m$ from about 140° C. to about 300° C.

In certain aspects, the high processing temperature polymeric composition exhibits a creep relaxation temperature $T_{cr}$ that is at least about 10° C. greater than the melting temperature $T_m$ of a low processing temperature polymeric composition. In one or more aspects, the high processing temperature polymeric composition exhibits a creep relaxation temperature $T_{cr}$ that is at least about 30° C. greater than a melting temperature $T_m$ of the low processing temperature polymeric composition. In one aspect, the high processing temperature polymeric composition exhibits a creep relaxation temperature $T_{cr}$ that is at least about 50° C. greater than a melting temperature $T_m$ of the low processing temperature polymeric composition.

In certain aspects, the high processing temperature polymeric composition exhibits a Vicat softening temperature $T_{vs}$ that is at least about 10° C. greater than the melting temperature $T_m$ of a low processing temperature polymeric composition. In one or more aspects, the high processing temperature polymeric composition exhibits a Vicat softening temperature $T_{vs}$ that is at least about 30° C. greater than the melting temperature $T_m$ of a low processing temperature polymeric composition. In one aspect, the high processing temperature polymeric composition exhibits a Vicat softening temperature $T_{vs}$ that is at least about 50° C. greater than the melting temperature $T_m$ of the low processing temperature polymeric composition.

In certain aspects, the high processing temperature polymeric composition exhibits a heat deflection temperature $T_{hd}$ that is at least about 10° C. greater than the melting temperature $T_m$ of a low processing temperature polymeric composition. In various aspects, the high processing temperature polymeric composition exhibits a heat deflection temperature $T_{hd}$ that is at least about 30° C. greater than the melting temperature $T_m$ of a low processing temperature polymeric composition. In one aspect, the high processing temperature polymeric composition exhibits a heat deflection temperature $T_{hd}$ that is at least about 50° C. greater than the melting temperature $T_m$ of a low processing temperature polymeric composition.

As stated above, the high processing temperature polymeric composition comprises one or more second thermoplastic polymers. The one or more second thermoplastic polymers of the high processing temperature polymeric composition can be a thermoplastic polymer as described above as an Exemplary Thermoplastic Polymer, with the understanding that the one or more second thermoplastic polymers differ from the one or more first thermoplastic polymers of the low processing temperature polymeric composition based on melting temperature $T_m$. The high processing temperature polymeric composition includes one or more second thermoplastic polymer having a sufficiently high melting temperature $T_m$ which are present in the composition in a sufficiently high concentration such that the creep relaxation temperature $T_{cr}$, the heat deflection temperature $T_{hd}$, or the Vicat softening temperature $T_{vs}$ of the high processing temperature polymeric composition is greater than a melting temperature $T_m$ of the low melting temperature polymeric composition, In one aspect, the one or more second thermoplastic polymers can include one or more polymers selected from the group consisting of polyesters, polyethers, polyamides, polyurethanes and polyolefins. In certain aspects, the thermoplastic polymers can include one or more thermoplastic polymers selected from the group consisting of thermoplastic polyesters, polyethers, polyamides, and combinations thereof. In aspects, the thermoplastic polymers can include one or more thermoplastic polymers selected from the group consisting of thermoplastic polyesters, polyamides, and combinations thereof.

In various aspects, the thermoplastic polymers can include one or more thermoplastic polyesters. In such aspects, the thermoplastic polyesters can include polyethylene terephthalate (PET). In certain aspects, the thermoplastic polymers can include one or more thermoplastic polyamides. In such aspects, the thermoplastic polyamides can include poly(hexamethylene adipamide) (nylon 6,6), polycaprolactam (nylon 6), polylaurolactam (nylon 12), and combinations thereof. In one aspect, the thermoplastic polymers can include one or more thermoplastic polyurethanes.

In various aspects, the thermoplastic polymers can include one or more co-polymers. In aspects, the thermoplastic polymers can include one or more co-polymers selected from the group consisting of co-polyesters, co-polyethers, co-polyamides, co-polyurethanes, and combinations thereof. In one aspect, the thermoplastic polymers can include one or more co-polyesters. In certain aspects, the thermoplastic polymers can include one or more co-polyethers. In aspects, the thermoplastic polymers can include one or more co-polyamides. In various aspects, the thermoplastic polymers can include one or more co-polyurethanes. In one aspect, the thermoplastic polymers can include one or more polyether block amide (PEBA) co-polymers. In aspects, the copolymers can include relatively harder polymeric segments copolymerized with relatively softer polymeric segments. Exemplary thermoplastic polymers are described in detail below Exemplary Thermoplastic Polymers In various aspects, the thermoplastic polymers disclosed herein can be included in a disclosed low processing temperature polymeric composition, disclosed high processing temperature polymeric composition, a disclosed film, and/or a disclosed shaped material. In aspects, the disclosed fibers can comprise a thermoplastic polymer as disclosed herein. In a further aspect, the disclosed yarns can comprise a thermoplastic polymer as disclosed herein.

In aspects, exemplary thermoplastic polymers include homo-polymers and co-polymers. In certain aspects, the thermoplastic polymer can be a random co-polymer. In one aspect, the thermoplastic polymer can be a block co-polymer. The term "polymer" refers to a polymerized molecule having one or more monomer species, and includes homopolymers and copolymers. The term "copolymer" refers to a polymer having two or more monomer species, and includes terpolymers (i.e., copolymers having three monomer species). For example, the thermoplastic polymer can be a block co-polymer having repeating blocks of polymeric units of the same chemical structure (segments) which are relatively harder (hard segments), and repeating blocks of polymeric segments which are relatively softer (soft segments). In various aspects, in block co-polymers, including block co-polymers having repeating hard segments and soft segments, physical crosslinks can be present within the blocks or between the blocks or both within and between the blocks. Particular examples of hard segments include isocyanate segments and polyamide segments. Particular examples of soft segments include polyether segments and polyester segments. As used herein, the polymeric segment can be referred to as being a particular type of polymeric segment such as, for example, an isocyanate segment, a polyamide segment, a polyether segment, a polyester segment, and the like. It is understood that the chemical structure of the segment is derived from the described chemical structure. For example, an isocyanate segment is a polymerized unit including an isocyanate functional group. When referring to a block of polymeric segments of a particular chemical structure, the block can can contain up to 10 mol % of segments of other chemical structures. For example, as used herein, a polyether segment is understood to include up to 10 mol % of non-polyether segments.

In various aspects, the thermoplastic polymer can include one or more of a thermoplastic polyurethane, a thermoplastic polyamide, a thermoplastic polyester, and a thermoplastic polyolefin. It should be understood that other thermoplastic polymeric materials not specifically described below are also contemplated for use in the low processing temperature polymeric composition and/or the high processing temperature polymeric composition.

Thermoplastic Polyurethanes

In certain aspects, the thermoplastic polymer can be a thermoplastic polyurethane. In aspects, the thermoplastic polyurethane can be a thermoplastic block polyurethane co-polymer.

In such aspects, the thermoplastic block polyurethane co-polymer can be a block copolymer having blocks of hard segments and blocks of soft segments. In aspects, the hard segments can comprise or consist of isocyanate segments. In the same or alternative aspects, the soft segments can comprise or consist of polyether segments, or polyester segments, or a combination of polyether segments and polyester segments. In a particular aspect, the thermoplastic material can comprise or consist essentially of an elastomeric thermoplastic polyurethane having repeating blocks of hard segments and repeating blocks of soft segments.

In aspects, one or more of the thermoplastic polyurethanes can be produced by polymerizing one or more isocyanates with one or more polyols to produce copolymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

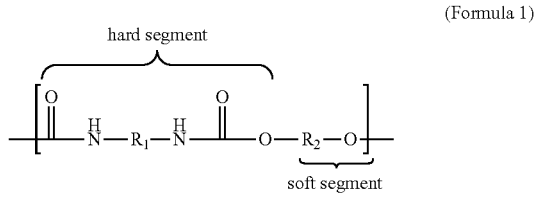

(Formula 1)

In these embodiments, each $R_1$ and $R_2$ independently is an aliphatic or aromatic segment. Optionally, each $R_2$ can be a hydrophilic segment.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Additionally, the isocyanates can also be chain extended with one or more chain extenders to bridge two or more isocyanates. This can produce polyurethane copolymer chains as illustrated below in Formula 2, wherein $R_3$ includes the chain extender. As with each $R_1$ and $R_3$, each $R_3$ independently is an aliphatic or aromatic segment.

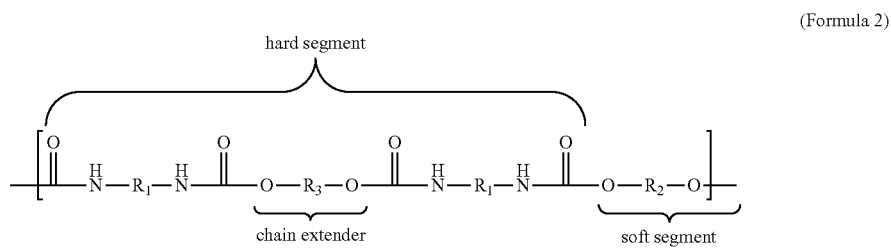

(Formula 2)

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5% to 85% by weight, from 5% to 70% by weight, or from 10% to 50% by weight, based on the total weight of the reactant monomers.

In aliphatic embodiments (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane copolymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate ($T_mDI$), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In aromatic embodiments (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane copolymer chains include toluene diisocyanate (TDI), TDI adducts with trimethyloylpropane ($T_mP$), methylene diphenyl diisocyanate (MDI), xylene diisocyanate (XDI), tetramethylxylylene diisocyanate ($T_mXDI$), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular aspects, the polyurethane copolymer chains are produced from diisocynates including HMDI, TDI, MDI, $H_{12}$ aliphatics, and combinations thereof. For example, the low processing temperature polymeric composition of the present disclosure can comprise one or more polyurethane copolymer chains are produced from diisocynates including HMDI, TDI, MDI, $H_{12}$ aliphatics, and combinations thereof.

In certain aspects, polyurethane chains which are crosslinked (e.g., partially crosslinked polyurethane copolymers which retain thermoplastic properties) or which can be crosslinked, can be used in accordance with the present disclosure. It is possible to produce crosslinked or crosslinkable polyurethane copolymer chains using multi-functional isocyantes. Examples of suitable triisocyanates for producing the polyurethane copolymer chains include TDI, HDI, and IPDI adducts with trimethyloylpropane ($T_mP$), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane copolymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis (2-hydroxyethyl) ethers of hydroquinone and resorcinol, xylene-a,a-diols, bis(2-hydroxyethyl) ethers of xylene-a,a-diols, and combinations thereof.

Segment $R_2$ in Formula 1 and 2 can include a polyether group, a polyester group, a polycarbonate group, an aliphatic group, or an aromatic group. Each segment $R_2$ can be present in an amount of 5% to 85% by weight, from 5% to 70% by weight, or from 10% to 50% by weight, based on the total weight of the reactant monomers.

Optionally, in some examples, the thermoplastic polyurethane of the present disclosure can be a thermoplastic polyurethane having relatively high degree of hydrophilicity. For example, the thermoplastic polyurethane can be a thermoplastic polyurethane in which segment $R_2$ in Formulas 1 and 2 includes a polyether group, a polyester group, a polycarbonate group, an aliphatic group, or an aromatic group, wherein the aliphatic group or aromatic group is substituted with one or more pendant group having relatively greater degree of hydrophilicity (i.e., relatively "hydrophilic" groups). The relatively "hydrophilic" groups can be selected from the group consisting of hydroxyl, polyether, polyester, polylactone (e.g., polyvinylpyrrolidone (PVP)), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In such examples, this relatively hydrophilic group or segment of $R_2$ can form portions of the polyurethane backbone, or can be grafted to the polyurethane backbone as a pendant group. In some examples, the pendant hydrophilic group or segment can be bonded to the aliphatic group or aromatic group through a linker. Each segment $R_2$ can be present in an amount of 5% to 85% by weight, from 5% to 70% by weight, or from 10% to 50% by weight, based on the total weight of the reactant monomers.

In some examples, at least one $R_2$ segment of the thermoplastic polyurethane includes a polyether segment (i.e., a segment having one or more ether groups). Suitable polyethers include, but are not limited to polyethylene oxide (PEO), polypropylene oxide (PPO), polytetrahydrofuran (PTHF), polytetramethylene oxide (P $T_mO$), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the thermoplastic polyurethane, the at least one $R_2$ segment includes a polyester segment. The polyester segment can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly (hexamethylene carbonate) glycol, poly(propylene carbonate) glycol, poly(tetramethylene carbonate)glycol, and poly (nonanemethylene carbonate) glycol. Suitable polyesters can include, for example, polyethylene adipate (PEA), poly (1,4-butylene adipate), poly(tetramethylene adipate), poly (hexamethylene adipate), polycaprolactone, polyhexamethylene carbonate, poly(propylene carbonate), poly (tetramethylene carbonate), poly(nonanemethylene carbonate), and combinations thereof.

In various of the thermoplastic polyurethane, at least one $R_2$ segment includes a polycarbonate segment. The polycarbonate segment can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various examples of the thermoplastic polyurethane, at least one $R_2$ segment can include an aliphatic group substituted with one or more groups having a relatively greater degree of hydrophilicity, i.e., a relatively "hydrophilic" group. The one or more relatively hydrophilic group can be selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In some examples, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term $C_n$ means the alkylene group has "n" carbon atoms. For example, $C_{1-6}$ alkylene refers to an alkylene group having, e.g., 1, 2, 3, 4, 5, or 6 carbon atoms. The term "alkenylene" refers to a bivalent hydrocarbon having at least one double bond.

In some cases, at least one $R_2$ segment includes an aromatic group substituted with one or more relativelyhydrophilic group. The one or more hydrophilicgroup can be selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterionic (e.g., a betaine, such as poly(carboxybetaine (pCB) and ammonium phosphonate groups such as phosphatidylcholine), and combinations thereof. Suitable aromatic groups include, but are not limited to, phenyl, naphthyl, tetrahydronaphthyl, phenanthrenyl, biphenylenyl, indanyl, indenyl, anthracenyl, fluorenylpyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups, and combinations thereof.

In various aspects, the aliphatic and aromatic groups can be substituted with one or more pendant relatively hydrophilic and/or charged groups. In some aspects, the pendant hydrophilic group includes one or more (e.g., 2, 3, 4, 5, 6, 7, 8, 9, 10 or more) hydroxyl groups. In various aspects, the pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups.

In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly(carboxybetaine (pCB) and ammonium phosphonate groups such as a phosphatidylcholine group).

In some aspects, the $R_2$ segment can include charged groups that are capable of binding to a counterion to ionically crosslink the thermoplastic polymer and form ionomers. In these aspects, for example, $R_2$ is an aliphatic or aromatic group having pendant amino, carboxylate, sulfonate, phosphate, ammonium, or zwitterionic groups, or combinations thereof.

In various cases when a pendant hydrophilic group is present, the pendant "hydrophilic" group is at least one polyether group, such as two polyether groups. In other cases, the pendant hydrophilic group is at least one polyester. In various cases, the pendant hydrophilic group is polylactone group (e.g., polyvinylpyrrolidone). Each carbon atom of the pendant hydrophilic group can optionally be substituted with, e.g., a $C_{1-6}$ alkyl group. In some of these aspects, the aliphatic and aromatic groups can be graft polymeric groups, wherein the pendant groups are homopolymeric groups (e.g., polyether groups, polyester groups, polyvinylpyrrolidone groups).

In some aspects, the pendant hydrophilic group is a polyether group (e.g., a polyethylene oxide group, a polyethylene glycol group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. In some aspects, the linker can be 4,4'-diphenylmethane diisocyanate (MDI), as shown below.

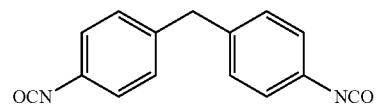

(Formula 3)

In some exemplary aspects, the pendant hydrophilic group is a polyethylene oxide group and the linking group is MDI, as shown below.

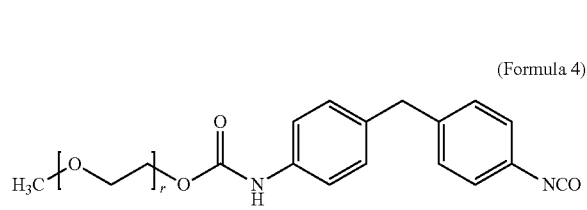

(Formula 4)

In some cases, the pendant hydrophilic group is functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

(Formula 5)

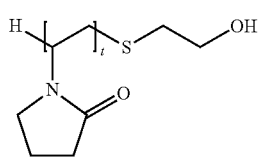

In some of the aspects disclosed herein, at least one $R_2$ segment includes a polytetramethylene oxide group. In other exemplary aspects, at least one $R_2$ segment can include an aliphatic polyol group functionalized with a polyethylene oxide group or polyvinylpyrrolidone group, such as the polyols described in E.P. Patent No. 2 462 908. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

alkenyl, aryl, or polyether; and each $R_5$ independently is $C_{1-10}$ alkylene, polyether, or polyurethane.

In some aspects, each $R_4$ independently is a H, $C_{1-10}$ alkyl, $C_{2-10}$ alkenyl, $C_{1-6}$ aryl, polyethylene, polypropylene, or polybutylene group. For example, each $R_4$ can independently be selected from the group consisting of methyl, ethyl, n-propyl, isopropyl, n-butyl, isobutyl, s-butyl, t-butyl, ethenyl, propenyl, phenyl, and polyethylene groups.

In various aspects, each $R^5$ independently includes a $C_{1-10}$ alkylene group (e.g., a methylene, ethylene, propylene, butylene, pentylene, hexylene, heptylene, octylene, nonylene, or decylene group). In other cases, each $R^5$ is a polyether group (e.g., a polyethylene, polypropylene, or polybutylene group). In various cases, each R5 is a polyurethane group.

Optionally, in some aspects, the polyurethane can include an at least partially crosslinked polymeric network that includes copolymer chains that are derivatives of polyurethane. In such cases, it is understood that the level of crosslinking is such that the polyurethane retains thermo- (Formula 6)

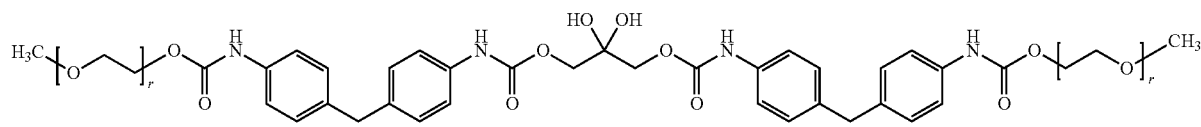

(Formula 7)

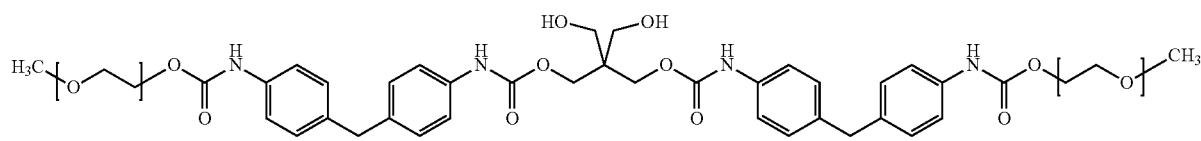

(Formula 8)

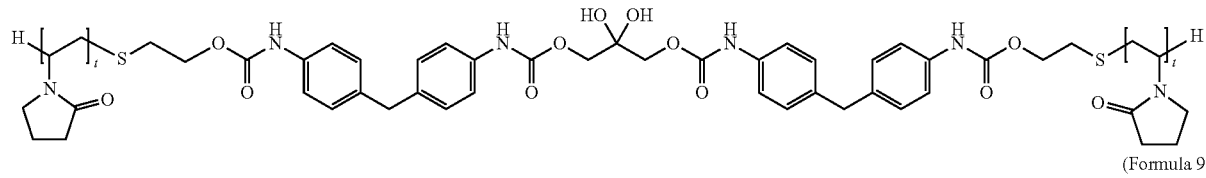

(Formula 9)

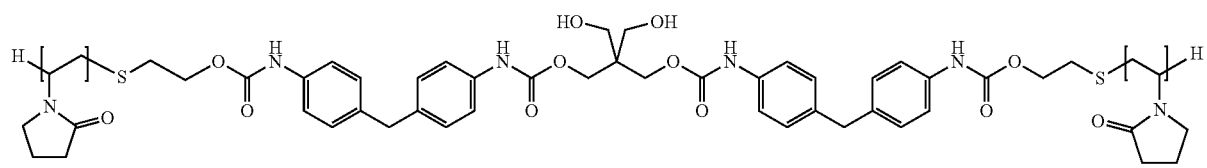

In various cases, at least one $R_2$ is a polysiloxane, In these cases, $R_2$ can be derived from a silicone monomer of Formula 10, such as a silicone monomer disclosed in U.S. Pat. No. 5,969,076, which is hereby incorporated by reference:

(Formula 10)

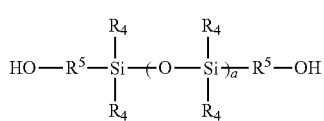

wherein: a is 1 to 10 or larger (e.g., 1, 2, 3, 4, 5, 6, 7, 8, 9, or 10); each $R_4$ independently is hydrogen, $C_{1-18}$ alkyl, $C_{2-18}$ plastic properties (i.e., the crosslinked thermoplastic polyurethane can be softened or melted and re-solidified under the processing conditions described herein). This crosslinked polymeric network can be produced by polymerizing one or more isocyanates with one or more polyamino compounds, polysulfhydryl compounds, or combinations thereof, as shown in Formulas 11 and 12, below:

(Formula 11)

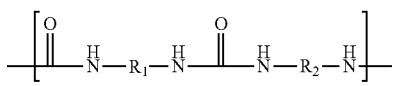

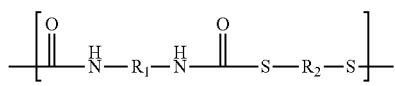

(Formula 12)

wherein the variables are as described above. Additionally, the isocyanates can also be chain extended with one or more polyamino or polythiol chain extenders to bridge two or more isocyanates, such as previously described for the polyurethanes of Formula 2.

In some aspects, the thermoplastic polyurethane is composed of MDI, P $T_mO$, and 1,4-butylene glycol, as described in U.S. Pat. No. 4,523,005. For example, the low processing temperature polymeric composition can comprise one or more thermoplastic polyurethane composed of thermoplastic polyurethane is composed of MDI, P $T_mO$, and 1,4-butylene glycol.

As described herein, the thermoplastic polyurethane can be physically crosslinked through e.g., nonpolar or polar interactions between the urethane or carbamate groups on the polymers (the hard segments. In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment. In some examples, the thermoplastic polyurethane having physically crosslinked hard and soft segments can be a hydrophilic thermoplastic polyurethane (i.e., a thermoplastic polyurethane including hydrophilic groups as disclosed herein).

Commercially available thermoplastic polyurethanes having greater hydrophilicity suitable for the present use include, but are not limited to those under the tradename "TECOPHILIC", such as TG-500, TG-2000, SP-80A-150, SP-93A-100, SP-60D-60 (Lubrizol, Countryside, Ill.), "ESTANE" (e.g., ALR G 500, or 58213; Lubrizol, Countryside, Ill.).

In various aspects, the thermoplastic polyurethane can be partially covalently crosslinked, as previously described herein.

Thermoplastic Polyamides

In various aspects, the disclosed materials, such as yarns, fibers, or a combination of yarns and fibers, can comprise one or more thermoplastic polymer comprising a thermoplastic polyamide. The thermoplastic polyamide can be a polyamide homopolymer having repeating polyamide segments of the same chemical structure. Alternatively, the polyamide can comprise a number of polyamide segments having different polyamide chemical structures (e.g., polyamide 6 segments, polyamide 11 segments, polyamide 12 segments, polyamide 66 segments, etc.).

The polyamide segments having different chemical structure can be arranged randomly, or can be arranged as repeating blocks.

In aspects, the thermoplastic polymers can be a block co-polyamide. For example, the block co-polyamide can have repeating blocks of hard segments, and repeating blocks soft segments. The hard segments can comprise polyamide segments, and the soft segments can comprise non-polyamide segments. The thermoplastic polymers can be an elastomeric thermoplastic co-polyamide comprising or consisting of block co-polyamides having repeating blocks of hard segments and repeating blocks of soft segments. In block co-polymers, including block co-polymers having repeating hard segments and soft segments, physical cross-links can be present within the blocks or between the blocks or both within and between the blocks.

The thermoplastic polyamide can be a co-polyamide (i.e., a co-polymer including polyamide segments and non-polyamide segments). The polyamide segments of the co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating blocks. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The thermoplastic copolyamide can be formed from the polycodensation of a polyamide oligomer or prepolymer with a second oligomer prepolymer to form a block copolyamide (i.e., a block co-polymer including polyamide segments. Optionally, the second prepolymer can be a hydrophilic prepolymer.

In some aspects, the thermoplastic polyamide itself, or the polyamide segment of the thermoplastic copolyamide can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group.

Each polyamide segment of the thermoplastic polyamide can be the same or different.

In some aspects, the thermoplastic polyamide or the polyamide segment of the thermopolastic copolyamide is derived from the polycondensation of lactams and/or amino acids, and includes an amide segment having a structure shown in Formula 13, below, wherein $R_6$ is the segment of the polyamide derived from the lactam or amino acid.

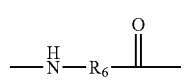

(Formula 13)

In some aspects, $R_6$ is derived from a lactam. In some cases, $R_6$ is derived from a $C_{3-20}$ lactam, or a $C_{4-15}$ lactam, or a $C_{6-12}$ lactam. For example, $R_6$ can be derived from caprolactam or laurolactam. In some cases, $R_6$ is derived from one or more amino acids. In various cases, $R_6$ is derived from a $C_{4-25}$ amino acid, or a $C_{5-20}$ amino acid, or a $C_{8-15}$ amino acid. For example, $R_6$ can be derived from 12-aminolauric acid or 11-aminoundecanoic acid.

Optionally, in order to increase the relative degree of hydrophilicity of the thermoplastic copolyamide, Formula 13 can include a polyamide-polyether block copolymer segment, as shown below:

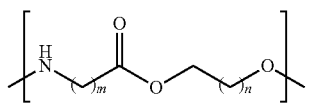
(Formula 14)

wherein m is 3-20, and n is 1-8. In some exemplary aspects, m is 4-15, or 6-12 (e.g., 6, 7, 8, 9, 10, 11, or 12), and n is 1, 2, or 3. For example, m can be 11 or 12, and n can be 1 or 3. In various aspects, the thermoplastic polyamide or the polyamide segment of the thermoplastic co-polyamide is derived from the condensation of diamino compounds with dicarboxylic acids, or activated forms thereof, and includes an amide segment having a structure shown in Formula 15, below, wherein $R_7$ is the segment of the polyamide derived from the diamino compound, $R_8$ is the segment derived from the dicarboxylic acid compound:

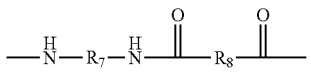
(Formula 15)

In some aspects, $R_7$ is derived from a diamino compound that includes an aliphatic group having $C_{4-15}$ carbon atoms, or $C_{5-10}$ carbon atoms, or $C_{6-9}$ carbon atoms. In some aspects, the diamino compound includes an aromatic group, such as phenyl, naphthyl, xylyl, and tolyl. Suitable diamino compounds from which $R_7$ can be derived include, but are not limited to, hexamethylene diamine (HMD), tetramethylene diamine, trimethyl hexamethylene diamine ($T_mD$), m-xylylene diamine (MXD), and 1,5-pentamine diamine. In various aspects, $R_8$ is derived from a dicarboxylic acid or activated form thereof, includes an aliphatic group having $C_{4-15}$ carbon atoms, or $C_{5-12}$ carbon atoms, or $C_{6-10}$ carbon atoms. In some cases, the dicarboxylic acid or activated form thereof from which $R_8$ can be derived includes an aromatic group, such as phenyl, naphthyl, xylyl, and tolyl groups. Suitable carboxylic acids or activated forms thereof from which $R_8$ can be derived include, but are not limited to adipic acid, sebacic acid, terephthalic acid, and isophthalic acid. In some aspects, the copolymer chains are substantially free of aromatic groups.

In some aspects, each polyamide segment of the thermoplastic polyamide (including the thermoplastic copolyamide) is independently derived from a polyamide prepolymer selected from the group consisting of 12-aminolauric acid, caprolactam, hexamethylene diamine and adipic acid.

In some aspects, the thermoplastic polyamide comprises or consists of a thermoplastic poly(ether-block-amide). The thermoplastic poly(ether-block-amide) can be formed from the polycondensation of a carboxylic acid terminated polyamide prepolymer and a hydroxyl terminated polyether prepolymer to form a thermoplastic poly(ether-block-amide), as shown in Formula 16:

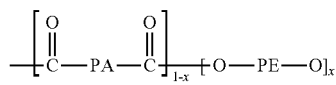
(Formula 16)

In various aspects, a disclosed poly(ether block amide) polymer is prepared by polycondensation of polyamide blocks containing reactive ends with polyether blocks containing reactive ends. Examples include, but are not limited to: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the thermoplastic poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (P $T_m$O), and combinations thereof.

Disclosed poly(ether block amide) polymers include those comprising polyamide blocks comprising dicarboxylic chain ends derived from the condensation of α, ω-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. In various aspects, the copolymer comprises polyamide blocks comprising polyamide 12 or of polyamide 6.

Disclosed poly(ether block amide) polymers include those comprising polyamide blocks derived from the condensation of one or more α, ω-aminocarboxylic acids and/or of one or more lactams containing from 6 to 12 carbon atoms in the presence of a dicarboxylic acid containing from 4 to 12 carbon atoms, and are of low mass, i.e., they have an $M_n$ of from 400 to 1000. In poly(ether block amide) polymers of this type, a α, ω-aminocarboxylic acid such as aminoundecanoic acid or aminododecanoic acid can be used; a dicarboxylic acids such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH can be used; and a lactam such as caprolactam and lauryllactam can be used; or various combinations of any of the foregoing. In various aspects, the copolymer comprises polyamide blocks obtained by condensation of lauryllactam in the presence of adipic acid or dodecanedioic acid and with a $M_n$ of 750 have a melting point of 127-130° C. In a further aspect, the various constituents of the polyamide block and their proportion can be chosen in order to obtain a melting point of less than 150° C. and advantageously between 90° C. and 135° C.

Disclosed poly(ether block amide) polymers include those comprising polyamide blocks derived from the condensation of at least one α, ω-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine such as an aliphatic diamine containing from 6 to 12 atoms and can be arylic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM) can be used.

In various aspects, the constituents of the polyamide block and their proportion can be chosen in order to obtain a melting point of less than 150° C. and advantageously between 90° C. and 135° C. In a further aspect, the various constituents of the polyamide block and their proportion can be chosen in order to obtain a melting point of less than 150° C. and advantageously between 90° C. and 135° C.

In an aspect, the number average molar mass of the polyamide blocks can be from about 300 g/mol and about 15,000 g/mol, from about 500 g/mol and about 10,000 g/mol, from about 500 g/mol and about 6,000 g/mol, from about 500 g/mol to 5,000 g/mol, and from about 600 g/mol and about 5,000 g/mol. In a further aspect, the number average molecular weight of the polyether block can range from about 100 g/mol to about 6,000 g/mol, from about 400 g/mol to 3000 g/mol and from about 200 g/mol to about 3,000 g/mol. In a still further aspect, the polyether (PE) content (x) of the poly(ether block amide) polymer can be from about 0.05 to about 0.8 (i.e., from about 5 mol % to about 80 mol %). In a yet further aspect, the polyether blocks can be present from about 10 wt % to about 50 wt %, from about 20 wt % to about 40 wt %, and from about 30 wt % to about 40 wt %. The polyamide blocks can be present from about 50 wt % to about 90 wt %, from about 60 wt % to about 80 wt %, and from about 70 wt % to about 90 wt %.

In an aspect, the polyether blocks can contain units other than ethylene oxide units, such as, for example, propylene oxide or polytetrahydrofuran (which leads to polytetramethylene glycol sequences). It is also possible to use simultaneously PEG blocks, i.e. those consisting of ethylene oxide units, PPG blocks, i.e. those consisting of propylene oxide units, and P $T_mG$ blocks, i.e. those consisting of tetramethylene glycol units, also known as polytetrahydrofuran. PPG or P $T_mG$ blocks are advantageously used. The amount of polyether blocks in these copolymers containing polyamide and polyether blocks can be from about 10 wt % to about 50 wt % of the copolymer and from about 35 wt % to about 50 wt %.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place between 180 and 300° C., preferably 200 to 290° C., and the pressure in the reactor is set between 5 and 30 bar and maintained for approximately 2 to 3 hours. The pressure in the reactor is slowly reduced to a $T_m$ospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. In an aspect, the polyether is added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 mbar (5000 Pa) at a temperature such that the reactants and the copolymers obtained are in the molten state. By way of example, this temperature can be between 100 and 400° C. and usually between 200 and 250° C. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. Advantageously, the catalyst is a derivative of a metal (M) chosen from the group formed by titanium, zirconium and hafnium.

In an aspect, the derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

In a further aspect, the catalyst can comprise a salt of the metal (M), particularly the salt of (M) and of an organic acid and the complex salts of the oxide of (M) and/or the hydroxide of (M) and an organic acid. In a still further aspect, the organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. In some aspects, M is zirconium and such salts are called zirconyl salts, e.g., the commercially available product sold under the name zirconyl acetate.

In an aspect, the weight proportion of catalyst varies from about 0.01 to about 5% of the weight of the mixture of the dicarboxylic polyamide with the polyetherdiol and the polyol. In a further aspect, the weight proportion of catalyst varies from about 0.05 to about 2% of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of very variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is between 5 and 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. In one aspect, it can be useful to blend a block copolymer having a high level of polyamide groups with a block copolymer having a higher level of polyether blocks, to produce a blend having an average level of polyether blocks of about 20 to 40 wt % of the total blend of poly(amid-block-ether) copolymers, and preferably about 30 to 35 wt %. In a further aspect, the copolymer comprises a blend of two different poly(ether-block-amide)s comprising at least one block copolymer having a level of polyether blocks below about 35 wt %, and a second poly(ether-block-amide) having at least about 45 wt % of polyether blocks.

In various aspects, the thermoplastic polymer is a polyamide or a poly(ether-block-amide) with a melting temperature ($T_m$) from about 90° C. to about 120° C. when determined in accordance with AS $T_m$ D3418-97 as described herein below. In a further aspect, the thermoplastic polymer is a polyamide or a poly(ether-block-amide) with a melting temperature ($T_m$) from about 93° C. to about 99° C. when determined in accordance with AS $T_m$ D3418-97 as described herein below. In a still further aspect, the thermoplastic polymer is a polyamide or a poly(ether-block-amide) with a melting temperature ($T_m$) from about 112° C. to about 118° C. when determined in accordance with AS $T_m$ D3418-97 as described herein below. In some aspects, the thermoplastic polymer is a polyamide or a poly(ether-block-amide) with a melting temperature of about 90° C., about 91° C., about 92° C., about 93° C., about 94° C., about 95° C., about 96° C., about 97° C., about 98° C., about 99° C., about 100° C., about 101° C., about 102° C., about 103° C., about 104° C., about 105° C., about 106° C., about 107° C., about 108° C., about 109° C., about 110° C., about 111° C., about 112° C., about 113° C., about 114° C., about 115° C., about 116° C., about 117° C., about 118° C., about 119° C., about 120° C., any range of melting temperature ($T_m$) values encompassed by any of the foregoing values, or any combination of the foregoing melting temperature ($T_m$) values, when determined in accordance with AS $T_m$ D3418-97 as described herein below.

In various aspects, the thermoplastic polymer is a polyamide or a poly(ether-block-amide) with a glass transition temperature ($T_g$) from about −20° C. to about 30° C. when determined in accordance with AS $T_m$ D3418-97 as described herein below. In a further aspect, the thermoplastic polymer is a polyamide or a poly(ether-block-amide) with a glass transition temperature ($T_g$) from about −13° C. to about −7° C. when determined in accordance with AS $T_m$ D3418-97 as described herein below. In a still further aspect, the thermoplastic polymer is a polyamide or a poly(ether-block-amide) with a glass transition temperature ($T_g$) from about 17° C. to about 23° C. when determined in accordance with AS $T_m$ D3418-97 as described herein below. In some aspects, the thermoplastic polymer is a polyamide or a poly(ether-block-amide) with a glass transition temperature ($T_g$) of about −20° C., about −19° C., about −18° C., about −17° C., about −16° C., about −15° C., about −14° C., about −13° C., about −12° C., about −10° C., about −9° C., about −8° C., about −7° C., about −6° C., about −5° C., about −4° C., about −3° C., about −2° C., about −1° C., about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., any range of glass transition temperature values encompassed by any of the foregoing values, or any combination of the foregoing glass transition temperature values, when determined in accordance with AS $T_m$ D3418-97 as described herein below.

In various aspects, the thermoplastic polymer is a polyamide or a poly(ether-block-amide) can be spun into a yarn when tested in a melt extruder.

In various aspects, the thermoplastic polymer is a polyamide or a poly(ether-block-amide) with a melt flow index from about 10 cm³/10 min to about 30 cm³/10 min when tested in accordance with AS $T_m$ D1238-13 as described herein below at 160° C. using a weight of 2.16 kg. In a further aspect, the thermoplastic polymer is a polyamide or a poly(ether-block-amide) with a melt flow index from about 22 cm³/10 min to about 28 cm³/10 min when tested in accordance with AS $T_m$ D1238-13 as described herein below at 160° C. using a weight of 2.16 kg. In some aspects, the thermoplastic polymer is a polyamide or a poly(ether-block-amide) with a melt flow index of about 10 cm³/10 min, about 11 cm³/10 min, about 12 cm³/10 min, about 13 cm³/10 min, about 14 cm³/10 min, about 15 cm³/10 min, about 16 cm³/10 min, about 17 cm³/10 min, of about 18 cm³/10 min, about 19 cm³/10 min, of about 20 cm³/10 min, about 21 cm³/10 min, about 22 cm³/10 min, about 23 cm³/10 min, about 24 cm³/10 min, about 25 cm³/10 min, about 26 cm³/10 min, about 27 cm³/10 min, of about 28 cm³/10 min, about 29 cm³/10 min, of about 30 cm³/10 min, any range of melt flow index values encompassed by any of the foregoing values, or any combination of the foregoing melt flow index values, when determined in accordance with AS $T_m$ D1238-13 as described herein below at 160° C. using a weight of 2.16 kg.

In various aspects, the thermoplastic polymer is a polyamide or a poly(ether-block-amide) with a cold Ross flex test result of about 120,000 to about 180,000 when tested on a thermoformed plaque of the polyamide or the poly(ether-block-amide) in accordance with the cold Ross flex test as described herein below. In a further aspect, the thermoplastic polymer is a polyamide or a poly(ether-block-amide) with a cold Ross flex test result of about 140,000 to about 160,000 when tested on a thermoformed plaque of the polyamide or the poly(ether-block-amide) in accordance with the cold Ross flex test as described herein below. In a still further aspect, the thermoplastic polymer is a polyamide or a poly(ether-block-amide) with a cold Ross flex test result of about 130,000 to about 170,000 when tested on a thermoformed plaque of the polyamide or the poly(ether-block-amide) in accordance with the cold Ross flex test as described herein below. In some aspects, the thermoplastic polymer is a polyamide or a poly(ether-block-amide) with a cold Ross flex test result of about 120,000, about 125,000, about 130,000, about 135,000, about 140,000, about 145,000, about 150,000, about 155,000, about 160,000, about 165,000, about 170,000, about 175,000, about 180,000, any range of cold Ross flex test values encompassed by any of the foregoing values, or any combination of the foregoing cold Ross flex test values, when tested on a thermoformed plaque of the polyamide or the poly(ether-block-amide) in accordance with the cold Ross flex test as described herein below.

In various aspects, the thermoplastic polymer is a polyamide or a poly(ether-block-amide) with a modulus from about 5 MPa to about 100 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below. In a further aspect, the thermoplastic polymer is a polyamide or a poly(ether-block-amide) with a modulus from about 20 MPa to about 80 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below. In some aspects, the thermoplastic polymer is a polyamide or a poly(ether-block-amide) with a modulus of about 5 MPa, about 10 MPa, about 15 MPa, about 20 MPa, about 25 MPa, about 30 MPa, about 35 MPa, about 40 MPa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, any range of modulus values encompassed by any of the foregoing values, or any combination of the foregoing modulus values, when tested on a thermoformed plaque of the polyamide or the poly(ether-block-amide) in accordance with AS $T_m$ D412-98 Standard Test Methods for Vulcanized Rubber and Thermoplastic Rubbers and Thermoplastic Elastomers-Tension with modifications described herein below.

In various aspects, the thermoplastic polymer is a polyamide or a poly(ether-block-amide) with a melting temperature ($T_m$) of about 115° C. when determined in accordance with AS $T_m$ D3418-97 as described herein below; a glass transition temperature ($T_g$) of about −10° C. when determined in accordance with AS $T_m$ D3418-97 as described herein below; a melt flow index of about 25 cm³/10 min when tested in accordance with AS $T_m$ D1238-13 as described herein below at 160° C. using a weight of 2.16 kg; a cold Ross flex test result of about 150,000 when tested on a thermoformed plaque in accordance with the cold Ross flex test as described herein below; and a modulus from about 25 MPa to about 70 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

In various aspects, the thermoplastic polymer is a polyamide or a poly(ether-block-amide) with a melting temperature ($T_m$) of about 96° C. when determined in accordance with AS $T_m$ D3418-97 as described herein below; a glass transition temperature ($T_g$) of about 20° C. when determined in accordance with AS $T_m$ D3418-97 as described herein below; a cold Ross flex test result of about 150,000 when tested on a thermoformed plaque in accordance with the cold Ross flex test as described herein below; and a modulus of less than or equal to about 10 MPa a when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

In various aspects, the thermoplastic polymer is a polyamide or a poly(ether-block-amide) is a mixture of a first polyamide or a poly(ether-block-amide) with a melting temperature ($T_m$) of about 115° C. when determined in accordance with AS $T_m$ D3418-97 as described herein below; a glass transition temperature ($T_g$) of about −10° C. when determined in accordance with AS $T_m$ D3418-97 as described herein below; a melt flow index of about 25 cm³/10 min when tested in accordance with AS $T_m$ D1238-13 as described herein below at 160° C. using a weight of 2.16 kg; a cold Ross flex test result of about 150,000 when tested on a thermoformed plaque in accordance with the cold Ross flex test as described herein below; and a modulus from about 25 MPa to about 70 MPa when determined on a thermoformed plaque in accordance with AS $T_m$ D412-98 Standard Test Methods for Vulcanized Rubber and Thermoplastic Rubbers and Thermoplastic Elastomers-Tension with modifications described herein below; and a second polyamide or a poly(ether-block-amide) with a melting temperature ($T_m$) of about 96° C. when determined in accordance with AS $T_m$ D3418-97 as described herein below; a glass transition temperature ($T_g$) of about 20° C. when determined in accordance with AS $T_m$ D3418-97 as described herein below; a cold Ross flex test result of about 150,000 when tested on a thermoformed plaque in accordance with the cold Ross flex test as described herein below; and a modulus of less than or equal to about 10 MPa a when determined on a thermoformed plaque in accordance with AS $T_m$ D412-98 Standard Test Methods for Vulcanized Rubber and Thermoplastic Rubbers and Thermoplastic Elastomers-Tension with modifications described herein below.

Exemplary commercially available copolymers include, but are not limited to, those available under the tradenames of VESTAMID® (Evonik Industries); PELATAMID® (Arkema), e.g., product code H2694; PEBAX® (Arkema), e.g., product code "PEBAX MH1657" and "PEBAX MV1074"; PEBAX® RNEW (Arkema); GRILAMID® (EMS-Chemie AG), or also to other similar materials produced by various other suppliers.

In some examples, the thermoplastic polyamide is physically crosslinked through, e.g., nonpolar or polar interactions between the polyamide groups of the polymers. In examples where the thermoplastic polyamide is a thermoplastic copolyamide, the thermoplastic copolyamide can be physically crosslinked through interactions between the polyamide groups, an optionally by interactions between the copolymer groups. When the thermoplastic copolyamide is physically crosslinked thorough interactions between the polyamide groups, the polyamide segments can form the portion of the polymer referred to as the "hard segment", and copolymer segments can form the portion of the polymer referred to as the "soft segment". For example, when the thermoplastic copolyamide is a thermoplastic poly(ether-block-amide), the polyamide segments form the hard segment portion of the polymer, and polyether segments can form the soft segment portion of the polymer. Therefore, in some examples, the thermoplastic polymer can include a physically crosslinked polymeric network having one or more polymer chains with amide linkages.

In some aspects, the polyamide segment of the thermoplastic co-polyamide includes polyamide-11 or polyamide-12 and the polyether segment is a segment selected from the group consisting of polyethylene oxide, polypropylene oxide, and polytetramethylene oxide segments, and combinations thereof.

Optionally, the thermoplastic polyamide can be partially covalently crosslinked, as previously described herein. In such cases, it is to be understood that the degree of crosslinking present in the thermoplastic polyamide is such that, when it is thermally processed in the form of a yarn or fiber to form the articles of footwear of the present disclosure, the partially covalently crosslinked thermoplastic polyamide retains sufficient thermoplastic character that the partially covalently crosslinked thermoplastic polyamide is softened or melted during the processing and re-solidifies.

Thermoplastic Polyesters

In aspects, the thermoplastic polymers can comprise a thermoplastic polyester. The thermoplastic polyester can be formed by reaction of one or more carboxylic acids, or its ester-forming derivatives, with one or more bivalent or multivalent aliphatic, alicyclic, aromatic or araliphatic alcohols or a bisphenol. The thermoplastic polyester can be a polyester homopolymer having repeating polyester segments of the same chemical structure. Alternatively, the polyester can comprise a number of polyester segments having different polyester chemical structures (e.g., polyglycolic acid segments, polylactic acid segments, polycaprolactone segments, polyhydroxyalkanoate segments, polyhydroxybutyrate segments, etc.). The polyester segments having different chemical structure can be arranged randomly, or can be arranged as repeating blocks.

Exemplary carboxylic acids that that can be used to prepare a thermoplastic polyester include, but are not limited to, adipic acid, pimelic acid, suberic acid, azelaic acid, sebacic acid, nonane dicarboxylic acid, decane dicarboxylic acid, undecane dicarboxylic acid, terephthalic acid, isophthalic acid, alkyl-substituted or halogenated terephthalic acid, alkyl-substituted or halogenated isophthalic acid, nitroterephthalic acid, 4,4'-diphenyl ether dicarboxylic acid, 4,4'-diphenyl thioether dicarboxylic acid, 4,4'-diphenyl sulfonedicarboxylic acid, 4,4'-diphenyl alkylenedicarboxylic acid, naphthalene-2,6-dicarboxylic acid, cyclohexane-1,4-dicarboxylic acid and cyclohexane-1,3-dicarboxylic acid. Exemplary diols or phenols suitable for the preparation of the thermoplastic polyester include, but are not limited to, ethylene glycol, diethylene glycol, 1,3-propanediol, 1,4-butanediol, 1,6-hexanediol, 1,8-octanediol, 1,10-decanediol, 1,2-propanediol, 2,2-dimethyl-1,3-propanediol, 2,2,4-trimethylhexanediol, p-xylenediol, 1,4-cyclohexanediol, 1,4-cyclohexane dimethanol, and bis-phenol A.

In some aspects, the thermoplastic polyester is a polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), a liquid crystal polyester, or a blend or mixture of two or more of the foregoing.

The thermoplastic polyester can be a co-polyester (i.e., a co-polymer including polyester segments and non-polyester segments). The co-polyester can be an aliphatic co-polyester (i.e., a co-polyester in which both the polyester segments and the non-polyester segments are aliphatic). Alternatively, the co-polyester can include aromatic segments. The polyester segments of the co-polyester can comprise or consist of polyglycolic acid segments, polylactic acid segments, polycaprolactone segments, polyhydroxyalkanoate segments, polyhydroxybutyrate segments, or any combination thereof. The polyester segments of the co-polyester can be arranged randomly, or can be arranged as repeating blocks.

For example, the thermoplastic polyester can be a block co-polyester having repeating blocks of polymeric units of the same chemical structure (segments) which are relatively harder (hard segments), and repeating blocks of polymeric segments which are relatively softer (soft segments). In block co-polyesters, including block co-polyesters having repeating hard segments and soft segments, physical cross-links can be present within the blocks or between the blocks or both within and between the blocks. In a particular example, the thermoplastic material can comprise or consist essentially of an elastomeric thermoplastic co-polyester having repeating blocks of hard segments and repeating blocks of soft segments.

The non-polyester segments of the co-polyester can comprise or consist of polyether segments, polyamide segments, or both polyether segments and polyamide segments. The co-polyester can be a block co-polyester, or can be a random co-polyester. The thermoplastic copolyester can be formed from the polycodensation of a polyester oligomer or prepolymer with a second oligomer prepolymer to form a block copolyester. Optionally, the second prepolymer can be a hydrophilic prepolymer. For example, the co-polyester can be formed from the polycondensation of terephthalic acid or naphthalene dicarboxylic acid with ethylene glycol, 1,4-butanediol, or 1-3 propanediol. Examples of co-polyesters include polyethelene adipate, polybutylene succinate, poly (3-hydroxbutyrate-co-3-hydroxyvalerate), polyethylene terephthalate, polybutylene terephthalate, polytrimethylene terephthalate, polyethylene napthalate, and combinations thereof. In a particular example, the co-polyamide can comprise or consist of polyethylene terephthalate.

In some aspects, the thermoplastic polyester is a block copolymer comprising segments of one or more of polybutylene terephthalate (PBT), a polytrimethylene terephthalate, a polyhexamethylene terephthalate, a poly-1,4-dimethylcyclohexane terephthalate, a polyethylene terephthalate (PET), a polyethylene isophthalate (PEI), a polyarylate (PAR), a polybutylene naphthalate (PBN), and a liquid crystal polyester. For example, a suitable thermoplastic polyester that is a block copolymer can be a PET/PEI copolymer, a polybutylene terephthalate/tetraethylene glycol copolymer, a polyoxyalkylenediimide diacid/polybutylene terephthalate copolymer, or a blend or mixture of any of the foregoing.

In some aspects, the thermoplastic polyester is a biodegradable resin, for example, a copolymerized polyester in which poly($\alpha$-hydroxy acid) such as polyglycolic acid or polylactic acid is contained as principal repeating units.

The disclosed thermoplastic polyesters can be prepared by a variety of polycondensation methods known to the skilled artisan, such as a solvent polymerization or a melt polymerization process.

Thermoplastic Polyolefins

In some aspects, the thermoplastic polymers can comprise or consist essentially of a thermoplastic polyolefin. Exemplary of thermoplastic polyolefins useful in the disclosed compositions, yarns, and fibers can include, but are not limited to, polyethylene, polypropylene, and thermoplastic olefin elastomers (e.g., metallocene-catalyzed block copolymers of ethylene and $\alpha$-olefins having 4 to about 8 carbon atoms). In a further aspect, the thermoplastic polyolefin is a polymer comprising a polyethylene, an ethylene-$\alpha$-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary thermoplastic polyolefins useful in the disclosed compositions, yarns, and fibers are polymers of cycloolefins such as cyclopentene or norbornene.

It is to be understood that polyethylene, which optionally can be crosslinked, is inclusive a variety of polyethylenes, including, but not limited to, low density polyethylene (LDPE), linear low density polyethylene (LLDPE), (VLDPE) and (ULDPE), medium density polyethylene (MDPE), high density polyethylene (HDPE), high density and high molecular weight polyethylene (HDPE-HMVW), high density and ultrahigh molecular weight polyethylene (HDPE-UHMW), and blends or mixtures of any the foregoing polyethylenes. A polyethylene can also be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 wt % vinyl acetate-derived composition.

In some aspects, the thermoplastic polyolefin, as disclosed herein, can be formed through free radical, cationic, and/or anionic polymerization by methods well known to those skilled in the art (e.g., using a peroxide initiator, heat, and/or light). In a further aspect, the disclosed thermoplastic polyolefin can be prepared by radical polymerization under high pressure and at elevated temperature. Alternatively, the thermoplastic polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. In various aspects, the metal complexes can be in the free form or fixed on substrates, typically on activated magnesium chloride, titanium(III) chloride, alumina or silicon oxide. It is understood that the metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable thermoplastic polyolefins can be prepared by polymerization of monomers of monolefins and diolefins as described herein. Exemplary monomers that can be used to prepare disclosed thermoplastic polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

Suitable dynamically cross-linked polymers can be obtained by cross-linking a rubber component as a soft segment while at the same time physically dispersing a hard segment such as PP and a soft segment such as EPDM by using a kneading machine such as a Banbbury mixer and a biaxial extruder.

In some aspects, the thermoplastic polyolefin can be a mixture of thermoplastic polyolefins, such as a mixture of two or more polyolefins disclosed herein above. For example, a suitable mixture of thermoplastic polyolefins can be a mixture of polypropylene with polyisobutylene, polypropylene with polyethylene (for example PP/HDPE, PP/LDPE) or mixtures of different types of polyethylene (for example LDPE/HDPE).

In some aspects, the thermoplastic polyolefin can be a copolymer of suitable monolefin monomers or a copolymer of a suitable monolefin monomer and a vinyl monomer. Exemplary thermoplastic polyolefin copolymers include, but are not limited to, ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

In some aspects, the thermoplastic polyolefin can be a polypropylene homopolymer, a polypropylene copolymers, a polypropylene random copolymer, a polypropylene block copolymer, a polyethylene homopolymer, a polyethylene random copolymer, a polyethylene block copolymer, a low density polyethylene (LDPE), a linear low density polyethylene (LLDPE), a medium density polyethylene, a high density polyethylene (HDPE), or blends or mixtures of one or more of the preceding polymers.

In some aspects, the polyolefin is a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

In some aspects, the polyolefin is a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

Additives

In some aspects, a disclosed thermoplastic polymer, fiber, filament, yarn, or fabric can further comprise an additive. The additive can be incorporated directly into a fiber, filament, yarn, or fabric, or alternatively, applied thereto. Additives that can be used in the disclosed thermoplastic polymers, fibers, filaments, yarns, or fabrics include, but are not limited to, dyes, pigments, colorants, ultraviolet light absorbers, hindered amine light stabilizers, antioxidants, processing aids or agents, plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, fillers, or mixtures of two or more of the foregoing. When used, an additive can be present in an amount of from about 0.01 wt % to about 10 wt %, about 0.025 wt % to about 5 wt %, or about 0.1 wt % to 3 wt %, where the wt % is based upon the sum of the material components in the thermoplastic composition, fiber, filament, yarn, or fabric.

Individual components can be mixed together with the other components of the thermoplastic composition in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

In some aspects, the additive is an antioxidant such as ascorbic acid, an alkylated monophenol, an alkylthiomethylphenol, a hydroquinone or alkylated hydroquinone, a tocopherol, a hydroxylated thiodiphenyl ether, an alkylidenebisphenol, a benzyl compound, a hydroxylated malonate, an aromatic hydroxybenzl compound, a triazine compound, a benzylphosphonate, an acylaminophenol, an ester of β-(3,5-di-tert-butyl-4-hydroxyphenyl)propionic acid with mono- or polyhydric alcohols, an ester of β-(5-tert-butyl-4-hydroxy-3-methylphenyl)propionic acid with mono- or polyhydric alcohols, an ester of β-(3,5-dicyclohexyl-4-hydroxyphenyl)propionic acid with mono- or polyhydric alcohols, an ester of 3,5-di-tert-butyl-4-hydroxyphenyl acetic acid with mono- or polyhydric alcohols, an amide of β-(3,5-di-tert-butyl-4-hydromhenyl)propionic acid, an aminic antioxidant, or mixtures of two or more of the foregoing.

Exemplary alkylated monophenols include, but are not limited to, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-ethylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol, and mixtures of two or more of the foregoing.

Exemplary alkylthiomethylphenols include, but are not limited to, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, and mixtures of two or more of the foregoing.

Exemplary hydroquinones and alkylated hydroquinones include, but are not limited to, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate, and mixtures of two or more of the foregoing.

Exemplary tocopherols include, but are not limited to, α-tocopherol, p-tocopherol, 7-tocopherol, 6-tocopherol, and mixtures of two or more of the foregoing.

Exemplary hydroxylated thiodiphenyl ethers include, but are not limited to, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide, and mixtures of two or more of the foregoing.

Exemplary alkylidenebisphenols include, but are not limited to, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl) phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2.2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl) propane, 2,2-bis-(5-tert-butyl-4-hydroxy 2-methylphenyl)-4-n-dodecylmercaptobutane, 1,1,5,5-tetra-(5-tert-butyl-4-hydroxy-2-methylphenyl)pentane, and mixtures of two or more of the foregoing.

Exemplary benzyl compounds include, but are not limited to, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl)isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, and mixtures of two or more of the foregoing.

Exemplary hydroxybenzylated malonates include, but are not limited to, dioctadecyl-2,2-bis-(3,5-di-tert-butyl-2-hydroxybenzyl)-malonate, di-octadecyl-2-(3-tert-butyl-4-hydroxy-5-ethylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, and mixtures of two or more of the foregoing.

Exemplary aromatic hydroxybenzl compounds include, but are not limited to, 1,3,5-tris-(3,5-di-tert-butyl-4-hydroxybenzyl)-2,4,6-trimethyl benzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, and mixtures of two or more of the foregoing.

Exemplary triazine compounds include, but are not limited to, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl)isocyanurate, 2,4,6-tris(3,5-ditert-butyl-4-hydroxyphenylethyl)-1,3,5-triazine, 1,3,5-tris (3,5-di-tert-butyl-4-hydroxy-phenylpropionyl)-hexahydro-1.3,5-triazine, 1,3,5-tris(3,5-dicyclohexyl-4-hydroxybenzyl) isocyanurate, and mixtures of two or more of the foregoing.

Exemplary benzylphosphonates include, but are not limited to, dimethyl-2,5-di-tert-butyl-4-hydroxybenzylphosphonate, diethyl-3,5-di-tert-butyl-4-hydroxybenzylphosphonate, dioctadecyl 3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, and mixtures of two or more of the foregoing.

Exemplary acylaminophenols include, but are not limited to, 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate, and mixtures of two or more of the foregoing.

Exemplary esters of β-(3,5-di-tert-butyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(5-tert-butyl-4-hydroxy-3-methylphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(3,5-dicyclohexyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of 3,5-di-tert-butyl-4-hydroxyphenyl acetic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary amides of β-(3,5-di-tert-butyl-4-hydromhenyl)propionic acid, include, but are not limited to, N,N'-bis (3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy) ethyl]oxamide, and mixtures of two or more of the foregoing.

Exemplary aminic antioxidants include, but are not limited to, N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine. phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol, and mixtures of two or more of the foregoing.

In some aspects, the additive is a UV absorber and/or light stabilizer, including, but limited to, a 2-(2-hydroxyphenyl)-2H-benzotriazole compound, a 2-hydroxybenzophenone compound, an ester of a substituted and unsubstituted benzoic acid, an acrylate or malonate compound, a sterically hindered amine stabilizer compound, an oxamide compound, a tris-aryl-o-hydroxyphenyl-s-triazine compound, or mixtures of two or more of the foregoing.

Exemplary 2-(2-hydroxyphenyl)-2H-benzotriazole compounds include, but are not limited to, 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t- amyl-2-hydroxyphenyl)-2H-benzotriazole, 2-(3,5-bis-a-cumyl-2-hydroxyphenyl)-2H-benzotriazole, 2-(3-t-butyl-2-hydroxy-5-(2-(ω)-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl) phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy) carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole. 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycar-bonylethyl)phenyl)-5-chloro-2H-benzotriazole, 5-trifluo-romethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluorom-ethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole, and mixtures of two or more of the foregoing.

Exemplary 2-hydroxybenzophenone compounds include, but are not limited to, 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives of 2-hydroxy-benzophenone, and mixtures of two or more such derivatives.

Exemplary esters of a substituted and unsubstituted benzoic acid include, but are not limited to, 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate, and mixtures of two or more of the foregoing.

Exemplary an acrylate or malonate compounds include, but are not limited to, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovi-nyl)-2-methyl-indoline, dimethyl p-methoxybenzyliden-emalonate, di-(1,2,2,6,6-pentamethylpiperidin-4-yl)p-methoxybenzylidenemalonate, and mixtures of two or more of the foregoing.

Exemplary sterically hindered amine stabilizer compounds include, but are not limited to, 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl) sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethyl piperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpi-peridyl)sebacate, bis(1-octyloxy-2,2,6,6-tetramethyl-piperidyl)succinate, linear or cyclic condensates of N,N'-bis-(2,2,6,6-tetramethyl-4-piperidyl)-hexamethylenediamine and 4-morpholino-2,6-dichloro-1,3,5-triazine, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyr-rolidin-2,5-dione, 3-dodecyl-1-(1,2,2,6,6-pentamethyl-4-piperidyl)pyrrolidine-2,5-dione, N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, 1,1-bis(1,2,2,6,6-pentamethyl-4-piperidyloxycarbonyl)-2-(4-methoxyphenyl)ethene, N,N'-bis-formyl-N,N'-bis(2.2,6,6-tetramethyl-4-piperidyl)hexamethylenediamine, poly [methylpropyl-3-oxy-4-(2,2,6,6-tetramethyl-4-piperidyl)] siloxane, 1-(2-hydroxy-2-methylpropoxy)-4-octadecanoyloxy-2,2,6,6-tetramethylpiperidine, 1-(2-hydroxy-2-methyl propoxy)-4-hexadecanoyloxy-2,2,6,6-tetramethylpiperidine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl)sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpi-peridin-4-yl)succinate, bis(1-(2-hydroxy-2-methyl-propoxy)-2,2,6,6-tetramethylpiperidin-4-yl)glutarate and 2,4-bis{N-[1-(2-hydroxy-2-methylpropoxy)-2,2,6,6-tetram-ethylpiperidin-4-yl]-N-butylamino}-6-(2-hydroxyethyl-amino)-s-triazine, and mixtures of two or more of the foregoing.

Exemplary oxamide compounds include, but are not limited to, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides, and mixtures of two or more of the foregoing.

Exemplary tris-aryl-o-hydroxyphenyl-s-triazine compounds include, but are not limited to, 4,6-bis-(2,4-dimethylphenyl)-2-(2-hydroxy-4-octyloxyphenyl)-s-triazine, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-ethoxy)phenyl]-6-(2,4- dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl J-642-hydroxy-4-(3-sec-amyloxy-2-hydroxypropyloxy)-phenyl]-s-triazine, 2,4-bis(2,4-dimethylphenyl)-6-[2-hydroxy-4-(3-benzyloxy-2-hydroxy-propyloxy)phenyl]-s-triazine, 2,4-bis(2-hydroxy-4-n-butyloxyphenyl)-6-(2,4-di-n-butyloxyphenyl)-s-triazine, methylenebis-{2,4-bis(2,4-dimethyl phenyl)-6-[2-hydroxy-4-(3-butyloxy-2-hydroxypropoxy)-phenyl]-s-triazine}, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl)-s-triazine, 4,6-bis-(2,4-dimethylphenyl)-2-(2-hydroxy-4-(3-(2-ethylhexyloxy)-2-hydroxypropoxy)-phenyl)-s-triazine, 4,6-diphenyl-2-(4-hexyloxy-2-hydroxyphenyl)-s-triazine, and mixtures of two or more of the foregoing.

In some aspects, the additive is a peroxide scavenger such as an ester of β-thiodipropionic acid, e.g., the lauryl, stearyl, myristyl or tridecyl esters, mercaptobenzimidazole, and the zinc salt of 2-mercapto-benzimidazole, zinc dibutyldithiocarbamate, dioctadecyl disulfide, pentaerythritol tetrakis(β-dodecylmercapto)propionate, or mixtures of any of the foregoing.

In some aspects, the additive is a polyamide stabilizer such as a copper salt of a halogen, e.g., iodide, and/or phosphorus compounds and salts of divalent manganese.

In some aspects, the additive is a basic co-stabilizer such as melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

In some aspects, the additive is a nucleating agent such as talcum, metal oxides such as titanium dioxide or magnesium oxide, phosphates, carbonates or sulfates of, preferably, alkaline earth metals, or mixtures thereof. Alternatively, the nucleating agent can be a mono- or polycarboxylic acids, and the salts thereof, e.g., 4-tert-butylbenzoic acid, adipic acid, diphenylacetic acid, sodium succinate, sodium benzoate, or mixtures thereof. In a further aspect, the additive can be a nucleating agent comprising both an inorganic and an organic material as disclosed herein above.

In some aspects, the rheology modifier can be a nanoparticles having comparatively high aspect ratios, nano-clays, nano-carbon, graphite, nano-silica, and the like.

In some aspects, the additive is a filler or reinforcing agent such as clay, kaolin, talc, asbestos, graphite, glass (such as glass fibers, glass particulates, and glass bulbs, spheres, or spheroids), mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), metal hydroxides, particulate synthetic plastics (such as high molecular weight polyethylene, polypropylene, polystyrene, polyethylene ionomeric resins, polyamide, polyester, polyurethane, polyimide, and the like), synthetic fibers (such as fibers comprising high molecular weight polyethylene, polypropylene, polystyrene, polyethylene ionomeric resins, polyamide, polyester, polyurethane, polyimide, and the like), particulate carbonaceous materials (such as carbon black and the like), wood flour and flours or fibers of other natural products, as well as cotton flock, cellulose flock, cellulose pulp, leather fiber, and combinations of any of the above. Non-limiting examples of heavy-weight filler components that can be used to increase the specific gravity of the cured elastomer composition can include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light-weight filler components that can be used to decrease the specific gravity of the elastomer compound can include particulate plastics, hollow glass spheres, ceramics, and hollow spheres, regrinds, and foams, which can be used in combinations.

In some aspects, the additive is a cross-linking agent. There are a variety of cross-linking agents that can be used in the disclosed thermoplastic compositions. For example, a cross-linking agent can be a free-radical initiator. The free radical initiator can generate free radicals through thermo cleavage or UV radiation. The free-radical initiator can be present in an amount from about 0.001 wt % to about 1.0 wt %. A variety of radical initiators can be used as the radical sources to make thermoplastic compositions have a cross-linked structure. Suitable radical initiators applied include peroxides, sulfurs, and sulfides. Exemplary peroxides include, but are not limited to, aliphatic peroxides and aromatic peroxides, such as diacetylperoxide, di-tert-butyp-peroxide, dicumyl peroxide, dibenzoylperoxide, 2,5-dimethyl-2,5-di(benzoylperoxy)hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl), or combinations of two or more of the foregoing.
colorants can include without limitation dyes, pigments, and the like, and combinations thereof.

In some aspects, the additive is a colorant. The term "colorant," as used herein, means a compound providing color to a substrate, e.g., a disclosed thermoplastic composition. The colorant can be an organic or inorganic pigment, a dye, or mixtures or combinations thereof. In a further aspect, the pigment or dye is an inorganic material such as a metal oxide, e.g., iron oxide or titanium dioxide. Alternatively, the inorganic pigment or dye can be a metal compound, e.g., strontium chromate or barium sulfate, or a metallic pigment, e.g., aluminum flakes or particles. Other exemplary inorganic pigments include carbon black, talc, and the like. In some cases, the metal compound is not one comprising cadmium. In can be desirable in some instances that the inorganic pigment or dye is not one that contains a lead, cadmium and chromium (VI) compound. In a further aspect, the pigment or dye is an organic compound such as a perylene, phthalocyanine derivative (e.g., copper phthalocyanine), a indanthrone, a benzimidazolone, a quinacridone, a perinone, and an azomethine derivative. In some instances, the composition according to any method known to a person skilled in the art. For example, the colorant can be added to the thermoplastic composition in a mixing device such as an extruder, directly or else by means of a masterbatch. In various aspects, the disclosed thermoplastic composition can comprise between about 0.005 wt % and about 5 wt % relative to the weight of the composition. In a further aspect, the disclosed thermoplastic composition can comprise between about 0.01 wt % and about 3 wt % relative to the weight of the composition.

All technical and scientific terms used herein, unless defined otherwise, have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The terms "comprises," "comprising," "including," and "having," are inclusive and therefore specify the presence of features, steps, operations, elements, and/or components, but do not preclude the presence or addition of one or more other features, steps, operations, elements, components, and/or groups thereof.

As used in the specification and the appended claims, the singular forms "a," "an" and "the" include plural referents unless the context clearly dictates otherwise. Thus, for example, reference to "a low processing temperature polymeric composition," "a high processing temperature polymeric composition," or "a knit upper," including, but not limited to, two or more such low processing temperature polymeric compositions, low processing temperature polymeric compositions, or knit uppers, and the like.

As used herein, the term "and/or" includes any and all combinations of one or more of the associated listed items.

The terms first, second, third, etc. can be used herein to describe various elements, components, regions, layers and/or sections. These elements, components, regions, layers and/or sections should not be limited by these terms. These terms can be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As used herein, the modifiers "upper," "lower," "top," "bottom," "upward," "downward," "vertical," "horizontal," "longitudinal," "transverse," "front," "back" etc., unless otherwise defined or made clear from the disclosure, are relative terms meant to place the various structures or orientations of the structures of the article of footwear in the context of an article of footwear worn by a user standing on a flat, horizontal surface.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.4%, 3.2%, and 4.4%) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Reference to "a" chemical compound" refers to one or more molecules of the chemical compound, rather than being limited to a single molecule of the chemical compound. Furthermore, the one or more molecules can or can not be identical, so long as they fall under the category of the chemical compound. Thus, for example, "a polyamide" is interpreted to include one or more polymer molecules of the polyamide, where the polymer molecules can or can not be identical (e.g., different molecular weights and/or isomers).

The terms "at least one" and "one or more of" an element are used interchangeably, and have the same meaning that includes a single element and a plurality of the elements, and can also be represented by the suffix "(s)" at the end of the element. For example, "at least one polyamide", "one or more polyamides", and "polyamide(s)" can be used interchangeably and have the same meaning.

As used herein, the terms "optional" or "optionally" means that the subsequently described component, event or circumstance can or cannot occur, and that the description includes instances where said component, event or circumstance occurs and instances where it does not.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

As used herein the terms "weight percent," "wt %," and "wt %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Unless otherwise specified, temperatures referred to herein are determined at standard a $T_m$ospheric pressure (i.e., 1 a $T_m$).

Property Analysis and Characterization Procedures

Evaluation of various properties and characteristics of the part and support materials described herein are by various testing procedures as described herein below.

Method to Determine the Creep Relation Temperature $T_{cr}$.

The creep relation temperature $T_{cr}$ is determined according to the exemplary techniques described in U.S. Pat. No. 5,866,058. The creep relaxation temperature $T_{cr}$ is calculated to be the temperature at which the stress relaxation modulus of the tested material is 10% relative to the stress relaxation modulus of the tested material at the solidification temperature of the material, where the stress relaxation modulus is measured according to AS $T_m$ E328-02. The solidification temperature is defined as the temperature at which there is little to no change in the stress relaxation modulus or little to no creep about 300 seconds after a stress is applied to a test material, which can be observed by plotting the stress relaxation modulus (in Pa) as a function of temperature (in ° C.).

Method to Determine the Vicat Softening Temperature $T_{vs}$.

The Vicat softening temperature $T_{vs}$ is be determined according to the test method detailed in AS $T_m$ D1525-09 Standard Test Method for Vicat Softening Temperature of Plastics, preferably using Load A and Rate A. Briefly, the Vicat softening temperature is the temperature at which a flat-ended needle penetrates the specimen to the depth of 1 mm under a specific load. The temperature reflects the point of softening expected when a material is used in an elevated temperature application. It is taken as the temperature at which the specimen is penetrated to a depth of 1 mm by a flat-ended needle with a 1 $mm^2$ circular or square cross-section. For the Vicat A test, a load of 10 N is used, whereas for the Vicat B test, the load is 50 N. The test involves placing a test specimen in the testing apparatus so that the penetrating needle rests on its surface at least 1 mm from the edge. A load is applied to the specimen per the requirements of the Vicat A or Vicate B test. The specimen is then lowered into an oil bath at 23° C. The bath is raised at a rate of 50° C. or 120° C. per hour until the needle penetrates 1 mm. The test specimen must be between 3 and 6.5 mm thick and at least 10 mm in width and length. No more than three layers can be stacked to achieve minimum thickness.

Method to Determine the Heat DeflectionTemperature $T_{hd}$.

The heat deflection temperature $T_{hd}$ is be determined according to the test method detailed in AS $T_m$ D648-16 Standard Test Method for Deflection Temperature of Plastics Under Flexural Load in the Edgewise Position, using a 0.455 MPa applied stress. Briefly, the heat deflection temperature is the temperature at which a polymer or plastic sample deforms under a specified load. This property of a given plastic material is applied in many aspects of product design, engineering, and manufacture of products using thermoplastic components. In the test method, the bars are placed under the deflection measuring device and a load (0.455 MPa) of is placed on each specimen. The specimens are then lowered into a silicone oil bath where the temperature is raised at 2° C. per minute until they deflect 0.25 mm per AS $T_m$ D648-16. AS $T_m$ uses a standard bar 5"×½"×¼". ISO edgewise testing uses a bar 120 mm×10 mm×4 mm. ISO flatwise testing uses a bar 80 mm×10 mm×4 mm.

Method to Determine the Melting Temperature, $T_m$, and Glass Transition Temperature, $T_g$.

The melting temperature $T_m$ and glass transition temperature $T_g$ are determined using a commercially available Differential Scanning Calorimeter ("DSC") in accordance with AS $T_m$ D3418-97. Briefly, a 10-15 gram sample is placed into an aluminum DSC pan and then the lead was sealed with the crimper press. The DSC is configured to scan from −100° C. to 225° C. with a 20° C./minute heating rate, hold at 225° C. for 2 minutes, and then cool down to 25° C. at a rate of −10° C./minute. The DSC curve created from this scan is then analyzed using standard techniques to determine the glass transition temperature $T_g$ and the melting temperature $T_m$.

Method to Determine the Melt Flow Index.

The melt flow index is determined according to the test method detailed in AS $T_m$ D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the material is loaded into the barrel of the melt flow apparatus, which has been heated to a temperature specified for the material. A weight specified for the material is applied to a plunger and the molten material is forced through the die. A timed extrudate is collected and weighed. Melt flow rate values are calculated in g/10 min.

Method to Determine the Cold Ross Flex.

The cold Ross flex test is determined according the following test method. The purpose of this test is to evaluate the resistance to cracking of a sample under repeated flexing to 60 degrees in a cold environment. A thermoformed plaque of the material for testing is sized to fit inside the flex tester machine. Each material is tested as five separate samples. The flex tester machine is capable of flexing samples to 60 degrees at a rate of 100+/−5 cycles per minute. The mandrel diameter of the machine is 10 millimeters. Suitable machines for this test are the Emerson AR-6, the Satra S $T_m$ 141F, the Gotech GT-7006, and the Shin II Scientific SI-LTCO (DaeSung Scientific). The sample(s) are inserted into the machine according to the specific parameters of the flex machine used. The machine is placed in a freezer set to −6° C. for the test. The motor is turned on to begin flexing with the flexing cycles counted until the sample cracks. Cracking of the sample means that the surface of the material is physically split. Visible creases of lines that do not actually penetrate the surface are not cracks. The sample is measured to a point where it has cracked but not yet broken in two.

Method to Determine the Modulus (Plaque).

The modulus for a thermoformed plaque of material is determined according to the test method detailed in AS $T_m$ D412-98 Standard Test Methods for Vulcanized Rubber and Thermoplastic Rubbers and Thermoplastic Elastomers-Tension, with the following modifications. The sample dimension is the AS $T_m$D412-98 Die C, and the sample thickness used is 2.0 millimeters+/−0.5 millimeters. The grip type used is a pneumatic grip with a metal serrated grip face. The grip distance used is 75 millimeters. The loading rate used is 500 millimeters/minute. The modulus (initial) is calculated by taking the slope of the stress (MPa) versus the strain in the initial linear region.

Method to Determine the Modulus (Yarn).

The modulus for a yarn is determined according to the test method detailed in EN ISO 2062 (Textiles-Yarns from Packages)—Determination of Single-End Breaking Force and Elongation at Break Using Constant Rate of Extension (CRE) Tester, with the following modifications. The sample length used is 600 millimeters. The equipment used is an Instron and Gotech Fixture. The grip distance used is 250 millimeters. The pre-loading is set to 5 grams and the loading rate used is 250 millimeters/minute. The first meter of yarn is thrown away to avoid using damaged yarn. The modulus (initial) is calculated by taking the slope of the stress (MPa) versus the strain in the initial linear region.

Method to Determine Tenacity and Elongation.

The tenacity and elongation of yarn can be determined according to the test method detailed in EN ISO 2062 Determination of single end breaking force and elongation at break using constant rate of extension tester with the pre-load set to 5 grams.

Method to Determine Shrinkage.

The free-standing shrinkage of fibers and/or yarns can be determined by the following method. A sample fiber or yarn is cut to a length of approximately 30 millimeters with minimal tension at approximately room temperature (e.g., 20° C.). The cut sample is placed in a 50° C. or 70° C. oven for 90 seconds. The sample is removed from the oven and measured. The percentage of shrink is calculated using the pre- and post-oven measurements of the sample, by dividing the post-oven measurement by the pre-oven measurement, and multiplying by 100.

Method to Determine Enthalpy of Melting.

The enthalpy of melting is determined by the following method. A 5-10 mg sample of fibers or yarn is weighed to determine the sample mass, is placed into an aluminum DSC pan, and then the lid of the DSC pan is sealed using a crimper press. The DSC is configured to scan from −100° C. to 225° C. with a 20° C./minute heating rate, hold at 225° C. for 2 minutes, and then cool down to room temperature (e.g., 25° C.) at a rate of −10° C./minute. The enthalpy of melting is calculated by integrating the area of the melting endotherm peak and normalizing by the sample mass.

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Aspects

The following listing of exemplary aspects supports and is supported by the disclosure provided herein.

Aspect 1. A textile comprising: a first yarn or a first fiber comprising a low process temperature polymeric composition, the low processing temperature polymeric composition comprising one or more first thermoplastic polymers; and a second yarn or a second fiber comprising a high processing temperature polymeric composition, the high processing temperature polymeric composition comprising one or more second thermoplastic polymers, wherein the high processing temperature polymeric composition exhibits a creep relaxation temperature Tcr that is greater than a melting temperature Tm of the low processing temperature polymeric composition.

Aspect 2. A textile comprising: a first yarn or a first fiber comprising a low processing temperature polymeric composition, the low processing temperature polymeric composition comprising one or more first thermoplastic polymers; and a second yarn or a second fiber comprising a high processing temperature polymeric composition, the high processing temperature polymeric composition comprising one or more second thermoplastic polymers, wherein the high processing temperature polymeric composition exhibits a heat deflection temperature Thd that is greater than a melting temperature Tm of the low processing temperature polymeric composition.

Aspect 3. A textile comprising: a first yarn or a first fiber comprising a low processing temperature polymeric composition, the low processing temperature polymeric composition comprising one or more first thermoplastic polymers; and a second yarn or a second fiber comprising a high processing temperature polymeric composition, the high processing temperature polymeric composition comprising one or more second thermoplastic polymers, wherein the high processing temperature polymeric composition exhibits a Vicat softening temperature Tvs that is greater than a melting temperature Tm of the low processing temperature polymeric composition.

Aspect 4. A textile comprising: a first yarn or a first fiber comprising a low processing temperature polymeric composition, the low processing temperature polymeric composition comprising one or more first thermoplastic polymers, wherein the low processing temperature polymeric composition exhibits a melting temperature Tm that is 135° C. or less; and a second yarn or a second fiber comprising a high processing temperature polymeric composition, the high processing temperature polymeric composition comprising one or more second thermoplastic polymers, wherein the high processing temperature polymeric composition exhibits at least one of: 1) a creep relaxation temperature Tcr; 2) a heat deflection temperature Thd; or 3) a Vicat softening temperature Tvs that is greater than the melting temperature Tm of the low processing temperature polymeric composition.

Aspect 5. The textile according to any one of Aspects 1-4, wherein the textile is a component of an article of footwear, a component of an article of apparel, or is a component of an article of sporting equipment.

Aspect 6. The textile according to Aspect 5, wherein the textile is a component of an article of sporting equipment.

Aspect 7. The textile according to Aspect 6, wherein the textile is a component of an article of sporting equipment selected from the group including a component of a hat, a component of a bag, a component of a ball, and a component of protective equipment.

Aspect 8. The textile according to Aspect 5, wherein the textile is a component of an article of apparel.

Aspect 9. The textile according to Aspect 8, wherein the textile is a component of an article of footwear.

Aspect 10. The textile according to Aspect 9, wherein the textile is an upper for an article of footwear.

Aspect 11. The textile according to Aspect 10, wherein the upper comprises an outsole area.

Aspect 12. The textile according to any one of Aspect 10 and Aspect 11, wherein the upper is configured to wrap around at least a portion of a last and cover a bottom portion of the last.

Aspect 13. The textile according to any one of Aspect 10-Aspect 12, wherein the upper comprises an area configured to be a ground-facing area, wherein at least a portion of the first yarn or the first fiber is present on the ground-facing area.

Aspect 14. The textile according to Aspect 13, wherein at least a portion of the second yarn or the second fiber is present on the ground-facing area.

Aspect 15. The textile according to Aspect 13 or Aspect 14, wherein at least a portion of the ground-facing area of the upper is configured to cover the bottom portion of the last.

Aspect 16. The textile according to any one of Aspects 13-15, wherein the at least the portion of the ground-facing area comprises at least a portion of the first yarn or the first fiber.

Aspect 17. The textile according to any one of Aspect 1-Aspect 16, wherein the textile comprises an outward most layer that comprises at least a portion of the first yarn or the first fiber, the outward most layer comprising a first area and a second area, wherein the first area comprises an increased concentration of the first yarn or the first fiber compared to the second area.

Aspect 18. The textile according Aspect 17, wherein the textile is an upper for an article of footwear; and wherein the first area comprises an area configured to be a ground-facing area, an area configured to be a sole perimeter area, an area configured to be a heel area, an area configured to be a toe-box area, and combinations thereof.

Aspect 19. The textile according to any one of Aspect 17-Aspect 18, wherein the second area comprises an area configured to be a forefoot opening area, an ankle collar area or both.

Aspect 20. The textile according to Aspect 17, wherein the outward most layer further comprises a transition area positioned between the first and second areas, wherein the transition area comprises a decreased concentration of the first yarn or the first fiber compared to the first area.

Aspect 21. The textile according to Aspect 20, wherein the transition area comprises an increased concentration of the first yarn or the first fiber compared to the second area.

Aspect 22. The textile according to any one of Aspect 1-Aspect 21, wherein the textile comprises the first yarn and the second yarn.

Aspect 23. The textile according to Aspect 22, wherein the textile is a knit textile; and wherein at least one of the first yarn and the second yarn form a plurality of interconnected loops.

Aspect 24. The textile according to Aspect 23, wherein the first and second yarns at least partly form a plurality of interconnected courses on an outer surface of the knit textile, the outer surface having at least a first zone, a second zone, and a third zone, the second zone positioned between the first and third zones, wherein the first zone comprises an increased concentration of the second yarn compared to the second zone, and wherein the third zone comprises an increased concentration of the first yarn compared to the second zone.

Aspect 25. The textile according to Aspect 24, wherein each course of the plurality of interconnected courses comprises the first yarn and the second yarn.

Aspect 26. The textile according to Aspect 24 or Aspect 25, wherein the plurality of interconnected courses comprises a first course interconnected to a second course.

Aspect 27. The textile according to Aspect 26, wherein, in the first course, the first yarn extends from the third zone into the second zone and the second yarn extends from the second zone into the first zone, and wherein, in the second course, the first yarn extends from the third zone into the second zone and is interlooped with at least a portion of the first yarn of the first course in a first portion of the second zone.

Aspect 28. The textile according to Aspect 26 or Aspect 27, wherein, in the second course, the second yarn extends from the second zone into the first zone, and wherein the second yarn of the second course is interlooped with at least a portion of the first yarn of the first course in a second portion of the second zone.

Aspect 29. The textile according to any one of Aspect 26-Aspect 28, wherein, in the second course, the second yarn of the second course is interlooped with at least a portion of the second yarn of the first course in a third portion of the second zone.

Aspect 30. The textile according to any one of Aspect 26-Aspect 29, wherein, in the second zone, adjacent courses of the plurality of interconnected courses have a different number of loops of the first yarn.

Aspect 31. The textile according to any one of Aspect 26-Aspect 30, wherein, in the second zone, at least some of the adjacent courses of the plurality of interconnected courses have different numbers of loops of the second yarn.

Aspect 32. The textile according to any one of Aspect 26-Aspect 31, wherein, in the second zone, at least some of the adjacent courses of the plurality of interconnected courses have different numbers of loops of the first yarn and the second yarn.

Aspect 33. The textile according to any one of Aspect 24-Aspect 32, wherein, in the second zone, a first wale having loops of the first yarn is adjacent to a second wale having loops of the second yarn.

Aspect 34. The textile according to any one of Aspect 24-Aspect 33, wherein the textile is an upper for an article of footwear.

Aspect 35. The textile according to Aspect 34, wherein the third zone forms at least a portion of a ground-facing area.

Aspect 36. The textile according to any one of Aspect 34-Aspect 35, wherein the first zone forms at least a portion of a forefoot opening area and/or an ankle collar area.

Aspect 37. The textile according to any one of Aspect 34-Aspect 36, wherein, when the upper is present on a last, the upper wraps around at least a portion of the last and covers a bottom portion of the last.

Aspect 38. The textile according to any one of Aspect 34-Aspect 37, wherein, when the upper is present on a last, the upper wraps around at least a portion of a ground-facing area of the upper covers the bottom portion of the last.

Aspect 39. The textile according to any one of Aspect 34-Aspect 38, wherein at least the third zone comprises an anchor yarn, wherein the anchor yarn comprises an anchor yarn composition, the anchor yarn composition comprising one or more polymers, and wherein the anchor yarn exhibits an elongation that is less than an elongation of the first yarn or the first fiber.

Aspect 40. The textile according to Aspect 39, wherein the anchor yarn extends from the third zone into the second zone.

Aspect 41. The textile according to any one of Aspect 39 and 36, wherein a concentration of the anchor yarn in the second zone is less than a concentration of the anchor yarn in the third zone.

Aspect 42. The textile according to any one of Aspect 39-Aspect 41, wherein the anchor yarn is stitched with the first yarn or the first fiber in the third zone at loops spaced apart an amount within 25% of the gauge of a knit machine used to form at least a portion of the knit article.

Aspect 43. The textile according to any one of Aspect 39-Aspect 42, wherein the anchor yarn is tuck stitched with the first yarn or the first fiber in the third zone.

Aspect 44. The textile according to any one of Aspect 39-Aspect 43, wherein, in a first course of the plurality of interconnected courses, at least a portion of the anchor yarn extends as a float stitch along at least two adjacent loops of the first yarn or the first fiber.

Aspect 45. The textile according to any one of Aspect 39-Aspect 44, wherein the anchor yarn composition exhibits at least one of: 1) a creep relaxation temperature Tcr; 2) a heat deflection temperature Thd; 3) a Vicat softening temperature Tvs; or 4) a melting temperature Tm, that is greater than the melting temperature Tm of the low processing temperature polymeric composition of the first yarn or the first fiber.

Aspect 46. The textile according to any one of Aspect 39-Aspect 45, wherein the first yarn exhibits a tenacity of at least about 0.9 grams/denier.

Aspect 47. The knit textile according to any one of Aspect 39-Aspect 46, wherein the first yarn exhibits a tenacity of about 1 gram/denier to about 5 grams/denier.

Aspect 48. The knit textile according to any one of Aspect 39-Aspect 47, wherein the first yarn exhibits a tenacity of about 1.5 grams/denier to about 4.5 grams/denier.

Aspect 49. The knit textile according to any one of Aspect 39-Aspect 48, wherein the first yarn exhibits a tenacity of about 2.0 grams/denier to about 4.5 grams/denier.

Aspect 50. The textile according to any one of Aspect 39-Aspect 46, wherein the first yarn exhibits an elongation of less than about 130%.

Aspect 51. The textile according to any one of Aspect 39-Aspect 50, wherein the first yarn exhibits a shrinkage of less than about 60%.

Aspect 52. The textile according to any one of Aspect 39-Aspect 51, wherein the knit textile is a flat knit.

Aspect 53. The textile according to any one of Aspect 39-Aspect 51, wherein the knit textile is circular knit.

Aspect 54. The textile according to Aspect 22, wherein the textile is a woven textile; and wherein at least one of the first yarn and the second yarn form a plurality of interlaced yarns.

Aspect 55. The textile according to Aspect 54, wherein the textile is a woven textile; wherein at least a portion of the first yarn is a warp yarn; and wherein at least a portion of the second yarn is a weft yarn.

Aspect 56. The textile according to Aspect 54, wherein the textile is a woven textile; wherein at least a portion of the first yarn is a weft yarn; and wherein at least a portion of the second yarn is a warp yarn.

Aspect 57. The textile according to Aspect 22, wherein the textile is a braided textile; and wherein at least a portion of the first and second yarns are interlaced with one another.

Aspect 58. The textile according to any one of Aspect 1-Aspect 21, wherein the textile is a nonwoven textile comprising the first fiber and the second fiber.

Aspect 59. The textile according to any one of Aspect 1-Aspect 58, wherein the high processing temperature polymeric composition exhibits a creep relaxation temperature Tcr that is greater than the melting temperature Tm of the low processing temperature polymeric composition.

Aspect 60. The textile according to any one of Aspect 1-Aspect 58, wherein the high processing temperature polymeric composition of the second yarn or the second fiber exhibits a heat deflection temperature Thd that is greater than the melting temperature Tm of the low processing temperature polymeric composition.

Aspect 61. The textile according to any one of Aspect 1-Aspect 58, wherein the high processing temperature polymeric composition of the second yarn or the second fiber exhibits a Vicat softening temperature Tvs that is greater than the melting temperature Tm of the low processing temperature polymeric composition.

Aspect 62. The textile according to any one of Aspect 1-Aspect 61, wherein the high processing temperature polymeric composition exhibits a melting temperature Tm of greater than 140° C.

Aspect 63. The textile according to any one of Aspect 1-Aspect 62, wherein the high processing temperature polymeric composition exhibits a melting temperature Tm that is at least 10° C. greater than a melting temperature Tm of the low processing temperature polymeric composition.

Aspect 64. The textile according to any one of Aspect 1-Aspect 63, wherein the melting temperature Tm of the low processing temperature polymeric composition is less than 135° C.

Aspect 65. The textile according to any one of Aspect 1-Aspect 64, wherein the low processing temperature polymeric composition exhibits a melting temperature of from about 80° C. to about 135° C.

Aspect 66. The textile according to any one of Aspect 1-Aspect 65, wherein the low processing temperature polymeric composition exhibits a melting temperature of less than 125° C.

Aspect 67. The textile according to any one of Aspect 1-Aspect 66, wherein the low processing temperature polymeric composition exhibits a melting temperature of less than 120° C.

Aspect 68. The textile according to any one of Aspect 1-Aspect 65, wherein the low processing temperature polymeric composition exhibits a melting temperature of from about 90° C. to about 120° C.

Aspect 69. The textile according to any one of Aspect 1-Aspect 68, wherein the low processing temperature polymeric composition exhibits a melting temperature of from about 100° C. to about 120° C.

Aspect 70. The textile according to any one of Aspect 1-Aspect 65, wherein the low processing temperature polymeric composition exhibits a glass transition temperature Tg of about 50° C. or less.

Aspect 71. The textile according to any one of Aspect 1-Aspect 70, wherein the low processing temperature polymeric composition exhibits a glass transition temperature Tg of about 25° C. or less.

Aspect 72. The textile according to any one of Aspect 1-Aspect 71, wherein the low processing temperature polymeric composition exhibits a glass transition temperature Tg of about 0° C. or less.

Aspect 73. The textile according to any one of Aspect 1-Aspect 70, wherein the low processing temperature polymeric composition exhibits a melt flow index of about 0.1 g/10 min to about 60 g/10 min at 160° C. using a test weight of 2.16 kg.

Aspect 74. The textile according to any one of Aspect 1-Aspect 70, wherein the low processing temperature polymeric composition exhibits a melt flow index of about 2 g/10 min to about 50 g/10 min at 160° C. using a test weight of 2.16 kg.

Aspect 75. The textile according to any one of Aspect 1-Aspect 74, wherein the low processing temperature polymeric composition exhibits a melt flow index of about 5 g/10 min to about 40 g/10 min at 160° C. using a test weight of 2.16 kg.

Aspect 76. The textile according to any one of Aspect 1-Aspect 75, wherein the low processing temperature polymeric composition exhibits a melt flow index of about 25 g/10 min at 160° C. using a test weight of 2.16 kg.

Aspect 77. The textile according to any one of Aspect 1-Aspect 73, wherein the low processing temperature polymeric composition exhibits an enthalpy of melting of at least about 5 J/g.

Aspect 78. The textile according to any one of Aspect 1-Aspect 73, wherein the low processing temperature polymeric composition exhibits an enthalpy of melting of from about 8 J/g to about 45 J/g.

Aspect 79. The textile according to any one of Aspect 1-Aspect 78, wherein the low processing temperature polymeric composition exhibits an enthalpy of melting of from about 10 J/g to about 30 J/g.

Aspect 80. The textile according to any one of Aspect 1-Aspect 79, wherein the low processing temperature polymeric composition exhibits an enthalpy of melting of from about 15 J/g to about 25 J/g.

Aspect 81. The textile according to any one of Aspect 1-Aspect 80, wherein the low processing temperature polymeric composition exhibits a modulus of about 1 MPa to about 500 MPa.

Aspect 82. The textile according to any one of Aspect 1-Aspect 81, wherein the low processing temperature polymeric composition exhibits a modulus of about 1 MPa to about 500 MPa.

Aspect 83. The textile according to any one of Aspect 1-Aspect 82, wherein the low processing temperature polymeric composition exhibits a modulus of about 5 MPa to about 150 MPa.

Aspect 84. The textile according to any one of Aspect 1-Aspect 83, wherein the low processing temperature polymeric composition exhibits a modulus of about 20 MPa to about 130 MPa.

Aspect 85. The textile according to any one of Aspect 1-Aspect 84, wherein the low processing temperature polymeric composition exhibits a modulus of about 30 MPa to about 120 MPa.

Aspect 86. The textile according to any one of Aspect 1-Aspect 85, wherein the low processing temperature polymeric composition exhibits a modulus of about 40 MPa to about 110 MPa.

Aspect 87. The textile according to any one of Aspect 1-Aspect 86, wherein the low processing temperature polymeric composition exhibits a cold Ross flex (flexibility at cold temperature) of about 5000 cycles or more.

Aspect 88. The textile according to Aspect 87, wherein the low processing temperature polymeric composition exhibits a cold Ross flex (flexibility at cold temperature) from about 5,000 cycles to about 500,000 cycles.

Aspect 89. The textile according to Aspect 87, wherein the low processing temperature polymeric composition exhibits a cold Ross flex (flexibility at cold temperature) a cold Ross flex (flexibility at cold temperature of about 150,000 cycles.

Aspect 90. The textile according to any one of Aspect 1-Aspect 89, wherein the one or more first thermoplastic polymers comprises one or more thermoplastic polymers selected from the group consisting of polyesters, polyethers, polyamides, polyurethanes and polyolefins.

Aspect 91. The textile according to any one of Aspect 1-Aspect 90, wherein the one or more first thermoplastic polymers comprises one or more thermoplastic polymers selected from the group consisting of polyesters, polyethers, polyamides, polyurethanes, and combinations thereof.

Aspect 92. The textile according to any one of Aspect 1-Aspect 91, wherein the one or more first thermoplastic polymers comprises one or more thermoplastic polyesters.

Aspect 93. The textile according to any one of Aspect 1-Aspect 92, wherein the one or more first thermoplastic polyesters comprises polyethylene terephthalate (PET).

Aspect 94. The textile according to any one of Aspect 1-Aspect 93, wherein the one or more first thermoplastic polymers comprises one or more thermoplastic polyamides.

Aspect 95. The textile according to Aspect 94, wherein the one or more thermoplastic polyamides comprises nylon 6,6, nylon 6, nylon 12, and combinations thereof.

Aspect 96. The textile according to any one of Aspect 1-Aspect 95, wherein the one or more first thermoplastic polymers comprises one or more thermoplastic polyurethanes.

Aspect 97. The textile according to any one of Aspect 1-Aspect 96, wherein the one or more first thermoplastic polymers comprise one or more thermoplastic copolymers.

Aspect 98. The textile according to Aspect 97, wherein the one or more thermoplastic copolymers comprises thermoplastic copolymers selected from the group consisting of thermoplastic co-polyesters, thermoplastic co-polyethers, thermoplastic co-polyamides, thermoplastic co-polyurethanes, and combinations thereof.

Aspect 99. The textile according to Aspect 97, wherein the one or more first thermoplastic copolymers comprise thermoplastic co-polyesters.

Aspect 100. The textile according to Aspect 97, wherein the one or more first thermoplastic copolymers comprise thermoplastic co-polyethers.

Aspect 101. The textile according to Aspect 97, wherein the one or more first thermoplastic copolymers comprise thermoplastic co-polyamides.

Aspect 102. The textile according to Aspect 97, wherein the one or more first thermoplastic copolymers comprise thermoplastic co-polyurethanes.

Aspect 103. The textile according to any one of Aspect 1-Aspect 102, wherein the one or more first thermoplastic polymers comprise one or more thermoplastic polyether block amide (PEBA) copolymers.

Aspect 104. The textile according to any one of Aspect 1-Aspect 103, wherein the one or more second thermoplastic polymers comprise one or more thermoplastic polymers selected from the group consisting of thermoplastic polyesters, thermoplastic polyethers, thermoplastic polyamides, thermoplastic polyurethanes, and thermoplastic polyolefins.

Aspect 105. The textile according to any one of Aspect 1-Aspect 104, wherein the one or more second thermoplastic polymers comprise one or more thermoplastic polymers selected from the group consisting of thermoplastic polyesters, thermoplastic polyethers, thermoplastic polyamides, and combinations thereof.

Aspect 106. The textile according to any one of Aspect 1-Aspect 105, wherein the one or more second thermoplastic polymers comprise one or more thermoplastic polymers selected from the group consisting of thermoplastic polyesters, thermoplastic polyamides, and combinations thereof.

Aspect 107. The textile according to any one of Aspect 1-Aspect 106, wherein the one or more second thermoplastic polymers comprises one or more thermoplastic polyesters.

Aspect 108. The textile according to Aspect 107, wherein the one or more thermoplastic polyesters comprises thermoplastic polyethylene terephthalate (PET).

Aspect 109. The textile according to any one of Aspect 1-Aspect 108, wherein the one or more second thermoplastic polymers comprises one or more thermoplastic polyamides.

Aspect 110. The textile according to Aspect 109, wherein the one or more thermoplastic polyamides comprises nylon 6,6, nylon 6, nylon 12, and combinations thereof.

Aspect 111. The textile according to any one of Aspect 1-Aspect 110, wherein the one or more second thermoplastic polymers comprises one or more thermoplastic polyurethanes.

Aspect 112. The textile according to any one of Aspect 1-Aspect 111, wherein the one or more second thermoplastic polymers comprise one or more thermoplastic copolymers.

Aspect 113. The textile according to any one of Aspect 1-Aspect 112, wherein the one or more second thermoplastic polymers comprise one or more thermoplastic copolymers selected from the group consisting of thermoplastic co-polyesters, thermoplastic co-polyethers, thermoplastic co-polyamides, thermoplastic co-polyurethanes, and combinations thereof.

Aspect 114. The textile according to any one of Aspect 1-Aspect 113, wherein the one or more second thermoplastic polymers comprise thermoplastic co-polyesters.

Aspect 115. The textile according to any one of Aspect 1-Aspect 114, wherein the one or more second thermoplastic polymers comprise thermoplastic co-polyethers.

Aspect 116. The textile according to any one of Aspect 1-Aspect 115, wherein the one or more second thermoplastic polymers comprise thermoplastic co-polyamides.

Aspect 117. The textile according to any one of Aspect 1-Aspect 116, wherein the one or more second thermoplastic polymers comprise thermoplastic co-polyurethanes.

Aspect 118. The textile according to any one of Aspect 1-Aspect 117, wherein the one or more second thermoplastic polymers comprise one or more thermoplastic polyether block amide (PEBA) copolymers.

Aspect 119. The textile according to any one of Aspect 1-Aspect 118, wherein the first yarn is essentially free of dye.

Aspect 120. The textile according to any one of Aspect 1-Aspect 119, wherein the second yarn is a package dyed yarn.

Aspect 121. The textile according to any one of Aspect 1-Aspect 120, wherein the second yarn is a solution dyed yarn.

Aspect 122. A process for manufacturing an article comprising: providing the textile according to any one of Aspect 1-Aspect 121; and combining the textile with one or more additional components to form an article of footwear, an article of apparel, or an article of sporting equipment.

Aspect 123. The process for manufacturing an article according to Aspect 122, wherein the article is an article of footwear, and the one or more the additional components comprise a heel counter, a sockliner, a strobel, a toe cap, a plate, or a chassis.

Aspect 124. An article comprising: a first reflowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature composition comprising one or more second thermoplastic polymers; and wherein the high processing temperature polymeric composition exhibits a creep relaxation temperature Tcr that is greater than a melting temperature Tm of the low processing temperature polymeric composition.

Aspect 125. An article comprising: a first reflowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature polymeric composition comprising one or more second thermoplastic polymers; and wherein the high processing temperature polymeric composition exhibits a heat deflection temperature Thd that is greater than a melting temperature Tm of the low processing temperature polymeric composition.

Aspect 126. An article comprising: a first reflowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature polymeric composition comprising one or more second thermoplastic polymers; and wherein the high processing temperature polymeric composition exhibits a Vicat softening temperature Tvs that is greater than a melting temperature Tm of the low processing temperature polymeric composition.

Aspect 127. An article comprising: a first reflowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature polymeric composition comprising one or more second thermoplastic polymers; and wherein the high processing temperature polymeric composition exhibits at least one of: 1) a creep relaxation temperature Tcr; 2) a heat deflection temperature Thd; or 3) a Vicat softening temperature Tvs that is greater than the melting temperature Tm of the low processing temperature polymeric composition.

Aspect 128. The article according to any one of Aspect 124-Aspect 127, wherein the melted and re-solidified product is a melted and re-solidified element selected from a first shaped component, a first film, a first yarn, a first fiber, a first textile, or any combination thereof, which is a component of the second element.

Aspect 129. The article according to any one of Aspect 124-Aspect 128, wherein the article is an article of footwear or a component of an article of footwear, an article of apparel or a component of an article of apparel, or is an article of sporting equipment or a component of an article of sporting equipment.

Aspect 130. The article according to Aspect 129, wherein the article is an article of sporting equipment or a component of an article of sporting equipment.

Aspect 131. The article according to Aspect 130, wherein the article is a component of an article of sporting equipment selected from the group including a component of a hat, a component of a bag, a component of a ball, and a component of protective equipment.

Aspect 132. The article according to Aspect 129, wherein the article is an article of apparel or a component of an article of apparel.

Aspect 133. The article according to Aspect 132, wherein the article is an article of footwear or a component of an article of footwear.

Aspect 134. The article according to Aspect 133, wherein the article is an upper for an article of footwear.

Aspect 135. The article according to Aspect 134, wherein the upper includes an outsole area.

Aspect 136. The article according to any one of Aspect 134-Aspect 135, wherein the article comprises a ground-facing area, wherein at least a portion of the first reflowed material is present on the ground-facing area of the upper.

Aspect 137. The article according to any one of Aspect 134-Aspect 136, wherein the at least a portion of the first reflowed material is on at least about 40%, 50%, 60%, 70%, 80%, or 90% of the ground-facing area.

Aspect 138. The article according to any one of Aspect 134-Aspect 137, wherein at least a portion of the first reflowed material is present on: a ground-facing area of the upper; a toe-box area of the upper; and/or a heel area of the upper.

Aspect 139. The article according to any one of Aspect 134-Aspect 138, wherein the upper wraps around at least a portion of the last and covers a bottom portion of the last when the upper is present on a last.

Aspect 140. The article according to any one of Aspect 134-Aspect 139, wherein at least a portion of a ground-facing area of the upper covers the bottom portion of the last when the upper is present on a last.

Aspect 141. The article according to any one of Aspect 134-Aspect 140, wherein the at least the portion of the ground-facing area includes at least a portion of the first reflowed material.

Aspect 142. The article according to any one of Aspect 124-Aspect 141, wherein the article comprises an outward most layer that includes at least a portion of the first reflowed material; wherein the outward most layer comprises a first area and a second area, wherein the first area comprises an increased concentration of the first reflowed material compared to the second area.

Aspect 143. The article according to Aspect 142, wherein the article is an upper for an article of footwear; and wherein the first area comprises a ground-facing area, a sole perimeter area, a heel area, and/or a toe-box area.

Aspect 144. The article according to any one of Aspect 142-Aspect 143, wherein the article is an upper for an article of footwear; and wherein the second area comprises a forefoot opening area and/or an ankle collar area.

Aspect 145. The article according to any one of Aspect 124-Aspect 144, wherein the outward most layer comprises a transition area positioned between the first and second areas, wherein the transition area includes a decreased concentration of the low processing temperature polymeric composition compared to the first area.

Aspect 146. The article according to any one of Aspect 124-Aspect 145, wherein the transition area comprises an increased concentration of the low processing temperature polymeric composition compared to the second area.

Aspect 147. The article according to any one of Aspect 124-Aspect 146, wherein the article further comprises an outer surface having at least a first zone, a second zone, and a third zone, the second zone positioned between the first and third zones, wherein the first zone comprises an increased concentration of the high processing temperature polymeric composition compared to the second zone, and wherein the third zone comprises an increased concentration of the low processing temperature polymeric composition compared to the second zone.

Aspect 148. The article according to any one of Aspect 124-Aspect 147, wherein the high processing temperature polymeric composition exhibits a creep relaxation temperature Tcr that is greater than a melting temperature Tm of the low processing temperature polymeric composition.

Aspect 149. The article according to any one of Aspect 124-Aspect 148, wherein the high processing temperature polymeric composition exhibits a heat deflection temperature Thd that is greater than a melting temperature Tm of the low processing temperature polymeric composition.

Aspect 150. The article according to any one of Aspect 124-Aspect 149, wherein the high processing temperature polymeric composition exhibits a Vicat softening temperature Tvs that is greater than a melting temperature Tm of the low processing temperature polymeric composition.

Aspect 151. The article according to any one of Aspect 124-Aspect 150, the first reflowed material is impermeable to water.

Aspect 152. The article according to any one of Aspect 124-Aspect 151, wherein the low processing temperature polymeric composition exhibits: a melting temperature Tm is less than about 135° C.

Aspect 153. The article according to any one of Aspect 124-Aspect 151, wherein the low processing temperature polymeric composition exhibits: a melting temperature Tm is less than about 120° C.

Aspect 154. The article according to any one of Aspect 124-Aspect 153, wherein the high processing temperature polymeric composition exhibits a melting temperature Tm of greater than 140° C.

Aspect 155. The article according to any one of Aspect 124-Aspect 153, wherein the high processing temperature polymeric composition exhibits a melting temperature Tm that is at least 10° C. greater than a melting temperature Tm of the low processing temperature polymeric composition.

Aspect 156. The article according to any one of Aspect 124-Aspect 154, wherein the low processing temperature polymeric composition of the first reflowed material exhibits a glass transition temperature Tg of about 50° C. or less.

Aspect 157. The article according to any one of Aspect 124-Aspect 156, wherein the low processing temperature polymeric composition exhibits a melt flow index of about 0.1 g/10 min to about 60 g/10 min at 160° C. using a test weight of 2.16 kg.

Aspect 158. The article according to any one of Aspect 124-Aspect 157, wherein the low processing temperature polymeric composition exhibits an enthalpy of melting of at least about 5 J/g.

Aspect 159. The article according to any one of Aspect 124-Aspect 158, wherein the low processing temperature polymeric composition exhibits a modulus or stiffness of about 1 MPa to about 500 MPa.

Aspect 160. The article according to any one of Aspect 124-Aspect 159, wherein the low processing temperature polymeric composition exhibits a cold Ross flex (flexibility at cold temperature) of about 5000 cycles or more.

Aspect 161. The article according to any one of Aspect 124-Aspect 160, wherein the one or more first thermoplastic polymers comprises one or more polymers selected from the group consisting of polyesters, polyethers, polyamides, polyurethanes and polyolefins.

Aspect 162. The article according to any one of Aspect 124-Aspect 161, wherein the one or more first thermoplastic polymers comprises one or more polymers selected from the group consisting of polyesters, polyethers, polyamides, polyurethanes, and combinations thereof.

Aspect 163. The article according to any one of Aspect 124-Aspect 162, wherein the one or more first thermoplastic polymers can include one or more polyesters.

Aspect 164. The article according to any one of Aspect 124-Aspect 163, wherein the one or more polyesters can include polyethylene terephthalate (PET).

Aspect 165. The article according to any one of Aspect 124-Aspect 164, wherein the one or more first thermoplastic polymers comprises one or more polyamides.

Aspect 166. The article according to any one of Aspect 124-Aspect 165, wherein the one or more polyamides comprises nylon 6,6, nylon 6, nylon 12, and combinations thereof.

Aspect 167. The article according to any one of Aspect 124-Aspect 166, wherein the one or more first thermoplastic polymers comprises one or more polyurethanes.

Aspect 168. The article according to any one of Aspect 124-Aspect 167, wherein the one or more first thermoplastic polymers comprise one or more copolymers.

Aspect 169. The article according to any one of Aspect 124-Aspect 168, wherein the one or more first thermoplastic polymers comprise one or more copolymers selected from the group consisting of co-polyesters, co-polyethers, co-polyamides, co-polyurethanes, and combinations thereof.

Aspect 170. The article according to any one of Aspect 124-Aspect 169, wherein the one or more first thermoplastic polymers comprise co-polyesters.

Aspect 171. The article according to any one of Aspect 124-Aspect 170, wherein the one or more first thermoplastic polymers comprise co-polyethers.

Aspect 172. The article according to any one of Aspect 124-Aspect 171, wherein the one or more first thermoplastic polymers comprise co-polyamides.

Aspect 173. The article according to any one of Aspect 124-Aspect 172, wherein the one or more first thermoplastic polymers comprise co-polyurethanes.

Aspect 174. The article according to any one of Aspect 124-Aspect 173, wherein the one or more first thermoplastic polymers comprise one or more polyether block amide (PEBA) co-polymers.

Aspect 175. The article according to any one of Aspect 124-Aspect 174, wherein the one or more second thermoplastic polymers comprise one or more polymers selected from the group consisting of polyesters, polyethers, polyamides, polyurethanes and polyolefins.

Aspect 176. The article according to any one of Aspect 124-Aspect 175, wherein the one or more second thermoplastic polymers comprise one or more polymers selected from the group consisting of polyesters, polyethers, polyamides, and combinations thereof.

Aspect 177. The article according to any one of Aspect 124-Aspect 176, wherein the one or more second thermoplastic polymers comprise one or more polymers selected from the group consisting of polyesters, polyamides, and combinations thereof.

Aspect 178. The article according to any one of Aspect 124-Aspect 177, wherein the one or more second thermoplastic polymers can include one or more polyesters.

Aspect 179. The article according to any one of Aspect 124-Aspect 178, wherein the one or more polyesters can include polyethylene terephthalate (PET).

Aspect 180. The article according to any one of Aspect 124-Aspect 179, wherein the one or more second thermoplastic polymers comprises one or more polyamides.

Aspect 181. The article according to any one of Aspect 124-Aspect 180, wherein the one or more polyamides comprises nylon 6,6, nylon 6, nylon 12, and combinations thereof.

Aspect 182. The article according to any one of Aspect 124-Aspect 181, wherein the one or more second thermoplastic polymers comprises one or more polyurethanes.

Aspect 183. The article according to any one of Aspect 124-Aspect 182, wherein the one or more second thermoplastic polymers comprise one or more copolymers.

Aspect 184. The article according to any one of Aspect 124-Aspect 183, wherein the one or more second thermoplastic polymers comprise one or more copolymers selected from the group consisting of co-polyesters, co-polyethers, co-polyamides, co-polyurethanes, and combinations thereof.

Aspect 185. The article according to any one of Aspect 124-Aspect 184, wherein the one or more second thermoplastic polymers comprise co-polyesters.

Aspect 186. The article according to any one of Aspect 124-Aspect 185, wherein the one or more second thermoplastic polymers comprise co-polyethers.

Aspect 187. The article according to any one of Aspect 124-Aspect 186, wherein the one or more second thermoplastic polymers comprise co-polyamides.

Aspect 188. The article according to any one of Aspect 124-Aspect 187, wherein the one or more second thermoplastic polymers comprise co-polyurethanes.

Aspect 189. The article according to any one of Aspect 124-Aspect 188, wherein the one or more second thermoplastic polymers comprise one or more polyether block amide (PEBA) co-polymers.

Aspect 190. The article according to any one of Aspect 124-Aspect 189, wherein first element includes a first yarn essentially free of dye.

Aspect 191. The article according to any one of Aspect 124-Aspect 190, wherein the second element includes a package dyed yarn.

Aspect 192. The article according to any one of Aspect 124-Aspect 191, wherein the second element includes a solution dyed yarn.

Aspect 193. The article according to any one of Aspect 124-Aspect 192, wherein the article further comprises a lining on at least a portion of an interior surface of the article, the lining comprising a shaped component, a film, a textile, a yarn or a fiber comprising a high processing temperature polymeric composition, the high processing temperature composition comprising one or more third thermoplastic polymers.

Aspect 194. The article according to any one of Aspect 124-Aspect 193, wherein the article further comprises a skin on at least a portion of an exterior surface of the article, the skin comprising a re-flowed material comprising a low processing temperature composition, the low processing temperature composition comprising one or more fourth thermoplastic polymers.

Aspect 195. A process for manufacturing an article comprising: providing the article according to any one of Aspect 124-Aspect 192; and combining the knit article with one or more additional materials to form an article of footwear, apparel or sporting equipment.

Aspect 196. The process for manufacturing according to Aspect 195, wherein the article is an article of footwear, and the one or more additional materials comprise a heel counter, a sockliner, a strobel, a toe cap, a plate, and a chassis.

Aspect 197. A process for manufacturing an article, the process comprising: receiving a first element selected from a first shaped component, a first film, a first textile, a first yarn, and a first fiber; receiving a second element selected from a second shaped component, a second film, a second textile, a second yarn, or a second fiber; wherein the first element comprises a low processing temperature polymeric composition, the low processing temperature polymeric composition comprising one or more first thermoplastic polymers, wherein the second element comprises a high processing temperature polymeric composition, the high processing temperature polymeric composition comprising one or more second thermoplastic polymers, and wherein the high processing temperature polymeric composition exhibits at least one of: 1) a creep relaxation temperature Tcr; 2) a heat deflection temperature Thd; or 3) a Vicat softening temperature Tvs that is greater than the melting temperature Tm of the low processing temperature polymeric composition; placing at least a portion of the first element and at least a portion of the second element on a molding surface; while the at least a portion of the first element and the at least a portion of the second element is on the molding surface, increasing a temperature of the entire article to a temperature that is above the melting temperature Tm of the low processing temperature polymeric composition and below at least one of: 1) the creep relaxation temperature Tcr; 2) the heat deflection temperature Thd; or 3) the Vicat softening temperature Tvs of the high processing temperature polymeric composition; and subsequent to the increasing the temperature of the entire article, while the at least a portion of the article remains on the molding surface, decreasing the temperature of the entire article to a temperature below the melting temperature Tm of the low processing temperature polymeric composition, thereby forming a article.

Aspect 198. The process for manufacturing an article according to Aspect 197, wherein the article is an article of footwear or a component of an article of footwear, an article of apparel or a component of an article of apparel, or is an article of sporting equipment or a component of an article of sporting equipment.

Aspect 199. The process for manufacturing an article according Aspect 198, wherein the article is an article of sporting equipment or a component of an article of sporting equipment.

Aspect 200. The process for manufacturing an article according Aspect 198, wherein the article is a component of an article of sporting equipment selected from the group including a component of a hat, a component of a bag, a component of a ball, and a component of protective equipment.

Aspect 201. The process for manufacturing an article according Aspect 198, wherein the article is an article of apparel or a component of an article of apparel.

Aspect 202. The process for manufacturing an article according Aspect 198, wherein the article is an article of footwear or a component of an article of footwear.

Aspect 203. The process for manufacturing an article according Aspect 202, wherein the article is an upper for an article of footwear.

Aspect 204. The process for manufacturing an article according Aspect 203, wherein the upper includes an outsole area.

Aspect 205. The process for manufacturing an article according to Aspect 204, wherein the article comprises a ground-facing area; and wherein at least a portion of the first yarn is present on the ground-facing area of the knit upper.

Aspect 206. The process for manufacturing an article according to any one of Aspect 204 and Aspect 205, wherein the at least a portion of the first element comprising the low processing temperature polymeric composition is on at least about 40%, 50%, 60%, 70%, 80%, or 90% of the ground-facing area.

Aspect 207. The process for manufacturing an article according to any one of Aspect 204-Aspect 206, wherein at least a portion of the first element comprising the low processing temperature polymeric composition is present on: a ground-facing area of the knit upper; a toe-box area of the knit upper; and/or a heel area of the knit upper.

Aspect 208. The process for manufacturing an article according to any one of Aspect 204-Aspect 207, wherein the upper wraps around at least a portion of the last and covers a bottom portion of the last when the upper is present on a last.

Aspect 209. The process for manufacturing an article according to any one of Aspect 204-Aspect 208, wherein at least a portion of a ground-facing area of the upper covers the bottom portion of the last when the upper is present on a last.

Aspect 210. The process for manufacturing an article according to any one of Aspect 204-Aspect 209, wherein the at least the portion of the ground-facing area includes at least a portion of the first element comprising the low processing temperature polymeric composition.

Aspect 211. The process for manufacturing an article according to any one of Aspect 197-Aspect 210, wherein the article comprises an outward most layer that includes at least a portion of the first element comprising the low processing temperature polymeric composition, the outward most layer comprising a first area and a second area, wherein the first area comprises an increased concentration of the element comprising the low processing temperature polymeric composition compared to the second area.

Aspect 212. The process for manufacturing an article according to Aspect 211, wherein the first area comprises a ground-facing outsole area, a sole perimeter area, a heel area, and/or a toe-box area.

Aspect 213. The process for manufacturing an article according to any one of Aspect 211 and Aspect 212, wherein the second area comprises a forefoot opening area and/or an ankle collar area.

Aspect 214. The process for manufacturing an article according to any one of Aspect 211-Aspect 213, wherein the outward most layer further comprises a transition area positioned between the first and second areas, wherein the transition area includes a decreased concentration of the first shaped component, the first film, the first textile, the first yarn, or the first fiber comprising the low processing temperature polymeric composition compared to the first area.

Aspect 215. The process for manufacturing an article according to any one of Aspect 211-Aspect 214, wherein the transition area comprises an increased concentration of the first element comprising the low processing temperature polymeric composition compared to the second area.

Aspect 216. The process for manufacturing an article according Aspect 203, wherein the upper comprises a ground-facing outsole area Aspect 217. The process for manufacturing an article according Aspect 216, wherein at least a portion of the first element is present on the ground-facing outsole area.

Aspect 218. The process for manufacturing an article according Aspect 216, wherein at least a portion of the second element is present on the ground-facing outsole area.

Aspect 219. The process for manufacturing an article according Aspect 216, wherein the upper, when the upper is present on the last, the upper wraps around at least a portion of the last and covers a bottom portion of the last.

Aspect 220. The process for manufacturing an article according to any one of Aspect 216-Aspect 219, wherein at least a portion of a ground-facing outsole area of the upper covers the bottom portion of the last.

Aspect 221. The process for manufacturing an article according to any one of Aspect 216-Aspect 220, wherein the at least the portion of the ground-facing outsole area includes at least a portion of the first element.

Aspect 222. The process for manufacturing an article according to any one of Aspect 216-Aspect 221, wherein the upper comprises an outward most layer that includes at least a portion of the element, the outward most layer comprising a first area and a second area, wherein the first area comprises an increased concentration of the first element compared to the second area.

Aspect 223. The process for manufacturing an article according to any one of Aspect 216-Aspect 222, wherein the second area comprises a forefoot opening area and/or an ankle collar area.

Aspect 224. The process for manufacturing an article according to any one of Aspect 216-Aspect 223, wherein the outward most layer further comprises a transition area positioned between the first and second areas, wherein the transition area includes a decreased concentration of the first shaped component, the element compared to the first area.

Aspect 225. The process for manufacturing an article according to any one of Aspect 216-Aspect 224, wherein the transition area comprises an increased concentration of the first shaped component, the first element compared to the second area.

Aspect 226. The process for manufacturing an article according any one of Aspect 197-Aspect 225, wherein the high processing temperature polymeric composition exhibits a creep relaxation temperature $T_{cr}$ that is greater than the melting temperature $T_m$ of the low processing temperature polymeric composition.

Aspect 227. The process for manufacturing an article according any one of Aspect 197-Aspect 225, wherein the high processing temperature polymeric composition exhibits a heat deflection temperature $T_{hd}$ that is greater than the melting temperature $T_m$ of the low processing temperature polymeric composition.

Aspect 228. The process for manufacturing an article according any one of Aspect 197-Aspect 225, wherein the high processing temperature polymeric composition exhibits a Vicat softening temperature $T_{vs}$ that is greater than the melting temperature $T_m$ of the low processing temperature polymeric composition.

Aspect 229. The process for manufacturing an article according to any one of Aspect 197-Aspect 228, wherein the melting temperature $T_m$ of the low processing temperature polymeric composition is less than 135° C.

Aspect 230. The process for manufacturing an article according to any one of Aspect 197-Aspect 228, wherein the low processing temperature polymeric composition exhibits a melting temperature of less than 120° C.

Aspect 231. The process for manufacturing an article according to any one of Aspect 197-Aspect 230, wherein the low processing temperature polymeric composition exhibits a glass transition temperature $T_g$ of about 50° C. or less.

Aspect 232. The process for manufacturing an article according to any one of Aspect 197-Aspect 231, wherein the low processing temperature polymeric composition exhibits a melt flow index of about 0.1 g/10 min to about 60 g/10 min at 160° C. using a test weight of 2.16 kg.

Aspect 233. The process for manufacturing an article according to any one of Aspect 197-Aspect 232, wherein the low processing temperature polymeric composition exhibits an enthalpy of melting of at least about 5 J/g.

Aspect 234. The process for manufacturing an article according to any one of Aspect 197-Aspect 233, wherein the high processing temperature polymeric composition exhibits a melting temperature $T_m$ of greater than 140° C.

Aspect 235. The process for manufacturing an article according to any one of Aspect 197-Aspect 234, wherein the high processing temperature polymeric composition exhibits a melting temperature $T_m$ that is at least 10° C. greater than a melting temperature $T_m$ of the low processing temperature polymeric composition.

Aspect 236. The process of manufacturing an article according to any one of Aspect 197-Aspect 233, wherein, when the first element is exposed to a temperature above the melting temperature $T_m$ of the low processing temperature polymeric composition for at least one minute and then exposed to a temperature below the melting temperature $T_m$ of the low processing temperature polymeric composition for at least one minute, thereby forming a thermoformed material, the thermoformed material exhibits: a modulus or stiffness of about 1 MPa to about 500 MPa.

Aspect 237. The process of manufacturing an article according to any one of Aspect 197-Aspect 233, wherein, when the first element is exposed to a temperature above the melting temperature $T_m$ of the low processing temperature polymeric composition for at least one minute and then exposed to a temperature below the melting temperature Tm of the low processing temperature polymeric composition for at least one minute, thereby forming a thermoformed material, the thermoformed material exhibits: a cold Ross flex (flexibility at cold temperature) of about 5000 cycles or more.

Aspect 238. The process of manufacturing an article according to Aspect 237, wherein the thermoformed material exhibits: a cold Ross flex (flexibility at cold temperature) from about 5,000 cycles to about 500,000 cycles.

Aspect 239. The process of manufacturing an article according to Aspect 237, wherein the thermoformed material exhibits: a cold Ross flex (flexibility at cold temperature of about 150,000 cycles.

Aspect 240. The process for manufacturing an article according to any one of Aspect 197-Aspect 239, wherein the one or more first thermoplastic polymers comprises one or more polymers selected from the group consisting of polyesters, polyethers, polyamides, polyurethanes and polyolefins.

Aspect 241. The process for manufacturing an article according to any one of Aspect 197-Aspect 239, wherein the one or more first thermoplastic polymers comprises one or more polymers selected from the group consisting of polyesters, polyethers, polyamides, polyurethanes, and combinations thereof.

Aspect 242. The process for manufacturing an article according to any one of Aspect 197-Aspect 241, wherein the one or more first thermoplastic polymers can include one or more polyesters.

Aspect 243. The process for manufacturing an article according to any one of Aspect 197-Aspect 242, wherein the one or more polyesters can include polyethylene terephthalate (PET).

Aspect 244. The process for manufacturing an article according to any one of Aspect 197-Aspect 243, wherein the one or more first thermoplastic polymers comprises one or more polyamides.

Aspect 245. The process for manufacturing an article according to any one of Aspect 197-Aspect 244, wherein the one or more polyamides comprises nylon 6,6, nylon 6, nylon 12, and combinations thereof.

Aspect 246. The process for manufacturing an article according to any one of Aspect 197-Aspect 245, wherein the one or more first thermoplastic polymers comprises one or more polyurethanes.

Aspect 247. The process for manufacturing an article according to any one of Aspect 197-Aspect 246, wherein the one or more first thermoplastic polymers comprise one or more copolymers.

Aspect 248. The process for manufacturing an article according to any one of Aspect 197-Aspect 247, wherein the one or more first thermoplastic polymers comprise one or more copolymers selected from the group consisting of co-polyesters, co-polyethers, co-polyamides, co-polyurethanes, and combinations thereof.

Aspect 249. The process for manufacturing an article according to any one of Aspect 197-Aspect 248, wherein the one or more first thermoplastic polymers comprise co-polyesters.

Aspect 250. The process for manufacturing an article according to any one of Aspect 197-Aspect 249, wherein the one or more first thermoplastic polymers comprise co-polyethers.

Aspect 251. The process for manufacturing an article according to any one of Aspect 197-Aspect 250, wherein the one or more first thermoplastic polymers comprise co-polyamides.

Aspect 252. The process for manufacturing an article according to any one of Aspect 197-Aspect 251, wherein the one or more first thermoplastic polymers comprise co-polyurethanes.

Aspect 253. The process for manufacturing an article according to any one of Aspect 197-Aspect 252, wherein the one or more first thermoplastic polymers comprise one or more polyether block amide (PEBA) co-polymers.

Aspect 254. The process for manufacturing an article according to any one of Aspect 197-Aspect 253, wherein the one or more second thermoplastic polymers comprise one or more polymers selected from the group consisting of polyesters, polyethers, polyamides, polyurethanes and polyolefins.

Aspect 255. The process for manufacturing an article according to any one of Aspect 197-Aspect 254, wherein the one or more second thermoplastic polymers comprise one or more polymers selected from the group consisting of polyesters, polyethers, polyamides, and combinations thereof.

Aspect 256. The process for manufacturing an article according to any one of Aspect 197-Aspect 255, wherein the one or more second thermoplastic polymers comprise one or more polymers selected from the group consisting of polyesters, polyamides, and combinations thereof.

Aspect 257. The process for manufacturing an article according to any one of Aspect 197-Aspect 256, wherein the one or more second thermoplastic polymers can include one or more polyesters.

Aspect 258. The process for manufacturing an article according to any one of Aspect 197-Aspect 257, wherein the one or more polyesters can include polyethylene terephthalate (PET).

Aspect 259. The process for manufacturing an article according to any one of Aspect 197-Aspect 258, wherein the one or more second thermoplastic polymers comprises one or more polyamides.

Aspect 260. The process for manufacturing an article according to any one of Aspect 197-Aspect 259, wherein the one or more polyamides comprises nylon 6,6, nylon 6, nylon 12, and combinations thereof.

Aspect 261. The process for manufacturing an article according to any one of Aspect 197-Aspect 260, wherein the one or more second thermoplastic polymers comprises one or more polyurethanes.

Aspect 262. The process for manufacturing an article according to any one of Aspect 197-Aspect 261, wherein the one or more second thermoplastic polymers comprise one or more copolymers.

Aspect 263. The process for manufacturing an article according to any one of Aspect 197-Aspect 262, wherein the one or more second thermoplastic polymers comprise one or more copolymers selected from the group consisting of co-polyesters, co-polyethers, co-polyamides, co-polyurethanes, and combinations thereof.

Aspect 264. The process for manufacturing an article according to any one of Aspect 197-Aspect 263, wherein the one or more second thermoplastic polymers comprise co-polyesters.

Aspect 265. The process for manufacturing an article according to any one of Aspect 197-Aspect 264, wherein the one or more second thermoplastic polymers comprise co-polyethers.

Aspect 266. The process for manufacturing an article according to any one of Aspect 197-Aspect 265, wherein the one or more second thermoplastic polymers comprise co-polyamides.

Aspect 267. The process for manufacturing an article according to any one of Aspect 197-Aspect 266, wherein the one or more second thermoplastic polymers comprise co-polyurethanes.

Aspect 268. The process for manufacturing an article according to any one of Aspect 197-Aspect 267, wherein the one or more second thermoplastic polymers comprise one or more polyether block amide (PEBA) co-polymers.

Aspect 269. The process for manufacturing an article according to any one of Aspect 197-Aspect 268, wherein the molding surface is a last.

Aspect 270. The process for manufacturing an article according to any one of Aspect 197-Aspect 269, wherein the molding surface is not adapted to permit gas circulation through at least a portion of the molding surface.

Aspect 271. The process for manufacturing an article according to any one of Aspect 197-Aspect 270, wherein the article comprises an article outer inner surface and an article outer surface; wherein the molding surface comprises an inner molding surface and an outer surface; and wherein the at least a portion of the article on the molding surface has an article inner surface in contact with the molding outer surface.

Aspect 272. The process for manufacturing an article according to Aspect 271, further comprising placing a protective sheath in contact with the at least a portion of the article on the molding surface; wherein at least a portion of the protective sheath is contact with the article outer surface.

Aspect 273. The process for manufacturing an article according to Aspect 271, further comprising placing a vacuum bag in contact with the at least a portion of the article on the inner molding surface; wherein at least a portion of the vacuum bag is contact with the article outer surface opposed to the at least a portion of the article on the inner molding surface.

Aspect 274. The process for manufacturing an article according to Aspect 271, further comprising placing a protective sheath in contact with the at least a portion of the article on the molding surface; wherein at least a portion of the protective sheath is contact with the article outer surface; and further comprising placing at least a portion of a vacuum bag in contact with the protective sheath in contact with the at least a portion of the article outer surface.

Aspect 275. The process for manufacturing an article according to any one of Aspect 272 and Aspect 274, wherein the protective sheath further comprises a protective sheaf raised surface in contact the at least a portion of the textile on the molding surface; wherein the protective sheaf raised surface comprises a pattern.

Aspect 276. The process for manufacturing an article according to any one of Aspect 272 and Aspect 274-Aspect 275, wherein the protective sheath is formed from a polymeric material.

Aspect 277. The process for manufacturing an article according to Aspect 276, wherein the polymeric material is formed of a silicone elastomer.

Aspect 278. The process for manufacturing an article according to Aspect 276, wherein the polymeric material comprises silicon moieties.

Aspect 279. The process for manufacturing an article according to any one of Aspect 273 and Aspect 274, wherein the bag is formed from a polymeric material.

Aspect 280. The process for manufacturing an article according to Aspect 279, wherein the bag is formed of a silicone elastomer.

Aspect 281. The process for manufacturing an article according to Aspect 279, wherein the polymeric material comprises silicon moieties.

Aspect 282. The process for manufacturing a knit article according to any one of Aspect 272-Aspect 281, wherein the protective sheath is formed of a silicone elastomer, and the increasing the temperature of the entire knit textile is increasing the temperature of the entire knit textile to a temperature below the melting temperature or degradation temperature of the silicone elastomer.

Aspect 283. The process for manufacturing a knit article according to any one of Aspect 272-Aspect 282, wherein the increasing the temperature further comprises applying a compressive force to the protective sheath in contact with the at least a portion of the knit textile in contact with the at least a portion of the knit textile outer surface on the molding surface, the bag in contact with the at least a portion of the knit textile on the molding surface, or the bag in contact with the at least a portion of the protective sheath in contact with the at least a portion of the knit textile outer surface.

Aspect 284. The process for manufacturing an article according to Aspect 283, wherein the compressive force provides a pressure differential between the inner molding surface and the outer molding surface.

Aspect 285. The process for manufacturing an article according to Aspect 284, wherein the pressure differential is a positive pressure differential.

Aspect 286. The process for manufacturing an article according to Aspect 284, wherein the pressure differential is a negative pressure differential.

Aspect 287. The process for manufacturing an article according to any one of Aspect 197-Aspect 286, wherein first element includes a first yarn essentially free of dye.

Aspect 288. The process for manufacturing an article according to any one of Aspect 197-Aspect 287, wherein the second element includes a package dyed yarn.

Aspect 289. The process for manufacturing an article according to any one of Aspect 197-Aspect 288, wherein the second element includes a solution dyed yarn.

Aspect 290. The process for manufacturing an article according to any one of Aspect 197-Aspect 289, wherein receiving the first element comprises receiving a first formed element, the first formed element including two or more portions, the two or more portions selected from a portion of a third film, a portion of a third textile, or both, where at least one of the third film and the third textile comprises a low processing temperature composition comprising at least one third thermoplastic polymer, wherein the two or more portions are affixed to each other in a conformation configured to fit over or within the molding surface.

Aspect 291. The process according to Aspect 290, wherein the two or more portions are affixed to each other using a stitching thread.

Aspect 292. The process according to any Aspect 291, wherein the stitching thread comprises a low processing temperature composition comprising at least one fourth thermoplastic polymers.

Aspect 293. The process according to any one of Aspect 290-Aspect 292, wherein the first formed element includes two or more portions of the third film.

Aspect 294. The process according to any one of Aspect 290-Aspect 293, the first formed element includes two or more portions of the third textile.

Aspect 295. The process according to any one of Aspect 290-Aspect 294, wherein the first formed element is configured to fit over a last.

Aspect 296. The process according to Aspect 295, wherein the placing at least a portion of the first element and at least a portion of the second element on the molding surface includes first placing a majority of the first formed element on the molding surface, then covering at least a portion of the majority of the first formed element on the molding surface with at least a portion of the second element.

Aspect 297. The process according to Aspect 296, wherein the first formed element is a lining.

Aspect 298. The process according to Aspect 297, wherein first placing a majority of the first formed element on the molding surface, then covering at least a portion of the majority of the first formed element on the molding surface with at least a portion of the second element is first placing the majority of the first formed element on a shoe last, before covering at least a portion of the majority of the first formed element on the shoe last with the at least a portion of the second element.

Aspect 299. The process according to Aspect 298, wherein the lining is for an article of footwear Aspect 300. The process according to any one of Aspect 298 and Aspect 299, wherein the majority of the first formed element on the last is a portion configured to form a lateral area of an article of footwear, a medial area of an article of footwear, a toe area of an article of footwear, a heel area of an article of footwear, or any combination thereof.

Aspect 301. The process according to any one of Aspect 296-Aspect 300, wherein the majority of the first formed element on the last is a portion configured to form a ground-facing outsole area of an article of footwear.

Aspect 302. The process according to any one of Aspect 290-Aspect 295, wherein the placing at least a portion of the first element and at least a portion of the second element on the molding surface includes first placing a majority of second element on the molding surface, then covering at least a portion of the majority of the second element on the molding surface with at least a portion of the first formed element.

Aspect 303. The process according to Aspect 302, wherein the first formed element is a skin-forming element.

Aspect 304. The process according to any one of Aspect 302 and Aspect 303, wherein first placing a majority of the second element on the molding surface, then covering at least a portion of the majority of the second element on the molding surface with at least a portion of the first formed element is first placing the majority of the second element on a shoe last, before covering at least a portion of the majority of the second element on the shoe last with the at least a portion of the first formed element.

Aspect 305. The process according to any one of Aspect 302-Aspect 304, wherein the first formed element is a skin-forming element for an article of footwear.

Aspect 306. The process according to any one of Aspect 302-Aspect 305, wherein the portion of the first formed element covering the portion of the second element is a portion of the first formed element configured to form a skin on a lateral area of an article of footwear, a medial area of an article of footwear, a toe area of an article of footwear, a heel area of an article of footwear, or any combination thereof.

Aspect 307. The process according to any one of Aspect 302-Aspect 306, wherein the portion of the first formed element covering the portion of the second element is a portion of the first formed element configured to form a ground-facing outsole area of an article of footwear.

Aspect 308. A combination upper and outsole for an article of footwear, comprising: a first re-flowed material; and a second element selected from a second shaped component, a second film, a second textile, a second yarn, or a second fiber; wherein the first reflowed material is a melted and re-solidified product of a first element selected from a first shaped component, a first film, a first yarn, a first fiber, a first textile, or any combination thereof; wherein the first reflowed material comprises a low processing temperature polymeric composition, the low processing temperature polymeric composition comprising one or more first thermoplastic polymers; wherein the second element comprises a high processing temperature composition, the high processing temperature composition comprising one or more second thermoplastic polymers; wherein the high processing temperature polymeric composition exhibits at least one of: 1) a creep relaxation temperature $T_{cr}$; 2) a heat deflection temperature $T_{hd}$; or 3) a Vicat softening temperature $T_{vs}$ that is greater than the melting temperature $T_m$ of the low processing temperature polymeric composition; and wherein the combination upper and outsole includes a medial midfoot area, a lateral midfoot area, a ground-facing outsole area, and at least a portion of the first re-flowed material is present on the ground-facing outsole area.

Aspect 309. The combination upper and outsole according to Aspect 308, wherein the at least a portion of the first re-flowed material is on at least about 40% of the ground-facing outsole area.

Aspect 310. The combination upper and outsole according to Aspect 309, wherein the at least a portion of the first re-flowed material is on at least about 90% of the ground-facing outsole area.

Aspect 311. The combination upper and outsole according to any one of Aspect 308-Aspect 310, wherein the combination upper and outsole further comprises an outer surface having at least a first zone, a second zone, and a third zone, the second zone positioned between the first and third zones, wherein the first zone comprises an increased concentration of the second yarn compared to the second zone, and wherein the third zone comprises an increased concentration of the first re-flowed material compared to the second zone.

Aspect 312. The combination upper and outsole according to Aspect 311, wherein the third zone is in the ground-facing outsole area.

Aspect 313. The combination upper and outsole according to Aspect 311, wherein the first zone is in the medial midfoot area or a lateral midfoot area or both.

Aspect 314. The combination upper and outsole according to any one of Aspect 308-Aspect 313, wherein first element includes a first yarn essentially free of dye.

Aspect 315. The combination upper and outsole according to any one of Aspect 308-Aspect 314, wherein the second element includes a package dyed yarn.

Aspect 316. The combination upper and outsole according to any one of Aspect 308-Aspect 315, wherein the second element includes a solution dyed yarn.

Aspect 317. The combination upper and outsole according to any one of Aspect 308-Aspect 316, wherein the one or more first thermoplastic polymers include one or more thermoplastic polymers selected from the group consisting of polyesters, polyethers, polyamides, polyurethanes and polyolefins.

Aspect 318. The combination upper and outsole according to Aspect 317, wherein the one or more first thermoplastic polymers comprise one or more thermoplastic co-polyamides.

Aspect 319. The combination upper and outsole according to Aspect 318, wherein the one or more first thermoplastic polymers comprise one or more thermoplastic polyether block amide (PEBA) copolymers.

Aspect 320. The combination upper and outsole according to any one of Aspect 308-Aspect 319, wherein the low processing temperature polymeric composition exhibits a melting temperature of about 80° C. to about 135° C.

Aspect 321. The combination upper and outsole according to any one of Aspect 308-Aspect 320, wherein the first low processing temperature polymeric composition exhibits a glass transition temperature Tg of about 50° C. or less, exhibits a melt flow index of about 0.1 g/10 min to about 60 g/10 min at 160° C. using a test weight of 2.16 kg, exhibits an enthalpy of melting of at least 5 J/g, exhibits a modulus of about 1 MPa to about 500 MPa, or any combination thereof.

Aspect 322. The combination upper and outsole according to any one of Aspect 308-Aspect 321, wherein the one or more first thermoplastic polymers comprises a thermoplastic polyamide, a thermoplastic poly(ether-block-amide) or a thermoplastic polyurethane, and the first low processing temperature polymeric composition exhibits a melting temperature of about 80° C. to about 135° C., exhibits a glass transition temperature Tg of about 50° C. or less, exhibits a melt flow index of about 0.1 g/10 min to about 60 g/10 min at 160° C. using a test weight of 2.16 kg, exhibits an enthalpy of melting of at least 5 J/g, and exhibits a modulus of about 1 MPa to about 500 MPa.

Aspect 323. The combination upper and outsole according to Aspect 322, wherein the low processing temperature polymeric composition exhibits a melting temperature of less than 125° C., exhibits a glass transition temperature Tg of about 0° C. or less, exhibits a melt flow index of about 5 g/10 min to about 40 g/10 min at 160° C. using a test weight of 2.16 kg, exhibits an enthalpy of melting of from about 10 J/g to about 30 J/g, and exhibits a modulus of about 30 MPa to about 120 MPa.

Aspect 324. The combination upper and outsole according to any one of Aspect 308-Aspect 323, wherein the high processing temperature polymeric composition exhibits a melting temperature Tm of greater than 140° C.

Aspect 325. The combination upper and outsole according to any one of Aspect 308-Aspect 324, wherein the high processing temperature polymeric composition exhibits a melting temperature Tm that is at least 10° C. greater than a melting temperature Tm of the low processing temperature polymeric composition.

Aspect 326. The combination upper and outsole according to any one of Aspect 308-Aspect 325, wherein the one or more second thermoplastic polymers comprise one or more thermoplastic polymers selected from the group consisting of thermoplastic polyesters, thermoplastic polyamides, and combinations thereof.

Aspect 327. The combination upper and outsole according to Aspect 326, wherein the one or more second thermoplastic polymers includes one or more thermoplastic polyesters.

Aspect 328. The combination upper and outsole according to Aspect 327, wherein the one or more second thermoplastic polyesters includes thermoplastic polyethylene terephthalate (PET).

Aspect 329. A process for manufacturing a combination upper and outsole for an article of footwear, the process comprising: receiving a first element selected from a first shaped component, a first film, a first textile, a first yarn, and a first fiber; receiving a second element selected from a second shaped component, a second film, a second textile, a second yarn, or a second fiber; wherein the first element comprises a low processing temperature polymeric composition, the low processing temperature polymeric composition comprising one or more first thermoplastic polymers, wherein the second element comprises a high processing temperature polymeric composition, the high processing temperature polymeric composition comprising one or more second thermoplastic polymers, and wherein the high processing temperature polymeric composition exhibits at least one of: 1) a creep relaxation temperature Tcr; 2) a heat deflection temperature Thd; or 3) a Vicat softening temperature Tvs that is greater than the melting temperature Tm of the low processing temperature polymeric composition; placing at least a portion of the first element and at least a portion of the second element on a molding surface; while the at least a portion of the first element and the at least a portion of the second element are on the molding surface, increasing a temperature of the entire first element and the entire second element to a temperature that is above the melting temperature Tm of the low processing temperature polymeric composition and below at least one of: 1) the creep relaxation temperature Tcr; 2) the heat deflection temperature Thd; or 3) the Vicat softening temperature Tvs of the high processing temperature polymeric composition; and subsequent to the increasing the temperature of the entire first and second articles, while the at least a portions of the first and second articles remain on the molding surface, decreasing the temperature of the entire first and second elements to a temperature below the melting temperature Tm of the low processing temperature polymeric composition, thereby forming a article.

From the foregoing, it will be seen that aspects herein are well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings is to be interpreted as illustrative and not in a limiting sense.

While specific elements and steps are discussed in connection to one another, it is understood that any element and/or steps provided herein is contemplated as being combinable with any other elements and/or steps regardless of explicit provision of the same while still being within the scope provided herein. Since many possible aspects may be made of the disclosure without departing from the scope thereof, it is to be understood that all matter herein set forth or shown in the accompanying drawings is to be interpreted as illustrative and not in a limiting sense.

EXAMPLES

The present disclosure is more particularly described in the following examples that are intended as illustrations only, since numerous modifications and variations within the scope of the present disclosure will be apparent to those skilled in the art.

Example 1: Evaluation of Commercially Available Polymeric Materials for Use as Components of the Low Processing Temperature Polymeric Composition In this example, twenty-five commercially available polymers were evaluated for their suitability as components of the low processing temperature polymeric composition. Samples of the polymers were evaluated in yarn and/or resin form to determine melting temperature $T_m$, the number of cycles under the cold Ross flex (CRF) test, shrinkage in yarn form, and physical appearance after thermoforming. The results of this testing regimen are provided in Table 1 below.

While most of these commercially available materials had a melting temperature $T_m$ within the desired range of less than about 125° C., the vast majority of the materials did not have the ideal balance of properties making them suitable for use in articles of footwear and apparel. For example, many of the materials had a yellow tint or were not transparent then thermoformed. Some of the materials, when extruded to form yarns, produced yarns with unacceptably high levels of shrinkage. Also, many of the materials became somewhat brittle under cold conditions and so were unable to withstand over 150,000 cycles of testing using the cold Ross flex test method, making the materials undesirable for some footwear applications.

For applications where it is unacceptable for the materials to become brittle under cold conditions, the Platamid H 2694/Pebax 4023 SA from Arkema was determined to be the one polymer tested that passed the Cold Ross flex (CRF) test at the desired level. This material exhibited all the other favorable polymeric properties desired for use in the low processing temperature polymeric composition described herein, such as a favorable melting temperature $T_m$, and remaining clear when thermoformed.

Although the present disclosure has been described with reference to preferred aspects, workers skilled in the art will recognize that changes can be made in form and detail without departing from the spirit and scope of the disclosure.

TABLE 1

Evaluation of Commercially Available Polymeric Materials

| Material Name | Manufact. | Polymer | Form Tested | Comment |
| --- | --- | --- | --- | --- |
| K85 | EMS | CoPA | Yarn | Good $T_m$, Poor CRF |
| K110 | EMS | CoPA | Yarn | Good $T_m$, Poor CRF |
| K140 | EMS | CoPA | Yarn | Good $T_m$, Poor CRF |
| K140/K110 (30:70) | EMS | CoPA | Resin | Good $T_m$, Poor CRF |
| K140/K110 (50:50) | EMS | CoPA | Resin | Good $T_m$, Poor CRF |
| K140/K110 (70:30) | EMS | CoPA | Resin | Good $T_m$, Poor CRF |
| K178 | EMS | CoPA | Yarn | Good $T_m$, Poor CRF |
| PA12 (Sample 2) | EMS | PA12 | Resin | Poor $T_m$, Good CRF |
| HTg PA (Sample 1) | EMS | PA | Resin | Good $T_m$, Poor CRF |
| HTg PA (Sample 2) | EMS | PA | Resin | Good $T_m$, Poor CRF |
| K140/PA6 bicofiber Nonwoven pressed | EMS | CoPA/ PA6 | Resin | Good $T_m$, Poor CRF |
| G125 | Hyosung | PA6 | Yarn | Good $T_m$, Poor CRF |
| 5220 | Schaetti | CoPA | Resin | Good $T_m$, Poor CRF |
| 5250 | Schaetti | CoPA | Resin | Good $T_m$, Poor CRF |
| 5290 | Schaetti | CoPA | Resin | Good $T_m$, Poor CRF |
| 5424 | Schaetti | CoPA | Resin | Good $T_m$, Poor CRF |
| Flor-M | Unitika | PA | Yarn | Good $T_m$, Poor CRF |
| Platamid H 2694/ Pebax 4023 SA | Arkema | PA | Resin | Good $T_m$, Good CRF, Good Shrinkage Level |
| Pearlbond DIPP 119 | Lubrizol | TPU | Resin | Good $T_m$, Poor CRF |
| Estane 58213 | Lubrizol | TPU | Resin | Good $T_m$, Poor Shrinkage Level |
| PM110646 Tack Yarn | Techmer | LLDPE | Yarn | Good $T_m$, Poor color (not transparent) |
| Irogran CA116 | Huntsman | TPU | Resin | Good $T_m$, Poor color (yellow tint) |
| Irogran CA117 | Huntsman | TPU | Resin | Good $T_m$, Poor color (yellow tint) |
| Irogran CA9068 | Huntsman | TPU | Resin | Good $T_m$, Poor color (yellow tint) |
| Irogran PS456 | Huntsman | TPU | Resin | Good $T_m$, Poor color (yellow tint) |

CoPA = co-polyamide;
PA = polyamide;
PA12 = Nylon 12;
PA6 = Nylon 6;
TPU = thermoplastic polyurethane,
LLDPE = linear low-density polyethylene,
$T_m$ = melting temperature,
CRF = Cold Ross flex test

What is claimed is:
1. A method for thermoforming an article, the method comprising:
   receiving an article, wherein the article is an article of footwear or a component of an article of footwear, and the article comprises a textile, the article comprising a low processing temperature polymeric composition;

positioning the article on a molding surface, wherein the molding surface including a foot-shaped last, and positioning includes placing the textile on the last with the textile covering an upper portion of the last, wrapping around at least a portion of the last, and covering a bottom portion of the last;

following the positioning, covering the entire article and the entire molding surface in a protective sheath;

compressing a material onto the article using the protective sheath by exposing the entire article, the entire material, and entire molding surface to a pressure less than atmospheric pressure;

while compressing the material onto the article, exposing the entire article, the entire material, and the entire molding surface to one or more heating zones, wherein the heat is applied from the outside of the protective sheath; and subsequent to the exposing the entire article, the entire material, and the entire molding surface to the one or more heating zones, exposing the entire article, the entire material, and the entire molding surface to one or more cooling zones while compressing the material onto the article, thereby forming the thermoformed article;

wherein, in the thermoformed article, the textile forms both at least a medial midfoot area of an upper and an outsole area of a thermoformed article of footwear or a thermoformed component of an article of footwear.

2. The method of claim 1, wherein the protective sheath comprises an elastomeric material, and wherein the elastomeric material exhibits a melting temperature greater than about 135° C.

3. The method of claim 1, wherein the exposing the entire article to one or more heating zones comprises exposing at least a portion of the article to a temperature at or above the melting temperature $T_m$ of the low processing temperature polymeric composition.

4. The method of claim 3, wherein the exposing the entire article to one or more cooling zones comprises exposing at least a portion of the article to a temperature below the melting temperature $T_m$ of the low processing temperature polymeric composition.

5. The method of claim 4, wherein the exposing the at least a portion of the article to a temperature below the melting temperature $T_m$ of the low processing temperature polymeric composition comprises exposing the at least a portion of the article to a temperature of about 25° C. or less.

6. The method of claim 1, wherein the exposing the entire article to one or more heating zones comprises exposing at least a portion of the article to a first heating zone having a first temperature at or above the melting temperature $T_m$ of the low processing temperature polymeric composition, and exposing the at least a portion of the article to a second heating zone having a second temperature at or above the melting temperature $T_m$ of the low processing temperature polymeric composition, wherein the first and second temperatures are distinct from one another.

7. The method of claim 6, wherein the first temperature is greater than the second temperature.

8. The method of claim 6, wherein the first temperature is about 80° C. or greater.

9. The method of claim 1, wherein the protective sheath comprises one or more markings on an inner surface, and, upon the exposing the article to the one or more heating zones and the exposing the article to the one or more cooling zones, the markings are imprinted onto the outer surface of the article.

10. The method of claim 1, wherein the article further comprises one or more of an ankle collar lining, an ankle collar foam, an upper lining, an upper foam layer, a chassis, or a heel counter.

11. The method of claim 10, wherein the article further comprises the chassis, the heel counter, or both, and wherein, in the thermoformed article, the chassis, the heel counter, or both are positioned inside the upper.

12. The method of claim 11, wherein at least a portion of the chassis or the heel counter comprise a second low processing temperature polymeric composition, and wherein the exposing the entire article to one or more heating zones comprises exposing at least a portion of the article to a temperature that is above: a melting temperature $T_m$ of the low processing temperature polymeric composition of the article; and a melting temperature $T_m$ of the second low processing temperature polymeric composition.

\* \* \* \* \*